US011902070B2

(12) United States Patent
Lomayev et al.

(10) Patent No.: US 11,902,070 B2
(45) **Date of Patent: *Feb. 13, 2024**

(54) APPARATUS, SYSTEM AND METHOD OF COMMUNICATING A PHYSICAL LAYER PROTOCOL DATA UNIT (PPDU) INCLUDING A TRAINING FIELD

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Claudio Da Silva, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,200

(22) Filed: Oct. 24, 2022

(65) Prior Publication Data

US 2023/0308331 A1 Sep. 28, 2023

Related U.S. Application Data

(63) Continuation of application No. 17/120,473, filed on Dec. 14, 2020, now Pat. No. 11,516,062, which is a (Continued)

(51) Int. Cl.
*H04L 27/26* (2006.01)
*H04L 5/00* (2006.01)

(52) U.S. Cl.
CPC ...... *H04L 27/26136* (2021.01); *H04L 27/262* (2013.01); *H04L 27/2613* (2013.01);

(Continued)

(58) Field of Classification Search
CPC ........... H04L 27/26136; H04L 27/2613; H04L 27/2617; H04L 27/262; H04L 27/2646;

(Continued)

(56) References Cited

U.S. PATENT DOCUMENTS

| | | | |
|---|---|---|---|
| 10,382,598 | B1 | 8/2019 | Zhang et al. |
| 10,651,977 | B2 | 5/2020 | Seok |

(Continued)

FOREIGN PATENT DOCUMENTS

| | | |
|---|---|---|
| WO | 2013122301 | 8/2013 |
| WO | 2017044420 | 3/2017 |
| WO | 2019010355 | 1/2019 |

OTHER PUBLICATIONS

Office Action for U.S. Appl. No. 17/966,847, dated Mar. 30, 2023, 13 pages.

(Continued)

*Primary Examiner* — Siming Liu
(74) *Attorney, Agent, or Firm* — Shichrur & Co.

(57) ABSTRACT

Some demonstrative embodiments include apparatuses, devices, systems and methods of communicating a PPDU including a training field. For example, an Enhanced Directional Multi-Gigabit (DMG) (EDMG) wireless communication station may be configured to determine one or more Orthogonal Frequency Division Multiplexing (OFDM) Training (TRN) sequences in a frequency domain based on a count of one or more 2.16 Gigahertz (GHz) channels in a channel bandwidth for transmission of an EDMG PPDU including a TRN field; generate one or more OFDM TRN waveforms in a time domain based on the one or more OFDM TRN sequences, respectively, and based on an OFDM TRN mapping matrix, which is based on a count of the one or more transmit chains; and transmit an OFDM mode transmission of the EDMG PPDU over the channel (Continued)

bandwidth, the OFDM mode transmission comprising transmission of the TRN field based on the one or more OFDM TRN waveforms.

20 Claims, 9 Drawing Sheets

Related U.S. Application Data continuation of application No. 16/056,787, filed on Aug. 7, 2018, now Pat. No. 10,904,062.

(60) Provisional application No. 62/556,453, filed on Sep. 10, 2017, provisional application No. 62/554,083, filed on Sep. 5, 2017, provisional application No. 62/542,372, filed on Aug. 8, 2017.

(52) U.S. Cl.
CPC ...... *H04L 27/2617* (2013.01); *H04L 27/2646* (2013.01); *H04L 27/2662* (2013.01); *H04L 27/2666* (2013.01); *H04L 27/2672* (2013.01); *H04L 5/0007* (2013.01)

(58) Field of Classification Search
CPC ............. H04L 27/2662; H04L 27/2666; H04L 27/2672
See application file for complete search history.

(56) References Cited

U.S. PATENT DOCUMENTS

| | | | |
|---|---|---|---|
| 10,904,062 B2 | 1/2021 | Lomayev et al. | |
| 11,025,369 B2 | 6/2021 | Lomayev et al. | |
| 11,509,422 B2 | 11/2022 | Lomayev et al. | |
| 11,516,062 B2 * | 11/2022 | Lomayev | H04L 27/262 |
| 11,563,476 B2 | 1/2023 | Murakami et al. | |
| 2011/0135023 A1 | 6/2011 | Kwon et al. | |
| 2011/0176626 A1 | 7/2011 | Liao et al. | |
| 2012/0224659 A1 | 9/2012 | Yu et al. | |
| 2015/0181458 A1 | 6/2015 | Aryafar et al. | |
| 2016/0261319 A1 | 9/2016 | Sanderovich | |
| 2017/0033844 A1 | 2/2017 | Kasher | |
| 2017/0048095 A1 | 2/2017 | Sun et al. | |
| 2017/0070995 A1 | 3/2017 | Eitan et al. | |
| 2017/0078008 A1 | 3/2017 | Kasher et al. | |
| 2017/0257201 A1 | 9/2017 | Eitan et al. | |
| 2018/0062902 A1 | 3/2018 | Gagiev et al. | |
| 2018/0191419 A1 | 7/2018 | Eitan et al. | |
| 2019/0044781 A1 | 2/2019 | Lomayev et al. | |
| 2019/0159272 A1 | 5/2019 | Yun et al. | |
| 2019/0173636 A1 | 6/2019 | Yun et al. | |
| 2019/0190754 A1 | 6/2019 | Kim et al. | |
| 2019/0215702 A1 | 7/2019 | Yun et al. | |
| 2019/0386862 A1 | 12/2019 | Islam et al. | |
| 2021/0168010 A1 | 6/2021 | Lomayev et al. | |
| 2023/0188258 A1 | 6/2023 | Lomayev et al. | |
| 2023/0224080 A1 | 7/2023 | Lomayev et al. | |

OTHER PUBLICATIONS

International Search Report and the Written Opinion for International Application No. PCT/US2018/023765, dated Jul. 6, 2018, 9 pages.
International Preliminary Report on Patentability for International Application No. PCT/US2018/023765, dated Oct. 3, 2019, 6 pages.
Artyom Lomayev et al., 'SC PHY EDMG-CEF Design for Channel Bonding x3', IEEE 802.11-16/1207r0, Sep. 11, 2016, 16 pages.
IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
International Search Report and the Written Opinion for International Application No. PCT/US2018/040991, dated Oct. 26, 2018, 11 pages.
Lei Huang et al., 'CR on MIMO phase of SU-MIMO and MU-MIMO beamforming' , IEEE 802.11-17/0541r2 , Apr. 10, 2017, 6 pages.
Artyom Lomayev et al., 'Proposed Comment Resolution for CID 63, 68 in 11ay', IEEE 802.11-17/0893r2 , Jun. 12, 2017, 8 pages.
Artyom Lomayev et al., '30.6.3 OFDM EDMG-CEF Definition', IEEE 802.11-17/0596r0, Apr. 21, 2017, 7 pages.
Office Action for U.S. Appl. No. 16/056,787, dated Oct. 2, 2019, 20 pages.
International Preliminary Report on Patentability for International Application No. PCT/US2018/040991, dated Jan. 7, 2020, 9 pages.
Office Action for U.S. Appl. No. 16/056,787, dated Apr. 16, 2020, 16 pages.
Notice of Allowance for U.S. Appl. No. 16/056,787, dated Aug. 10, 2020, 7 pages.
Office Action for U.S. Appl. No. 16/488,006, dated Sep. 24, 2020, 28 pages.
Notice of Allowance for U.S. Appl. No. 16/488,006, dated Jan. 21, 2021, 13 pages.
Notice of Allowance for U.S. Appl. No. 17/326,113, dated Jul. 12, 2022, 22 pages.
Office Action for U.S. Appl. No. 17/120,473, dated Apr. 6, 2022, 30 pages.
Office Action for U.S. Appl. No. 18/174,626, dated Jul. 17, 2023, 20 pages.
Notice of Allowance for U.S. Appl. No. 17/966,847, dated Jul. 19, 2023, 8 pages.
Notice of Allowance for U.S. Appl. No. 17/966,847, dated Sep. 18, 2023, 8 pages.
Notice of Allowance for U.S. Appl. No. 17/966,847, dated Oct. 19, 2023, 7 pages.
Notice of Allowance for U.S. Appl. No. 18/174,626, dated Oct. 25, 2023, 17 pages.
Notice of Allowance for U.S. Appl. No. 17/966,847, dated Nov. 6, 2023, 7 pages.
Notice of Allowance for U.S. Appl. No. 18/174,626, dated Nov. 14, 2023, 7 pages.
Notice of Allowance for U.S. Appl. No. 18/174,626, dated Dec. 15, 2023, 8 pages.

* cited by examiner

300

APPARATUS, SYSTEM AND METHOD OF COMMUNICATING A PHYSICAL LAYER PROTOCOL DATA UNIT (PPDU) INCLUDING A TRAINING FIELD

CROSS REFERENCE

This application claims the benefit of and priority from U.S. Provisional Patent Application No. 62/542,372 entitled "Apparatus, System and Method of Communicating a Physical Layer Protocol Data Unit (PPDU) Including a Training Field", filed Aug. 8, 2017, U.S. Provisional Patent Application No. 62/554,083 entitled "Apparatus, System and Method of Communicating a Physical Layer Protocol Data Unit (PPDU)", filed Sep. 5, 2017, and U.S. Provisional Patent Application No. 62/556,453 entitled "Apparatus, System and Method of Communicating a Physical Layer Protocol Data Unit (PPDU) Including a Training Field", filed Sep. 10, 2017, the entire disclosures of all of which are incorporated herein by reference.

TECHNICAL FIELD

Embodiments described herein generally relate to communicating a Physical Layer Protocol Data Unit (PPDU) including a training field.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
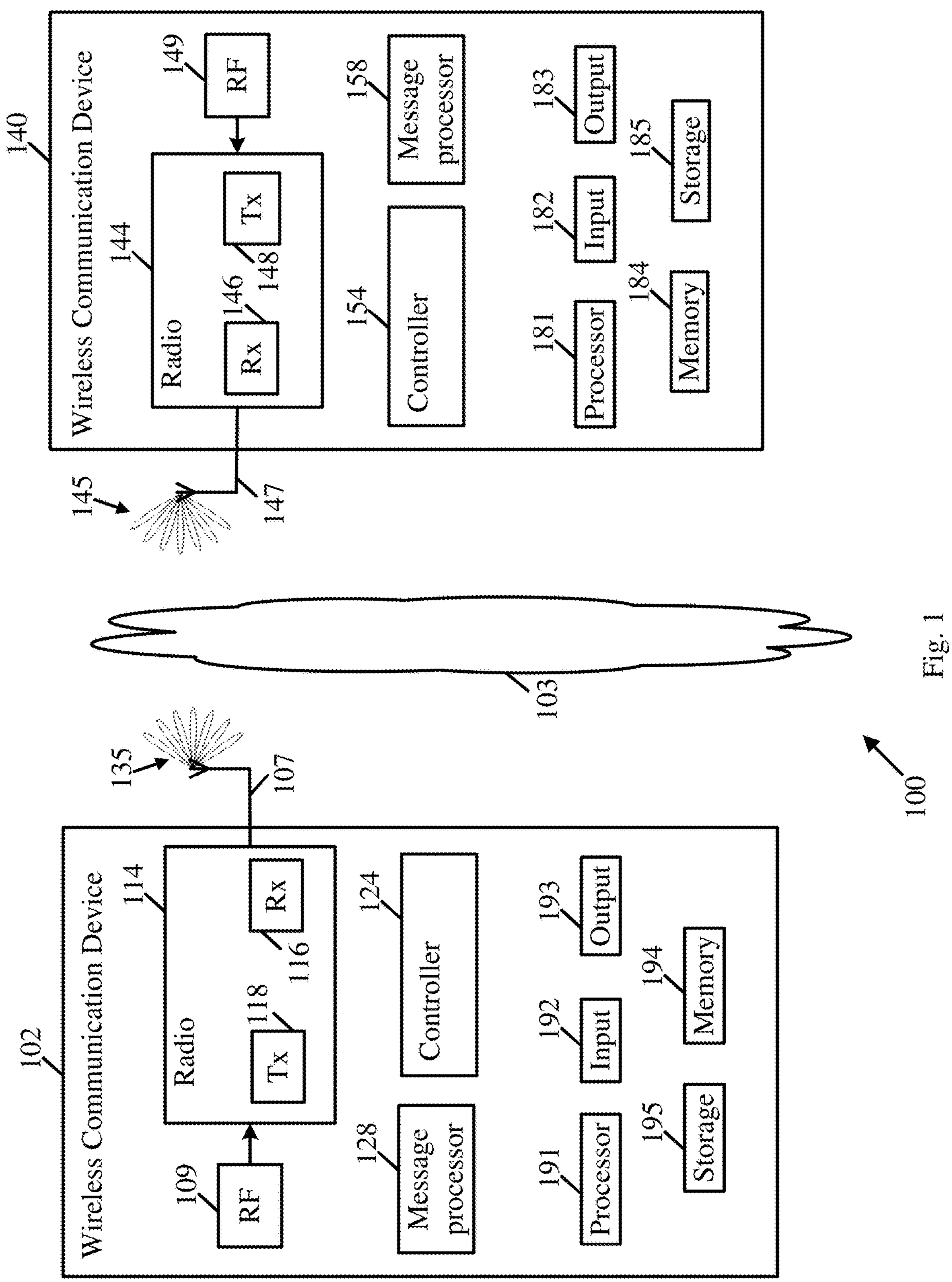
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay/D1.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications-Amendment 7: Enhanced Throughput for Operation in License-Exempt Bands Above 45 GHz, November 2017)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a SIG band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114.

In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144.

In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC)

schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
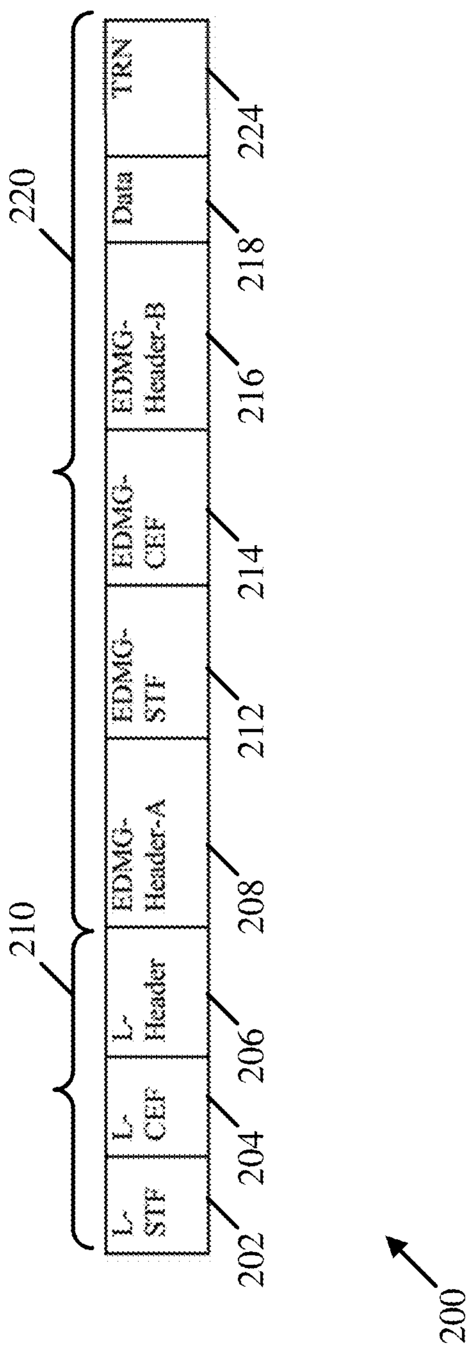
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more training sequences fields, e.g., a Training (TRN) field 224.

In some demonstrative embodiments, EDMG portion 220 may include some or all of the fields shown in FIG. 2 and/or one or more other additional or alternative fields.

Referring back to FIG. 1, in some demonstrative embodiments, devices 102 and/or 140 may be configured to generate, transmit, receive and/or process one or more transmissions, e.g., including one or more EDMG PPDUs, e.g., as described below.

In some demonstrative embodiments, for example, devices 102 and/or 140 may be configured to perform one or more operations, and/or functionalities of EDMG STA, which may be configured, for example, to generate, transmit, receive and/or process one or more transmissions, e.g., including one or more EDMG PPDUs, e.g., including one or more fields according to the EDMG PPDU format of FIG. 2.

In some demonstrative embodiments, devices 102 and/or 140 may be configured to generate, transmit, receive and/or process one or more transmissions of PPDUs, for example, EDMG PPDUs, for example, OFDM PPDUs, e.g., in accordance with an IEEE 802.11ay Specification and/or any other specification.

In some demonstrative embodiments, devices 102 and/or 140 may be configured to generate, transmit, receive and/or process one or more transmissions of OFDM PHY PPDUs, for example, EDMG OFDM PHY PPDUs, for example, according to an EDMG transmission mode for OFDM PHY, e.g., as described below.

In some demonstrative embodiments, devices 102 and/or 140 may be configured to generate, transmit, receive and/or process one or more transmissions of the OFDM PHY PPDUs, for example, according to a transmission mode, which may be configured to support transmission of OFDM PHY PPDUs over a 2.16 GHz bandwidth, a 4.32 GHz bandwidth, a 6.48 GHz bandwidth, a 8.64 GHz bandwidth, and/or any other bandwidth, for example, using one or more space-time streams and/or one or more transmit chains and/or antennas.

In some demonstrative embodiments, devices 102 and/or 140 may be configured to implement one or more operations to support OFDM transmission of an EDMG PPDU, for example, an EDMG OFDM PHY PPDU for OFDM PHY, e.g., in accordance with an IEEE 802.11ay Specification, e.g., as described below.

In some demonstrative embodiments, devices 102 and/or 140 may be configured to generate, transmit, receive and/or process a PPDU, for example, an EDMG PPDU, e.g., an EDMG OFDM PPDU, for example, according to the format of EDMG PPDU 200 (FIG. 2), including a TRN field, e.g., TRN field 224 (FIG. 2), which may be configured according to a definition of an OFDM TRN subfield, e.g., instead of a TRN unit.

For example, a definition of a TRN field, e.g., TRN field 224 (FIG. 2), for example, in compliance with an IEEE 802.11ay Specification, may include one or more, e.g., a number of, TRN units.

In one example, a TRN unit, e.g., each TRN unit, may include one or more, e.g., a number of, TRN subfields. One definition of the TRN subfield, for example, for a Single Carrier (SC) mode and/or a Control PHY mode, may use Golay complementary sequences in a time domain. For example, a sequence length of the Golay complementary sequences may be dependent on the number of 2.16 GHz channels used for PPDU transmission. In one example, the sequence length may be defined by a factor (also referred to as "channel bonding factor") $N_{CB}$, which may be equal, for example, to 1, 2, 3 or 4.

For example, the TRN field may be transmitted using one or more, e.g., a number of, transmit chains, denoted $N_{TX}$. For example, different chains may use different Golay sequences.

In some demonstrative embodiments, devices 102 and/or 140 may be configured to generate, transmit, receive and/or process the TRN field according to an OFDM TRN subfield definition, e.g., as described below.

In some demonstrative embodiments, the OFDM TRN subfield definition may be configured according to a TRN field structure, which may be, for example, compatible with an IEEE 802.11ay Specification, e.g., even allowing to keep the TRN field structure unchanged, if desired.

In some demonstrative embodiments, the OFDM TRN subfield definition may be configured differently from the SC and/or Control PHY TRN subfield definition.

In some demonstrative embodiments, the OFDM TRN subfield may be defined in a frequency domain, for example, using a set of sequences, e.g., as described below.

In some demonstrative embodiments, devices 102 and/or 140 may be configured to transmit the OFDM TRN field, for example, using one or more, e.g., a number of, transmit chains, e.g., $N_{TX}$ transmit chains. For example, different transmit chains may use different frequency domain sequences, e.g., as described below.

In some demonstrative embodiments, a sequence length of the frequency domain sequences may be dependent, for example, on the number of 2.16 GHz channels used for PPDU transmission. In one example, the sequence length may be defined at least by the factor $N_{CB}$, which may be equal, for example, to 1, 2, 3 or 4. In other embodiments, any other additional or alternative factor may be used.

In some demonstrative embodiments, for example, the sequence length of the frequency domain sequences may be defined, for example, in accordance with one or more OFDM signal parameters for OFDM PPDU, e.g., in accordance with a subclause defining OFDM signal parameters for an IEEE 802.11ay Specification. Other additional or alternative parameters may be used.

In some demonstrative embodiments, devices 102 and/or 140 may be configured to generate, transmit, receive and/or process the TRN field according to an OFDM TRN subfield definition, which may be defined, for example, in a frequency domain, e.g., as described below.

In some demonstrative embodiments, the OFDM TRN subfield definition in the frequency domain may allow, for example, one or more technical benefits and/or solving one or more technical problems.

In one example, utilizing OFDM TRN subfields defined in the frequency domain may allow, for example, at least to process the OFDM TRN fields on a per subcarrier basis, for example, to support at least performing beamforming training and/or channel estimation per subcarrier basis.

In some demonstrative embodiments, the OFDM TRN subfield definition in the frequency domain may allow, for example, one or more technical benefits, for example, compared to a solution, which defines the TRN subfields in a time domain, for example, for SC and/or Control PHY. For example, such a definition in the time domain may not support channel estimation in the frequency domain.

In some demonstrative embodiments, devices 102 and/or 140 may be configured to generate, transmit, receive and/or process the TRN field according to a TRN subfield definition for EDMG OFDM PHY.

In some demonstrative embodiments, the TRN subfields may be defined in the frequency domain, for example, per transmit chain, using a sequence set, e.g., as described below.

In some demonstrative embodiments, for example, a number of different sequences in the set may be equal to the number of transmit chains, e.g., as described below.

In some demonstrative embodiments, the TRN sequences may be defined for a plurality of different channel bonding factors, e.g., at least for $N_{CB}$=1, 2, 3, and/or 4, and/or any other additional or alternative factor.

In some demonstrative embodiments, an OFDM TRN subfield of an EDMG PPDU may be defined, for example, based on one or more OFDM TRN sequences, which may be based on a channel bandwidth to be used for transmitting the EDMG PPDU, e.g., as described below.

In some demonstrative embodiments, for example, the OFDM TRN sequences may be defined, for example, to support a channel bandwidth of 2.16 GHz, a channel bandwidth of 4.32 GHz, a channel bandwidth of 6.48 GHz, and/or a channel bandwidth of 8.64 GHz, e.g., as described below. In other embodiments, the OFDM TRN sequences may be defined and/or configured with respect to any other additional or alternative channel bandwidth.

In some demonstrative embodiments, for example, the OFDM TRN sequences may be defined, for example, to support transmission via one or more transmit chains, e.g., as described below.

In some demonstrative embodiments, the OFDM TRN sequences may be configured to support transmission via 1, 2, 3, 4, 5, 6, 7 or 8 transmit chains, e.g., as described below. In other embodiments, any other number of transmit chains may be utilized, for example, more than 8 transmit chains, for example, up to 16 transmit chains, or even more than 16 transmit chains.

In some demonstrative embodiments, controller 124 may be configured to cause, trigger, and/or control a wireless station implemented by device 102, e.g., an EDMG STA, to determine one or more OFDM TRN sequences in a frequency domain, for example, based on a count of one or more 2.16 GHz channels in a channel bandwidth for transmission of an EDMG PPDU including a TRN field, for example, EDMG PPDU 200 including TRN field 224 (FIG. 2), e.g., as described below.

In some demonstrative embodiments, the one or more OFDM TRN sequences may correspond to one or more respective transmit chains for transmission of the EDMG PPDU, e.g., as described below.

In some demonstrative embodiments, controller 124 may be configured to cause, trigger, and/or control the wireless station implemented by device 102 to generate one or more OFDM TRN waveforms in a time domain, for example, based on the one or more OFDM TRN sequences, respectively, and based on an OFDM TRN mapping matrix, e.g., as described below.

In some demonstrative embodiments, the OFDM TRN mapping matrix may be based on a count of the one or more transmit chains, e.g., as described below.

In some demonstrative embodiments, controller 124 may be configured to cause, trigger, and/or control the wireless station implemented by device 102 to transmit an OFDM mode transmission of the EDMG PPDU over the channel bandwidth, e.g., as described below.

In some demonstrative embodiments, the channel bandwidth may include a 2.16 GHz, a 4.32 GHz, a 6.48 GHz, or an 8.64 GHz bandwidth, e.g., as described below.

In other embodiments, the channel bandwidth may include any other bandwidth.

In some demonstrative embodiments, the OFDM mode transmission may include transmission of the TRN field based on the one or more OFDM TRN waveforms, e.g., as described below.

In some demonstrative embodiments, an OFDM TRN subfield to be transmitted via a transmit chain may be determined, for example, based on an OFDM TRN sequence, which may be based at least on an index of the transmit chain, e.g., as described below.

For example, a first OFDM TRN subfield to be transmitted via a first transmit chain may be determined, for example, based on a first OFDM TRN sequence, which may be based at least on the index of the first transmit chain, and a second OFDM TRN subfield to be transmitted via a second transmit chain may be determined, for example, based on a second OFDM TRN sequence, e.g., different from the first OFDM TRN sequence, which may be based at least on the index of the second transmit chain, as described below.

In some demonstrative embodiments, an OFDM TRN sequence of the one or more OFDM TRN sequences may include first and second predefined sequences, for example, corresponding to an index of a transmit chain of the one or more transmit chains, e.g., as described below.

In some demonstrative embodiments, the OFDM TRN sequence may include the first predefined sequence followed by three zeros, which, for example, may be followed by the second predefined sequence, e.g., as described below.

In some demonstrative embodiments, the first and second predefined sequences may have a same length, e.g., as described below.

In some demonstrative embodiments, each of the first and second predefined sequences may include a predefined sequence of symbols, for example, each symbol of the sequence of symbols my include +1, −1, +j, or −j, e.g., as described below.

In other embodiments, any other additional or alternative sequences may be used.

In some demonstrative embodiments, devices 102 and/or 140 may be configured to define an OFDM TRN subfield to be transmitted via a transmit chain over a channel bandwidth, for example, based on a sequence, e.g., a TRN sequence (also referred to as "TRN-BASIC sequence"), which may correspond, for example, to the transmit chain and/or the channel bandwidth, e.g., as described below.

In some demonstrative embodiments, controller 124 may be configured to cause, trigger, and/or control the wireless station implemented by device 102 to determine the one or more OFDM TRN sequences, for example, according to one of the following definitions:

$\text{TRN-BASIC}^{iTX}_{-177,\ 177}=[\text{Seq}^{iTX}_{left,\ 176},\ 0,\ 0,\ 0,\ \text{Seq}^{iTX}_{right,\ 176}]$, for $i_{TX}$=1, 2, 3, 4, 5, 6, 7, 8, when the channel bandwidth includes a 2.16 GHz channel, wherein $i_{TX}$ denotes a transmit chain index, $\text{TRN-BASIC}^{iTX}_{-177,\ 177}$ denotes an OFDM TRN sequence for the 2.16 GHz channel and the transmit chain index $i_{TX}$, $\text{Seq}^{iTX}_{left,\ 176}$ denotes a first predefined sequence of length 176 corresponding to the transmit chain index $i_{TX}$, and $\text{Seq}^{iTX}_{right,\ 176}$ denotes a second predefined sequence of length 176 corresponding to the transmit chain index $i_{TX}$;

$\text{TRN-BASIC}^{iTX}_{-386,\ 386}=[\text{Seq}^{iTX}_{left,\ 385},\ 0,\ 0,\ 0,\ \text{Seq}^{iTX}_{right,\ 385}]$, for $i_{TX}$=1, 2, 3, 4, 5, 6, 7, 8, when the channel bandwidth includes a 4.32 GHz channel, wherein $i_{TX}$ denotes a transmit chain index, $\text{TRN-BASIC}^{iTX}_{-386,\ 386}$ denotes an OFDM TRN sequence for the 4.32 GHz channel and the transmit chain index $i_{TX}$, $\text{Seq}^{iTX}_{left,\ 385}$ denotes a first predefined sequence of length 385 corresponding to the transmit chain index $i_{TX}$, and $\text{Seq}^{iTX}_{right,\ 385}$ denotes a second predefined sequence of length 385 corresponding to the transmit chain index $i_{TX}$;

$\text{TRN-BASIC}^{iTX}_{-596,\ 596}=[\text{Seq}^{iTX}_{left,\ 595},\ 0,\ 0,\ 0,\ \text{Seq}^{iTX}_{right,\ 595}]$, for $i_{TX}$=1, 2, 3, 4, 5, 6, 7, 8, when the channel bandwidth includes a 6.48 GHz channel, wherein $i_{TX}$ denotes a transmit chain index, $\text{TRN-BASIC}^{iTX}_{-595,\ 595}$ denotes an OFDM TRN sequence for the 6.48 GHz channel and the transmit chain index $i_{TX}$, $\text{Seq}^{iTX}_{left,\ 595}$ denotes a first predefined sequence of length 595 corresponding to the transmit chain index $i_{TX}$, and $\text{Seq}^{iTX}_{right,\ 595}$ denotes a second predefined sequence of length 595 corresponding to the transmit chain index $i_{TX}$; and $\text{TRN-BASIC}^{iTX}_{-805,\ 805}=[\text{Seq}^{iTX}_{left,\ 804},\ 0,\ 0,\ 0,\ \text{Seq}^{iTX}_{right,\ 804}]$, for $i_{TX}$=1, 2, 3, 4, 5, 6, 7, 8, when the channel bandwidth includes a 8.64 GHz channel, wherein $i_{TX}$ denotes a transmit chain index, $\text{TRN-BASIC}^{iTX}_{-805,\ 805}$ denotes an OFDM TRN sequence for the 8.64 GHz channel and the transmit chain index $i_{TX}$, $\text{Seq}^{iTX}_{left,\ 804}$ denotes a first predefined sequence of length 804 corresponding to the transmit chain index $i_{TX}$, and $\text{Seq}^{iTX}_{right,\ 804}$ denotes a second predefined sequence of length 804 corresponding to the transmit chain index $i_{TX}$.

In some demonstrative embodiments, a length of each of the one or more OFDM TRN sequences may be based on the count of the one or more 2.16 GHz channels, e.g., as described below.

In some demonstrative embodiments, the count of the one or more transmit chains may include 1, 2, 3, 4, 5, 6, 7, or 8 value, e.g., as described below.

In other embodiments, the count of the one or more transmit chains may include any other additional or alternative values.

In some demonstrative embodiments, for example, for EDMG PPDU transmissions using the EDMG OFDM mode over a 2.16 GHz channel, e.g., for $N_{CB}$=1, the OFDM TRN-BASIC sequence may be defined in the frequency domain for an $i_{TX}$-th transmit chain, e.g., as follows:

$$\text{TRN-BASIC}^{iTX}_{-177,177}=[\text{Seq}^{iTX}_{left,176},0,0,0,\text{Seq}^{iTX}_{right,176}],\ \text{for}\ i_{TX}=1,2,3,4,5,6,7,8$$

In some demonstrative embodiments, for example, for EDMG PPDU transmissions using the EDMG OFDM mode over a 4.32 GHz channel, e.g., for $N_{CB}$=2, the OFDM TRN-BASIC sequence may be defined in the frequency domain for an $i_{TX}$-th transmit chain, e.g., as follows:

$$\text{TRN-BASIC}^{iTX}_{-386,386}=[\text{Seq}^{iTX}_{left,385},0,0,0,\text{Seq}^{iTX}_{right,385}],\ \text{for}\ i_{TX}=1,2,3,4,5,6,7,8$$

In some demonstrative embodiments, for example, for EDMG PPDU transmissions using the EDMG OFDM mode over a 6.48 GHz channel, e.g., for $N_{CB}$=3, the OFDM TRN-BASIC sequence may be defined in the frequency domain for an $i_{TX}$-th transmit chain, e.g., as follows:

$$\text{TRN-BASIC}^{iTX}_{-596,596}=[\text{Seq}^{iTX}_{left,595},0,0,0,\text{Seq}^{iTX}_{right,595}],\ \text{for}\ i_{TX}=1,2,3,4,5,6,7,8$$

In some demonstrative embodiments, for example, for EDMG PPDU transmissions using the EDMG OFDM mode over a 8.64 GHz channel, e.g., for $N_{CB}$=4, the OFDM TRN-BASIC sequence may be defined in the frequency domain for an $i_{TX}$-th transmit chain, e.g., as follows:

$$\text{TRN-BASIC}^{iTX}_{-805,805}=[\text{Seq}^{iTX}_{left,804},0,0,0,\text{Seq}^{iTX}_{right,804}],\ \text{for}\ i_{TX}=1,2,3,4,5,6,7,8$$

In some demonstrative embodiments, some or all of the OFDM TRN-BASIC sequences defined above may be implemented, and/or one or more additional or alternative sequences may be defined. In one example, one or more OFDM TRN-BASIC sequences may be defined for one or more other channel bandwidths and/or channel bonding factors.

In some demonstrative embodiments, the sequences $\text{Seq}^{iTX}_{left,N}$ and/or $\text{Seq}^{iTX}_{right,N}$ may include sequences of a length N corresponding to the $i_{TX}$ transmit chain, e.g., as described below.

In some demonstrative embodiments, some or all of the OFDM TRN-BASIC sequences defined above may be used, and/or one or more additional or alternative the OFDM TRN-BASIC sequences may be defined, e.g., based on the channel bandwidth, the transmit chain and/or any other additional or alternative parameters.

In some demonstrative embodiments, the OFDM TRN mapping matrix, denoted $P_{TRN}$ may be defined, for example, based at least on the number of transmit chains, e.g., as described below.

In some demonstrative embodiments, the OFDM TRN mapping matrix $P_{TRN}$ may be based on the count of the one or more transmit chains, denoted $N_{TX}$, e.g., as follows:

$$P_{TRN} = [+1\ -1],\ \text{for } N_{TX} = 1 \tag{1}$$

$$P_{TRN} = \begin{bmatrix} +1 & -1 \\ +1 & +1 \end{bmatrix},\ \text{for } N_{TX} = 2 \tag{2}$$

$$P_{TRN} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ \text{for } N_{TX} = 3 \tag{3}$$

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ \text{for } N_{TX} = 4 \tag{4}$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},\ w_6 = \exp(-j2\pi/6),\ \text{for } N_{TX} = 5 \text{ or } 6 \tag{5}$$

$$P_{TRN} = \begin{bmatrix} P_{4\times4} & P_{4\times4} \\ P_{4\times4} & -P_{4\times4} \end{bmatrix},\ \text{for } N_{TX} = 7 \text{ or } 8 \tag{6}$$

In some demonstrative embodiments, controller 124 may be configured to cause, trigger, and/or control the wireless station implemented by device 102 to generate the one or more OFDM TRN waveforms, for example, based on a number of OFDM symbols in a TRN subfield, e.g., as described below.

In some demonstrative embodiments, the number of OFDM symbols in the TRN subfield may be based on the count of the one or more transmit chains, e.g., as described below.

In some demonstrative embodiments, the number of OFDM symbols in the TRN subfield, denoted $N_{TRN}^{N_{TX}}$, may be based on the count of the one or more transmit chains, denoted $N_{TX}$, e.g., as follows:

$N_{TRN}^{N_{TX}}=2$, for $N_{TX}=1$ $N_{TRN}^{N_{TX}}=2$, for $N_{TX}=2$ $N_{TRN}^{N_{TX}}=3$, for $N_{TX}=3$ $N_{TRN}^{N_{TX}}=4$, for $N_{TX}=4$ $N_{TRN}^{N_{TX}}=6$, for $N_{TX}$,=5 or 6

$N_{TRN}^{N_{TX}}=8$, for $N_{TX}$=7 or 8

In some demonstrative embodiments, a number of rows in the OFDM TRN mapping matrix $P_{TRN}$ may be configured, for example, based on the value of $N_{TX}$ to be supported, for example, such that the OFDM TRN subfield waveform may be defined using $N_{TX}$ rows from the OFDM TRN mapping matrix $P_{TRN}$.

In some demonstrative embodiments, a number of columns in the OFDM TRN mapping matrix $P_T$ may be configured, for example, based on the value of $N_{TRN}^{N_{TX}}$ to be supported. For example, the number of columns in the OFDM TRN mapping matrix $P_{TRN}$ may be equal to $N_{TRN}^{N_{TX}}$, e.g., as described below.

In some demonstrative embodiments, the OFDM TRN mapping matrix $P_{TRN}$ and/or the value of $N_{TRN}^{N_{TX}}$ may be defined, for example, for $N_{TX}=1$, e.g., as follows:

$$P_{TRN}=[+1 -1], N_{TRN}^{N_{TX}}=2$$

In some demonstrative embodiments, the OFDM TRN mapping matrix $P_{TRN}$ and/or the value of $N_{TRN}^{N_{TX}}$ may be defined, for example, for $N_{TX}=2$, e.g., as follows:

$$P_{TRN} = \begin{bmatrix} +1 & -1 \\ +1 & +1 \end{bmatrix},\ N_{TRN}^{N_{TX}} = 2$$

In some demonstrative embodiments, the OFDM TRN mapping matrix $P_{TRN}$ and/or the value of $N_{TRN}^{N_{TX}}$ may be defined, for example, for $N_{TX}=3$, e.g., as follows:

$$P_{TRN} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ N_{TRN}^{N_{TX}} = 3$$

In some demonstrative embodiments, the OFDM TRN mapping matrix $P_{TRN}$ and/or the value of $N_{TRN}^{N_{TX}}$ may be defined, for example, for $N_{TX}=4$, e.g., as follows:

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ N_{TRN}^{N_{TX}} = 4$$

In some demonstrative embodiments, the OFDM TRN mapping matrix $P_R N$ and/or the value of $N_{TRN}^{N_{TX}}$ may be defined, for example, for $N_{TX}=5,6$, e.g., as follows:

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},\ w_6 = \exp(-j2\pi/6),\ N_{TRN}^{N_{TX}} = 6$$

In some demonstrative embodiments, the OFDM TRN mapping matrix $P_{TRN}$ and/or the value of $N_{TRN}^{N_{TX}}$ may be defined, for example, for $N_{TX}=7,8$, e.g., as follows:

$$P_{TRN} = \begin{bmatrix} P_{4\times4} & P_{4\times4} \\ P_{4\times4} & -P_{4\times4} \end{bmatrix},\ N_{TRN}^{N_{TX}} = 8$$

In other embodiments, any other additional or alternative definition of the OFDM TRN mapping matrix and/or value of $N_{TRN}^{N_{TX}}$ may be utilized.

In some demonstrative embodiments, devices 102 and/or 140 may be configured to define the OFDM TRN subfield according to an OFDM TRN subfield waveform in a time domain, which may be based, for example, on the OFDM TRN-BASIC sequence, e.g., as described below.

In some demonstrative embodiments, controller 124 may be configured to cause, trigger, and/or control the wireless station implemented by device 102 to generate an OFDM TRN waveform, denoted $r_{TRN}^{n,i_{TX}}(qT_s)$, corresponding to a transmit chain having a transmit chain index $i_{TX}$, e.g., as follows:

$$r_{TRN}^{n,i_{TX}}(qT_s) = \frac{1}{\sqrt{N_{TRN}^{Tone}}} w(qT_s) \cdot \cdot \sum_{k=-N_{SR}}^{N_{SR}} [P_{TRN}]_{i_{TX},n} TRN - BASIC_k^{i_{TX}} \exp(j2\pi k \Delta_F (qT_s - T_{GI\ long})) 1 \le n \le N_{TRN}^{N_{TX}} \quad (7)$$

wherein:

- $N_{TRN}^{Tone}=N_{ST}-N_{DC}$ denotes a total number of active tones;
- $P_{TRN}$ denotes the OFDM TRN mapping matrix;
- $TRN\text{-}BASIC_k^{i_{TX}}$ denotes a k-th element of an OFDM TRN sequence corresponding to the transmit chain index $i_{TX}$;
- $N_{TRN}^{N_{TX}}$ denotes the number of OFDM symbols in a TRN subfield for the count of transmit chains, denoted $N_{TX}$, e.g., as defined above or according to any other definition;
- $[\ ]_{m,n}$ denotes a matrix element from m-th row and n-th column;
- $w(qT_s)$ denotes a window function to smooth transitions between consecutive OFDM symbols, this function may be defined, for example, in an implementation specific manner; and
- q denotes a time sample index.

In some demonstrative embodiments, for example, an OFDM TRN subfield waveform for the $i_{TX}$-th transmit chain in the time domain shall be defined at an OFDM sampling rate, denoted $F_s$, for example, at the sampling rate $F_s$ equal to $N_{CB}$*2.64 GHz and/or any other rate, and/or at a sample time duration, denoted $T_s$, for example, at the sample time duration $T_s=1/F_s$ nanoseconds (ns) and/or any other duration, e.g., according to Equation 7.

In other embodiments, the OFDM TRN subfield waveform may be defined using any other additional or alternative parameters.

In some demonstrative embodiments, the sequences $Seq^{iTX}_{left,N}$ and/or $Seq^{iTX}_{right,N}$ may include sequences of a length N corresponding to the $i_{TX}$ transmit chain, e.g., as described below.

In some demonstrative embodiments, the sequences $Seq^{iTX}_{left,N}$ and/or $Seq^{iTX}_{right,N}$ may be defined for the lengths N=176, 385, 595, and/or 804, e.g., as described below. In other embodiments, any other additional or alternative sequences $Seq^{iTX}_{left,N}$ and/or $Seq^{iTX}_{right,N}$ may be defined for the lengths N=176, 385, 595, and/or 804, and/or for any other additional or alternative lengths.

In some demonstrative embodiments, the sequence pairs $Seq^{iTX}_{left,N}$ and $Seq^{iTX}_{right,N}$ of the length N=176, 385, 595, and/or 804 may use {+1, −1, +j, −j} symbols alphabet, for example, as defined in one or more of the following Tables 1-8:

TABLE 1

| The sequence $Seq^{iTX}_{left,176}(k)$ |
|---|
| The Sequence $Seq^{1}_{left,176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1<br>+j +1 +1 −1 +1 −j −1 −1 +j +j +j −1 −1 +j −1 −1 −j +1 −1 −j +j −j −1 +j −j +j −j −1 +j +j +1<br>+1 +1 +j +j +j −1 −1 −j +1 −1 −j +j −j −1 +j +j −j +j +1 −j −j −1 −1 −1 −j −j +j −1 −1 −j +1 −1<br>−j +j −j −1 +j −j +j −j −1 +j +j +1 +1 +1 +j +j −j +1 +1 +j −1 +1 +j −j +j +1 −j −j +j −j −1 +j<br>+j +1 +1 +1 +j +j −1 −j −j +1 +j −j +1 −1 +1 −j −1 +1 −1 +1 −j −1 −1 +j +j +j −1 −1 −1 −j −j<br>+1 +j −j +1 −1 +1 −j −1 −1 +1 −1 +j +1 +1 −j −j −j +1 +1 |
| The Sequence $Seq^{2}_{left,176}(k)$, to be transmitted from left to right, up to down |
| +1 −j −j −1 +j −j −1 +1 −1 −j +1 +1 −j −j −1 +j −j −1 +1 −1 −j +1 +j +1 +1 −j −1 +1 −j +j −j<br>+1 +j −j −1 −1 +j +1 −1 +j −j +j −1 −j +1 −1 +1 +j −1 −1 −j −j −j −1 −1 +1 −1 +1 +j −1 −1 −j −j<br>−j −1 −1 +j −j +j −1 −j −j +1 +1 +1 −j −j −j +j −j +1 +j +j −1 −1 −1 +j +j +j +1 +1 −j −1 +1 −j<br>+j −j +1 +j −j −1 −1 +j +1 −1 +j −j +j −1 −j −1 +j +j +1 −j +j +1 −1 +1 +j −1 −1 +j +j +1 −j<br>+j +1 −1 +1 +j −1 −j +j −j +1 +j +j −1 −1 −1 +j +j +j −j +j −1 −j −j +1 +1 +1 −j −j +1 −1 +1<br>+j −1 −1 −j −j −j −1 −1 +1 −1 +1 +j −1 −1 −j −j −j −1 −1 |
| The Sequence $Seq^{3}_{left,176}(k)$, to be transmitted from left to right, up to down |
| +1 +1 +j +j +j +1 +1 −j −1 +1 −1 +1 +1 +j +j +j +1 +1 −j −1 +1 −1 +j +j −1 −1 −1 +j +j<br>+1 −j +j −j −j −j +1 +1 +1 −j −j −1 +j −j +j +j +j −1 −1 −1 +j +j +1 −j +j −j +j +j −1 −1 −1 +j<br>+j +1 −j +j −j +1 +1 +j +j +j +1 +1 −j −1 +1 −1 −1 −1 −j −j −j −1 −1 +j +1 −1 +1 −j −1 +j −j<br>+j −1 +1 +j −1 −1 −j +j +1 −j +j −j +1 −1 −j +1 +1 +j +1 −j −1 +1 −1 −j +j −1 −j −j +1 +1 −j −1<br>+1 −1 −j +j −1 −j −j +1 +1 −j −1 +1 −1 −j +j −1 −j −j +1 −1 +j +1 −1 +1 +j −j +1 +j +j −1 −j<br>−1 +j −j +j −1 +1 +j −1 −1 −j −j −1 +j −j +j −1 +1 +j −1 −1 −j |
| The Sequence $Seq^{4}_{left,176}(k)$, to be transmitted from left to right, up to down |
| −1 +j +j +1 −j +j +1 −1 +1 +j −1 −j −1 −1 +j +1 −1 +j −j +j −1 −j +j −j +j −1 −j −j +1 +1 +1 −j<br>−j −1 +1 −1 −j +1 +1 +j +j +j +1 +1 −1 +j +j +1 −j +j +1 −1 +1 +j −1 −j −1 −1 +j +1 −1 +j<br>−j +j −1 −j −j +j −j +1 +j +j −1 −1 −1 +j +j +1 −1 +1 +j −1 −1 −j −j −j −1 −1 +1 −j −j −1 +j −j<br>−1<br>+1 −1 −j +1 −j −1 −1 +j +1 −1 +j −j +j −1 −j −j +j −j +1 +j +j −1 −1 −1 +j +j −1 +1 −1 −j +1<br>+1 +j +j +j +1 +1 −1 +j +j +1 −j +j +1 −1 +1 +j −1 +j +1 +1 −j −1 +1 −j +j −j +1 +j −j +j −j<br>+1 +j +j −1 −1 −1 +j +j −1 +1 −1 −j +1 +1 +j +j +j +1 +1 |
| The Sequence $Seq^{5}_{left,176}(k)$, to be transmitted from left to right, up to down |
| +1 −1 +1 −j −1 −1 +j +j +j −1 −1 +1 +j +j −1 −j +j −1 +1 −1 +j +1 +1 −1 +1 −j −1 −1 +j +j<br>+j −1 −1 +1 +j +j −1 −j +j −1 +1 −1 +j +1 +j −j +j +1 −j −j −1 −1 −1 −j −j +j −1 −1 −j +1 −1 −j<br>+j −j −1 +j −j +j −j −1 +j +j +1 +1 +1 +j +j −j +1 +1 +j −1 +1 +j −j +j +1 −j −j +j −j −1 +j<br>+j +1 +1 +1 +j +j +j −1 −1 −j +1 −1 −j +j −j −1 +j +j −j +j +1 −j −j −1 −1 −1 −j −j −j +1 +1 +j<br>−1 +1 +j −j +j +1 −j +1 −1 +1 −j −1 −1 +j +j +j −1 −1 −1 −j −j +1 +j −j +1 −1 +1 −j −1 +1 −1<br>+1 −j −1 −1 +j +j +j −1 −1 −1 −j −j +1 +j −j +1 −1 +1 −j −1 |

TABLE 1-continued

| The sequence $Seq^{iTX}_{left,176}(k)$ |
|---|
| The Sequence $Seq^{6}_{left,176}(k)$, to be transmitted from left to right, up to down |
| +1 +j −1 +1 −1 +j −j −1 +j +j +1 −1 −j +1 −1 +1 −j +j +1 −j −j −1 +j −1 −j +j −j −1 +1 −j −1 −1<br>+j −j +1 +j −j +j +1 −1 +j +1 +1 −j +j +j +1 +1 +1 +j +j −1 −j +j −j +j +j +1 +1 +1 +j<br>+j −1 −j +j −j −1 −1 +j +j +j −1 −1 −j +1 −1 +1 −1 −1 +j +j +j −1 −1 −j +1 −1 +1 +j −1 −j +j −j<br>−1 +1 −j −1 −1 +j +j −1 −j +j −j −1 +1 −j −1 −1 +j +1 +j −1 +1 −1 +j −j −1 +j +j +1 +1 +j −1<br>+1 −1 +j −j −1 +j +j +1 −1 −1 +j +j +j −1 −1 −j +1 −1 +1 +1 −j −j −j +1 +1 +j −1 +1 −1<br>+j +j +1 +1 +1 +j +j −1 −j +j −j −j −j −1 −1 −1 −j −j +1 +j −j +j |
| The Sequence $Seq^{7}_{left,176}(k)$, to be transmitted from left to right, up to down |
| −j −1 +j −j +j −1 +1 +j −1 −1 −j +j +j −1 −1 −1 +j +j +1 −j +j −j +1 −j −1 +1 −1 −j +j −1 −j −j<br>+1 −1 −1 −j −j −j −1 −1 +j +1 −1 +1 +1 −j −1 +1 −1 −j +j −1 −j −j +1 −1 −1 −j −j −j −1 −1 +j +1<br>−1 +1 −j −1 +j −j +j −1 +1 +j −1 −1 −j +j +j −1 −1 −1 +j +j +1 −j +j −j +1 −j −1 +1 −1 −j +j −1<br>−j −j +1 +1 +1 +j +j +j +1 +1 −j −1 +1 −1 −j −1 +j −j +j −1 +1 +j −1 −1 −j −j −j +1 +1 +1 −j<br>−j −1 +j −j +j +j +1 −j +j −j +1 −1 −j +1 +1 +j +j +j −1 −1 −1 +j +j +1 −j +j −j −1 +j +1 −1<br>+1 +j −j +1 +j +j −1 −1 −1 −j −j −j −1 −1 +j +1 −1 +1 |
| The Sequence $Seq^{8}_{left,176}(k)$, to be transmitted from left to right, up to down |
| +1 −1 +1 +j −1 −1 −j −j −j −1 −1 +j −j +j −1 −j −j +1 +1 +1 −j −j −j +j −j +1 +j +j −1 −1 −1 +j<br>+j +1 −1 +1 +j −1 −1 −j −j −j −1 −1 +1 −1 +1 +j −1 −1 −j −j −j −1 −1 −j +j −j +1 +j +j −1 −1 −1<br>+j +j +j −j +j −1 −j −j +1 +1 +1 −j −j +1 −1 +1 +j −1 −1 −j −j −j −1 −1 +j +1 +1 −j −1 +1 −j +j<br>−j +1 +j −1 +j +j +1 −j +j +1 −1 +1 +j −1 −1 +j +j +1 −j +j +1 −1 +1 +j −1 −j −1 −1 +j +1 −1<br>+j −j +j −1 −j +j +1 +1 −j −1 +1 −j +j −j +1 +j +1 −j −j −1 +j −j −1 +1 −1 −j +1 +1 −j −j −1<br>+j −j −1 +1 −1 −j +1 −j −1 −1 +j +1 −1 +j −j +j −1 −j |

TABLE 2

| The sequence $Seq^{iTX}_{right,176}(k)$ |
|---|
| The Sequence $Seq^{1}_{right,176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1<br>+j +1 +1 −1 +1 −j −1 −1 +j +j +j −1 −1 +j −1 −1 −j +1 −1 −j +j −j −1 +j −j +j −j −1 +j +j +1<br>+1 +1 +j +j +j −1 −1 −j +1 −1 −j +j −j −1 +j +j −j +j +1 −j −j −1 −1 −1 −j −j −j +1 +1 +j −1 +1<br>+j −j +j +1 −j +j −j +j +1 −j −j −1 −1 −1 −j −j +j −1 −1 −j +1 −1 −j +j −j −1 +j +j −j +j +1 −j −j<br>−1 −1 −1 −j −j +1 +j +j −1 −j +j −1 +1 −1 +j +1 −1 +1 −1 +j +1 +1 −j −j −j +1 +1 +1 +j +j −1<br>−j +j −1 +1 −1 +j +1 +1 −1 +1 −j −1 −1 +j +j +j −1 −1 |
| The Sequence $Seq^{2}_{right,176}(k)$, to be transmitted from left to right, up to down |
| −1 +j +j +1 −j +j +1 −1 +1 +j −1 −1 +j +j +1 −j +j +1 −1 +1 +j −1 +j +1 +1 −j −1 +1 −j +j −j<br>+1 +j −j −1 −1 +j +1 −1 +j −j +j −1 −j −1 +1 −1 −j +1 +1 +j +j +j +1 +1 −1 +1 −1 −j +1 +1<br>+j +j +j +1 +1 +j −j +j −1 −j −j +1 +1 +1 −j −j −j +j −j +1 +j +j −1 −1 −1 +j +j −j −1 −1 +j<br>+1 −1 +j −j +j −1 −j +j +1 +1 −j −1 +1 −j +j −j +1 +j −1 +j +j +1 −j +j +1 −1 +1 +j −1 −1 +j<br>+j +1 −j +j +1 −1 +1 +j −1 +j −j +j −1 −j −j +1 +1 +1 −j −j −j +j −j +1 +j +j −1 −1 −1 +j +j<br>+1 −1 +1 +j −1 −1 −j −j −j −1 −1 +1 −1 +1 +j −1 −1 −j −j −j −1 −1 |
| The Sequence $Seq^{3}_{right,176}(k)$, to be transmitted from left to right, up to down |
| −1 −1 −j −j −j −1 −1 +j +1 −1 +1 −1 −1 −j −j −j −1 −1 +j +1 −1 +1 −j −j +1 +1 +1 −j −j −1 +j −j<br>+j +j +j −1 −1 −1 +j +j +1 −j +j −j +j +j −1 −1 −1 +j +j +1 −j +j −j +j +j −1 −1 −1 +j +j +1 −j<br>+j −j +1 +1 +j +j +j +1 +1 −j −1 +1 −1 −1 −1 −j −j −j −1 −1 +j +1 −1 +1 +j +1 −j +j −j +1 −1<br>−j +1 +1 +j −j −1 +j −j +j −1 +1 +j −1 −1 −j −1 +j +1 −1 +1 +j −j +1 +j +j −1 −1 +j +1 −1 +1<br>+j −j +1 +j +j −1 +1 −j −1 +1 −1 −j +j −1 −j −j +1 −1 +j +1 −1 +1 +j −j +1 +j +j −1 −j −1 +j −j<br>+j −1 +1 +j −1 −1 −j −j −1 +j −j +j −1 +1 +j −1 −1 −j |
| The Sequence $Seq^{4}_{right,176}(k)$, to be transmitted from left to right, up to down |
| +1 −j −j −1 +j −j −1 +1 −1 −j +1 −j −1 −1 +j +1 −1 +j −j +j −1 −j −j +j −j +1 +j +j −1 −1 −1 +j<br>+j −1 +1 −1 −j +1 +1 +j +j +j +1 +1 +1 −j −j −1 +j −j −1 +1 −1 −j +1 −j −1 −1 +j +1 −1 +j −j<br>+j −1 −j +j −j +j −1 −j −j +1 +1 +1 −j −j +1 −1 +1 +j −1 −1 −j −j −j −1 −1 −1 +j +j +1 −j +j +1<br>−1 +1 +j −1 −j −1 −1 +j +1 −1 +j −j +j −1 −j +j −j +j −1 −j −j +1 +1 +1 −j −j −1 +1 −1 −j +1<br>+1 +j +j +j +1 +1 +1 −j −j −1 +j −j −1 +1 −1 −j +1 +j +1 +1 −j −1 +1 −j +j −j +1 +j +j −j +j<br>−1 −j −j +1 +1 +1 −j −j −1 +1 −1 −j +1 +1 +j +j +j +1 +1 |
| The Sequence $Seq^{5}_{right,176}(k)$, to be transmitted from left to right, up to down |
| −1 +1 −1 +j +1 +1 −j −j −j +1 +1 −1 −j −j +1 +j −j +1 −1 +1 −j −1 −1 +1 −1 +j +1 +1 −j −j −j<br>+1 +1 −1 −j −j +1 +j −j +1 −1 +1 −j −1 +j −j +j +1 −j −j −1 −1 −1 −j −j +j −1 −1 −j +1 −1 −j +j<br>−j −1 +j −j +j −j −1 +j +j +1 +1 +1 +j +j −j +1 +1 +j −1 +1 +j −j +j +1 −j +j −j +j +1 −j −j −1<br>−1 −1 −j −j −j +1 +1 +j −1 +1 +j −j +j +1 −j −j +j −j −1 +j +j +1 +1 +1 +j +j +j −1 −1 −j<br>+1 −1 −j +j −j −1 +j +1 −1 +1 −j −1 −1 +j +j +j −1 −1 −1 −j −j +1 +j −j +1 −1 +1 −j −1 +1 −1<br>+1 −j −1 −1 +j +j +j −1 −1 −1 −j −j +1 +j −j +1 −1 +1 −j −1 |
| The Sequence $Seq^{6}_{right,176}(k)$, to be transmitted from left to right, up to down |
| −1 −j +1 −1 +1 −j +j +1 −j −j −1 +1 +j −1 +1 −1 +j −j −1 +j +j +1 +j −1 −j +j −j −1 +1 −j −1 −1<br>+j −j +1 +j −j +j +1 −1 +j +1 +1 −j −j −j −1 −1 −1 −j −j +1 +j −j +j −j −j −1 −1 −1 −j −j +1 +j<br>−j +j −1 −1 +j +j +j −1 −1 −j +1 −1 +1 −1 −1 +j +j +j −1 −1 −j +1 −1 +1 −j +1 +j −j +j +1 −1<br>+j +1 +1 −j −j +1 +j −j +j +1 −1 +j +1 +1 −j +1 +j −1 +1 −1 +j −j −1 +j +j +1 +1 +j −1 +1 |

TABLE 2-continued

| The sequence $Seq^{iTX}_{right,176}(k)$ |
|---|
| −1 +j −j −1 +j +j +1 +1 +1 −j −j −j +1 +1 +j −1 +1 −1 −1 −1 +j +j +j −1 −1 −j +1 −1 +1 +j +j<br>+1 +1 +1 +j +j −1 −j +j −j −j −j −1 −1 −1 −j −j +1 +j −j +j |
| The Sequence $Seq^{7}_{right,176}(k)$, to be transmitted from left to right, up to down |
| +j +1 −j +j −j +1 −1 −j +1 +1 +j −j −j +1 +1 +1 −j −j −1 +j −j +j −1 +j +1 −1 +1 +j −j +1 +j<br>+j −1 +1 +1 +j +j +j +1 +1 −j −1 +1 −1 +1 −j −1 +1 −1 −j +j −1 −j −j +1 −1 −1 −j −j −j −1 −1<br>+j +1 −1 +1 −j −1 +j −j +j −1 +1 +j −1 −1 −j +j +j −1 −1 −1 +j +j +1 −j +j −j −1 +j +1 −1 +1<br>+j −j +1 +j +j −1 −1 −1 −j −j −j −1 −1 +j +1 −1 +1 +j +1 −j +j −j +1 −1 −j +1 +1 +j +j +j −1 −1<br>−1 +j +j +1 −j +j −j +j +1 −j +j −j +1 −1 −j +1 +1 +j +j +j −1 −1 −1 +j +j +1 −j +j −j −1 +j<br>+1 −1 +1 +j −j +1 +j +j −1 −1 −1 −j −j −j −1 −1 +j +1 −1 +1 |
| The Sequence $Seq^{8}_{right,176}(k)$, to be transmitted from left to right, up to down |
| −1 +1 −1 −j +1 +1 +j +j +j +1 +1 +j −j +j −1 −j −j +1 +1 +1 −j −j +j −j +j −1 −j −j +1 +1 +1<br>−j −j +1 −1 +1 +j −1 −1 −j −j −j −1 −1 −1 +1 −1 −j +1 +1 +j +j +j +1 +1 −j +j −j +1 +j +j −1 −1<br>−1 +j +j −j +j −j +1 +j +j −1 −1 −1 +j +j +1 −1 +1 +j −1 −1 −j −j −j −1 −1 −j −1 −1 +j +1 −1<br>+j −j +j −1 −j −1 +j +j +1 −j +j +1 −1 +1 +j −1 +1 −j −j −1 +j −j −1 +1 −1 −j +1 −j −1 −1 +j<br>+1 −1 +j −j +j −1 −j −j −1 −1 +j +1 −1 +j −j +j −1 −j +1 −j −j −1 +j −j −1 +1 −1 −j +1 −1 +j +j<br>+1 −j +j +1 −1 +1 +j −1 −j −1 −1 +j +1 −1 +j −j +j −1 −j |

TABLE 3

| The sequence $Seq^{iTX}_{left,385}(k)$ |
|---|
| The Sequence $Seq^{1}_{left,385}(k)$, to be transmitted from left to right, up to down |
| −1 −1 +j −1 +1 +1 −1 +j +1 +j +j +j −j −j −1 −j +j +j −j +1 −j +1 +1 +1 −1 −1 +j −1 +1 +1 −1<br>+j +1 +j +j +j −j +j +1 +j −j −j +j −1 +j −1 −1 −1 +1 +1 −j +1 −1 −1 +1 −j −1 −j −j −j +j +j<br>+1 +j −j −j +j −1 +j −1 −1 −1 +1 −1 +j −1 +1 +1 −1 +j +1 +j +j +j −j +j +1 +j −j −j +j −1 +j<br>−1 −1 −1 +1 −1 +j −1 +1 +1 −1 +j +1 +j +j +j −j −j −1 −j +j +j −j +1 −j +1 +1 +1 −1 −1 +j −1<br>+1 +1 −1 +j +1 +j +j +j −j +j +1 +j −j −j +j −1 +j −1 −1 −1 +1 −1 +j −1 +1 +1 −1 +j +1 +j +j +j<br>−j −j −1 −j +j +j −j +1 −j +1 +1 +1 −1 +1 −j +1 −1 −1 +1 −j −1 −j −j −j +j −j −1 −j +j +j −j<br>+1 −j +1 +1 +1 −1 −j −1 −j +j +j −j −1 +j −1 −1 −1 +1 +1 −j +1 −1 −1 +1 +j +1 +j +j +j −j −j<br>−1 −j +j +j −j −1 +j −1 −1 −1 +1 −1 +j −1 +1 +1 −1 −j −1 −j −j −j +j +j +1 +j −j −j +j +1 −j<br>+1 +1 +1 −1 −1 +j −1 +1 +1 −1 −j −1 −j −j −j +j −j −1 −j +j +j −j −1 +j −1 −1 −1 +1 −1 +j −1<br>+1 +1 −1 −j −1 −j −j −j +j +j +1 +j −j −j +j +1 −j +1 +1 +1 −1 −1 +j −1 +1 +1 −1 −j −1 −j −j −j<br>+j +j +1 +j −j −j +j +1 −j +1 +1 +1 −1 +1 −j +1 −1 −1 +1 +j +1 +j +j +j −j +j +1 +j −j −j +j +1<br>−j +1 +1 +1 −1 −1 +j −1 +1 +1 −1 −j −1 −j −j −j +j −j −1 −j +j +j −j −1 +j −1 −1 −1 +1 −1<br>+j −1 +1 +1 −1 −j −1 −j −j −j +j |
| The Sequence $Seq^{2}_{left,385}(k)$, to be transmitted from left to right, up to down |
| −j +1 −1 −1 −1 +j −1 −j +j +j +j +1 +j +j −j −j +j +1 +j −1 +1 +1 −1 +j −1 −1 +1 +1 +1 −j<br>+1 +j −j −j −j −1 −j −j +j +j −j −1 −j +1 −1 −1 +1 −j +1 +1 −1 −1 −1 +j −1 −j +j +j +j +1 +j +j<br>−j −j +j +1 +j −1 +1 +1 −1 +j −1 +1 −1 −1 −1 +j −1 −j +j +j +j +1 +j +j −j −j +j +1 +j −1 +1<br>+1 −1 +j −1 +1 −1 −1 −1 +j −1 −j +j +j +j +1 +j +j −j −j +j +1 +j −1 +1 +1 −1 +j −1 +1 −1 −1<br>−1 +j −1 −j +j +j +j +1 +j +j −j −j +j +1 +j −1 +1 +1 −1 +j −1 +1 −1 −1 −1 +j −1 −j +j +j<br>+j +1 +j +j −j −j +j +1 +j −1 +1 +1 −1 +j −1 −1 +1 +1 +1 −j +1 +j −j −j −j −1 −j −j +j +j −j −1<br>−j +1 −1 −1 +1 −j +1 +j −j −j −j −1 −j −1 +1 +1 +1 −j +1 −1 +1 +1 −1 +j −1 +j −j −j +j +1<br>+j −j +j +j +j +1 +j +1 −1 −1 −1 +j −1 +1 −1 −1 +1 −j +1 −j +j +j −j −1 −j +j −j −j −j −1 −j −1<br>+1 +1 +1 −j +1 −1 +1 +1 −1 +j −1 +j −j −j +j +1 +j +j −j −j −j −1 −j −1 +1 +1 +1 −j +1 −1<br>+1 +1 −1 +j −1 +j −j −j +j +1 +j −j +j +j +j +1 +j +1 −1 −1 −1 +j −1 +1 −1 −1 +1 −j +1 −j +j<br>+j −j −1 −j −j +j +j +j +1 +j +1 −1 −1 −1 +j −1 +1 −1 −1 +1 −j +1 −j +j +j −j −1 −j −j +j +j +j<br>+1 +j +1 −1 −1 −1 +j −1 +1 −1 −1 +1 −j +1 −j +j +j −j −1 −j +j −j −j −j −1 −j −1 +1 +1 +1 −j<br>+1 −1 +1 +1 −1 +j −1 +j −j −j +j +1 +j |
| The Sequence $Seq^{3}_{left,385}(k)$, to be transmitted from left to right, up to down |
| +1 −1 +j −1 +1 −j +1 +j +1 +j −j −1 −j +1 −j +1 −1 +j −1 +j +1 +j −j −1 −j +1 −j +1 −1 +j −1<br>+j +1 +j −j −1 −j −1 +j −1 +1 −j +1 +j +1 +j −j −1 −j +1 +1 −1 −1 −1 +1 −j −j +j +j +j −j +1<br>+1 −1 −1 −1 +1 +j +j −j −j −j +j −1 −1 +1 +1 +1 −1 −j −j +j +j +j −j −1 −1 +1 +1 +1 −1 +j +j<br>−j −j −j +j +j +1 +j −j −1 −j +1 −j +1 −1 +j −1 −j −1 −j +j +1 +j +1 −j +1 −1 +j −1 +j +1 +j −j<br>−1 −j −1 +j −1 +1 −j +1 −j −1 −j +j +1 +j −1 +j −1 +1 −j +1 −j −j +j +j +j −j −1 −1 +1 +1 +1 −1<br>−j −j +j +j +j −j +1 +1 −1 −1 −1 +1 −j −j +j +j +j −j +1 +1 −1 −1 −1 +1 −j −j +j +j +j −j −1 −1<br>+1 +1 +1 −1 +j +1 +j +j +1 +j +1 −j +1 +1 −j +1 −j −1 −j −j −1 −j +1 −j +1 +1 −j +1 −j −1<br>−j −j −1 −j +1 −j +1 +1 −j +1 +j +1 +j +j +1 +j +1 −j +1 +1 −j +1 −j −j +j −j −j +j −1 −1 +1 −1<br>−1 +1 −j −j +j −j −j +j +1 +1 −1 +1 +1 −1 +j +j −j +j +j −j −1 −1 +1 −1 −1 +1 +j +j −j +j<br>+j −j +1 +1 −1 +1 +1 −1 −1 +j −1 −1 +j −1 +j +1 +j +j +1 +j +1 −j +1 +1 −j +1 +j +1 +j<br>+j +1 +j −1 +j −1 −1 +j −1 −j −1 −j −j −1 −j +1 −j +1 +1 −j +1 −j −1 −j −j −1 −j +1 +1 −1 +1<br>+1 −1 −j −j +j −j −j +j +1 +1 −1 +1 +1 −1 +j +j −j +j +j −j +1 +1 −1 +1 +1 −1 +j +j −j +j +j<br>−j +1 +1 −1 +1 +1 −1 −j −j +j −j −j +j |
| The Sequence $Seq^{4}_{left,385}(k)$, to be transmitted from left to right, up to down |
| −1 −1 +j −1 +j +1 +j +1 +1 −1 −j −j +j −j −1 −j +1 −j +1 +j +j −j −1 −1 +1 +1 −j +1 −j −1 −j<br>−1 −1 +1 +j +j −j +j +1 +j −1 +j −1 −j −j +j +1 +1 −1 −j −1 −j −1 +j −1 −j −j +j −1 −1 +1 +1<br>−j +1 +j +1 +j +1 +1 −1 +j +j −j +j +1 +j +1 −j +1 +j +j −j +1 +1 −1 −1 +j −1 −j −1 −j −1 −1 |

TABLE 3-continued

| The sequence $Seq^{iTX}_{left,385}(k)$ |
|---|
| +1 −j −j +j −1 +j −1 +j +1 +j +1 +1 −1 −j −j +j −j −1 −j +1 −j +1 +j +j −j −1 −1 +1 −1 +j −1<br>+j +1 +j +1 +1 −1 −j −j +j −j −1 −j +1 −j +1 +j +j −j −1 −1 +1 +j +1 +j +1 −j +1 +j +j −j +1<br>+1 −1 −1 +j −1 −j −1 −j −1 −1 +1 −j −j +j +j +1 +j +1 −j +1 +j +j −j +1 +1 −1 −1 +j −1 −j −1<br>−j −1 −1 +1 −j −j +j +j +1 +j −1 +j −1 −j −j +j +1 +1 −1 −1 +j −1 +j +1 +j +1 +1 −1 −j −j +j<br>+j +1 +j −1 +j −1 −j −j +j +1 +1 −1 −1 +j −1 +j +1 +j +1 +1 −1 −j −j +j −1 +j −1 −j −1 −j −1 −1<br>+1 −j −j +j −j −1 −j −1 +j −1 −j −j +j −1 −1 +1 −1 +j −1 −j −1 −j −1 −1 +1 −j −j +j −j −1 −j<br>−1 +j −1 −j −j +j −1 −1 +1 +j +1 +j −1 +j −1 −j −j +j +1 +1 −1 −1 +j −1 +j +1 +j +1 +1 −1 −j −j<br>+j −j −1 −j +1 −j +1 +j +j −j −1 −1 +1 +1 −j +1 −j −1 −j −1 −1 +1 +j +j −j +1 −j +1 +j +1 +j<br>+1 +1 −1 +j +j −j +j +1 +j +1 −j +1 +j +j −j +1 +1 −1 −1 +j −1 −j −1 −j −1 −1 +1 −j −j +j −j −1<br>−j −1 +j −1 −j −j +j −1 −1 +1 |
| The Sequence $Seq^{5}_{left,385}(k)$, to be transmitted from left to right, up to down |
| −j −1 +1 +1 −1 +1 +1 +j −j −j +j −j −j −j +j +j +j −j −j −1 +1 +1 +1 −1 −1 −1 +1 +1 +1 −1 −1<br>+j −j −j −j +j +j −j +j +j −j +j +j −1 +1 +1 −1 +1 +1 +1 −1 −1 +1 −1 −1 +j −j −j +j −j −j +j −j<br>−j −j +j +j −1 +1 +1 +1 −1 −1 +1 −1 −1 −1 +1 +1 +j −j −j −j +j +j +j −j −j +j −j −j −1 +1 +1 −1<br>+1 +1 −j +j +j −j +j +j +1 −1 −1 +1 −1 −1 +1 −1 −1 −1 +1 +1 +j −j −j −j +j +j +j −j −j −j +j<br>+j −1 +1 +1 +1 −1 −1 −1 +1 +1 −1 +1 +1 −j +j +j −j +j +j +j −j −j +j −j −j +1 −1 −1 +1 −1 −1<br>−1 +1 +1 +1 −1 −1 +j −j −j −j +j +j −j +j +j +j −j −j −1 +1 +1 +1 −1 −1 +1 −1 −1 +1 −1 −1 −j<br>+j +j −j +j +j +1 −j +1 +1 −j +1 −j −1 −j −j −1 −j +j +1 +j −j −1 −j +1 −j +1 −1 +j −1 +1 −j +1<br>−1 +j −1 −j −1 −j +j +1 +j +j +1 +j +j +1 +j +1 −j +1 +1 −j +1 +1 −j +1 +1 −j +1 +j +1 +j<br>+j +1 +j +j +1 +j −j −1 −j −1 +j −1 +1 −j +1 +1 −j +1 −1 +j −1 +j +1 +j −j −1 −j +j +1 +j +j<br>+1 +j −1 +j −1 −1 +j −1 +j +1 +j +j +1 +j −1 +j −1 −1 +j −1 −1 +j −1 +1 −j +1 −j −1 −j +j +1<br>+j −j −1 −j +j +1 +j +1 −j +1 −1 +j −1 +1 −j +1 +1 −j +1 +j +1 +j +j +1 +j +j +1 +j +j +1<br>+j +1 −j +1 +1 −j +1 −1 +j −1 +1 −j +1 +j +1 +j −j −1 −j −j −1 −j +j +1 +j −1 +j −1 +1 −j +1<br>+1 −j +1 +1 −j +1 −j −1 −j −j −1 −j |
| The Sequence $Seq^{6}_{left,385}(k)$, to be transmitted from left to right, up to down |
| +j −1 +j −1 +j +1 +j −1 +j −1 +j +1 +j −j −1 −j −1 +j −1 −j −1 −j −1 +j −1 −1 +j −1 −j −1 −j<br>−1 +j −1 −j −1 −j +j +1 +j −1 +j −1 +j +1 +j −1 +j −1 −j −1 −j −1 +j −1 +j +1 +j +1 −j +1 +1<br>−j +1 −j −1 −j −1 +j −1 +j +1 +j −j −1 −j +1 −j +1 +j +1 +j −1 +j −1 −1 +j −1 −j −1 −j +1 −j<br>+1 +j +1 +j −j +j +j −1 +1 +1 −j +j +j −1 +1 +1 +1 −1 −1 −j +j +j +1 −1 −1 −j +j +j −j +j +j<br>+1 −1 −1 −j +j +j +1 −1 −1 −1 +1 +1 −j +j +j −1 +1 +1 −j +j +j −1 +1 +1 +j −j −j +1 −1 −1 −j<br>+j +j −j +j +j −1 +1 +1 +j −j −j +1 −1 −1 −1 +1 +1 −j +j +j +1 −1 −1 +j −j −j +j −j −j −1 +1<br>+1 −j +j +j +1 −1 −1 +1 −j +1 +j +1 +j −1 +j −1 −j −1 −j +j +1 +j −1 +j −1 −j −1 −j +1 −j +1<br>+1 −j +1 −j −1 −j −1 +j −1 +j +1 +j −j −1 −j −1 +j −1 +j +1 +j +1 −j +1 +j +1 +j −1 +j −1 +j<br>+1 +j −1 +j −1 −1 +j −1 −j −1 −j −1 +j −1 −j −1 −j +j +1 +j +1 −j +1 +j +1 +j +1 −j +1 +1 −j<br>+1 −j −1 −j +1 −j +1 −j −1 −j +j −j −j −1 +1 +1 −j +j +j +1 −1 −1 −1 +1 +1 −j +j +j +1 −1 −1<br>+j −j −j +j −j −j +1 −1 −1 −j +j +j −1 +1 +1 +1 −1 −1 −j +j +j −1 +1 +1 +j −j −j +1 −1 −1 +j −j<br>−j +1 −1 −1 +j −j −j +j −j −j −1 +1 +1 +j −j −j −1 +1 +1 +1 −1 −1 −j +j +j +1 −1 −1 −j +j +j −j<br>+j +j −1 +1 +1 −j +j +j −1 +1 +1 |
| The Sequence $Seq^{7}_{left,385}(k)$, to be transmitted from left to right, up to down |
| −1 +1 −1 −1 +j −j −j +1 −1 −1 +j −j −j +1 −1 −1 −j +j +j +1 −1 −1 −j +j +j +j +1 +j −1 +j −1<br>+j +1 +j −1 +j −1 +j +1 +j +1 −j +1 +j +1 +j +1 −j +1 +j −j −j −1 +1 +1 −j +j +j +1 −1 −1<br>+j −j −j +1 −1 −1 −j +j +j −1 +1 +1 +1 −j +1 +j +1 +j −1 +j −1 −j −1 −j +1 −j +1 −j −1 −j −1<br>+j −1 +j +1 +j −1 +1 +1 +j −j −j −1 +1 +1 +j −j −j −1 +1 +1 −j +j +j −1 +1 +1 −j +j +j −j −1<br>−j −1 +j −1 −j −1 −j −1 +j −1 −j −1 −j +1 −j +1 −j −1 −j +1 −j +1 −j +j +j −1 +1 +1 +j −j −j +1<br>−1 −1 −j +j +j +1 −1 −1 +j −j −j −1 +1 +1 −1 +j −1 +j +1 +j +1 −j +1 −j −1 −j −1 +j −1 −j −1<br>−j +1 −j +1 +j +1 +j +j −j −j −1 +1 +1 −j +j +j +1 −1 −1 −j +j +j −1 +1 +1 +j −j −j +1 −1 −1 −1<br>+j −1 −j −1 −j +1 −j +1 +j +1 +j +1 −j +1 −j −1 −j −1 +j −1 +j +1 +j −1 +1 +1 −j +j +j −1 +1<br>+1 −j +j +j +1 −1 −1 −j +j +j +1 −1 −1 −j +j +j +j +1 +j −1 +j −1 +j +1 +j −1 +j −1 −j −1 −j −1<br>+j −1 −j −1 −j −1 +j −1 −j +j +j −1 +1 +1 +j −j −j +1 −1 −1 +j −j −j −1 +1 +1 −j +j +j +1 −1<br>−1 +1 −j +1 −j −1 −j −1 +j −1 +j +1 +j −1 +j −1 −j −1 −j +1 −j +1 +j +1 +j +1 −1 −1 −j +j +j<br>+1 −1 −1 −j +j +j −1 +1 +1 −j +j +j −1 +1 +1 −j +j +j −j −1 −j −1 +j −1 −j −1 −j −1 +j −1 +j<br>+1 +j −1 +j −1 +j +1 +j −1 +j −1 |
| The Sequence $Seq^{8}_{left,385}(k)$, to be transmitted from left to right, up to down |
| +1 +1 −j +1 −j −1 −j +1 −j +1 +j +1 +j −1 +1 +1 +j −j −j −1 +1 +1 −j +j +j −1 +j −1 −j −1 −j<br>−1 +j −1 +j +1 +j +1 −1 −1 +j −j −j +1 −1 −1 −j +j +j −1 +j −1 +j +1 +j −1 +j −1 −j −1 −j +1 −1<br>−1 −j +j +j +1 −1 −1 +j −j −j +1 −j +1 +j +1 +j +1 −j +1 −j −1 −j −1 +1 +1 −j +j +j −1 +1<br>+1 +j −j −j −1 +j −1 +j +1 +j +1 −j +1 +j +1 +j −1 +1 +1 +j −j −j +1 −1 −1 +j −j −j +1 −j +1<br>+j +1 +j −1 +j −1 +j +1 +j +1 −1 −1 +j −j −j −1 +1 +1 +j −j −j +1 −j +1 −j −1 −j −1 +j −1 −j −1<br>−j +1 −1 −1 −j +j +j −1 +1 +1 −j +j +j −1 +j −1 −j −1 −j +1 −j +1 −j −1 −j −1 +1 +1 −j +j +j<br>+1 −1 −1 −j +j +j −j −1 −j −1 +j −1 −j −1 −j +1 −j +1 +j −j −j +1 −1 −1 +j −j −j −1 +1 +1 −j<br>−1 −j +1 −j +1 −j −1 −j −1 +j −1 +j −j −j −1 +1 +1 +j −j −j +1 −1 −1 −j −1 −j −1 +j −1 −j −1<br>−j +1 −j +1 +j −j −j +1 −1 −1 +j −j −j −1 +1 +1 −j −1 −j +1 −j +1 −j −1 −j −1 +j −1 +j −j −j<br>−1 +1 +1 +j −j −j +1 −1 −1 +j +1 +j +1 −j +1 −j −1 −j +1 −j +1 +j −j −j +1 −1 −1 −j +j +j +1<br>−1 −1 +j +1 +j −1 +j −1 −j −1 −j −1 +j −1 +j −j −j −1 +1 +1 −j +j +j −1 +1 +1 +j +1 +j +1 −j<br>+1 −j −1 −j +1 −j +1 +j −j −j +1 −1 −1 −j +j +j +1 −1 −1 +j +1 +j −1 +j −1 −j −1 −j −1 +j −1<br>+j −j −j −1 +1 +1 −j +j +j −1 +1 +1 |

TABLE 4

| The sequence $Seq^{iTX}_{right,385}(k)$ |
|---|
| The Sequence $Seq^{1}_{right,385}(k)$, to be transmitted from left to right, up to down |
| +1 −j +1 −1 −1 +1 −j −1 −j −j −j +j +j +1 +j −j −j +j −1 +j −1 −1 −1 +1 +1 −j +1 −1 −1 +1 −j |
| −1 −j −j −j +j −j −1 −j +j +j −j +1 −j +1 +1 +1 −1 −1 +j −1 +1 +1 −1 +j +1 +j +j +j −j −j −1 −j |
| +j +j −j +1 −j +1 +1 +1 −1 +1 −j +1 −1 −1 +1 −j −1 −j −j −j +j +j −1 −j +j +j −j +1 −j +1 +1 |
| +1 −1 +1 −j +1 −1 −1 +1 −j −1 −j −j −j +j +j +1 +j −j −j +j −1 +j −1 −1 −1 +1 +1 −j +1 −1 −1 |
| +1 −j −1 −j −j −j +j −j −1 −j +j +j −j +1 −j +1 +1 +1 −1 +1 −j +1 −1 −1 +1 −j −1 −j −j −j +j +j |
| +1 +j −j −j +j −1 +j −1 −1 −1 +1 −1 +j −1 +1 +1 −1 +j +1 +j +j +j −j +j +1 +j −j −j +j −1 +j |
| −1 −1 −1 +1 −j −1 −j +j +j −j −1 +j −1 −1 −1 +1 +1 −j +1 −1 −1 +1 +j +1 +j +j +j −j −j −1 −j |
| +j +j −j −1 +j −1 −1 −1 +1 −1 +j −1 +1 +1 −1 −j −1 −j −j −j +j +j +1 +j −j −j +j +1 −j +1 +1 |
| +1 −1 −1 +j −1 +1 +1 −1 −j −1 −j −j −j +j −j −1 −j +j +j −j −1 +j −1 −1 −1 +1 −1 +j −1 +1 +1 |
| −1 −j −1 −j −j −j +j +j +1 +j −j −j +j +1 −j +1 +1 +1 −1 −1 +j −1 +1 +1 −1 −j −1 −j −j −j +j +j |
| +1 +j −j −j +j +1 −j +1 +1 +1 −1 +1 −j +1 −1 −1 +1 +j +1 +j +j +j −j +j +1 +j −j −j +j +1 −j |
| +1 +1 +1 −1 −1 +j −1 +1 +1 −1 −j −1 −j −j −j +j −j −1 −j +j +j −j −1 +j −1 −1 −1 +1 −1 +j −1 |
| +1 +1 −1 −j −1 −j −j −j +j +j |
| The Sequence $Seq^{2}_{right,385}(k)$, to be transmitted from left to right, up to down |
| −1 +1 +1 +1 −j +1 +j −j −j −j −1 −j −j +j +j −j −1 −j +1 −1 −1 +1 −j +1 +1 −1 −1 −1 +j −1 −j |
| +j +j +j +1 +j +j −j −j +j +1 +j −1 +1 +1 −1 +j −1 +1 −1 −1 −1 +j −1 −j +j +j +j +1 +j +j −j −j |
| +j +1 +j −1 +1 +1 −1 +j −1 +1 −1 −1 −1 +j −1 −j +j +j +j +1 +j +j −j −j +j +1 +j −1 +1 +1 −1 |
| +j −1 −1 +1 +1 +1 −j +1 +j −j −j −j −1 −j −j +j +j −j −1 −j +1 −1 −1 +1 −j +1 −1 +1 +1 +1 −j |
| +1 +j −j −j −j −1 −j −j +j +j −j −1 −j +1 −1 −1 +1 −j +1 +1 −1 −1 −1 +j −1 −j +j +j +j +1 +j |
| +j −j −j +j +1 +j −1 +1 +1 −1 +j −1 −1 +1 +1 −j +1 +j −j −j −j −1 −j −j +j +j −j −1 −j +1 −1 |
| −1 +1 −j +1 −j +j +j +j +1 +j +1 −1 −1 −1 +j −1 +1 −1 −1 +1 −j +1 −j +j +j −j −1 −j +j −j −j |
| −1 −j −1 +1 +1 +1 −j +1 −1 +1 +1 −1 +j −1 +j −j −j +j +1 +j +j −j −j −j −1 −j −1 +1 +1 +1 −j |
| +1 −1 +1 +1 −1 +j −1 +j −j −j +j +1 +j +j −j −j −j −1 −j −1 +1 +1 +1 −j +1 −1 +1 +1 −1 +j −1 |
| +j −j −j +j +1 +j +j −j −j −j −1 −j −1 +1 +1 +1 −j +1 −1 +1 +1 −1 +j −1 +j −j −j +j +1 +j +j −j |
| −j −j −1 −j −1 +1 +1 +1 −j +1 −1 +1 +1 −1 +j −1 +j −j −j +j +1 +j −j +j +j +j +1 +j +1 −1 −1 |
| −1 +j −1 +1 −1 −1 +1 −j +1 −j +j +j −j −1 −j +j −j −j −j −1 −j −1 +1 +1 +1 −j +1 −1 +1 +1 −1 |
| +j −1 +j −j −j +j +1 +j −j |
| The Sequence $Seq^{3}_{right,385}(k)$, to be transmitted from left to right, up to down |
| +1 −j +1 +1 −j +1 −j −1 −j −j −1 −j −1 +j −1 −1 +j −1 −j −1 −j −j −1 −j −1 +j −1 −1 +j −1 −j |
| −1 −j −j −1 −j +1 −j +1 +1 −j +1 −j −1 −j −j −1 −j −1 −1 +1 −1 −1 +1 +j +j −j +j +j −j −1 −1 |
| +1 −1 −1 +1 −j −j +j −j −j +j +1 +1 −1 +1 +1 −1 +j +j −j +j +j −j +1 +1 −1 +1 +1 −1 −j −j +j −j |
| −j +j −j −1 −j −j −1 −j −1 +j −1 −1 +j −1 +j +1 +j +j +1 +j −1 +j −1 −1 +j −1 −j −1 −j −j −1 |
| −j +1 −j +1 +1 −j +1 +j +1 +j +j +1 +j +1 −j +1 +1 −j +1 +j +j −j +j +j −j +1 +1 −1 +1 +1 −1 +j +j |
| −j +j +j −j −1 −1 +1 −1 −1 +1 +j +j −j +j +j −j −1 −1 +1 −1 −1 +1 +j +j −j +j +j −j +1 +1 −1 +1 |
| +1 −1 −j −1 −j +j +1 +j −1 +j −1 +1 −j +1 +j +1 +j −j −1 −j −1 +j −1 +1 −j +1 +j +1 +j −j −1 |
| −j −1 +j −1 +1 −j +1 −j −1 −j +j +1 +j −1 +j −1 +1 −j +1 +j +j −j −j −j +j +1 +1 −1 −1 −1 +1 |
| +j +j −j −j −j +j −1 −1 +1 +1 +1 −1 −j −j +j +j +j −j +1 +1 −1 −1 −1 +1 −j −j +j +j +j −j −1 −1 |
| +1 +1 +1 −1 +1 −j +1 −1 +j −1 −j −1 −j +j +1 +j −1 +j −1 +1 −j +1 −j −1 −j +j +1 +j +1 −j |
| +1 −1 +j −1 +j +1 +j −j −1 −j −1 +j −1 +1 −j +1 +j +1 +j −j −1 −j −1 −1 +1 +1 +1 −1 +j +j −j |
| −j −j +j −1 −1 +1 +1 +1 −1 −j −j +j +j +j −j −1 −1 +1 +1 +1 −1 −j −j +j +j +j −j −1 −1 +1 +1 |
| +1 −1 +j +j −j −j −j +j +j |
| The Sequence $Seq^{4}_{right,385}(k)$, to be transmitted from left to right, up to down |
| +1 −j +1 −j −1 −j −1 −1 +1 +j +j −j −j −1 −j +1 −j +1 +j +j −j −1 −1 +1 −1 +j −1 +j +1 +j +1 |
| +1 −1 −j −j +j +j +1 +j −1 +j −1 −j −j +j +1 +1 −1 +j +1 +j +1 −j +1 +j +j −j +1 +1 −1 +1 −j |
| +1 +j +1 +j +1 +1 −1 +j +j −j −j −1 −j −1 +j −1 −j −j +j −1 −1 +1 −1 +j −1 −j −1 −j −1 −1 +1 −j −j |
| +j +1 −j +1 −j −1 −j −1 −1 +1 +j +j −j −j −1 −j +1 −j +1 +j +j −j −1 −1 +1 +1 −j +1 −j −1 −j |
| −1 −1 +1 +j +j −j −j −1 −j +1 −j +1 +j +j −j −1 −1 +1 −j −1 −j −1 +j −1 −j −j +j −1 −1 +1 −1 +j |
| −1 −j −1 −j −1 −1 +1 −j −j +j −j −1 −j −1 +j −1 −j −j +j −1 −1 +1 −1 +j −1 −j −1 −j −1 −1 +1 −j −j |
| +j −j −1 −j +1 −j +1 +j +j −j −1 −1 +1 −1 +j −1 +j +1 +j +1 +1 −1 −j −j +j −j −1 −j +1 −j +1 |
| +j +j −j −1 −1 +1 −1 +j −1 +j +1 +j +1 +1 −1 −j −j +j +1 −j +1 +j +1 +j +1 +1 −1 +j +j −j −j |
| −1 −j −1 +j −1 −j −j +j −1 −1 +1 +1 −j +1 +j +1 +j +1 +1 −1 +j +j −j −j −1 −j −1 +j −1 −j −j +j |
| −1 −1 +1 −j −1 −j +1 −j +1 +j +j −j −1 −1 +1 −1 +j −1 +j +1 +j +1 +1 −1 −j −j +j +j +1 +j −1 |
| +j −1 −j −j +j +1 +1 −1 +1 −j +1 −j −1 −j −1 −1 +1 +j +j −j −1 +j −1 −j −1 −j −1 −1 +1 −j −j +j |
| +j +1 +j +1 −j +1 +j +j −j +1 +1 −1 +1 −j +1 +j +1 +j +1 +1 −1 +j +j −j −j −1 −j −1 +j −1 −j |
| −j +j −1 −1 +1 −j |
| The Sequence $Seq^{5}_{right,385}(k)$, to be transmitted from left to right, up to down |
| +1 −1 −1 +1 −1 −1 −j +j +j −j +j +j −j +j +j +j −j −j −1 +1 +1 +1 −1 −1 +1 −1 −1 −1 +1 +1 −j |
| +j +j +j −j −j −j +j +j −j +j +j −1 +1 +1 −1 +1 +1 −1 +1 +1 −1 +1 +1 −j +j +j −j +j +j +j −j |
| −j −j +j +j −1 +1 +1 +1 −1 −1 −1 +1 +1 +1 −1 −1 −j +j +j +j −j −j +j −j −j +j −j −j −1 +1 +1 −1 |
| +1 +1 +j −j −j +j −j −j −1 +1 +1 −1 +1 +1 +1 −1 −1 −1 +1 +1 +j −j −j −j +j +j −j +j +j +j −j |
| −j +1 −1 −1 −1 +1 +1 −1 +1 +1 −1 +1 +1 −j +j +j −j +j +j −j +j +j −j +j +j −1 +1 +1 −1 +1 |
| +1 −1 +1 +1 +1 −1 −1 +j −j −j −j +j +j +j −j −j −j +j +j +1 −1 −1 −1 +1 +1 +1 −1 −1 +1 −1 −1 |
| −j +j +j −j +j +j −1 +j −1 −1 +j −1 +j +1 +j +j +1 +j +j +1 +j −j −1 −j +1 −j +1 −1 +j −1 −1 |
| +j −1 +1 −j +1 +j +1 +j −j −1 −j +j +1 +j +j +1 +j +1 −j +1 +1 −j +1 −1 +j −1 −1 +j −1 −j −1 |
| −j −j −1 −j +j +1 +j −j −1 −j −1 +j −1 +1 −j +1 −1 +j −1 +1 −j +1 −j −1 −j +j +1 +j +j +1 +j +j |
| +1 +j −1 +j −1 −1 +j −1 −j −1 −j −j −1 −j +1 −j +1 +1 −j +1 −1 +j −1 +1 −j +1 −j −1 −j +j +1 |
| +j +j +1 +j −j −1 −j −1 +j −1 +1 −j +1 +1 −j +1 +1 −j +1 +j +1 +j +j +1 +j −j −1 −j −j −1 −j −1 |
| +j −1 −1 +j −1 −1 +j −1 +1 −j +1 +j +1 +j −j −1 −j +j +1 +j −j −1 −j +1 −j +1 −1 +j −1 +1 −j |
| +1 +1 −j +1 −j −1 −j −j −1 −j −j |

TABLE 4-continued

| The sequence $Seq^{iTX}_{right,385}(k)$ |
|---|
| The Sequence $Seq^{6}_{right,385}(k)$, to be transmitted from left to right, up to down |
| +1 −j +1 −j −1 −j +1 −j +1 −j −1 −j −j −1 −j −1 +j −1 −j −1 −j −1 +j −1 +1 −j +1 +j +1 +j +1 −j |
| +1 +j +1 +j +j +1 +j −1 +j −1 +j +1 +j −1 +j −1 +j +1 +j +1 −j +1 −j −1 −j −1 +j −1 +1 −j |
| +1 −j −1 −j −1 +j −1 +j +1 +j +j +1 +j −1 +j −1 −j −1 −j +1 −j +1 −1 +j −1 −j −1 −j +1 −j +1 |
| +j +1 +j +j −j −j +1 −1 −1 +j −j −j +1 −1 −1 +1 −1 −1 −j +j +j +1 −1 −1 −j +j +j +j −j −j −1 +1 |
| +1 +j −j −j −1 +1 +1 −1 +1 +1 −j +j +j −1 +1 +1 −j +j +j +1 −1 −1 −j +j +j −1 +1 +1 +j −j −j |
| −j +j +j −1 +1 +1 +j −j −j +1 −1 −1 +1 −1 −1 +j −j −j −1 +1 +1 −j +j +j +j −j −j −1 +1 +1 −j |
| +j +j +1 −1 −1 −1 +j −1 −j −1 −j +1 −j +1 +j +1 +j +j +1 +j −1 +j −1 −j −1 −j +1 −j +1 −1 +j |
| −1 +j +1 +j +1 −j +1 −j −1 −j −j −1 −j −1 +j −1 +j +1 +j +1 −j +1 −j −1 −j +1 −j +1 −j −1 −j +1 |
| −j +1 −1 +j −1 −j −1 −j −1 +j −1 −j −1 −j −j −1 −j −1 +j −1 −j −1 −j −1 +j −1 +1 −j +1 −j −1 −j +1 |
| −j +1 −j −1 −j −j +j +j +1 −1 −1 +j −j −j −1 +1 +1 −1 +1 +1 −j +j +j +1 −1 −1 +j −j −j −j +j +j |
| −1 +1 +1 +j −j −j +1 −1 −1 +1 −1 −1 −j +j +j −1 +1 +1 +j −j −j −1 +1 +1 −j +j +j −1 +1 +1 −j |
| +j +j +j −j −j −1 +1 +1 +j −j −j −1 +1 +1 −1 +1 +1 +j −j −j −1 +1 +1 +j −j −j −j +j +j −1 +1 |
| +1 −j +j +j −1 +1 +1 −j |
| The Sequence $Seq^{7}_{right,385}(k)$, to be transmitted from left to right, up to down |
| −1 +1 +1 −j +j +j −1 +1 +1 −j +j +j −1 +1 +1 +j −j −j −1 +1 +1 +j −j −j −j −1 −j +1 −j +1 −j −1 |
| −j +1 −j +1 −j −1 −j −1 +j −1 −j −1 −j −1 +j −1 −j +j +j +1 −1 −1 +j −j −j −1 +1 +1 −j +j +j −1 |
| +1 +1 +j −j −j +1 −1 −1 −1 +j −1 −j −1 −j +1 −j +1 +j +1 +j −1 +j −1 +j +1 +j +1 −j +1 −j −1 |
| −j −1 +1 +1 +j −j −j −1 +1 +1 +j −j −j −1 +1 +1 −j +j +j −1 +1 +1 −j +j +j −j −1 −j −1 +j −1 −j |
| −1 −j −1 +j −1 −j −1 −j +1 −j +1 −j −1 −j +1 −j +1 −j +j +j −1 +1 +1 +j −j −j +1 −1 −1 −j +j +j |
| +1 −1 −1 +j −j −j −1 +1 +1 −1 +j −1 +j +1 +j +1 −j +1 −j −1 −j −1 +j −1 −j −1 −j +1 −j +1 +j |
| +1 +j −j +j +j +1 −1 −1 +j −j −j −1 +1 +1 +j −j −j +1 −1 −1 −j +j +j −1 +1 +1 +1 −j +1 +j +1 |
| +j −1 +j −1 −j −1 −j −1 +j −1 +j +1 +j +1 −j +1 −j −1 −j +1 −1 −1 +j −j −j +1 −1 −1 +j −j −j −1 |
| +1 +1 +j −j −j −1 +1 +1 +j −j −j −j −1 −j +1 −j +1 −j −1 −j +1 −j +1 +j +1 +j +1 −j +1 +j +1 |
| +j +1 −j +1 −j +j +j −1 +1 +1 +j −j −j +1 −1 −1 +j −j −j −1 +1 +1 −j +j +j +1 −1 −1 +1 −j +1 |
| −j −1 −j −1 +j −1 +j +1 +j −1 +j −1 −j −1 −j +1 −j +1 +j +1 +j +1 −1 −1 −j +j +j +1 −1 −1 −j |
| +j +j −1 +1 +1 −j +j +j −1 +1 +1 −j +j +j −j −1 −j −1 +j −1 −j −1 −j −1 +j −1 +j +1 +j −1 +j −1 |
| +j +1 +j −1 +j −1 +1 |
| The Sequence $Seq^{8}_{right,385}(k)$, to be transmitted from left to right, up to down |
| −1 +j −1 +j +1 +j −1 +j −1 −j −1 −j +1 −1 −1 −j +j +j +1 −1 −1 +j −j −j +1 −j +1 +j +1 +j +1 |
| −j +1 −j −1 −j −1 +1 +1 −j +j +j −1 +1 +1 +j −j −j −1 +j −1 +j +1 +j −1 +j −1 −j −1 −j +1 −1 −1 |
| −j +j +j +1 −1 −1 +j −j −j +1 −j +1 +j +1 +j +1 −j +1 −j −1 −j −1 +1 +1 −j +j +j −1 +1 +1 |
| +j −j −j +1 −j +1 −j −1 −j −1 +j −1 −j −1 −j +1 −1 −1 −j +j +j −1 +1 +1 −j +j +j −1 +j −1 −j −1 −j |
| +1 −j +1 −j −1 −j −1 +1 +1 −j +j +j +1 −1 −1 −j +j +j +1 −j +1 −j −1 −j −1 +j −1 −j −1 −j +1 −1 |
| −1 −j +j +j −1 +1 +1 −j +j +j −1 +j −1 −j −1 −j +1 −j +1 −j −1 −j −1 +1 +1 −j +j +j +1 −1 −1 |
| −j +j +j +j +1 +j +1 −j +1 +j +1 +j −1 +j −1 −j +j +j −1 +1 +1 −j +j +j +1 −1 −1 +j +1 +j −1 |
| +j −1 +j +1 +j +1 −j +1 −j +j +j +1 −1 −1 −j +j +j −1 +1 +1 −j −1 −j −1 +j −1 −j −1 −j +1 −j |
| +1 +j −j −j +1 −1 −1 +j −j −j −1 +1 +1 −j −1 −j +1 −j +1 −j −1 −j −1 +j −1 +j −j −j −1 +1 +1 +j |
| −j −j +1 −1 −1 −j −1 −j −1 +j −1 +j +1 +j −1 +j −1 −j +j +j −1 +1 +1 +j −j −j −1 +1 +1 −j −1 −j |
| +1 −j +1 +j +1 +j +1 −j +1 −j +j +j +1 −1 −1 +j −j −j +1 −1 −1 +j +1 +j +1 −j +1 −j −1 −j +1 |
| −j +1 +j −j −j +1 −1 −1 −j +j +j +1 −1 −1 +j +1 +j −1 +j −1 −j −1 −j −1 +j −1 +j −j −j −1 +1 +1 |
| −j +j +j −1 +1 +1 +1 |

TABLE 5

| The sequence $Seq^{iTX}_{left,595}(k)$ |
|---|
| The Sequence $Seq^{1}_{left,595}(k)$, to be transmitted from left to right, up to down |
| +j +1 −1 +j +1 +j −j −1 −1 +j +j −1 −1 +1 +1 +1 −j −j −1 +1 −j +1 −1 −1 +1 −j −1 −j −j −j +j |
| +j +1 +j −j −j +j −1 +j −1 −1 −1 +1 +1 −j +1 −1 −1 +1 −j −1 −j −j −j +j −j −1 −j +j +j −j +1 −j |
| +1 +1 +1 −1 −1 +j −1 +1 +1 −1 +j +1 +j +j +j −j −j −1 −j +j +j −j +1 −j +1 +1 +1 −1 +1 −j |
| +1 −1 −1 +1 −j −1 −j −j −j +j −j −1 −j +j +j −j +1 −j +1 +1 +1 −1 −j −1 −j +j +j −j −1 +j −1 −1 −1 |
| +1 +1 −j +1 −1 −1 +1 +j +1 +j +j +j −j −j −1 −j +j +j −j −1 +j −1 −1 −1 +1 −1 +j −1 +1 +1 |
| −1 −j −1 −j −j −j +j −j −1 −j +j +j −j −1 +j −1 −1 −1 +1 +1 −j +1 −1 −1 +1 +j +1 +j +j +j −j +j |
| +1 +j −j −j +j +1 −j +1 +1 +1 −1 +1 −j +1 −1 −1 +1 +j +1 +j +j +j −j +1 −j +1 −1 −1 +1 −j −1 |
| −j −j −j +j +j +1 +j −j −j +j −1 +j −1 −1 −1 +1 +1 −j +1 −1 −1 +1 −j −1 −j −j −j +j −j −1 −j +j |
| +j −j +1 −j +1 +1 +1 −1 −1 +j −1 +1 +1 −1 +j +1 +j +j +j −j −j −1 −j +j +j −j +1 −j +1 +1 |
| +1 −1 +1 −j +1 −1 −1 +1 −j −1 −j −j −j +j −j −1 −j +j +j −j +1 −j +1 +1 +1 −1 −j −1 −j +j +j −j |
| −1 +j −1 −1 −1 +1 +1 −j +1 −1 −1 +1 +j +1 +j +j +j −j −j −1 −j +j +j −j −1 +j −1 −1 −1 +1 −1 |
| +j −1 +1 +1 −1 −j −1 −j −j −j +j −j −1 −j +j +j −j −1 +j −1 −1 −1 +1 +1 −j +1 −1 −1 +1 +j +1 |
| +j +j +j −j +j +1 +j −j −j +j +1 −j +1 +1 +1 −1 +1 −j +1 −1 −1 +1 +j +1 +j +j +j −j −1 +j −1 |
| +1 +1 −1 +j +1 +j +j +j −j −j −1 −j +j +j −j +1 −j +1 +1 +1 −1 −1 +j −1 +1 +1 −1 +j +1 |
| +j +j +j −j +j +1 +j −j −j +j −1 +j −1 −1 −1 +1 +1 −j +1 −1 −1 +1 −j −1 −j −j −j +j +j +1 +j −j |
| −j +j −1 +j −1 −1 −1 +1 −1 +j −1 +1 +1 −1 +j +1 +j +j +j −j +j +1 +j −j −j +j −1 +j −1 −1 −1 |
| +1 +j +1 +j −j −j +j +1 −j +1 +1 +1 −1 −1 +j −1 +1 +1 −1 −j −1 −j −j −j +j +j +1 +j −j −j +j |
| +1 −j +1 +1 +1 −1 +1 −j +1 −1 −1 +1 +j +1 +j +j +j −j +j +1 +j −j −j +j +1 −j +1 +1 +1 −1 |
| −1 +j −1 +1 +1 −1 −j −1 −j −j −j +j −j −1 −j +j +j −j −1 +j −1 −1 −1 +1 −1 +j −1 +1 +1 −1 −j −1 |
| −j −j −j +j |

TABLE 5-continued

| The sequence $Seq^{iTX}_{left,595}(k)$ |
| --- |
| The Sequence $Seq^{2}_{left,595}(k)$, to be transmitted from left to right, up to down |
| −1 +1 −j +1 −j −1 +j +j +j −1 −1 +1 −1 −1 +j +1 +j −j −1 +1 −j +1 −1 +j −1 +1 −j +1 +1 −j<br>+1 +1 −j +1 −1 +j −1 −1 +j −1 −1 +j −1 −j −1 −j +j +1 +j −j −1 −j −j −1 −j +j +1 +j −j −1 −j −j −1<br>−j −j −1 −j −1 +j −1 +1 −j +1 −1 +j −1 −1 +j −1 −1 +j −1 +1 −j +1 +1 −j +1 +1 −j +1 −j −1 −j<br>+j +1 +j −j −1 −j −j −1 −j +j +1 +j −j −1 −j −j −1 −j −j −1 −j +j +j −j −j −j +j +j +j −j +j +j −j +j<br>+j −j −j −j +j −j −j +j −j −j +j +1 +1 −1 −1 −1 +1 +1 +1 −1 +1 +1 −1 −1 −1 +1 +1 +1 −1 +1<br>+1 −1 +1 +1 −1 +j +j −j −j −j +j +j +j −j +j +j −j +j +j −j −j −j +j −j −j +j −j −j +j −1 −1 +1 +1<br>+1 −1 −1 −1 +1 −1 −1 +1 +1 +1 −1 −1 −1 +1 −1 −1 +1 −1 −1 +1 +1 −j +1 −1 +j −1 +1 −j +1<br>+1 −j +1 +1 −j +1 −1 +j −1 −1 +j −1 −1 +j −1 −j −1 −j +j +1 +j −j −1 −j −j −1 −j +j +1 +j −j −1<br>−j −j −1 −j −j −1 −j −1 +j −1 +1 −j +1 −1 +j −1 −1 +j −1 −1 +j −1 +1 −j +1 +1 −j +1 +1 −j +1 −j<br>−1 −j +j +1 +j −j −1 −j −j −1 −j +j +1 +j −j −1 −j −j −1 −j −j −1 −j +j +j −j −j −j +j +j +j −j +j +j<br>−j +j +j −j −j −j +j −j −j +j −j −j +j +1 +1 −1 −1 −1 +1 +1 +1 −1 +1 +1 −1 −1 −1 +1 +1 +1 −1<br>+1 +1 −1 +1 +1 −1 +j +j −j −j −j +j +j +j −j +j +j −j +j +j −j −j −j +j −j −j +j −j −j +j −1 −1 +1<br>+1 +1 −1 −1 −1 +1 −1 −1 +1 +1 +1 −1 −1 −1 +1 −1 −1 +1 −1 −1 +1 −1 +j −1 +1 −j +1 −1 +j −1<br>−1 +j −1 −1 +j −1 +1 −j +1 +1 −j +1 +1 −j +1 +j +1 +j −j −1 −j +j +1 +j +j +1 +j −j −1 −j<br>+j +1 +j +j +1 +j +j +1 +j +1 −j +1 −1 +j −1 +1 −j +1 +1 −j +1 +1 −j +1 −1 +j −1 −1 +j −1<br>−1 +j −1 +j +1 +j −j −1 −j +j +1 +j +j +1 +j −j −1 −j +j +1 +j +j +1 +j +j +1 +j −j −j +j +j<br>+j −j −j −j +j −j −j +j −j −j +j +j +j −j +j +j −j +j +j −j −1 −1 +1 +1 +1 −1 −1 −1 +1 −1 −1 +1<br>+1 +1 −1 −1 −1 +1 −1 −1 +1 −1 −1 +1 −j −j +j +j +j −j −j −j +j −j −j +j −j −j +j +j +j −j +j +j −j<br>+j +j −j +1 +1 −1 −1 −1 +1 +1 +1 −1 +1 +1 −1 −1 −1 +1 +1 +1 −1 +1 +1 −1 +1 +1 −1 |
| The Sequence $Seq^{3}_{left,595}(k)$, to be transmitted from left to right, up to down |
| −j −j −j −j −j +j −j +1 −j −j −j +j +j +j +1 −1 +j −1 +1 +1 −j +1 +j +1 +j +1 −j +1 −j −1 −j −j −1<br>−j −1 +j −1 −j −1 −j +1 −j +1 −1 +j −1 −j −1 −j −1 +j −1 +j +1 +j −j −1 −j −1 +j −1 −j −1 −j +1<br>−j +1 −1 −1 +1 −j −j +j −1 −1 +1 +j +j −j +j +j −j +1 +1 −1 +j +j −j −1 −1 +1 −1 −1 +1 −j −j<br>+j −1 −1 +1 +j +j −j −j −j +j −1 −1 +1 −j −j +j +1 +1 −1 +j +1 +j −1 +j −1 −j −1 −j −1 +j −1<br>+1 −j +1 −j −1 −j −1 +j −1 −j −1 −j −j −1 −j +1 −j +1 +j +1 +j +1 −j +1 +1 −j +1 −j −1 −j −1 +j<br>−1 −j −1 −j −j −j +j +1 +1 −1 +j +j −j +1 +1 −1 −1 −1 +1 +j +j −j +1 +1 −1 +j +j −j −j −j +j<br>+1 +1 −1 +j +j −j +1 +1 −1 +1 +1 −1 −j −j +j −1 −1 +1 −j −j +j +j +1 +j −1 +j −1 +j +1 +j<br>+1 −j +1 +1 −j +1 −j −1 −j +1 −j +1 +j +1 +j −j −1 −j +1 −j +1 −j −1 −j −1 +j −1 +1 −j +1 −j −1<br>−j +1 −j +1 +j +1 +j −j −j +j +1 +1 −1 −j −j +j −1 −1 +1 −1 −1 +1 +j +j −j −1 −1 +1 −j −j +j<br>−j −j +j +1 +1 −1 −j −j +j −1 −1 +1 +1 +1 −1 −j −j +j +1 +1 −1 +j +j −j −1 +j −1 −j −1 −j +1 −j<br>+1 −j −1 −j +j +1 +j +1 −j +1 −j −1 −j +1 −j +1 +1 −j +1 +j +1 +j −1 +j −1 +j +1 +j +j +1<br>+j +1 −j +1 −j −1 −j +1 −j +1 +1 +1 −1 +j +j −j −1 −1 +1 +j +j −j −j −j +j −1 −1 +1 +j +j −j −1<br>−1 +1 +1 +1 −1 +j +j −j −1 −1 +1 +j +j −j +j +j −j +1 +1 −1 −j −j +j +1 +1 −1 +1 −j +1 +j<br>+1 +j +1 −j +1 −j −1 −j −j −1 −j −1 +j −1 −j −1 −j +1 −j +1 −1 +j −1 −j −1 −j −1 +j −1 +j +1 +j<br>−j −1 −j −1 +j −1 −j −1 −j +1 −j +1 −1 −1 +1 −j −j +j −1 −1 +1 +j +j −j +j +j −j +1 +1 −1 +j +j<br>−j −1 −1 +1 −1 −1 +1 −j −j +j −1 −1 +1 +j +j −j −j −j +j −1 −1 +1 −j −j +j +1 +1 −1 +j +1 +j −1<br>+j −1 −j −1 −j −1 +j −1 +1 −j +1 −j −1 −j −1 +j −1 −j −1 −j −j −1 −j +1 −j +1 +j +1 +j +1 −j<br>+1 +1 −j +1 −j −1 −j −1 +j −1 −j −1 −j −j −j +j +1 +1 −1 +j +j −j +1 +1 −1 −1 −1 +1 +j +j −j<br>+1 +1 −1 +j +j −j −j −j +j +1 +1 −1 +j +j −j +1 +1 −1 +1 +1 −1 −j −j +j −1 −1 +1 −j −j +j |
| The Sequence $Seq^{4}_{left,595}(k)$, to be transmitted from left to right, up to down |
| +1 +1 +1 −1 −j −1 +1 −1 −j −1 −j −j −1 −j +j +1 +j −1 +1 +1 −j +1 +j +1 +j +j +1 +j +1 −j<br>+1 +1 +1 −1 +j +j −j +j +j −j +1 +1 −1 +j +1 +j +1 −j +1 −1 +j −1 −j −1 −j −j −j +j −1 −1 +1<br>+1 +1 −1 +j +j −j −1 +j −1 −j −1 −j −j −1 −j −1 +j −1 −1 −1 +1 −j −j +j −j −j +j −1 −1 +1 −j −1 −j<br>−1 +j −1 +1 −j +1 +j +1 +j +j +j −j +1 +1 −1 −1 −1 +1 −j −j +j +1 −j +1 +j +1 +j −j −1 −j −1<br>+j −1 +1 +1 −1 +j +j −j −j −j +j −1 −1 +1 +j +1 +j +1 −j +1 +1 −j +1 +j +1 +j −j −j +j −1 −1<br>+1 −1 −1 +1 −j −j +j +1 −j +1 +j +1 +j −j −1 −j −1 +j −1 +1 +1 −1 +j +j −j −j +j −1 −1 +1<br>+j +1 +j +1 −j +1 +1 −j +1 +j +1 +j −j −j +j −1 −1 +1 −1 −1 +1 −j −j +j +j +1 +j −1 +j −1 −1<br>+j −1 +j +1 +j +j +j −j −1 −1 +1 −1 −1 +1 +j +j −j −1 +j −1 +j +1 +j −j −1 −j +1 −j +1 +1 +1<br>−1 −j −j +j +j +j −j −1 −1 +1 −j −1 −j +1 −j +1 +1 −j +1 −j −1 −j −j −j +j +1 +1 −1 +1 +1 −1 −j<br>−j +j +1 −j +1 −j −1 −j +j +1 +j −1 +j −1 −1 −1 +1 +j +j −j −j −j +j +1 +1 −1 +j +1 +j −1 +j −1<br>+1 −j +1 −j −1 −j +j +j −j −1 −1 +1 +1 +1 −1 −j −j +j −1 +j −1 +j +1 +j +j +1 +j −1 +j −1<br>+1 +1 −1 −j −j +j −j −j +j +1 +1 −1 +j +1 +j −1 +j −1 +1 −j +1 −j −1 −j +j +j −j −1 −1 +1 +1<br>+1 −1 −j −j +j −1 +j −1 +j +1 +j +j +1 +j −1 +j −1 +1 +1 −1 −j −j +j −j −j +j +1 +1 −1 +1 −j<br>+1 +j +1 +j +j +1 +j +1 −j +1 +1 +1 −1 +j +j −j +j +j −j +1 +1 −1 +j +1 +j +1 −j +1 −1<br>+j −1 −j −1 −j −j −j +j −1 −1 +1 +1 +1 −1 +j +j −j −1 +j −1 −j −1 −j −j −1 −j −1 +j −1 −1 −1 +1 −j<br>−j +j −j −j +j −1 −1 +1 −j −1 −j −1 +j −1 +1 −j +1 +j +1 +j +j +j −j +1 +1 −1 −1 −1 +1 −j −j<br>+j +1 −j +1 +j +1 +j −j −1 −j −1 +j −1 +1 +1 −1 +j +j −j −j −j +j −1 −1 +1 +j +1 +j +1 −j +1<br>+1 −j +1 +j +1 +j −j −j +j −1 −1 +1 −1 −1 +1 −j −j +j +1 −j +1 +j +1 +j −j −1 −j −1 +j −1 +1<br>+1 −1 +j +j −j −j −j +j −1 −1 +1 +j +1 +j +1 −j +1 +1 −j +1 +j +1 +j −j −j +j −1 −1 +1 −1 −1<br>+1 −j −j +j |
| The Sequence $Seq^{5}_{left,595}(k)$, to be transmitted from left to right, up to down |
| +1 −j +1 −1 +1 −j −j −1 −j +j −1 +j +1 +1 +j +1 −j +1 +1 +1 −1 −1 +1 −1 −1 +1 −1 −1 −1 +1<br>+1 +j −j −j +j −j −j +j −j −j −j +j +j −j −1 −j −j −1 −j +j +1 +j −j −1 −j +1 −j +1 +1 −j +1 −1 +j<br>−1 +1 −j +1 −j +j +j −j +j +j −j +j +j +j −j −j −1 +1 +1 −1 +1 +1 −1 +1 +1 +1 −1 −1 −1 +j −1<br>−1 +j −1 +1 −j +1 −1 +j −1 +j +1 +j +j +1 +j −j −1 −j +j +1 +j −1 +1 +1 +1 −1 −1 −1 +1 +1<br>−1 +1 +1 −j +j +j +j −j −j −j +j +j −j +j +j +j +1 +j −j −1 −j −j −1 −j −j −1 −j −1 +j −1 +1 −j +1<br>+1 −j +1 +1 −j +1 −j +j +j +j −j −j −j +j +j −j +j +j −1 +1 +1 +1 −1 −1 −1 +1 +1 −1 +1 +1 −1<br>+j −1 +1 −j +1 +1 −j +1 +1 −j +1 +j +1 +j −j −1 −j −j −1 −j −j −1 −j +j −j −j +j −j −j +j −j −j −j<br>+j +j −1 +1 +1 −1 +1 +1 −1 +1 +1 +1 −1 −1 +1 −j +1 +1 −j +1 −1 +j −1 +1 −j +1 +j +1<br>+j +j +1 +j −j −1 −j +j +1 +j +1 −1 −1 +1 −1 −1 +1 −1 −1 −1 +1 +1 −j +j +j −j +j +j −j +j +j<br>+j −j −j −j −1 −j −j −1 −j +j +1 +j −j −1 −j −1 +j −1 −1 +j −1 +1 −j +1 −1 +j −1 −j +j +j +j −j −j<br>−j +j +j −j +j +j +1 −1 −1 −1 +1 +1 +1 −1 −1 +1 −1 −1 −1 +j −1 +1 −j +1 +1 −j +1 +1 −j +1<br>−j −1 −j +j +1 +j +j +1 +j +j +1 +j +1 −1 −1 −1 +1 +1 +1 −1 −1 +1 −1 −1 −j +j +j +j −j −j −j |

TABLE 5-continued

The sequence $Seq^{iTX}_{left,595}(k)$

+j +j −j +j +j −j −1 −j +j +1 +j +j +1 +j +j +1 +j −1 +j −1 +1 −j +1 +1 −j +1 +1 −j +1 +1 −1
−1 +1 −1 −1 +1 −1 −1 −1 +1 +1 +j −j −j +j −j −j +j −j −j −j +j +j −j −1 −j −j −1 −j +j +1 +j −j
−1 −j +1 −j +1 +1 −j +1 −1 +j −1 +1 −j +1 −j +j +j −j +j +j −j +j +j +j −j −j −1 +1 +1 −1 +1
+1 −1 +1 +1 +1 −1 −1 −1 +j −1 −1 +j −1 +1 −j +1 −1 +j −1 +j +1 +j +j +1 +j −j −1 −j +j +1
+j −1 +1 +1 +1 −1 −1 −1 +1 +1 −1 +1 +1 −j +j +j +j −j −j −j +j +j −j +j +j +j +1 +j −j −1 −j
−j −1 −j −j −1 −j −1 +j −1 +1 −j +1 +1 −j +1 +1 −j +1 −j +j +j +j −j −j −j +j +j −j +j +j −1 +1
+1 +1 −1 −1 −1 +1 +1 −1 +1 +1 −1 +j −1 +1 −j +1 +1 −j +1 +1 −j +1 +j +1 +j −j −1 −j −j −1
−j −j −1 −j

The Sequence $Seq^{6}_{left,595}(k)$, to be transmitted from left to right, up to down +1 −j +1 +1 −j +j +1 −1 −j +j −j −1 +j +j +1 −1 +1 +1 −1 +1 −1 −1 −j +j +j −1 +j −1 +j +1
+j −j +j +j −1 +1 +1 +j +1 +j +1 −j +1 +1 −1 −1 −j +j +j −1 +j −1 +j +1 +j +j −j −j +1 −1 −1
−j −1 −j −1 +j −1 +j −j −j −1 +1 +1 −j −1 −j +1 −j +1 −1 +1 +1 −j +j +j +1 −j +1 +j +1 +j +j −j
−j −1 +1 +1 −j −1 −j +1 −j +1 +1 −1 −1 +j −j −j −1 +j −1 −j −1 −j −1 +1 +1 −j +j +j −1 +j −1 −j
−1 −j +j −j −j −1 +1 +1 +j +1 +j −1 +j −1 −1 +1 +1 −j +j +j −1 +j −1 −j −1 −j −j +j +j +1 −1
−1 −j −1 −j +1 −j +1 −j +j +j −1 +1 +1 −j −1 −j −1 +j −1 +1 −1 −1 −j +j +j +1 −j +1 −j −1 −j −j
+j +j −1 +1 +1 −j −1 −j −1 +j −1 −1 +1 +1 +j −j −j −1 +j −1 +j +1 +j +j −j −j +1 −1 −1 −j −1 −j
−1 +j −1 +1 −1 −1 −j +j +j −1 +j −1 +j +1 +j +j −j −j +1 −1 −1 −j −1 −j −1 +j −1 −1 +1 +1 +j −j
−j +1 −j +1 −j −1 −j −1 +1 +1 −j +j +j +1 −j +1 +j +1 +j −j +j +j +1 −1 −1 +j +1 +j −1 +j −1
−1 +1 +1 −j +j +j +1 −j +1 +j +1 +j +j −j −j −1 +1 +1 −j −1 −j +1 −j +1 −j +j +j +1 −1 −1
−j −1 −j +1 −j +1 −1 +1 +1 −j +j +j −1 +j −1 −j −1 −j −j +j +j +1 −1 −1 −j −1 −j +1 −j +1 +1 −1
−1 +j −j −j +1 −j +1 +j +1 +j +1 −1 −1 −j +j +j +1 −j +1 −j −1 −j +j −j −j +1 −1 −1 +j +1 +j
+1 −j +1 +1 −1 −1 −j +j +j +1 −j +1 −j −1 −j −j +j +j −1 +1 +1 −j −1 −j −1 +j −1 +1 −1 −1 −j
+j +j −1 +j −1 +j +1 +j −j +j +j −1 +1 +1 +j +1 +j +1 −j +1 +1 −1 −1 −j +j +j −1 +j −1 +j
+1 +j +j −j −j +1 −1 −1 −j −1 −j −1 +j −1 +j −j −j −1 +1 +1 −j −1 −j +1 −j +1 −1 +1 +1 −j +j +j
+1 −j +1 +j +1 +j +j −j −j −1 +1 +1 −j −1 −j +1 −j +1 +1 −1 −1 +j −j −j −1 +j −1 −j −1 −j −1
+1 +1 −j +j +j −1 +j −1 −j −1 −j +j −j −j −1 +1 +1 +j +1 +j −1 +j −1 −1 +1 +1 −j +j +j −1 +j
−1 −j −1 −j −j +j +j +1 −1 −1 −j −1 −j +1 −j +1 −j +j +j −1 +1 +1 −j −1 −j −1 +j −1 +1 −1 −1 −j
+j +j +1 −j +1 −j −1 −j −j +j +j −1 +1 +1 −j −1 −j −1 +j −1 −1 +1 +1 +j −j −j −1 +j −1 +j +1
+j The Sequence $Seq^{7}_{left,595}(k)$, to be transmitted from left to right, up to down +j −j +j −1 −1 +1 +j +1 −1 −j +j −j −j −j −j −1 +1 +1 +1 +1 −1 −1 −1 +1 +1 −j +j +j +j −j −j
+j −j −j +j −j −j +1 −1 −1 +1 −1 −1 −j +j +j +j −j −j +1 −1 −1 −1 +1 +1 +1 −1 −1 +1 −1 −1 +j −j
−j +j −j −j +j −j −j −j +j +j −1 +1 +1 +1 −1 −1 +1 −1 −1 +1 −1 −1 +j −j −j +j −j −j +1 −1 −1 −1
+1 +1 −j +j +j +j −j −j −j +j +j −j +j +j −1 +1 +1 −1 +1 +1 +1 −j +1 +1 −j +1 −j −1 −j −j −1 −j
+j +1 +j −j −1 −j +1 −j +1 −1 +j −1 −j −1 −j −j −1 −j +1 −j +1 +1 −j +1 +1 −j +1 −1 +j −1 +j
+1 +j −j −1 −j +j +1 +j +j +1 +j −1 +j −1 −1 +j −1 +1 −j +1 −1 +j −1 +j +1 +j −j −1 −j +1 −j
+1 +1 −j +1 −j −1 −j −j −1 −j −j −1 −j +j +1 +j −1 +j −1 +1 −j +1 +1 −1 −1 −1 +1 +1 −j +j +j
+j −j −j +j −j −j +j −j −j +1 −1 −1 +1 −1 −1 −j +j +j +j −j −j +1 −1 −1 −1 +1 +1 +1 −1 −1 +1 −1
−1 +j −j −j +j −j −j +j −j −j −j +j +j −1 +1 +1 +1 −1 −1 +1 −1 −1 +1 −1 −1 +j −j −j +j −j −j +1 −1
−1 −1 +1 +1 −j +j +j +j −j −j −j +j +j −j +j +j −1 +1 +1 −1 +1 +1 +1 −j +1 +1 −j +1 −j −1
−j −j −1 −j +j +1 +j −j −1 −j +1 −j +1 −1 +j −1 −j −1 −j −j −1 −j +1 −j +1 +1 −j +1 +1 −j +1 −1
+j −1 +j +1 +j −j −1 −j +j +1 +j +j +1 +j −1 +j −1 −1 +j −1 +1 −j +1 −1 +j −1 +j +1 +j −j −1
−j +1 −j +1 +1 −j +1 −j −1 −j −j −1 −j −j −1 −j +j +1 +j −1 +j −1 +1 −j +1 −1 +1 +1 +1 −1 −1
+j −j −j −j +j +j −j +j +j −j +j +j −1 +1 +1 −1 +1 +1 +j −j −j −j +j +j −1 +1 +1 +1 −1 −1 −1
+1 +1 −1 +1 +1 −j +j +j −j +j +j −j +j +j +j −j −j +1 −1 −1 −1 +1 +1 −1 +1 +1 −1 +1 +1 −j
+j +j −j +j +j −1 +1 +1 +1 −1 −1 +j −j −j −j +j +j +j −j −j +j −j −j +1 −1 −1 +1 −1 −1 −1 +j −1
−1 +j −1 +j +1 +j +j +1 +j −j −1 −j +j +1 +j −1 +j −1 +1 −j +1 +j +1 +j +j +1 +j −1 +j −1 −1
+j −1 −1 +j −1 +1 −j +1 −j −1 −j +j +1 +j −j −1 −j −j −1 −j +1 −j +1 +1 −j +1 −1 +j −1 +1 −j
+1 −j −1 −j +j +1 +j −1 +j −1 −1 +j −1 +j +1 +j +j +1 +j +j +1 +j −j −1 −j +1 −j +1 −1 +j −1

The Sequence $Seq^{8}_{left,595}(k)$, to be transmitted from left to right, up to down −1 +j +j +1 +1 −1 −j +j −j −1 −j +j −1 +j −j +j −1 +j +1 +1 −1 −1 −1 +1 +1 +j −j −j −j +j +j −1
+j −1 −1 +j −1 −j −1 −j −j −1 −j −j +j +j +j −j −j −1 +1 +1 +1 −1 −1 +j +1 +j +j +1 +j +1 −j
+1 +1 −j +1 −j +j +j −j +j +j −1 +1 +1 −1 +1 +1 +j +1 +j −j −1 −j +1 −j +1 −1 +j −1 −1 +1
+1 −1 +1 +1 −j +j +j −j +j +j +1 −j +1 −1 +j −1 +j +1 +j −j −1 −j +1 −1 −1 −1 +1 +1 +j −j −j
−j +j +j −1 +j −1 −1 +j −1 −j −1 −j −j −1 −j +j −j −j −j +j +j +1 −1 −1 −1 +1 +1 −j −1 −j −j −1 −j
−1
+j −1 −1 +j −1 −j +j +j −j +j +j −1 +1 +1 −1 +1 +1 +j +1 +j −j −1 −j +1 −j +1 −1 +j −1 +1
−1 −1 +1 −1 −1 +j −j −j +j −j −j −1 +j −1 +1 −j +1 −j −1 −j +j +1 +j +1 −1 −1 −1 +1 +1 +j −j −j
−j +j +j −1 +j −1 −1 +j −1 −j −1 −j −j −1 −j −j +j +j +j −j −j −1 +1 +1 +1 −1 −1 +j +1 +j +j +1
+j +1 −j +1 +1 −j +1 −j +j +j −j +j +j −1 +1 +1 −1 +1 +1 +j +1 +j −j −1 −j +1 −j +1 −1 +j −1
−1 +1 +1 −1 +1 +1 −j +j +j −j +j +j +1 −j +1 −1 +j −1 +j +1 +j −j −1 −j +1 −1 −1 −1 +1
+1 +j −j −j −j +j +j −1 +j −1 −1 +j −1 −j −1 −j −j −1 −j +j −j −j −j +j +j +1 −1 −1 −1 +1 +1 −j −1
−j −j −1 −j −1 +j −1 −1 +j −1 −j +j +j −j +j +j −1 +1 +1 −1 +1 +1 +j +1 +j −j −1 −j +1 −j +1 −1
+j −1 +1 −1 −1 +1 −1 −1 +j −j −j +j −j −j −1 +j −1 +1 −j +1 −j −1 −j +j +1 +j −1 +1 +1 +1 −1
−1 −j +j +j +j −j −j +1 −j +1 +1 −j +1 +j +1 +j +j +1 +j +j −j −j −j +j +j +1 −1 −1 −1 +1
+1 −j −1 −j −j −1 −j −1 +j −1 −1 +j −1 +j −j −j +j −j −j +1 −1 −1 +1 −1 −1 −j −1 −j +j +1 +j −1
+j −1 +1 −j +1 +1 −1 −1 +1 −1 −1 +j −j −j +j −j −j −1 +j −1 +1 −j +1 −j −1 −j +j +1 +j −1 +1
+1 +1 −1 −1 −j +j +j +j −j −j +1 −j +1 +1 −j +1 +j +1 +j +j +1 +j −j +j +j +j −j −j −1 +1 +1
+1 −1 −1 +j +1 +j +j +1 +j +1 −j +1 +1 −j +1 +j −j −j +j −j −j +1 −1 −1 +1 −1 −1 −j −1 −j +j
+1 +j −1 +j −1 +1 −j +1 −1 +1 +1 −1 +1 +1 −j +j +j −j +j +j +1 −j +1 −1 +j −1 +j +1 +j −j −1
−j

TABLE 6

| The sequence $Seq^{iTX}_{right,595}(k)$ |
| --- |
| The Sequence $Seq^{1}_{right,595}(k)$, to be transmitted from left to right, up to down |
| −j −1 −j +j +j −j −1 +j −1 −1 −1 +1 +1 −j +1 −1 −1 +1 +j +1 +j +j +j −j −j −1 −j +j +j −j −1 +j |
| −1 −1 −1 +1 −1 +j −1 +1 +1 −1 −j −1 −j −j −j +j +j +1 +j −j −j +j +1 −j +1 +1 +1 −1 −1 +j −1 |
| +1 +1 −1 −j −1 −j −j −j +j −j −1 −j +j +j −j −1 +j −1 −1 −1 +1 −1 +j −1 +1 +1 −1 −j −1 −j −j −j |
| +j +1 −j +1 −1 −1 +1 −j −1 −j −j −j +j +j +1 +j −j −j +j −1 +j −1 −1 −1 +1 +1 −j +1 −1 −1 +1 −j |
| −1 −j −j −j +j −j −1 −j +j +j −j +1 −j +1 +1 +1 −1 +1 −j +1 −1 −1 +1 −j −1 −j −j −j +j +j +1 |
| +j −j −j +j −1 +j −1 −1 −1 +1 −1 +j −1 +1 +1 −1 +j +1 +j +j +j −j +j +1 +j −j −j +j −1 +j −1 −1 |
| −1 +1 +1 −j +1 −1 −1 +1 −j −1 −j −j −j +j +j +1 +j −j −j +j −1 +j −1 −1 −1 +1 +1 −j +1 −1 −1 |
| +1 −j −1 −j −j −j +j −j −1 −j +j +j −j +1 −j +1 +1 +1 −1 −1 +j −1 +1 +1 −1 +j +1 +j +j +j −j |
| −j −1 −j +j +j −j +1 −j +1 +1 +1 −1 +1 −j +1 −1 −1 +1 −j −1 −j −j −j +j −j −1 −j +j +j −j +1 −j |
| +1 +1 +1 −1 +j +1 +j −j −j +j +1 −j +1 +1 +1 −1 −1 +j −1 +1 +1 −1 −j −1 −j −j −j +j +j +1 |
| +j −j −j +j +1 −j +1 +1 +1 −1 +1 −j +1 −1 −1 +1 +j +1 +j +j +j −j +j +1 +j −j −j +j +1 −j |
| +1 +1 +1 −1 −1 +j −1 +1 +1 −1 −j −1 −j −j −j +j −j −1 −j +j +j −j −1 +j −1 −1 −1 +1 −1 +j −1 |
| +1 +1 −1 −j −1 −j −j −j +j −j −1 −j +j +j −j −1 +j −1 −1 −1 +1 +1 −j +1 −1 −1 +1 +j +1 +j +j |
| +j −j −j −1 −j +j +j −j −1 +j −1 −1 −1 +1 −1 +j −1 +1 +1 −1 −j −1 −j −j −j +j +j +1 +j −j −j +j |
| +1 −j +1 +1 +1 −1 −1 +j −1 +1 +1 −1 −j −1 −j −j −j +j −j −1 −j +j +j −j −1 +j −1 −1 −1 +1 −1 |
| +j −1 +1 +1 −1 −j −1 −j −j −j +j +1 −j +1 −1 −1 +1 −j −1 −j −j −j +j +j +1 +j −j −j +j −1 +j −1 −1 |
| −1 +1 +1 −j +1 −1 −1 +1 −j −1 −j −j −j +j −j −1 −j +j +j −j +1 −j +1 +1 +1 −1 +1 −j +1 −1 −1 |
| +1 −j −1 −j −j −j +j +j +1 +j −j −j +j −1 +j −1 −1 −1 +1 −1 +j −1 +1 +1 −1 +j +1 +j +j +j −j |
| +j +1 +j −j −j +j −1 +j −1 −1 −1 +1 −1 +1 +j +j −1 +1 +1 +j −j +j −1 +j +1 +1 +j +1 +j −1 |
| −j |
| The Sequence $Seq^{2}_{right,595}(k)$, to be transmitted from left to right, up to down |
| −j −1 −j −j −1 −j −j −1 −j +j +1 +j −j −1 −j −j −1 −j +j +1 +j −j −1 −j −1 +j −1 −1 +j −1 −1 +j −1 |
| +1 −j +1 +1 −j +1 +1 −j +1 −1 +j −1 +1 −j +1 +j +1 +j +j +1 +j +j +1 +j −j −1 −j +j +1 +j |
| +j +1 +j −j −1 −j +j +1 +j −1 +j −1 −1 +j −1 −1 +j −1 +1 −j +1 +1 −j +1 +1 −j +1 −1 +j −1 |
| +1 −j +1 +1 +1 −1 +1 +1 −1 +1 +1 −1 −1 −1 +1 +1 +1 −1 +1 +1 −1 −1 −1 +1 +1 +1 −1 −j −j |
| +j −j −j +j −j −j +j +j +j −j +j +j −j +j +j −j −j −j +j +j +j −j +1 +1 −1 +1 +1 −1 +1 +1 −1 −1 |
| −1 +1 +1 +1 −1 +1 +1 −1 −1 −1 +1 +1 +1 −1 +j +j −j +j +j −j +j +j −j −j −j +j −j −j +j −j −j |
| +j +j +j −j −j −j +j +1 −j +1 +1 −j +1 +1 −j +1 −1 +j −1 +1 −j +1 +1 −j +1 −1 +j −1 +1 −j +1 |
| −j −1 −j −j −1 −j −j −1 −j +j +1 +j +j +1 +j +j +1 +j −j −1 −j +j +1 +j −1 +j −1 −1 +j −1 −1 +j |
| −1 +1 −j +1 −1 +j −1 −1 +j −1 +1 −j +1 −1 +j −1 −j −1 −j −j −1 −j −j −1 −j +j +1 +j +j +1 +j +j |
| +1 +j −j −1 −j +j +1 +j +j +j −j +j +j −j +j +j −j −j −j +j +j +j −j +j +j −j −j −j +j +j +j −j +1 |
| +1 −1 +1 +1 −1 +1 +1 −1 −1 −1 +1 −1 −1 +1 −1 −1 +1 +1 +1 −1 −1 −1 +1 +j +j −j +j +j −j |
| +j +j −j −j −j +j +j +j −j +j +j −j −j −j +j +j +j −j −1 −1 +1 −1 −1 +1 −1 −1 +1 +1 +1 −1 +1 |
| +1 −1 +1 +1 −1 −1 −1 +1 +1 +1 −1 −j −1 −j −j −1 −j −j −1 −j +j +1 +j −j −1 −j −j −1 −j +j +1 +j |
| −j −1 −j −1 +j −1 −1 +j −1 −1 +j −1 +1 −j +1 +1 −j +1 +1 −j +1 −1 +j −1 +1 −j +1 +j +1 +j +j |
| +1 +j +j +1 +j −j −1 −j +j +1 +j +j +1 +j −j −1 −j +j +1 +j −1 +j −1 −1 +j −1 −1 +j −1 +1 −j |
| +1 +1 −j +1 +1 −j +1 −1 +j −1 +1 −j +1 +1 +1 −1 +1 +1 −1 +1 +1 −1 −1 −1 +1 +1 +1 −1 |
| +1 +1 −1 −1 −1 +1 +1 +1 −1 −j −j +j −j −j +j −j −j +j +j +j −j +j +j −j +j +j −j −j −j +j +j +j −j |
| +1 +1 −1 +1 +1 −1 +1 +1 −1 −1 −1 +1 +1 +1 −1 +1 +1 −1 −1 −1 +1 +1 +1 −1 +j +j −j +j |
| +j −j +j +j −j −j −j +j −j −j +j −j −j +j +j +j −j −j −j +j −1 −j +j −1 +1 −1 −1 +j −1 +j −j −1 +1 |
| +1 −1 +1 −j −j +1 |
| The Sequence $Seq^{3}_{right,595}(k)$, to be transmitted from left to right, up to down |
| +1 −j +1 +j +1 +j +1 −j +1 −j −1 −j −j −1 −j −1 +j −1 −j −1 −j +1 −j +1 −1 +j −1 −j −1 −j −1 +j |
| −1 +j +1 +j −j −1 −j −1 +j −1 −j −1 −j +1 −j +1 −1 −1 +1 −j −j +j −1 −1 +1 +j +j −j +j +j −j +1 |
| +1 −1 +j +j −j −1 −1 +1 −1 −1 +1 −j −j +j −1 −1 +1 +j +j −j −j −j +j −1 −1 +1 −j −j +j +1 +1 −1 |
| −j −1 −j +1 −j +1 +j +1 +j +1 −j +1 −1 +j −1 +j +1 +j +1 −j +1 +j +1 +j +j +1 +j −1 +j −1 |
| −j −1 −j −1 +j −1 −1 +j −1 +j +1 +j +1 −j +1 +j +1 +j +j +j −j −1 −1 +1 −j −j +j −1 −1 +1 |
| +1 +1 −1 −j −j +j −1 −1 +1 −j −j +j +j +j −j −1 −1 +1 −j −j +j −1 −1 +1 −1 −1 +1 +j +j −j +1 |
| +1 −1 +j +j −j −1 +j −1 −j −1 −j −1 +j −1 +j +1 +j +j +1 +j +1 −j +1 +j +1 +j −1 +j −1 +1 −j |
| +1 +j +1 +j +1 −j +1 −j −1 −j +j +1 +j +1 −j +1 +j +1 +j −1 +j −1 +1 +1 −1 +j +j −j +1 +1 |
| −1 −j −j +j −j −j +j −1 −1 +1 −j −j +j +1 +1 −1 +1 +1 −1 +j +j −j +1 +1 −1 −j −j +j +j +j −j +1 |
| +1 −1 +j +j −j −1 −1 +1 +j +1 +j −1 +j −1 −j −1 −j −1 +j −1 +1 −j +1 −j −1 −j −1 +j −1 −j −1 −j |
| −j −1 −j +1 −j +1 +j +1 +j +1 −j +1 +1 −j +1 −j −1 −j −1 +j −1 −j −1 −j −j −j +j +1 +1 −1 +j +j |
| −j +1 +1 −1 −1 −1 +1 +j +j −j +1 +1 −1 +j +j −j −j −j +j +1 +1 −1 +j +j −j +1 +1 −1 +1 +1 −1 |
| −j −j +j −1 −1 +1 −j −j +j −1 +j −1 −j −1 −j −1 +j −1 +j +1 +j +j +1 +j +1 −j +1 +j +1 +j −1 |
| +j −1 +1 −j +1 +j +1 +j +1 −j +1 −j −1 −j +j +1 +j +1 −j +1 +j +1 +j −1 +j −1 +1 +1 −1 +j |
| +j −j +1 +1 −1 −j −j +j −j −j +j −1 −1 +1 −j −j +j +1 +1 −1 +1 +1 −1 +j +j −j +1 +1 −1 −j −j |
| +j +j +j −j +1 +1 −1 +j +j −j −1 −1 +1 +j +1 +j −1 +j −1 −j −1 −j −1 +j −1 +1 −j +1 −j −1 −j −1 |
| +j −1 −j −1 −j −j −1 −j +1 −j +1 +j +1 +j +1 −j +1 +1 −j +1 −j −1 −j −1 +j −1 −j −1 −j −j −j +j |
| +1 +1 −1 +j +j −j +1 +1 −1 −1 −1 +1 +j +j −j +1 +1 −1 +j +j −j −j −j +j +1 +1 −1 +j +j −j |
| +1 +1 −1 +1 +1 −1 −j −j +j −1 −1 +1 −j −j +j −j −j +j +1 −1 −1 −j +j −j +j −1 +j +1 +1 +1 −1 |
| +1 −1 −j |
| The Sequence $Seq^{4}_{right,595}(k)$, to be transmitted from left to right, up to down |
| +1 −j +1 +j +1 +j +j +1 +j +1 −j +1 +1 +1 −1 +j +j −j +j +j −j +1 +1 −1 +j +1 +j +1 −j |
| +1 −1 +j −1 −j −1 −j −j −j +j −1 −1 +1 +1 +1 −1 +j +j −j +1 −j +1 +j +1 +j +j +1 +j +1 −j +1 |
| +1 +1 −1 +j +j −j +j +j −j +1 +1 −1 +j +1 +j +1 −j +1 −1 +j −1 −j −1 −j −j −j +j −1 −1 +1 +1 |
| +1 −1 +j +j −j +1 −j +1 +j +1 +j −j −1 −j −1 +j −1 +1 +1 −1 +j +j −j −j −j +j −1 −1 +1 +j +1 |
| +j +1 −j +1 +1 −j +1 +j +1 +j −j −j +j −1 −1 +1 −1 −1 +1 −j −j +j −1 +j −1 −j −1 −j +j +1 +j |
| +1 −j +1 −1 −1 +1 −j −j +j +j +j −j +1 +1 −1 −j −1 −j −1 +j −1 −1 +j −1 −j −1 −j +j +j −j +1 +1 |
| −1 +1 +1 −1 +j +j −j −1 +j −1 −j −1 −j −j −1 −j −1 +j −1 −1 −1 +1 −j −j +j −j −j +j −1 −1 +1 −j −1 |
| −j −1 +j −1 +1 −j +1 +j +1 +j +j +j −j +1 +1 −1 −1 −1 +1 −j −j +j −1 +j −1 −j −1 −j −j −1 −j −1 |
| +j −1 −1 −1 +1 −j −j +j −j −j +j −1 −1 +1 −j −1 −j −1 +j −1 +1 −j +1 +j +1 +j +j +j −j +1 +1 |
| −1 −1 −1 +1 −j −j +j −1 +j −1 −j −1 −j +j +1 +j +1 −j +1 −1 −1 +1 −j −j +j +j +j −j +1 +1 −1 −j |

TABLE 6-continued

| The sequence $Seq^{iTX}_{right,595}(k)$ |
| --- |
| −1 −j −1 +j −1 −1 +j −1 −j −1 −j +j +j −j +1 +1 −1 +1 +1 −1 +j +j −j +1 −j +1 +j +1 +j −j −1 −j |
| −1 +j −1 +1 +1 −1 +j +j −j −j −j +j −1 −1 +1 +j +1 +j +1 −j +1 +1 −j +1 +j +1 +j −j −j +j −1 |
| −1 +1 −1 −1 +1 −j −j +j −1 +j −1 −j −1 −j −j −1 −j −1 +j −1 −1 −1 +1 −j −j +j −j −j +j −1 −1 +1 |
| −j −1 −j −1 +j −1 +1 −j +1 +j +1 +j +j +j −j +1 +1 −1 −1 −1 +1 −j −j +j −1 +j −1 −j −1 −j −j −1 |
| −j −1 +j −1 −1 −1 +1 −j −j +j −j −j +j −1 −1 +1 −j −1 −j −1 +j −1 +1 −j +1 +j +1 +j +j +j −j +1 |
| +1 −1 −1 −1 +1 −j −j +j −1 +j −1 −j −1 −j +j +1 +j +1 −j +1 −1 −1 +1 −j −j +j +j +j −j +1 +1 −1 |
| −j −1 −j −1 +j −1 −1 +j −1 −j −1 −j +j +j −j +1 +1 −1 +1 +1 −1 +j +j −j +1 −j +1 +j +1 +j −j |
| −1 −j −1 +j −1 +1 +1 −1 +j +j −j −j −j +j −1 −1 +1 +j +1 +j +1 −j +1 +1 −j +1 +j +1 +j −j −j |
| +j −1 −1 +1 −1 −1 +1 −j −j +j −j −1 +j +1 +j −1 +1 +1 +j +1 −j −j +1 +1 +1 +j +1 −1 −1 |
| The Sequence $Seq^{5}_{right,595}(k)$, to be transmitted from left to right, up to down |
| +1 −1 −1 +1 −1 −1 +1 −1 −1 −1 +1 +1 −j +j +j −j +j +j −j +j +j +j −j −j −j −1 −j −j −1 −j +j +1 |
| +j −j −1 −j −1 +j −1 −1 +j −1 +1 −j +1 −1 +j −1 −j +j +j −j +j +j −j +j +j +j −j −j +1 −1 −1 +1 |
| −1 −1 +1 −1 −1 −1 +1 +1 −1 +j −1 −1 +j −1 +1 −j +1 −1 +j −1 −j −1 −j −j −1 −j +j +1 +j −j −1 −j |
| −1 +1 +1 +1 −1 −1 −1 +1 +1 −1 +1 +1 +j −j −j −j +j +j +j −j −j +j −j −j +j +1 +j −j −1 −j −j −1 |
| −j −j −1 −j +1 −j +1 −1 +j −1 −1 +j −1 −1 +j −1 −j +j +j +j −j −j −j +j +j −j +j +j +1 −1 −1 −1 |
| +1 +1 +1 −1 −1 +1 −1 −1 −1 +j −1 +1 −j +1 +1 −j +1 +1 −j +1 −j −1 −j +j +1 +j +j +1 +j +j |
| +1 +j −1 +1 +1 −1 +1 +1 −1 +1 +1 +1 −1 −1 +j −j −j +j −j −j +j −j −j −j +j +j +j +1 +j +j +1 |
| +j −j −1 −j +j +1 +j +1 −j +1 +1 −j +1 −1 +j −1 +1 −j +1 +j −j −j +j −j −j +j −j −j −j +j +j −1 |
| +1 +1 −1 +1 +1 −1 +1 +1 +1 −1 −1 +1 −j +1 +1 −j +1 −1 +j −1 +1 −j +1 +j +1 +j +j +1 +j |
| −j −1 −j +j +1 +j +1 −1 −1 −1 +1 +1 +1 −1 −1 +1 −1 −1 −j +j +j +j −j −j −j +j +j −j +j +j −j −1 |
| −j +j +1 +j +j +1 +j +j +1 +j −1 +j −1 +1 −j +1 +1 −j +1 +1 −j +1 +j −j −j −j +j +j +j −j −j |
| +j −j −j −1 +1 +1 +1 −1 −1 −1 +1 +1 −1 +1 +1 +1 −j +1 −1 +j −1 −1 +j −1 −1 +j −1 +j +1 +j |
| −j −1 −j −j −1 −j −j −1 −j −1 +1 +1 −1 +1 +1 −1 +1 +1 +1 −1 −1 +j −j −j +j −j −j +j −j −j −j +j |
| +j +j +1 +j +j +1 +j −j −1 −j +j +1 +j +1 −j +1 +1 −j +1 −1 +j −1 +1 −j +1 +j −j −j +j −j −j |
| +j −j −j −j +j +j −1 +1 +1 −1 +1 +1 −1 +1 +1 +1 −1 −1 +1 −j +1 +1 −j +1 −1 +j −1 +1 −j +1 |
| +j +1 +j +j +1 +j −j −1 −j +j +1 +j +1 −1 −1 −1 +1 +1 +1 −1 −1 +1 −1 −1 −j +j +j +j −j −j −j |
| +j +j −j +j +j −j −1 −j +j +1 +j +j +1 +j +j +1 +j −1 +j −1 +1 −j +1 +1 −j +1 +1 −j +1 +j −j |
| −j −j +j +j +j −j −j +j −j −j −1 +1 +1 +1 −1 −1 −1 +1 +1 −1 +1 +1 +1 −j +1 −1 +j −1 −1 +j −1 |
| −1 +j −1 +j +1 +j −j −1 −j −j −1 −j −j −1 −j −1 −j +1 −j −1 +1 +j −j +1 +j −1 −j +1 +1 +1 −j +j |
| +j +j |
| The Sequence $Seq^{6}_{right,595}(k)$, to be transmitted from left to right, up to down |
| +1 −1 −1 −j +j +j −1 +j −1 +j +1 +j −j +j +j −1 +1 +1 +j +1 +j +1 −j +1 −1 +1 +1 +j −j −j |
| +1 −j +1 −j −1 −j −j +j +j −1 +1 +1 +j +1 +j +1 −j +1 +j −j −j −1 +1 +1 −j −1 −j +1 −j +1 −1 |
| +1 +1 −j +j +j +1 −j +1 +j +1 +j −j +j +j +1 −1 −1 +j +1 +j −1 +j −1 −1 +1 +1 −j +j +j +1 |
| −j +1 +j +1 +j −1 +1 +1 −j +j +j −1 +j −1 −j −1 −j +j −j −j −1 +1 +1 +j +1 +j −1 +j −1 +1 −1 |
| −1 +j −j −j +1 −j +1 +j +1 +j +j −j −j −1 +1 +1 +j +1 +j −1 +j −1 −j +j +j −1 +1 +1 −j −1 −j −1 |
| +j −1 +1 −1 −1 −j +j +j +1 −j +1 −j −1 −j +j −j −j +1 −1 −1 +j +1 +j +1 −j +1 +1 −1 −1 −j |
| +j +j +1 −j +1 −j −1 −j −1 +1 +1 +j −j −j +1 −j +1 −j −1 −j +j −j −j +1 −1 −1 −j −1 −j −1 +j −1 |
| +1 −1 −1 −j +j +j −1 +j −1 +j +1 +j +j −j −j +1 −1 −1 −j −1 −j −1 +j −1 −j +j +j +1 −1 −1 +j |
| +1 +j −1 +j −1 +1 −1 −1 +j −j −j −1 +j −1 −j −1 −j +j −j −j −1 +1 +1 −j −1 −j +1 −j +1 +1 −1 −1 |
| +j −j −j −1 +j −1 −j −1 −j +1 −1 −1 +j −j −j +1 −j +1 +j +1 +j −j +j +j +1 −1 −1 −j −1 −j +1 −j |
| +1 −1 +1 +1 −j +j +j −1 +j −1 −j −1 −j −j +j +j +1 −1 −1 −j −1 −j +1 −j +1 +j −j −j +1 −1 −1 +j |
| +1 +j +1 −j +1 −1 +1 +1 +j −j −j −1 +j −1 +j +1 +j −j +j +j −1 +1 +1 −j −1 −j −1 +j −1 −1 +1 |
| +1 +j −j −j −1 +j −1 +j +1 +j −1 +1 +1 +j −j −j +1 −j +1 −j −1 −j +j −j −j +1 −1 −1 −j −1 −j −1 |
| +j −1 +1 −1 −1 −j +j +j −1 +j −1 +j +1 +j +j −j −j +1 −1 −1 −j −1 −j −1 +j −1 −j +j +j +1 −1 −1 |
| +j +1 +j −1 +j −1 +1 −1 −1 +j −j −j −1 +j −1 −j −1 −j +j −j −j −1 +1 +1 −j −1 −j +1 −j +1 +1 −1 |
| −1 +j −j −j −1 +j −1 −j −1 −j +1 −1 −1 +j −j −j +1 −j +1 +j +1 +j −j +j +j +1 −1 −1 −j −1 −j +1 |
| −j +1 −1 +1 +1 −j +j +j −1 +j −1 −j −1 −j −j +j +j +1 −1 −1 −j −1 −j +1 −j +1 +j −j −j +1 −1 −1 |
| +j +1 +j +1 −j +1 −1 +1 +1 +j −j −j −1 +j −1 +j +1 +j −j +j +j −1 +1 +1 −j −1 −j −1 +j −1 −1 |
| +1 +1 +j −j −j −1 +j −1 +j +1 +j +1 +1 +1 +j +j −1 +j +1 −j +1 +j −1 +1 +1 +1 +j −j +j +j |
| The Sequence $Seq^{7}_{right,595}(k)$, to be transmitted from left to right, up to down |
| −j +j +j +j −j −j −1 +1 +1 +1 −1 −1 +1 −1 −1 +1 −1 −1 −j +j +j −j +j +j +1 −1 −1 −1 +1 +1 +j |
| −j −j −j +j +j +j −j −j +j −j −j −1 +1 +1 −1 +1 +1 +1 −1 −1 −1 +1 +1 +j −j −j −j +j +j −j +j +j |
| −j +j +j +1 −1 −1 +1 −1 −1 +j −j −j −j +j +j +1 −1 −1 −1 +1 +1 +1 −1 −1 +1 −1 −1 −j +j +j −j |
| +j +j −j −1 −j −j −1 −j −1 +j −1 −1 +j −1 +1 −j +1 −1 +j −1 −j −1 −j +j +1 +j +1 −j +1 +1 −j +1 |
| +j +1 +j +j +1 +j +j +1 +j −j −1 −j −1 +j −1 +1 −j +1 +1 −j +1 +1 −j +1 +j +1 +j +j +1 +j |
| −j −1 −j +j +1 +j +1 −j +1 −1 +j −1 +j +1 +j +j +1 +j +1 −j +1 +1 −j +1 +1 −j +1 −1 +j −1 −j |
| −1 −j +j +1 +j +1 −1 −1 −1 +1 +1 −j +j +j +j −j −j +j −j −j +j −j −j +1 −1 −1 +1 −1 −1 +j −j −j |
| −j +j +j −1 +1 +1 +1 −1 −1 −1 +1 +1 −1 +1 +1 −j +j +j −j +j +j +j −j −j −j +j +j −1 +1 +1 |
| +1 −1 −1 +1 −1 −1 +1 −1 −1 +j −j −j +j −j −j −1 +1 +1 +1 −1 −1 +j −j −j −j +j +j +j −j −j +j −j |
| −j +1 −1 −1 +1 −1 −1 +1 −j +1 +1 −j +1 −j −1 −j −j −1 −j +j +1 +j −j −1 −j +1 −j +1 −1 +j −1 |
| +j +1 +j +j +1 +j −1 +j −1 −1 +j −1 −1 +j −1 +1 −j +1 −j −1 −j +j +1 +j +j +1 +j +j +1 +j −1 |
| +j −1 −1 +j −1 +1 −j +1 −1 +j −1 +j +1 +j −j −1 −j −1 +j −1 −1 +j −1 +j +1 +j +j +1 +j +j |
| +1 +j −j −1 −j +1 −j +1 −1 +j −1 −j +j +j +j −j −j −1 +1 +1 +1 −1 −1 +1 −1 −1 +1 −1 −1 −j +j |
| +j −j +j +j +1 −1 −1 −1 +1 +1 +j −j −j −j +j +j +j −j −j +j −j −j −1 +1 +1 −1 +1 +1 +1 −1 −1 −1 |
| +1 +1 +j −j −j −j +j +j −j +j +j −j +j +j +1 −1 −1 +1 −1 −1 +j −j −j −j +j +j +1 −1 −1 −1 +1 |
| +1 +1 −1 −1 +1 −1 −1 −j +j +j −j +j +j −j −1 −j −j −1 −j −1 +j −1 −1 +j −1 +1 −j +1 −1 +j −1 −j |
| −1 −j +j +1 +j +1 −j +1 +1 −j +1 +j +1 +j +j +1 +j +j +1 +j −j −1 −j −1 +j −1 +1 −j +1 +1 −j |
| +1 +1 −j +1 +j +1 +j +j +1 +j −j −1 −j +j +1 +j +1 −j +1 −1 +j −1 +j +1 +j +j +1 +j +1 −j |
| +1 +1 −j +1 +1 −j +1 −1 +j −1 −j −1 −j +j +1 +j −1 +1 −1 +1 +j +j −1 −1 −j +1 −1 +j +1 |
| +1 −1 −j +j +j +1 |
| The Sequence $Seq^{8}_{right,595}(k)$, to be transmitted from left to right, up to down |
| −j +j +j +j −j −j +1 −1 −1 −1 +1 +1 +j +1 +j +j +1 +j −1 +j −1 −1 +j −1 −1 +1 +1 +1 −1 −1 |
| +j −j −j −j +j +j +1 −j +1 +1 −j +1 −j −1 −j −j −1 −j −1 +1 +1 −1 +1 +1 +j −j −j +j −j −j +1 −j |

TABLE 6-continued

| The sequence $Seq^{iTX}_{right,595}(k)$ |
|---|
| +1 −1 +j −1 −j −1 −j +j +1 +j +j −j −j +j −j −j −1 +1 +1 −1 +1 +1 −j −1 −j +j +1 +j +1 −j +1 −1 |
| +j −1 +j −j −j −j +j +j −1 +1 +1 +1 −1 −1 −j −1 −j −j −1 −j +1 −j +1 +1 −j +1 −1 +1 +1 +1 −1 |
| −1 +j −j −j −j +j +j +1 −j +1 +1 −j +1 −j −1 −j −j −1 −j +1 −1 −1 +1 −1 −1 −j +j +j −j +j +j −1 |
| +j −1 +1 −j +1 +j +1 +j −j −1 −j +j −j −j +j −j −j −1 +1 +1 −1 +1 +1 −j −1 −j +j +1 +j +1 −j |
| +1 −1 +j −1 +1 −1 −1 −1 +1 +1 +j −j −j −j +j +j −1 +j −1 −1 +j −1 −j −1 −j −j −1 −j −j +j +j +j |
| −j −j −1 +1 +1 +1 −1 −1 +j +1 +j +j +1 +j +1 −j +1 +1 −j +1 −j +j +j −j +j +j −1 +1 +1 −1 |
| +1 +1 +j +1 +j −j −1 −j +1 −j +1 −1 +j −1 −1 +1 +1 −1 +1 +1 −j +j +j −j +j +j +1 −j +1 −1 |
| +j −1 +j +1 +j −j −1 −j −1 +1 +1 +1 −1 −1 −j +j +j +j −j −j +1 −j +1 +1 −j +1 +j +1 +j +j +1 |
| +j −j +j +j +j −j −j −1 +1 +1 +1 −1 −1 +j +1 +j +j +1 +j +1 −j +1 +1 −j +1 +j −j −j +j −j −j |
| +1 −1 −1 +1 −1 −1 −j −1 −j +j +1 +j −1 +j −1 +1 −j +1 −1 +1 +1 −1 +1 +1 −j +j +j −j +j +j |
| +1 −j +1 −1 +j −1 +j +1 +j −j −1 −j −j +j +j +j −j −j +1 −1 −1 −1 +1 +1 +j +1 +j +j +1 +j −1 |
| +j −1 −1 +j −1 −1 +1 +1 +1 −1 −1 +j −j −j −j +j +j +1 −j +1 +1 −j +1 −j −1 −j −j −1 −j −1 +1 |
| +1 −1 +1 +1 +j −j −j +j −j −j +1 −j +1 −1 +j −1 −j −1 −j +j +1 +j +j −j −j +j −j −j −1 +1 +1 −1 |
| +1 +1 −j −1 −j +j +1 +j +1 −j +1 −1 +j −1 +j −j −j −j +j +j −1 +1 +1 +1 −1 −1 −j −1 −j −j −1 −j |
| +1 −j +1 +1 −j +1 −1 +1 +1 +1 −1 −1 +j −j −j −j +j +j +1 −j +1 +1 −j +1 −j −1 −j −j −1 −j +1 |
| −1 −1 +1 −1 −1 −j +j +j −j +j +j −1 +j −1 +1 −j +1 +j +1 +j −j −1 −j +j −j −j +j −j −j −1 +1 +1 |
| −1 +1 +1 −j −1 −j +j +1 +j +1 −j +1 −1 +j −1 +j +1 −1 +1 +1 −1 +1 −1 +j +j −1 −1 +1 +1 −1 |
| −j −j −j +1 |

TABLE 7

| The sequence $Seq^{iTX}_{left,804}(k)$ |
|---|
| The Sequence $Seq^{1}_{left,804}(k)$, to be transmitted from left to right, up to down |
| −j +j +1 −1 +j −1 −j −j −1 +j −j +j +1 +1 +1 +j −1 −1 +j −1 +1 −1 +j +j −1 −j +1 +1 −j −1 +1 |
| −1 +j +j −j +1 +j +j +1 +j −j +j +1 +1 +j −1 −j −j −1 +j −j +j +1 +1 +1 +j −1 −1 +j −1 +1 −1 |
| +j +j +1 +j −1 −1 +j +1 −1 +1 −j −j +j −1 −j −j −1 −j +j −j −1 −1 −j +1 +j +j +1 −j +j −j −1 −1 |
| −1 −j +1 +1 −j +1 −1 +1 −j −j +1 +j −1 −1 +j +1 −1 +1 −j −j +j −1 −j −j −1 −j +j −j −1 −1 +j −1 |
| −j −j −1 +j −j +j +1 +1 +1 +j −1 −1 +j −1 +1 −1 +j +j +1 +j −1 −1 +j +1 −1 +1 −j −j +j −1 −j |
| −j −1 −j +j −j −1 −1 +j −1 −j −j −1 +j −j +j +1 +1 +1 +j −1 −1 +j −1 +1 −1 +j +j −1 −j +1 +1 −j |
| −1 +1 −1 +j +j −j +1 +j +j +1 +j −j +j +1 +1 +j −1 −j −j −1 +j −j +j +1 +1 +1 +j −1 −1 +j −1 |
| +1 −1 +j +j +1 +j −1 −1 +j +1 −1 +1 −j −j +j −1 −j −j −1 −j +j −j −1 −1 −j +1 +j +j +1 −j +j −j |
| −1 −1 −1 −j +1 +1 −j +1 −1 +1 −j −j +1 +j −1 −1 +j +1 −1 +1 −j −j +j −1 −j −j −1 −j +j −j −1 −1 |
| +j −1 −j −j −1 +j −j +j +1 +1 +1 +j −1 −1 +j −1 +1 −1 +j +j +1 +j −1 −1 +j +1 −1 +1 −j −j +j |
| −1 −j −j −1 −j +j −j −1 −1 +1 +j −1 −1 +j +1 −1 +1 −j −j −j +1 +j +j +1 +j −j +j +1 +1 +j −1 −j |
| −j −1 +j −j +j +1 +1 −1 −j +1 +1 −j +1 −1 +1 −j −j +1 +j −1 −1 +j +1 −1 +1 −j −j −j +1 +j +j |
| +1 +j −j +j +1 +1 −j +1 +j +j +1 −j +j −j −1 −1 +1 +j −1 −1 +j −1 +1 −1 +j +j −1 −j +1 +1 −j |
| −1 +1 −1 +j +j +j −1 −j −j −1 −j +j −j −1 −1 −j +1 +j +j +1 −j +j −j −1 −1 +1 +j −1 −1 +j −1 +1 |
| −1 +j +j +1 +j −1 −1 +j +1 −1 +1 −j −j −j +1 +j +j +1 +j −j +j +1 +1 −j +1 +j +j +1 −j +j −j |
| −1 −1 +1 +j −1 −1 +j −1 +1 −1 +j +j −1 −j +1 +1 −j −1 +1 −1 +j +j +j −1 −j −j −1 −j +j −j −1 −1 |
| −j +1 +j +j +1 −j +j −j −1 −1 +1 +j −1 −1 +j −1 +1 −1 +j +j −1 −j +1 +1 −j −1 +1 −1 +j +j |
| +j −1 −j −j −1 −j +j −j −1 −1 +j −1 −j −j −1 +j −j +j +1 +1 −1 −j +1 +1 −j +1 −1 +1 −j −j +1 +j |
| −1 −1 +j +1 −1 +1 −j −j −j +1 +j +j +1 +j −j +j +1 +1 +j −1 −j −j −1 +j −j +j +1 +1 −1 −j +1 |
| +1 −j +1 −1 +1 −j −j −1 −j +1 +1 −j −1 +1 −1 +j +j +j −1 −j −j −1 −j +j −j −1 −1 +j −1 −j −j −1 |
| +j −j +j +1 +1 −1 −j +1 +1 −j +1 −1 +1 −j −j +1 +j −1 −1 +j +1 −1 +1 −j −j −j +1 +j +j +1 +j |
| −j +j +1 +1 +j −1 −j −j −1 +j −j +j +1 +1 −1 −j +1 +1 −j +1 −1 +1 −j −j +1 +j −1 −1 +j +1 −1 |
| +1 −j −j −j +1 +j +j +1 +j −j +j +1 +1 −j +1 +j +j +1 −j +j −j −1 −1 +1 +j −1 −1 +j −1 +1 −1 |
| +j +j −1 −j +1 +1 −j −1 +1 −1 +j +j +j −1 −j −j −1 −j +j −j −1 −1 −j +1 +j +j +1 −j +j −j −1 −1 |
| +1 +j −1 −1 +j −1 +1 −1 +j +j +1 +j −1 −1 +j +1 −1 +1 −j −j −j +1 +j +j +1 +j −j +j +1 +1 −j |
| +1 +j +j +1 −j +j −j −1 −1 +1 +j −1 −1 +j −1 +1 −1 +j +j |
| The Sequence $Seq^{2}_{left,804}(k)$, to be transmitted from left to right, up to down |
| +1 −1 −1 +1 +j −1 −j −j −1 +j −1 −j −j −1 +1 +j −1 −1 +j +1 +j −1 −1 +j −j +1 +j +j +1 −j +1 |
| +j +j +1 +1 +j −1 −1 +j +1 +j −1 −1 +j +j −1 −j −j −1 −j +1 +j +j +1 −1 −j +1 +1 −j +1 +j −1 |
| −1 +j −j +1 +j +j +1 +j −1 −j −j −1 −1 −j +1 +1 −j +1 +j −1 −1 +j +1 −1 +1 −j −j +1 −1 +1 −j |
| −j −j +j −j −1 −1 −j +j −j −1 −1 +1 −1 +1 −j −j +1 −1 +1 −j −j +j −j +j +1 +1 +j −j +j +1 +1 +1 |
| −1 +1 −j −j −1 +1 −1 +j +j +j −j +j +1 +1 −j +j −j −1 −1 +1 −1 +1 −j −j −1 +1 −1 +j +j −j +j −j |
| −1 −1 +j −j +j +1 +1 +j −1 −j −j −1 +j −1 −j −j −1 +1 +j −1 −1 +j +1 +j −1 −1 +j −j +1 +j +j |
| +1 −j +1 +j +j +1 +1 +j −1 −1 +j +1 +j −1 −1 +j +j −1 −j −j −1 −j +1 +j +j +1 −1 −j +1 +1 −j |
| +1 +j −1 −1 +j −j +1 +j +j +1 +j −1 −j −j −1 −1 −j +1 +1 −j +1 +j −1 −1 +j +1 −1 +1 −j −j +1 |
| −1 +1 −j −j −j +j −j −1 −1 −j +j −j −1 −1 +1 −1 +1 −j −j +1 −1 +1 −j −j +j −j +j +1 +1 +j −j +j |
| +1 +1 +1 −1 +1 −j −j −1 +1 −1 +j +j +j −j +j +1 +1 −j +j −j −1 −1 +1 −1 +1 −j −j −1 +1 −1 +j |
| +j −j +j −j −1 −1 +j −j +j +1 +1 +1 +j −1 −1 +j +1 +j −1 −1 +j −j +1 +j +j +1 −j +1 +j +j |
| +1 −1 −j +1 +1 −j −1 −j +1 +1 −j −j +1 +j +j +1 −j +1 +j +j +1 +1 +j −1 −1 +j −1 −j +1 +1 −j |
| +j −1 −j −j −1 −j +1 +j +j +1 −1 −j +1 +1 −j +1 +j −1 −1 +j +j −1 −j −j −1 −j +1 +j +j +1 −j |
| +j −j −1 −1 −j +j −j −1 −1 +1 −1 +j −1 +1 −1 +j +j −j +j −j −1 −1 −j +j −j −1 −1 +1 −1 +1 |
| −j −j +1 −1 +1 −j −j −j +j −j −1 −1 +j −j +j +1 +1 +1 −1 +1 −j −j −1 +1 −1 +j +j −j +j −j −1 −1 |
| +j −j +j +1 −1 +1 −1 +j +j +1 −1 +1 −j −j −1 −j +1 +1 −j −1 −j +1 +1 −j +j −1 −j −j −1 +j −1 |
| −j −j −1 +1 +j −1 −1 +j +1 +j −1 −1 +j +j −1 −j −j −1 +j −1 −j −j −1 −1 −j +1 +1 −j +1 +j −1 −1 |
| +j −j +1 +j +j +1 +j −1 −j −j −1 +1 +j −1 −1 +j −1 −j +1 +1 −j −j +1 +j +j +1 +j −1 −j −j −1 |
| +j −j +j +1 +1 +j −j +j +1 +1 +1 −1 +1 −j −j +1 −1 +1 −j −j +j −j +j +1 +1 +j −j +j +1 +1 −1 |
| +1 −1 +j +j −1 +1 −1 +j +j +j −j +j +1 +1 −j +j −j −1 −1 −1 +1 −1 +j +j +1 −1 +1 −j −j +j |
| −j +j +1 +1 −j +j −j −1 −1 +1 −1 +1 −j −j −1 +1 −1 +j +j +1 +j −1 −1 +j +1 +j −1 −1 +j −j +1 |
| +j +j +1 −j +1 +j +j +1 −1 −j +1 +1 −j −1 −j +1 +1 −j −j +1 +j +j +1 −j +1 +j +j +1 +1 +j −1 |

TABLE 7-continued

| The sequence $Seq^{iTX}_{left,804}(k)$ |
|---|
| −1 +j −1 −j +1 +1 −j +j −1 −j −j −1 −j +1 +j +j +1 −1 −j +1 +1 −j +1 +j −1 −1 +j +j −1 −j −j |
| −1 −j +1 +j +j +1 −j +j −j −1 −1 −j +j −j −1 −1 −1 +1 −1 +j +j −1 +1 −1 +j +j −j +j −j −1 −1 −j |
| +j −j −1 −1 +1 −1 +1 −j −j +1 −1 +1 −j −j −j +j −j −1 −1 +j −j +j +1 +1 +1 −1 +1 −j −j −1 +1 −1 |
| +j +j −j +j −j −1 −1 +j −j +j +1 +1 −1 +1 −1 +j +j +1 −1 +1 −j −j |
| The Sequence $Seq^{3}_{left,804}(k)$, to be transmitted from left to right, up to down |
| −j −1 −1 −1 +j −1 −j −j −1 +j −j +j +1 +1 −1 −j +1 +1 −j −1 +1 −1 +j +j −j +1 +j +j +1 +j −j |
| +j +1 +1 +1 +j −1 −1 +j −1 +1 −1 +j +j +1 +j −1 −1 +j +1 −1 +1 −j −j −j +1 +j +j +1 −j +j −j |
| −1 −1 +1 +j −1 −1 +j −1 +1 −1 +j +j −j +1 +j +j +1 +j −j +j +1 +1 +j −1 −j −j −1 +j −j +j |
| +1 +1 +1 +j −1 −1 +j +1 −1 +1 −j −j −j +1 +j +j +1 +j −j +j +1 +1 −1 −j +1 +1 −j +1 −1 +1 |
| −j −j +1 +j −1 −1 +j +1 −1 +1 −j −j +j −1 −j −j −1 +j −j +j +1 +1 +1 +j −1 −1 +j −1 +1 −1 +j |
| +j +j −1 −j −j −1 −j +j −j −1 −1 −j +1 +j +j +1 −j +j −j −1 −1 +1 +j −1 −1 +j +1 −1 +1 −j −j +j |
| −1 −j −j −1 −j +j −j −1 −1 −1 −j +1 +1 −j +1 −1 +1 −j −j −1 −j +1 +1 −j −1 +1 −1 +j +j +j −1 −j |
| −j −1 +j −j +j +1 +1 −1 −j +1 +1 −j +1 −1 +1 −j −j +j −1 −j −j −1 −j +j −j −1 −1 −j +1 +j +j +1 |
| −j +j −j −1 −1 −1 −j +1 +1 −j −1 +1 −1 +j +j +j −1 −j −j −1 −j +j −j −1 −1 +1 +j −1 −1 +j −1 +1 |
| −1 +j +j −1 −j +1 +1 −j −1 +1 −1 +j +j −j +1 +j +j +1 −j +j −j −1 −1 −1 −j +1 +1 −j +1 −1 +1 |
| −j −j −j +1 +j +j +1 +j −j +j +1 +1 +j −1 −j −j −1 +j −j +j +1 +1 −1 −j +1 +1 −j −1 +1 −1 +j |
| +j −j +1 +j +j +1 +j −j +j +1 +1 +1 +j −1 −1 +j −1 +1 −1 +j +j +1 +j −1 −1 +j +1 −1 +1 −j |
| −j −j +1 +j +j +1 −j +j −j −1 −1 +1 +j −1 −1 +j −1 +1 −1 +j +j −j +1 +j +j +1 +j −j +j +1 +1 |
| +j −1 −j −j −1 +j −j +j +1 +1 +1 +j −1 −1 +j +1 −1 +1 −j −j −j +1 +j +j +1 +j −j +j +1 +1 −1 |
| −j +1 +1 −j +1 −1 +1 −j −j +1 +j −1 −1 +j +1 −1 +1 −j −j +j −1 −j −j −1 +j −j +j +1 +1 +1 +j |
| −1 −1 +j −1 +1 −1 +j +j +j −1 −j −j −1 −j +j −j −1 −1 −1 −j +1 +1 −j −1 +1 −1 +j +j −j +1 +j +j |
| +1 −j +j −j −1 −1 +1 +j −1 −1 +j −1 +1 −1 +j +j +j −1 −j −j −1 −j +j −j −1 −1 +j −1 −j −j −1 +j −j |
| +j +1 +1 +1 +j −1 −1 +j +1 −1 +1 −j −j +j −1 −j −j −1 −j +j −j −1 −1 +1 +j −1 −1 +j −1 +1 −1 |
| +j +j −1 −j +1 +1 −j −1 +1 −1 +j +j +j −1 −j −j −1 +j −j +j +1 +1 +1 +j −1 −1 +j −1 +1 −1 |
| +j +j −j +1 +j +j +1 +j −j +j +1 +1 +j −1 −j −j −1 +j −j +j +1 +1 −1 −j +1 +1 −j −1 +1 −1 +j |
| +j +j −1 −j −j −1 −j +j −j −1 −1 −1 −j +1 +1 −j +1 −1 +1 −j −j −1 −j +1 +1 −j −1 +1 −1 +j +j −j |
| +1 +j +j +1 −j +j −j −1 −1 +1 +j −1 −1 +j −1 +1 −1 +j +j +j −1 −j −j −1 −j +j −j −1 −1 +j −1 −j |
| −j −1 +j −j +j +1 +1 +1 +j −1 −1 +j +1 −1 +1 −j −j +j −1 −j −j −1 −j +j −j −1 −1 +1 +j −1 −1 +j |
| −1 +1 −1 +j +j −1 −j +1 +1 −j −1 +1 −1 +j +j +j −1 −j −j −1 +j −j +j +1 +1 +1 +j −1 −1 +j −1 |
| +1 −1 +j +j −j +1 +j +j +1 +j −j +j +1 +1 +j −1 −j −j −1 +j −j +j +1 +1 −1 −j +1 +1 −j −1 +1 |
| −1 +j +j +j −1 −j −j −1 −j +j −j −1 −1 −1 −j +1 +1 −j +1 −1 +1 −j −j |
| The Sequence $Seq^{4}_{left,804}(k)$, to be transmitted from left to right, up to down |
| +1 +j +j −j +j −1 −j −j −1 +j −1 −j −j −1 −j +j −j −1 −1 −j +j −j −1 −1 −1 −j +1 +1 −j −1 −j +1 +1 |
| −j +1 −1 +1 −j −j +1 −1 +1 −j −j −1 −j +1 +1 −j +1 +j −1 −1 +j +1 −1 +1 −j −j −1 +1 −1 +j +j |
| +j −1 −j −j −1 −j +1 +j +j +1 −j +j −j −1 −1 +j −j +j +1 +1 −1 −j +1 +1 −j −1 −j +1 +1 −j −1 |
| +1 −1 +j +j −1 +1 −1 +j +j +j −1 −j −j −1 +j −1 −j −j −1 +j −j +j +1 +1 +j −j +j +1 +1 −j +1 |
| +j +j +1 +j −1 −j −j −1 −j +j −j −1 −1 +j −j +j +1 +1 +1 +j −1 −1 +j −1 −j +1 +1 −j +1 −1 +11 |
| +j +1 +j −1 −1 +j −1 +1 −1 +j +j −1 +1 −1 +j +j +1 +j −1 −1 +j −1 −j +1 +1 −j −1 +1 −1 |
| +j +j +1 −1 +1 −j −j −j +1 +j +j +1 +j −1 −j −j −1 +j −j +j +1 +1 −j +j −j −1 −1 +1 +j −1 −1 |
| +j +1 +j −1 −1 +j +1 −1 +1 −j −j +1 −1 +1 −j −j −j +1 +j +j +1 −j +1 +j +j +1 −j +j −j −1 −1 |
| −j +j −j −1 −1 +j −1 −j −j −1 −j +1 +j +j +1 +j −j +j +1 +1 −j +j −j −1 −1 −1 −j +1 +1 −j +1 +j |
| −1 −1 +j −1 +1 −1 +j +j +1 −1 +1 −j −j +j −1 −j −j −1 +j −1 −j −j −1 −j +j −j −1 −1 −j +j −j −1 −1 |
| −1 −j +1 +1 −j −1 −j +1 +1 −j +1 −1 +1 −j −j +1 −1 +1 −j −j −1 −j +1 +1 −j +1 +j −1 −1 +j +1 |
| −1 +1 −j −j −1 +1 −1 +j +j +j −1 −j −j −1 −j +1 +j +j +1 −j +j −j −1 −1 +j −j +j +1 +1 −1 −j +1 |
| +1 −j −1 −j +1 +1 −j −1 +1 −1 +j +j −1 +1 −1 +j +j +j −1 −j −j −1 +j −1 −j −j −1 +j −j +j +1 |
| +1 +j −j +j +1 +1 −j +1 +j +j +1 +j −1 −j −j −1 −j +j −j −1 −1 +j −j +j +1 +1 +1 +j −1 −1 +j |
| −1 −j +1 +1 −j +1 −1 +1 −j −j −1 +1 −1 +j +j −1 −j +1 +1 −j −1 −j +1 +1 −j +1 −1 +1 −j −j +1 |
| −1 +1 −j −j −j +1 +j +j +1 −j +1 +j +j +1 +j −j +j +1 +1 +j −j +j +1 +1 −j +1 +j +j +1 +j −1 |
| −j −j −1 +j −j +j +1 +1 −j +j −j −1 −1 −1 −j +1 +1 −j +1 +j −1 −1 +j +1 −1 +1 −j −j −1 +1 −1 |
| +j +j −j +1 +j +j +1 −j +1 +j +j +1 −j +j −j −1 −1 −j +j −j −1 −1 −1 −j +1 +1 −j −1 −j +1 +1 −j |
| −1 +1 −1 +j +j −1 +1 −1 +j +j +1 +j −1 −1 +j −1 −j +1 +1 −j +1 −1 +1 −j −j −1 +1 −1 +j +j |
| +j −1 −j −j −1 −j +1 +j +j +1 +j −j +j +1 +1 −j +j −j −1 −1 −1 −j +1 +1 −j −1 −j +1 +1 −j +1 −1 |
| +1 −j −j +1 −1 +1 −j −j −j +1 +j +j +1 −j +1 +j +j +1 +j −j +j +1 +1 +j −j +j +1 +1 −j +1 |
| +j +j +1 +j −1 −j −j −1 +j −j +j +1 +1 −j +j −j −1 −1 −1 −j +1 +1 −j +1 +j −1 −1 +j +1 −1 +1 |
| −j −j −1 +1 −1 +j +j −j +1 +j +j +1 −j +1 +j +j +1 −j +j −j −1 −1 −j +j −j −1 −1 −1 −j +1 +1 −j |
| −1 −j +1 +1 −j −1 +1 −1 +j +j −1 +1 −1 +j +j +1 +j −1 −1 +j −1 −j +1 +1 −j +1 −1 +1 −j −j −1 |
| +1 −1 +j +j +j −1 −j −j −1 −j +1 +j +j +1 +j −j +j +1 +1 −j +j −j −1 −1 |
| The Sequence $Seq^{5}_{left,804}(k)$, to be transmitted from left to right, up to down |
| −j −j +1 −j −1 −1 −j +j −j −1 −1 −j +j −j +1 +1 +j −j +j −1 −1 −j +j −j −j +1 +1 −j −1 −j +1 +1 −j |
| −1 +j −1 −1 +j +1 −j +1 +1 −j −1 −1 −1 −j +j −j +1 +1 +j −j +j +1 +1 +j −j +j +1 +1 +j −j +j |
| +j −1 −1 +j +1 −j +1 +1 −j −1 −j +1 +1 −j −1 −j +1 +1 −j −1 +j +j −1 +1 −1 +j +j −1 +1 −1 +j |
| +j −1 +1 −1 −j −j +1 −1 +1 −1 −j −j −1 +j −1 −j −j −1 +j −1 −j −j −1 +j +1 +j +j +1 −j +j +j −1 |
| +1 −1 −j −j +1 −1 +1 +j +j −1 +1 −1 +j +j −1 +1 −1 +1 +j +j +1 −j −1 −j −j −1 +j +1 +j +j |
| +1 −j +1 +j +j +1 −j −1 −1 −j +j −j −1 −1 −j +j −j +1 +1 +j −j +j −1 −1 −j +j −j −j +1 +1 −j −1 |
| −j +1 +1 −j −1 +j −1 −1 +j +1 −j +1 +1 −j −1 −1 −1 −j +j −j +1 +1 +j −j +j +1 +1 +j −j +j +1 |
| +1 +j −j +j +j −1 −1 +j +1 −j +1 +1 −j −1 −j +1 +1 −j −1 −j +1 +1 −j −1 +j +j −1 +1 −1 +j +j |
| −1 +1 −1 +j +j −1 +1 −1 −j −j +1 −1 +1 −1 −j −j −1 +j −1 −j −j −1 +j −1 −j −j −1 +j +1 +j +j +1 |
| −j +j +j −1 +1 −1 −j −j +1 −1 +1 +j +j −1 +1 −1 +j +j −1 +1 −1 +1 +j +j +1 −j −1 −j −j −1 +j |
| +1 +j +j +1 −j +1 +j +j +1 −j +j +j −1 +1 −1 +j +j −1 +1 −1 −j −j +1 −1 +1 +j +j −1 +1 −1 −1 |
| −j −j −1 +j −1 −j −j −1 +j +1 +j +j +1 −j −1 −j −j −1 +j +j +j −1 +1 −1 −j −j +1 −1 +1 −j −j +1 |
| −1 +1 −j −j +1 −1 +1 +1 +j +j +1 −j −1 −j −j −1 +j −1 −j −j −1 +j −1 −j −j −1 +j +1 +1 +j −j +j |
| +1 +1 +j −j +j +1 +1 +j −j +j −1 −1 −j +j −j +j −1 −1 +j +1 +j −1 −1 +j +1 +j −1 −1 +j +1 −j |
| +1 +1 −j −1 +1 +1 +j −j +j −1 −1 −j +j −j +1 +1 +j −j +j +1 +1 +j −j +j −j +1 +1 −j −1 +j −1 |
| −1 +j +1 −j +1 +1 −j −1 −j +1 +1 −j −1 −j −j +1 −1 +1 −j −j +1 −1 +1 +j +j −1 +1 −1 −j −j +1 |
| −1 +1 +1 +j +j +1 −j +1 +j +j +1 −j −1 −j −j −1 +j +1 +j +j +1 −j −j −j +1 −1 +1 +j +j −1 +1 |

TABLE 7-continued

| The sequence $Seq^{iTX}_{left,804}(k)$ |
|---|
| −1 +j +j −1 +1 −1 +j +j −1 +1 −1 −1 −j −j −1 +j +1 +j +j +1 −j +1 +j +j +1 −j +1 +j +j +1 −j |
| −1 −1 −j +j −j −1 −1 −j +j −j −1 −1 −j +j −j +1 +1 +j −j +j −j +1 +1 −j −1 −j +1 +1 −j −1 −j +1 |
| +1 −j −1 +j −1 −1 +j +1 −1 −1 −j +j −j +1 +1 +j −j +j −1 −1 −j +j −j −1 −1 −j +j −j +j −1 −1 +j |
| +1 −j +1 +1 −j −1 +j −1 −1 +j +1 +j −1 −1 +j +1 +j +j −1 +1 −1 +j +j −1 +1 −1 −j −j +1 −1 |
| +1 +j +j −1 +1 −1 −1 −j −j −1 +j −1 −j −j −1 +j +1 +j +j +1 −j −1 −j −j −1 +j +j +j −1 +1 −1 −j |
| −j +1 −1 +1 −j −j +1 −1 +1 −j −j +1 −1 +1 +1 +j +j +1 −j −1 −j −j −1 +j −1 −j −j −1 +j −1 −j −j |
| −1 +j +1 +1 +j −j +j +1 +1 +j −j +j +1 +1 +j −j +j −1 −1 −j +j −j +j −1 −1 +j +1 +j −1 −1 +j |
| +1 +j −1 −1 +j +1 −j +1 +1 −j −1 +1 +1 +j −j +j −1 −1 −j +j −j +1 +1 +j −j +j +1 +1 +j −j +j |
| −j +1 +1 −j −1 +j −1 −1 +j +1 −j +1 +1 −j −1 −j +1 +1 −j −1 |
| The Sequence $Seq^{6}_{left,804}(k)$, to be transmitted from left to right, up to down |
| +j +j +1 −1 +1 +j +j +1 −j −j +1 +1 −j −1 −1 −j −j −1 +j −j +1 +1 −j −1 −j +1 +1 −j −1 −1 −j −j |
| −1 +j +j −1 −1 +j +1 −1 −j −j −1 +j +1 +1 +j −j +j −j −j +1 −1 +1 +1 +1 +j −j +j +j +j −1 +1 |
| −1 −j −j +1 −1 +1 −1 −1 −j +j −j −j −j +1 −1 +1 +1 +1 +j −j +j +j −1 −1 +j +1 −1 −j −j −1 +j −j |
| +1 +1 −j −1 −1 −j −j −1 +j −1 −j −j −1 +j −j +1 +1 −j −1 +1 +j +j +1 −j −j +1 +1 −j −1 +j +j −1 |
| +1 −1 −1 −1 −j +j −j +j +j −1 +1 −1 +1 +1 +j −j +j −1 −1 −j +j −j −j −j +1 −1 +1 −1 −1 −j +j −j |
| +j +j −1 +1 −1 +1 +j +j +1 −j −j +1 +1 −j −1 −1 −j −j −1 +j −j +1 +1 −j −1 −j +1 +1 −j −1 −1 −j |
| −j −1 +j +j −1 −1 +j +1 −1 −j −j −1 +j +1 +1 +j −j +j −j −j +1 −1 +1 +1 +1 +j −j +j +j +j −1 |
| +1 −1 −j −j +1 −1 +1 −1 −1 −j +j −j −j −j +1 −1 +1 +1 +1 +j −j +j +j −1 −1 +j +1 −1 −j −j −1 |
| +j −j +1 +1 −j −1 −1 −j −j −1 +j −1 −j −j −1 +j −j +1 +1 −j −1 +1 +j +j +1 −j −j +1 +1 −j −1 +j |
| +j −1 +1 −1 −1 −1 −j +j −j +j +j −1 +1 −1 +1 +1 +j −j +j −1 −1 −j +j −j −j −j +1 −1 +1 −1 −1 −j |
| +j −j +j +j −1 +1 −1 −j +1 +1 −j −1 −1 −j −j −1 +j +j −1 −1 +j +1 −1 −j −j −1 +j −1 −j −j −1 +j |
| +j −1 −1 +j +1 +1 +j +j +1 −j +j −1 −1 +j +1 −j −j +1 −1 +1 −1 −1 −j +j −j −j −j +1 −1 +1 +1 |
| +1 +j −j +j −1 −1 −j +j −j +j +j −1 +1 −1 −1 −1 −j +j −j −j −j +1 −1 +1 +1 +j +j +1 −j +j −1 −1 |
| +j +1 −1 −j −j −1 +j +j −1 −1 +j +1 +j −1 −1 +j +1 −1 −j −j −1 +j −j +1 +1 −j −1 −1 −j −j −1 +j |
| +1 +1 +j −j +j +j +j −1 +1 −1 +1 +1 +j −j +j −j −j +1 −1 +1 +j +j −1 +1 −1 −1 −1 −j +j −j +j |
| +j −1 +1 −1 +1 +1 +j −j +j +j −1 −1 +j +1 +1 +j +j +1 −j −j +1 +1 −j −1 +1 +j +j +1 −j +1 |
| +j +j +1 −j −j +1 +1 −j −1 −1 −j −j −1 +j −j +1 +1 −j −1 +j +j −1 +1 −1 +1 +1 +j −j +j +j +j −1 |
| +1 −1 −1 −1 −j +j −j +1 +1 +j −j +j −j −j +1 −1 +1 +1 +1 +j −j +j +j +j −1 +1 −1 −1 −j −j −1 |
| +j −j +1 +1 −j −1 +1 +j +j +1 −j −j +1 +1 −j −1 −j +1 +1 −j −1 +1 +j +j +1 −j +j −1 −1 +j |
| +1 +1 +j +j +1 −j −1 −1 −j +j −j −j −j +1 −1 +1 −1 −1 −j +j −j +j +j −1 +1 −1 −j −j +1 −1 +1 |
| +1 +1 +j −j +j −j −j +1 −1 +1 −1 −1 −j +j −j −j +1 +1 −j −1 −1 −j −j −1 +j +j −1 −1 +j +1 −1 −j |
| −j −1 +j −1 −j −j −1 +j +j −1 −1 +j +1 +1 +j +j +1 −j +j −1 −1 +j +1 −j −j +1 −1 +1 −1 −1 −j |
| +j −j −j −j +1 −1 +1 +1 +1 +j −j +j −1 −1 −j +j −j +j +j −1 +1 −1 −1 −1 −j +j −j −j −j +1 −1 +1 |
| +1 +j +j +1 −j +j −1 −1 +j +1 −1 −j −j −1 +j +j −1 −1 +j +1 +j −1 −1 +j +1 −1 −j −j −1 +j −j |
| +1 +1 −j −1 −1 −j −j −1 +j +1 +1 +j −j +j +j +j −1 +1 −1 +1 +1 +j −j +j −j −j +1 −1 +1 +j +j |
| −1 +1 −1 −1 −1 −j +j −j +j +j −1 +1 −1 +1 +1 +j −j +j |
| The Sequence $Seq^{7}_{left,804}(k)$, to be transmitted from left to right, up to down |
| +j −j −1 −1 −1 −1 −j +j −j +1 +1 +j −j +j +1 +j +j +1 −j +1 +j +j +1 −j −j −j +1 −1 +1 +j +j −1 |
| +1 −1 +j −1 −1 +j +1 +j −1 −1 +j +1 +j +j −1 +1 −1 −j −j +1 −1 +1 −j +1 +1 −j −1 −j +1 |
| +1 −j −1 +1 +1 +j −j +j −1 −1 −j +j −j −1 −j −j −1 +j −1 −j −j −1 +j −j −j +1 −1 +1 −j −j +1 −1 |
| +1 +j −1 −1 +j +1 −j +1 +1 −j −1 −1 −1 −j +j −j −1 −1 −j +j −j +1 +j +j +1 −j −1 −j −j −1 +j −1 |
| −1 −j +j −j −1 −1 −j +j −j +1 +j +j +1 −j −1 −j −j −1 +j −j −j +1 −1 +1 −j −j +1 −1 +1 +j −1 −1 |
| +j +1 −j +1 +1 −j −1 +1 +1 +j −j +j −1 −1 −j +j −j −1 −j −j −1 +j −1 −j −j −1 +j +j +j −1 +1 −1 |
| −j −j +1 −1 +1 −j +1 +1 −j −1 −j +1 +1 −j −1 −j −j +1 −1 +1 +j +j −1 +1 −1 +j −1 −1 +j +1 +j |
| −1 −1 +j +1 −1 −1 −j +j −j +1 +1 +j −j +j +1 +j +j +1 −j +1 +j +j +1 −j +j +j −1 +1 −1 +j |
| +j −1 +1 −1 −j +1 +1 −j −1 +j −1 −1 +j +1 +1 +1 +j −j +j +1 +1 +j −j +j −1 −j −j −1 +j +1 +j |
| +j +1 −j +1 +1 +j −j +j +1 +1 +j −j +j −1 −j −j −1 +j +1 +j +j +1 −j +j +j −1 +1 −1 +j +j −1 |
| +1 −1 −j +1 +1 −j −1 +j −1 −1 +j +1 −1 −1 −j +j −j +1 +1 +j −j +j +1 +j +j +1 −j +1 +j +j |
| +1 −j −j −j +1 −1 +1 +j +j −1 +1 −1 +j −1 −1 +j +1 +j −1 −1 +j +1 +j +j −1 +1 −1 −j −j +1 −1 |
| +1 −j +1 +1 −j −1 −j +1 +1 −j −1 +1 +1 +j −j +j −1 −1 −j +j −j −1 −j −j −1 +j −1 −j −j −1 +j −j −j |
| +1 −1 +1 −j −j +1 −1 +1 +j −1 −1 +j +1 −j +1 +1 −j −1 −1 −1 −j +j −j −1 −1 −j +j −j +1 +j +j |
| +1 −j −1 −j −j −1 +j −1 −1 −j +j −j −1 −1 −j +j −j +1 +j +j +1 −j −1 −j −j −1 +j −j −j +1 −1 +1 −j |
| −j +1 −1 +1 +j −1 −1 +j +1 −j +1 +1 −j −1 −j −j +1 −1 +1 +j +j −1 +1 −1 +j −1 −1 +j +1 +j −1 |
| −1 +j +1 +1 +1 +j −j +j −1 −1 −j +j −j −1 −j −j −1 +j −1 −j −j −1 +j −1 −1 −j +j −j +1 +1 +j −j |
| +j +1 +j +j +1 −j +1 +j +j +1 −j +j +j −1 +1 −1 −j −j +1 −1 +1 −j +1 +1 −j −1 −j +1 +1 −j −1 |
| +1 +1 +j −j +j +1 +1 +j −j +j −1 −j −j −1 +j +1 +j +j +1 −j −j −j +1 −1 +1 −j −j +1 −1 +1 +j |
| −1 −1 +j +1 −j +1 +1 −j −1 −j −j +1 −1 +1 −j −j +1 −1 +1 +j −1 −1 +j +1 −j +1 +1 −j −1 +1 |
| +1 +j −j +j +1 +1 +j −j +j −1 −j −j −1 +j +1 +j +j +1 −j −j −j +1 −1 +1 +j +j −1 +1 −1 +j −1 |
| −1 +j +1 +j −1 −1 +j +1 +1 +1 +j −j +j −1 −1 −j +j −j −1 −j −j −1 +j −1 −j −j −1 +j −1 −1 −j +j |
| −j +1 +1 +j −j +j +1 +j +j +1 −j +1 +j +j +1 −j +j +j −1 +1 −1 −j −j +1 −1 +1 −j +1 +1 −j −1 |
| −j +1 +1 −j −1 +1 +1 +j −j +j +1 +1 +j −j +j −1 −j −j −1 +j +1 +j +j +1 −j −j −j +1 −1 +1 −j −j |
| +1 −1 +1 +j −1 −1 +j +1 −j +1 +1 −j −1 −j −j +1 −1 +1 −j −j +1 −1 +1 +j −1 −1 +j +1 −j +1 |
| +1 −j −1 +1 +1 +j −j +j +1 +1 +j −j +j −1 −j −j −1 +j +1 +j +j +1 −j |
| The Sequence $Seq^{8}_{left,804}(k)$, to be transmitted from left to right, up to down |
| −1 +j +1 −1 −j −j +1 −1 +1 −1 −1 −j +j −j −1 −1 −j +j −j +j +j −1 +1 −1 −j +1 +1 −j −1 −1 −j −j |
| −1 +j −1 −j −j −1 +j +j −1 −1 +j +1 +1 +1 +j −j +j +j +j −1 +1 −1 +j +j −1 +1 −1 −1 −1 −j +j |
| −j +1 +j +j +1 −j +j −1 −1 +j +1 +j −1 −1 +j +1 −1 −j −j −1 +j +j +j −1 +1 −1 −1 −1 −j +j −j |
| +1 +1 +j −j +j +j +j −1 +1 −1 −j +1 +1 −j −1 +1 +j +j +1 −j −1 −j −j −1 +j −j +1 +1 −j −1 −1 |
| −1 −j +j −j +j +j −1 +1 −1 −j −j +1 −1 +1 −1 −1 −j +j −j +1 +j +j +1 −j −j +1 +1 −j −1 +j −1 −1 |
| +j +1 +1 +j +j +1 −j +j +j −1 +1 −1 +1 +1 +j −j +j +1 +1 +j −j +j −j −j +1 −1 +1 +j −1 −1 |
| +j +1 +1 +j +j +1 −j +1 +j +j +1 −j −j +1 +1 −j −1 −1 −1 −j +j −j −j −j +1 −1 +1 −j −j +1 −1 |
| +1 +1 +1 +j −j +j −1 −j −j −1 +j −j +1 +1 −j −1 −j +1 +1 −j −1 +1 +j +j +1 −j −j −j +1 −1 +1 |
| +1 +1 +j −j +j −1 −1 −j +j −j −j −j +1 −1 +1 +j −1 −1 +j +1 −1 −j −j −1 +j +1 +j +j +1 −j +j −1 |
| −1 +j +1 +1 +1 +j −j +j −j −j +1 −1 +1 +j +j −1 +1 −1 +1 +1 +j −j +j −1 −j −j −1 +j +j −1 |
| −1 +j +1 −j +1 +1 −j −1 −1 −j −j −1 +j −j −j +1 −1 +1 −1 −1 −j +j −j −1 −1 −j +j −j +j +j −1 +1 |

TABLE 7-continued

| The sequence $Seq^{iTX}_{left,804}(k)$ |
| --- |
| −1 −j +1 +1 −j −1 −1 −j −j −1 +j −1 −j −j −1 +j +j −1 −1 +j +1 +1 +1 +j −j +j +j +j −1 +1 −1 |
| +j +j −1 +1 −1 −1 −1 −j +j −j +1 +j +j +1 −j +j −1 −1 +j +1 +j −1 −1 +j +1 −1 −j −j −1 +j +j |
| +j −1 +1 −1 −1 −1 −j +j −j +1 +1 +j −j +j +j +j −1 +1 −1 −j +1 +1 −j −1 +1 +j +j +1 −j −1 −j |
| −j −1 +j −j +1 +1 −j −1 −1 −1 −j +j −j +j +j −1 +1 −1 −j −j +1 −1 +1 −1 −1 −j +j −j +1 +j +j +1 |
| −j −j +1 +1 −j −1 +j −1 −1 +j +1 +1 +j +j +1 −j +1 +1 +j −j +j −j −j +1 −1 +1 −j −j +1 −1 +1 |
| −1 −1 −j +j −j +1 +j +j +1 −j −j +1 +1 −j −1 −j +1 +1 −j −1 −1 −j −j −1 +j +j +j −1 +1 −1 −1 −1 |
| −j +j −j −1 −1 −j +j −j −j +1 −1 +1 +j −1 −1 +j +1 −1 −j −j −1 +j −1 −j −j −1 +j −j +1 +1 −j −1 |
| −1 −1 −j +j −j −j −j +1 −1 +1 +j +j −1 +1 −1 −1 −1 −j +j −j +1 +j +j +1 −j +j −1 −1 +j +1 −j |
| +1 +1 −j −1 +1 +j +j +1 −j −j −j +1 −1 +1 −1 −1 −j +j −j +1 +1 +j −j +j −j −j +1 −1 +1 +j −1 |
| −1 +j +1 +1 +j +j +1 −j −1 −j −j −1 +j +j −1 −1 +j +1 +1 +1 +j −j +j −j −j +1 −1 +1 −j −j +1 |
| −1 +1 −1 −1 −j +j −j +1 +j +j +1 −j −j +1 +1 −j −1 −j +1 +1 −j −1 −1 −j −j −1 +j +j +j −1 +1 −1 |
| −1 −1 −j +j −j −1 −1 −j +j −j −j −j +1 −1 +1 +j −1 −1 +j +1 −1 −j −j −1 +j −1 −j −j −1 +j −j +1 |
| +1 −j −1 −1 −1 −j +j −j −j −j +1 −1 +1 +j +j −1 +1 −1 −1 −1 −j +j −j +1 +j +j +1 −j +j −1 −1 +j |
| +1 −j +1 +1 −j −1 +1 +j +j +1 −j −j −j +1 −1 +1 −1 −1 −j +j −j +1 +1 +j −j +j −j −j +1 −1 +1 |
| +j −1 −1 +j +1 +1 +j +j +1 −j −1 −j −j −1 +j +j −1 −1 +j +1 |

TABLE 8

| The sequence $Seq^{iTX}_{right,804}(k)$ |
| --- |
| The Sequence $Seq^{1}_{right,804}(k)$, to be transmitted from left to right, up to down |
| −j +1 +j +j +1 −j +j −j −1 −1 −1 −j +1 +1 −j +1 −1 +1 −j −j +1 +j −1 −1 +j +1 −1 +1 −j −j +j |
| −1 −j −j −1 −j +j −j −1 −1 −j +1 +j +j +1 −j +j −j −1 −1 −1 −j +1 +1 −j +1 −1 +1 −j −j −1 −j +1 |
| +1 −j −1 +1 −1 +j +j −j +1 +j +j +1 +j −j +j +1 +1 −j +1 +j +j +1 −j +j −j −1 −1 −1 −j +1 +1 |
| −j +1 −1 +1 −j −j +1 +j −1 −1 +j +1 −1 +1 −j −j +j −1 −j −j −1 −j +j −j −1 −1 +j −1 −j −j −1 +j −j |
| +j +1 +1 +1 +j −1 −1 +j −1 +1 −1 +j +j +1 +j −1 −1 +j +1 −1 +1 −j −j +j −1 −j −j −1 −j +j −j |
| −1 −1 −1 −j +1 +1 −j −1 +1 −1 +j +j +j −1 −j −j −1 −j +j −j −1 −1 −j +1 +j +j +1 −j +j −j −1 −1 |
| +1 +j −1 −1 +j −1 +1 −1 +j +j −1 −j +1 +1 −j −1 +1 −1 +j +j +j −1 −j −j −1 −j +j −j −1 −1 +j |
| −1 −j −j −1 +j −j +j +1 +1 −1 −j +1 +1 −j +1 −1 +1 −j −j −1 −j +1 +1 −j −1 +1 −1 +j +j +j −1 −j |
| −j −1 −j +j −j −1 −1 −j +1 +j +j +1 −j +j −j −1 −1 +1 +j −1 −1 +j −1 +1 −1 +j +j +1 +j −1 −1 |
| +j +1 −1 +1 −j −j −j +1 +j +j +1 +j −j +j +1 +1 −j +1 +j +j +1 −j +j −j −1 −1 +1 +j −1 −1 +j |
| −1 +1 −1 +j +j −1 −j +1 +1 −j −1 +1 −1 +j +j +j −1 −j −j −1 −j +j −j −1 −1 −j +1 +j +j +1 −j +j |
| −j −1 −1 +1 +j −1 −1 +j −1 +1 −1 +j +j −1 −j +1 +1 −j −1 +1 −1 +j +j +j −1 −j −j −1 −j +j −j −1 |
| −1 +j −1 −j −j −1 +j −j +j +1 +1 −1 −j +1 +1 −j +1 −1 +1 −j −j −1 −j +1 +1 −j −1 +1 −1 +j +j |
| +j −1 −j −j −1 −j +j −j −1 −1 −j +1 +j +j +1 −j +j −j −1 −1 +1 +j −1 −1 +j −1 +1 −1 +j +j +1 +j |
| −1 −1 +j +1 −1 +1 −j −j −j +1 +j +j +1 +j −j +j +1 +1 −j +1 +j +j +1 −j +j −j −1 −1 +1 +j −1 |
| −1 +j −1 +1 −1 +j +j −j +1 +j +j +1 −j +j −j −1 −1 −1 −j +1 +1 −j +1 −1 +1 −j −j +1 +j −1 −1 |
| +j +1 −1 +1 −j −j +j −1 −j −j −1 −j +j −j −1 −1 −j +1 +j +j +1 −j +j −j −1 −1 −1 −j +1 +1 −j +1 |
| −1 +1 −j −j −1 −j +1 +1 −j −1 +1 −1 +j +j −j +1 +j +j +1 +j −j +j +1 +1 −j +1 +j +j +1 −j +j |
| −j −1 −1 −1 −j +1 +1 −j +1 −1 +1 −j −j +1 +j −1 −1 +j +1 −1 +1 −j −j +j −1 −j −j −1 −j +j −j −1 |
| −1 +j −1 −j −j −1 +j −j +j +1 +1 +1 +j −1 −1 +j −1 +1 −1 +j +j +1 +j −1 −1 +j +1 −1 +1 −j −j |
| +j −1 −j −j −1 −j +j −j −1 −1 +1 +j −1 −1 +j +1 −1 +1 −j −j −j +1 +j +j +1 +j −j +j +1 +1 +j |
| −1 −j −j −1 +j −j +j +1 +1 −1 −j +1 +1 −j +1 −1 +1 −j −j +1 +j −1 −1 +j +1 −1 +1 −j −j −j +1 |
| +j +j +1 +j −j +j +1 +1 −j +1 +j +j +1 −j +j −j −1 −1 +1 +j −1 −1 +j −1 +1 −1 +j +j +1 +j |
| −1 −1 +j +1 −1 +1 −j −j −j +1 +j +j +1 +j −j +j +1 +1 +j −1 −j −j −1 +j −j +j +1 +1 −1 −j +1 |
| +1 −j +1 −1 +1 −j −j −1 −j +1 +1 −j −1 +1 −1 +j +j +j −1 −j −j −1 −j +j −j −1 −1 +j −1 −j −j −1 |
| +j −j +j +1 +1 −1 −j +1 +1 −j +1 −1 +1 −j −j +1 +1 +j −1 |
| The Sequence $Seq^{2}_{right,804}(k)$, to be transmitted from left to right, up to down |
| −j +1 +j +j +1 +j −1 −j −j −1 −1 −j +1 +1 −j +1 +j −1 −1 +j +j −1 −j −j −1 −j +1 +j +j +1 −1 −j |
| +1 +1 −j +1 +j −1 −1 +j −j +1 +j +j +1 −j +1 +j +j +1 +1 +j −1 −1 +j +1 +j −1 −1 +j +j −1 |
| −j −j −1 +j −1 −j −j −1 +1 +j −1 −1 +j +1 +j −1 −1 +j −1 +1 −1 +j +j +1 −1 +1 −j −j +j −j +j |
| +1 +1 −j +j −j −1 −1 −1 +1 −1 +j +j +1 −1 +1 −j −j −j +j −j −1 −1 +j −j +j +1 +1 −1 +1 −1 +j |
| +j −1 +1 −1 +j +j −j +j −j −1 −1 −j +j −j −1 −1 −1 +1 −1 +j +j −1 +1 −1 +j +j +j −j +j +1 +1 |
| +j −j +j +1 +1 −1 −j +1 +1 −j +1 +j −1 −1 +j +j −1 −j −j −1 −j +1 +j +j +1 +1 +j −1 −1 +j −1 |
| −j +1 +1 −j +j −1 −j −j −1 −j +1 +j +j +1 −1 −j +1 +1 −j −1 −j +1 +1 −j −j +1 +j +j +1 −j +1 |
| +j +j +1 +1 +j −1 −1 +j +1 +j −1 −1 +j −j +1 +j +j +1 −j +1 +j +j +1 +j −j +j +1 +1 −j +j |
| −j −1 −1 +1 −1 +1 −j −j −1 +1 −1 +j +j +j −j +j +1 +1 −j +j −j −1 −1 −1 +1 −1 +j +j +1 −1 +1 |
| −j −j +j −j +j +1 +1 +j −j +j +1 +1 −1 +1 −1 +j +j −1 +1 −1 +j +j +j −j +j +1 +1 +j −j +j +1 |
| +1 +1 −1 +1 −j −j +1 −1 +1 −j −j −1 −j +1 +1 −j +1 +j −1 −1 +j +j −1 −j −j −1 −j +1 +j +j +1 |
| +1 +j −1 −1 +j −1 −j +1 +1 −j +j −1 −j −j −1 −j +1 +j +j +1 −1 −j +1 +1 −j −1 −j +1 +1 −j −j |
| +1 +j +j +1 −j +1 +j +j +1 +1 +j −1 −1 +j +1 +j −1 −1 +j −j +1 +j +j +1 −j +1 +j +j +1 +j |
| −j +j +1 +1 −j +j −j −1 −1 +1 −1 +1 −j −j −1 +1 −1 +j +j +j −j +j +1 +1 −j +j −j −1 −1 −1 +1 |
| −1 +j +j +1 −1 +1 −j −j +j −j +j +1 +1 +j −j +j +1 +1 −1 +1 −1 +j +j −1 +1 −1 +j +j +j −j +j |
| +1 +1 +j −j +j +1 +1 +1 −1 +1 −j −j +1 −1 +1 −j −j −j +1 +j +j +1 +j −1 −j −j −1 −1 −j +1 +1 |
| −j +1 +j −1 −1 +j +j −1 −j −j −1 −j +1 +j +j +1 −1 −j +1 +1 −j +1 +j −1 −1 +j −j +1 +j +j +1 |
| −j +1 +j +j +1 +1 +j −1 −1 +j +1 +j −1 −1 +j +j −1 −j −j −1 +j −1 −j −j −1 +1 +j −1 −1 +j +1 |
| +j −1 −1 +j −1 +1 −1 +j +j +1 −1 +1 −j −j +j −j +j +1 +1 −j +j −j −1 −1 −1 +1 −1 +j +j +1 −1 |
| +1 −j −j −j +j −j −1 −1 +j −j +j +1 +1 −1 +1 −1 +j +j −1 +1 −1 +j +j −j +j −j −1 −1 −j +j −j −1 |
| −1 −1 +1 −1 +j +j −1 +1 −1 +j +j +j −j +j +1 +1 +j −j +j +1 +1 +1 +j −1 −1 +j −1 −j +1 +1 |
| −j −j +1 +j +j +1 +j −1 −j −j −1 −1 −j +1 +1 −j +1 +j −1 −1 +j −j +1 +j +j +1 +j −1 −j −j −1 |
| +1 +j −1 −1 +j +1 +j −1 −1 +j +j −1 −j −j −1 +j −1 −j −j −1 −1 −j +1 +1 −j −1 −j +1 +1 −j +j −1 |
| −j −j −1 +j −1 −j −j −1 −j +j −j −1 −1 +j −j +j +1 +1 −1 +1 −1 +j +j +1 −1 +1 −j −j −j +j −j −1 |

TABLE 8-continued

| The sequence $Seq^{iTX}_{right,804}(k)$ |
| --- |
| −1 +j −j +j +1 +1 +1 −1 +1 −j −j −1 +1 −1 +j +j −j +j −j −1 −1 −j +j −j −1 −1 +1 −1 +1 −j −j +1<br>−1 +1 −j −j −j +j −j −1 −1 −j +j −j −1 −1 −1 +1 −1 +j +j −1 +1 −1 +j +j +j +j +j −j |
| The Sequence $Seq^{3}_{right,804}(k)$, to be transmitted from left to right, up to down |
| +1 +j −1 −1 +j +1 −1 +1 −j −j +j −1 −j −j −1 +j −j +j +1 +1 −1 −j +1 +1 −j +1 −1 +1 −j −j −j<br>+1 +j +j +1 +j −j +j +1 +1 −j +1 +j +j +1 −j +j −j −1 −1 −1 −j +1 +1 −j −1 +1 −1 +j +j −j +1<br>+j +j +1 +j −j +j +1 +1 −1 −j +1 +1 −j +1 −1 +1 −j −j −1 −j +1 +1 −j −1 +1 −1 +j +j +j −1 −j<br>−j −1 +j −j +j +1 +1 +1 +j −1 −1 +j −1 +1 −1 +j +j −j +1 +j +j +1 +j −j +j +1 +1 +j −1 −j −j<br>−1 +j −j +j +1 +1 −1 −j +1 +1 −j −1 +1 −1 +j +j +j −1 −j −j −1 −j +j −j −1 −1 −1 −j +1 +1 −j<br>+1 −1 +1 −j −j −j +1 +j +j +1 −j +j −j −1 −1 +1 +j −1 −1 +j +1 −1 +1 −j −j +j −1 −j −j −1 −j +j<br>−j −1 −1 −1 −j +1 +1 −j +1 −1 +1 −j −j −1 −j +1 +1 −j −1 +1 −1 +j +j +j −1 −j −j −1 +j −j +j +1<br>+1 −1 −j +1 +1 −j +1 −1 +1 −j −j +j −1 −j −j −1 −j +j −j −1 −1 +j −1 −j −j −1 +j −j +j +1 +1 +1<br>+j −1 −1 +j +1 −1 +1 −j −j −j +1 +j +j +1 +j −j +j +1 +1 −1 −j +1 +1 −j +1 −1 +1 −j −j +1 +j<br>−1 −1 +j +1 −1 +1 −j −j +j −1 −j −j −1 +j −j +j +1 +1 +1 +j −1 −1 +j −1 +1 −1 +j +j +j −1 −j<br>−j −1 −j +j −j −1 −1 −1 −j +1 +1 −j −1 +1 −1 +j +j −j +1 +j +j +1 −j +j −j −1 −1 +1 +j −1 −1 +j<br>−1 +1 −1 +j +j +j −1 −j −j −1 −j +j −j −1 −1 +j −1 −j −j −1 +j −j +j +1 +1 +1 +j −1 −1 +j +1 −1<br>+1 −j −j +j −1 −j −j −1 −j +j −j −1 −1 +1 +j −1 −1 +j −1 +1 −1 +j +j +1 +j −1 −1 +j +1 −1 +1<br>−j −j −j +1 +j +j +1 −j +j −j −1 −1 −1 −j +1 +1 −j +1 −1 +1 −j −j +j −1 −j −j −1 −j +j −j −1 −1 −j<br>+1 +j +j +1 −j +j −j −1 −1 +1 +j −1 −1 +j +1 −1 +1 −j −j −j +1 +j +j +1 +j −j +j +1 +1 +1<br>+j −1 −1 +j −1 +1 −1 +j +j −1 −j +1 +1 −j −1 +1 −1 +j +j −j +1 +j +j +1 −j +j −j −1 −1 +1 +j<br>−1 −1 +j −1 +1 −1 +j +j +j −1 −j −j −1 −j +j −j −1 −1 +j −1 −j −j −1 +j −j +j +1 +1 +1 +j −1 −1<br>+j +1 −1 +1 −j −j +j −1 −j −j −1 −j +j −j −1 −1 +1 +j −1 −1 +j −1 +1 −1 +j +j +1 +j −1 −1 +j<br>+1 −1 +1 −j −j −j +1 +j +j +1 −j +j −j −1 −1 −1 −j +1 +1 −j +1 −1 +1 −j −j +j −1 −j −j −1 −j +j<br>−j −1 −1 −j +1 +j +j +1 −j +j −j −1 −1 +1 +j −1 −1 +j +1 −1 +1 −j −j −j +1 +j +j +1 +j −j +j<br>+1 +1 +1 +j −1 −1 +j −1 +1 −1 +j +j −j +1 +j +j +1 −j +j −j −1 −1 +1 +j −1 −1 +j +1 −1 +1<br>−j −j +j −1 −j −j −1 −j +j −j −1 −1 −1 −j +1 +1 −j +1 −1 +1 −j −j −1 −j +1 +1 −j −1 +1 −1 +j +j<br>+j −1 −j −j −1 +j −j +j +1 +1 −1 −j +1 +1 −j +1 −1 +1 −j −j +j −1 −j −j −1 −j +j −j −1 −1 +j −1<br>−j −j −1 +j −j +j +1 +1 +1 +j −1 −1 +j +1 −1 +1 −j −j −j +1 +j +j +1 +j −j +j +1 +1 −1 −j +1<br>+1 −j +1 −1 +1 −j −j +1 +j −1 −1 +j +1 −1 +1 −j −j +j −1 −j −j −1 +j −j +j +1 +1 +1 +j −1 −1<br>+j −1 +1 −1 +j +j +j −1 −j −j −1 −j +j −j −1 −1 −1 +1 −1 −j |
| The Sequence $Seq^{4}_{right,804}(k)$, to be transmitted from left to right, up to down |
| +1 +j −1 −1 +j −1 −j +1 +1 −j −1 +1 −1 +j +j +1 −1 +1 −j −j +j −1 −j −j −1 −j +1 +j +j +1 −j<br>+j −j −1 −1 +j −j +j +1 +1 +j −1 −j −j −1 +j −1 −j −j −1 −j +j −j −1 −1 −j +j −j −1 −1 +1 +j −1 −1<br>+j +1 +j −1 −1 +j −1 +1 −1 +j +j −1 +1 −1 +j +j +j −1 −j −j −1 −j +1 +j +j +1 +j −j +j +1 +1<br>−j +j −j −1 −1 +1 +j −1 −1 +j −1 −j +1 +1 −j +1 −1 +1 −j −j −1 +1 −1 +j +j −1 −j +1 +1 −j −1<br>−j +1 +1 −j −1 +1 −1 +j +j −1 +1 −1 +j +j −j +1 +j +j +1 −j +1 +j +j +1 −j +j −j −1 −1 −j +j<br>−j −1 −1 −j +1 +j +j +1 +j −1 −j −j −1 +j −j +j +1 +1 −j +j −j −1 −1 +1 +j −1 −1 +j −1 −j +1 +1<br>−j −1 +1 −1 +j +j +1 −1 +1 −j −j +1 +j −1 −1 +j +1 +j −1 −1 +j −1 +1 −1 +j +j −1 +1 −1 +j<br>+j −j +1 +j +j +1 −j +1 +j +j +1 +j −j +j +1 +1 +j −j +j +1 +1 +1 +j −1 −1 +j −1 −j +1 +1<br>−j +1 −1 +1 −j −j −1 +1 −1 +j +j −j +1 +j +j +1 +j −1 −j −j −1 −j +j −j −1 −1 +j −j +j +1 +1 +j<br>−1 −j −j −1 +j −1 −j −j −1 +j −j +j +1 +1 +j −j +j +1 +1 −1 −j +1 +1 −j −1 −j +1 +1 −j −1 +1<br>−1 +j +j −1 +1 −1 +j +j −1 −j +1 +1 −j +1 +j −1 −1 +j +1 −1 +1 −j −j −1 +1 −1 +j +j −j +1 +j<br>+j +1 +j −1 −j −j −1 +j −j +j +1 +1 −j +j −j −1 −1 −j +1 +j +j +1 −j +1 +j +j +1 +j −j +j +1<br>+1 +j −j +j +1 +1 −1 −j +1 +1 −j −1 −j +1 +1 −j +1 −1 +1 −j −j +1 −1 +1 −j −j −j +1 +j +j +1<br>+j −1 −j −j −1 −j +j −j −1 −1 +j −j +j +1 +1 −1 −j +1 +1 −j +1 +j −1 −1 +j −1 +1 −1 +j +j +1<br>−1 +1 −j −j +1 +j −1 −1 +j +1 +j −1 −1 +j +1 −1 +1 −j −j +1 −1 +1 −j −j +j −1 −j −j −1 +j −1 −j<br>−j −1 +j −j +j +1 +1 +j −j +j +1 +1 −1 −j +1 +1 −j +1 +j −1 −1 +j +1 −1 +1 −j −j −1 +1 −1 +j<br>+j −j +1 +j +j +1 +j −1 −j −j −1 +j −j +j +1 +1 −j +j −j −1 −1 −j +1 +j +j +1 −j +1 +j +j +1<br>+j −j +j +1 +1 +j −j +j +1 +1 −1 −j +1 +1 −j −1 −j +1 +1 −j +1 −1 +1 −j −j +1 −1 +1 −j −j −j<br>+1 +j +j +1 +j −1 −j −j −1 −j +j −j −1 −1 +j −j +j +1 +1 −1 −j +1 +1 −j +1 +j −1 −1 +j −1 +1<br>−1 +j +j +1 −1 +1 −j −j +1 +j −1 −1 +j +1 +j −1 −1 +j +1 −1 +1 −j −j +1 −1 +1 −j −j +j −1 −j<br>−j −1 +j −1 −j −j −1 +j −j +j +1 +1 +j −j +j +1 +1 −j +1 +j +j +1 +j −1 −j −j −1 +j −j +j +1<br>+1 −j +j −j −1 −1 +1 +j −1 −1 +j −1 −j +1 +1 −j −1 +1 −1 +j +j +1 −1 +1 −j −j +1 +j −1 −1 +j<br>+1 +j −1 −1 +j −1 +1 −1 +j +j −1 +1 −1 +j +j −j +1 +j +j +1 −j +1 +j +j +1 +j −j +j +1 +1<br>+j −j +j +1 +1 +1 +j −1 −1 +j −1 −j +1 +1 −j +1 −1 +1 −j −j −1 +1 −1 +j +j −j +1 +j +j +1<br>+j −1 −j −j −1 −j +j −j −1 −1 +j −j +j +1 +1 +j −1 −j −j −1 +j −1 −j −j −1 +j −j +j +1 +1 +j −j +j<br>+1 +1 −1 −j +1 +1 −j −1 −j +1 +1 −j −1 +1 −1 +j +j −1 +1 −1 +j +j +1 +1 −1 −j |
| The Sequence $Seq^{5}_{right,804}(k)$, to be transmitted from left to right, up to down |
| +1 +1 +j −j +j +1 +1 +j −j +j −1 −1 −j +j −j +1 +1 +j −j +j +j −1 −1 +j +1 +j −1 −1 +j +1 −j<br>+1 +1 −j −1 +j −1 −1 +j +1 +1 +1 +j −j +j −1 −1 −j +j −j −1 −1 −j +j −j −1 −1 −j +j −j −j +1 +1<br>−j −1 +j −1 −1 +j +1 +j −1 −1 +j +1 +j −1 −1 +j +1 +j +j −1 +1 −1 +j +j −1 +1 −1 +j +j −1<br>+1 −1 −j −j +1 −1 +1 −1 −j −j −1 +j −1 −j −j −1 +j −1 −j −j −1 +j +1 +j +j +1 −j +j +j −1 +1 −1<br>−j −j +1 −1 +1 +j +j −1 +1 −1 +j +j −1 +1 −1 +1 +j +j +1 −j −1 −j −j −1 +j +1 +j +j +1 −j +1<br>+j +j +1 −j −j −j +1 −1 +1 −j −j +1 −1 +1 +j +j −1 +1 −1 −j −j +1 −1 +1 +1 +j +j +1 −j +1 +j<br>+j +1 −j −1 −j −j −1 +j +1 +j +j +1 −j −j −j +1 −1 +1 +j +j −1 +1 −1 +j +j −1 +1 −1 +j +j −1<br>+1 −1 −1 −j −j −1 +j +1 +j +j +1 −j +1 +j +j +1 −j +1 +j +j +1 −j +1 +1 +j −j +j +1 +1 +j<br>−j +j +1 +1 +j −j +j −1 −1 −j +j −j +j −1 −1 +j +1 +j −1 −1 +j +1 +j −1 −1 +j +1 −j +1 +1 −j<br>−1 +1 +1 +j −j +j −1 −1 −j +j −j +1 +1 +j −j +j +1 +1 +j −j +j −j +1 +1 −j −1 +j −1 −1 +j +1<br>−j +1 +1 −j −1 −j +1 +1 −j −1 −j −j +1 −1 +1 −j −j +1 −1 +1 +j +j −1 +1 −1 −j −j +1 −1 +1 +1<br>+j +j +1 −j +1 +j +j +1 −j −1 −j −j −1 +j +1 +j +j +1 −j −j −j +1 −1 +1 +j +j −1 +1 −1 +j +j<br>−1 +1 −1 +j +j −1 +1 −1 −1 −j −j −1 +j +1 +j +j +1 −j +1 +j +j +1 −j +1 +j +j +1 −j +1 +1<br>+j −j +j +1 +1 +j −j +j +1 +1 +j −j +j −1 −1 −j +j −j +j −1 −1 +j +1 +j −1 −1 +j +1 +j −1 −1<br>+j +1 −j +1 +1 −j −1 +1 +1 +j −j +j −1 −1 −j +j −j +1 +1 +j −j +j +1 +1 +j −j +j −j +1 +1 −j<br>−1 +j −1 −1 +j +1 −j +1 +1 −j −1 −j +1 +1 −j −1 +1 +1 +j −j +j +1 +1 +j −j +j −1 −1 −j +j −j<br>+1 +1 +j −j +j +j −1 −1 +j +1 +j −1 −1 +j +1 −j +1 +1 −j −1 +j −1 −1 +j +1 +1 +1 +j −j +j<br>−1 −1 −j +j −j −1 −1 −j +j −j −1 −1 −j +j −j −j +1 +1 −j −1 +j −1 −1 +j +1 +j −1 −1 +j +1 +j −1 |

TABLE 8-continued

The sequence $Seq^{iTX}_{right,804}(k)$

−1 +j +1 +j +j −1 +1 −1 +j +j −1 +1 −1 +j +j −1 +1 −1 −j −j +1 −1 +1 −1 −j −j −1 +j −1 −j −j
−1 +j −1 −j −j −1 +j +1 +j +j +1 −j +j +j −1 +1 −1 −j −j +1 −1 +1 +j +j −1 +1 −1 +j +j −1 +1
−1 +1 +j +j +1 −j −1 −j −j −1 +j +1 +j +j +1 −j +1 +j +j +1 −j +j +j −1 +1 −1 +j +j −1 +1 −1
−j −j +1 −1 +1 +j +j −1 +1 −1 −1 −j −j −1 +j −1 −j −j −1 +j +1 +j +j +1 −j −1 −j −j −1 +j +j +j
−1 +1 −1 −j −j +1 −1 +1 −j −j +1 −1 +1 −j −j +1 −1 +1 +1 +j +j +1 −j −1 −j −j −1 +j −1 −j −j −1
+j −1 −j −j −1 +j −1 −1 −j +j −j −1 −1 −j +j −j −1 −1 −j +j −j +1 +1 +j −j +j −j +1 +1 −j −1 −j +1
+1 −j −1 −j +1 +1 −j −1 +j −1 −1 +j +1 −1 −1 −j +j −j +1 +1 +j −j +j −1 −1 −j +j −j −1 −1 −j +j
−j +j −1 −1 +j +1 −j +1 +1 −j −1 +j −1 −1 +j +1 +j −1 −1 +j +1 +j −1 +1 +1

The Sequence $Seq^{6}_{right,804}(k)$, to be transmitted from left to right, up to down −1 −j −j −1 +j +j −1 −1 +j +1 +1 +j +j +1 −j +j −1 −1 +j +1 −j +1 +1 −j −1 −1 −j −j −1 +j +j
−1 −1 +j +1 −1 −j −j −1 +j −1 −1 −j +j −j +j +j −1 +1 −1 −1 −1 −j +j −j −j −j +1 −1 +1 −j −j +1 −1
+1 −1 −1 −j +j −j −j −j +1 −1 +1 +1 +1 +j −j +j −j +1 +1 −j −1 +1 +j +j +1 −j +j −1 −1 +j +1
+1 +j +j +1 −j −1 −j −j −1 +j −j +1 +1 −j −1 +1 +j +j +1 −j −j +1 +1 −j −1 −j −j +1 −1 +1 +1
+1 +j −j +j −j −j +1 −1 +1 −1 −1 −j +j −j −1 −1 −j +j −j −j −j +1 −1 +1 −1 −1 −j +j −j +j +j −1
+1 −1 +j −1 −1 +j +1 +1 +j +j +1 −j −j +1 +1 −j −1 +1 +j +j +1 −j −1 −j −j −1 +j +j −1 −1 +j
+1 +1 +j +j +1 −j +j −1 −1 +j +1 +j +j −1 +1 −1 +1 +1 +j −j +j +j +j −1 +1 −1 −1 −1 −j +j
−j −1 −1 −j +j −j +j +j −1 +1 −1 −1 −1 −j +j −j −j −j +1 −1 +1 −1 −j −j −1 +j −j +1 +1 −j −1 +1 +j
+j +1 −j −j +1 +1 −j −1 +j −1 −1 +j +1 −1 −j −j −1 +j −j +1 +1 −j −1 −1 −j −j −1 +j −1 −1 −j +j
−j −j −j +1 −1 +1 −1 −1 −j +j −j +j +j −1 +1 −1 +j +j −1 +1 −1 −1 −1 −j +j −j +j +j −1 +1 −1
+1 +1 +j −j +j +j −1 −1 +j +1 +1 +j +j +1 −j −j +1 +1 −j −1 +1 +j +j +1 −j −1 −j −j −1 +j +j
−1 −1 +j +1 +1 +j +j +1 −j +j −1 −1 +j +1 +j +j −1 +1 −1 +1 +1 +j −j +j +j +j −1 +1 −1 −1
−1 −j +j −j −1 −1 −j +j −j +j +j −1 +1 −1 −1 −1 −j +j −j −j −j +1 −1 +1 −1 −j −j −1 +j −j +1 +1 −j
−1 +1 +j +j +1 −j −j +1 +1 −j −1 +j −1 −1 +j +1 −1 −j −j −1 +j −j +1 +1 −j −1 −1 −j −j −1 +j −1
−1 −j +j −j −j −j +1 −1 +1 −1 −1 −j +j −j +j +j −1 +1 −1 +j +j −1 +1 −1 −1 −1 −j +j −j +j +j −1
+1 −1 +1 +1 +j −j +j −1 −j −j −1 +j +j −1 −1 +j +1 +1 +j +j +1 −j +j −1 −1 +j +1 −j +1 +1 −j
−1 −1 −j −j −1 +j +j −1 −1 +j +1 −1 −j −j −1 +j −1 −1 −j +j −j +j +j −1 +1 −1 −1 −1 −j +j −j −j −j
+1 −1 +1 −j −j +1 −1 +1 −1 −1 −j +j −j −j −j +1 −1 +1 +1 +1 +j −j +j −j +1 +1 −j −1 +1 +j +j
+1 −j +j −1 −1 +j +1 +1 +j +j +1 −j −1 −j −j −1 +j −j +1 +1 −j −1 +1 +j +j +1 −j −j +1 +1 −j
−1 −j −j +1 −1 +1 +1 +1 +j −j +j −j −j +1 −1 +1 −1 −1 −j +j −j −1 −1 −j +j −j −j −j +1 −1 +1 −1
−1 −j +j −j +j +j −1 +1 −1 −j +1 +1 −j −1 −1 −j −j −1 +j +j −1 −1 +j +1 −1 −j −j −1 +j +1 +j +j
+1 −j −j +1 +1 −j −1 −1 −j −j −1 +j −j +1 +1 −j −1 −j −j +1 −1 +1 −1 −1 −j +j −j −j −j +1 −1 +1
+1 +1 +j −j +j +1 +1 +j −j +j −j −j +1 −1 +1 +1 +1 +j −j +j +j +j −1 +1 −1 +1 +j +j +1 −j
+j −1 −1 +j +1 −1 −j −j −1 +j +j −1 −1 +j +1 −j +1 +1 −j −1 +1 +j +j +1 −j +j −1 −1 +j +1 +1
+j +j +1 −j +1 +1 +j −j +j +j +j −1 +1 −1 +1 +1 +j −j +j −j −j +1 −1 +1 −j −j +1 −1 +1 +1
+1 +j −j +j −j −j +1 −1 +1 −1 −1 −j +j −j −1 −j +1 +1

The Sequence $Seq^{7}_{right,804}(k)$, to be transmitted from left to right, up to down +j +j −1 +1 −1 −j −j +1 −1 +1 −j +1 +1 −j −1 −j +1 +1 −j −1 −1 −1 −j +j −j +1 +1 +j −j +j +1
+j +j +1 −j +1 +j +j +1 −j −1 −1 −j +j −j +1 +1 +j −j +j +1 +j +j +1 −j +1 +j +j +1 −j +j +j
−1 +1 −1 −j −j +1 −1 +1 −j +1 +1 −j −1 −j +1 +1 −j −1 −1 −1 −j +j −j −1 −1 −j +j −j +1 +j +j
+1 −j −1 −j −j −1 +j +j +j −1 +1 −1 +j +j −1 +1 −1 −j +1 +1 −j −1 +j −1 −1 +j +1 −j −j +1 −1
+1 −j −j +1 −1 +1 +j −1 −1 +j +1 −j +1 +1 −j −1 +1 +1 +j −j +j +1 +1 +j −j +j −1 −j −j −1 +j
+1 +j +j +1 −j +1 +1 +j −j +j −1 −1 −j +j −j −1 −j −j −1 +j −1 −j −j −1 +j +j +j −1 +1 −1 −j −j
+1 −1 +1 −j +1 +1 −j −1 −j +1 +1 −j −1 +j +j −1 +1 −1 −j −j +1 −1 +1 −j +1 +1 −j −1 −j +1
+1 −j −1 +1 +1 +j −j +j −1 −1 −j +j −j −1 −j −j −1 +j −1 −j −j −1 +j +j +j −1 +1 −1 +j +j −1 +1
−1 −j +1 +1 −j −1 +j −1 −1 +j +1 +1 +1 +j −j +j +1 +1 +j −j +j −1 −j −j −1 +j +1 +j +j +1 −j
−1 −1 −j +j −j −1 −1 −j +j −j +1 +j +j +1 −j −1 −j −j −1 +j −j −j +1 −1 +1 −j −j +1 −1 +1 +j −1
−1 +j +1 −j +1 +1 −j −1 −j −j +1 −1 +1 +j +j −1 +1 −1 +j −1 −1 +j +1 +j −1 −1 +j +1 +1 +1
+j −j +j −1 −1 −j +j −j −1 −j −j −1 +j −1 −j −j −1 +j +1 +1 +j −j +j −1 −1 −j +j −j −1 −j −j −1 +j
−1 −j −j −1 +j −j −j +1 −1 +1 +j +j −1 +1 −1 +j −1 −1 +j +1 +j −1 −1 +j +1 +1 +1 +j −j +j +1
+1 +j −j +j −1 −j −j −1 +j +1 +j +j +1 −j −j −j +1 −1 +1 −j −j +1 −1 +1 +j −1 −1 +j +1 −j +1
+1 −j −1 +j +j −1 +1 −1 +j +j −1 +1 −1 −j +1 +1 −j −1 +j −1 −1 +j +1 −1 −1 −j +j −j −1 −1 −j
+j −j +1 +j +j +1 −j −1 −j −j −1 +j −j −j +1 −1 +1 +j +j −1 +1 −1 +j −1 −1 +j +1 +j −1 −1 +j
+1 +1 +1 +j −j +j −1 −1 −j +j −j −1 −j −j −1 +j −1 −j −j −1 +j +1 +1 +j −j +j −1 −1 −j +j −j −1
−j −j −1 +j −1 −j −j −1 +j −j −j +1 −1 +1 +j +j −1 +1 −1 +j −1 −1 +j +1 +j −1 −1 +j +1 +1 +1
+j −j +j +1 +1 +j −j +j −1 −j −j −1 +j +1 +j +j +1 −j −j −j +1 −1 +1 −j −j +1 −1 +1 +j −1 −1
+j +1 −j +1 +1 −j −1 +j +j −1 +1 −1 +j +j −1 +1 −1 −j +1 +1 −j −1 +j −1 −1 +j +1 −1 −1 −j +j
−j −1 −1 −j +j −j +1 +j +j +1 −j −1 −j −j −1 +j +1 +1 +j −j +j −1 −1 −j +j −j −1 −j −j −1 +j −1 −j
−j −1 +j +j +j −1 +1 −1 −j −j +1 −1 +1 −j +1 +1 −j −1 −j +1 +1 −j −1 +j +j −1 +1 −1 −j −j +1
−1 +1 −j +1 +1 −j −1 −j +1 +1 −j −1 +1 +1 +j −j +j −1 −1 −j +j −j −1 −j −j −1 +j −1 −j −j −1 +j
+j +j −1 +1 −1 +j +j −1 +1 −1 −j +1 +1 −j −1 +j −1 −1 +j +1 +1 +1 +j −j +j +1 +1 +j −j +j
−1 −j −j −1 +j +1 +j +j +1 −j −1 −1 −j +j −j −1 −1 −j +j −j +1 +j +j +1 −j −1 −j −j −1 +j −j −j +1
−1 +1 −j −j +1 −1 +1 +j −1 −1 +j +1 −j +1 +1 −j −1 +j −j −1 −j The Sequence $Seq^{8}_{right,804}(k)$, to be transmitted from left to right, up to down +1 +1 +j −j +j −j −j +1 −1 +1 +j +j −1 +1 −1 +1 +1 +j −j +j +1 +j +j +1 −j −j +1 +1 −j −1
+j −1 −1 +j +1 +1 +j +j +1 −j +j +j −1 +1 −1 −1 −1 −j +j −j +1 +1 +j −j +j +j +j −1 +1 −1 +j
−1 −1 +j +1 −1 −j −j −1 +j +1 +j +j +1 −j +j −1 −1 +j +1 −1 −1 −j +j −j −j −j +1 −1 +1 −j −j +1
−1 +1 +1 +1 +j −j +j +1 +j +j +1 −j +j −1 −1 +j +1 +j −1 −1 +j +1 −1 −j −j −1 +j −j −j +1 −1
+1 −1 −1 −j +j −j −1 −1 −j +j −j +j +j −1 +1 −1 +j −1 −1 +j +1 +1 +j +j +1 −j +1 +j +j +1 −j
−j +1 +1 −j −1 −j −j +1 −1 +1 −1 −1 −j +j −j +1 +1 +j −j +j −j −j +1 −1 +1 −j +1 +1 −j −1 −1 −j
−j −1 +j +1 +j +j +1 −j −j +1 +1 −j −1 +1 +1 +j −j +j +j +j −1 +1 −1 −j −j +1 −1 +1 +1 +1
+j −j +j +1 +j +j +1 −j +j −1 −1 +j +1 −j +1 +1 −j −1 +1 +j +j +1 −j +j +j −1 +1 −1 −1 −1 −j
+j −j −1 −1 −j +j −j −j −j +1 −1 +1 −j +1 +1 −j −1 +1 +j +j +1 −j +1 +j +j +1 −j +j −1 −1 +j
+1 −1 −1 −j +j −j +j +j −1 +1 −1 +j +j −1 +1 −1 +1 +1 +j −j +j +1 +j +j +1 −j −j +1 +1 −j −1
−j +1 +1 −j −1 −1 −j −j −1 +j −1 −1 −j +j −j +j +j −1 +1 −1 −j −j +1 −1 +1 −1 −1 −j +j −j −1 −j −j
−1 +j +j −1 −1 +j +1 −j +1 +1 −j −1 −1 −j −j −1 +j −j −j +1 −1 +1 +1 +1 +j −j +j −1 −1 −j +j −j TABLE 8-continued

| The sequence $Seq^{iTX}_{right,804}(k)$ |
|---|
| −j −j +1 −1 +1 −j +1 +1 −j −1 +1 +j +j +1 −j −1 −j −j −1 +j −j +1 +1 −j −1 +1 +1 +j −j +j +j |
| +j −1 +1 −1 +j +j −1 +1 −1 −1 −1 −j +j −j −1 −j −j −1 +j −j +1 +1 −j −1 −j +1 +1 −j −1 +1 +j |
| +j +1 −j +j +j −1 +1 −1 +1 +1 +j −j +j +1 +1 +j −j +j −j −j +1 −1 +1 −j +1 +1 −j −1 −1 −j −j |
| −1 +j −1 −j −j −1 +j +j −1 −1 +j +1 −1 −1 −j +j −j +j +j −1 +1 −1 −j −j +1 −1 +1 −1 −1 −j +j −j |
| −1 −j −j −1 +j +j −1 −1 +j +1 −j +1 +1 −j −1 −1 −j −j −1 +j −j −j +1 −1 +1 +1 +1 +j −j +j −1 −1 |
| −j +j −j −j −j +1 −1 +1 −j +1 +1 −j −1 +1 +j +j +1 −j −1 −j −j −1 +j −j +1 +1 −j −1 +1 +1 +j −j |
| +j +j +j −1 +1 −1 +j +j −1 +1 −1 −1 −1 −j +j −j −1 −j −j −1 +j −j +1 +1 −j −1 −j +1 +1 −j −1 |
| +1 +j +j +1 −j +j +j −1 +1 −1 +1 +1 +j −j +j +1 +1 +j −j +j −j −j +1 −1 +1 −j +1 +1 −j −1 |
| −1 −j −j −1 +j −1 −j −j −1 +j +j −1 −1 +j +1 −j −j +1 −1 +1 −1 −1 −j +j −j +1 +1 +j −j +j −j −j +1 |
| −1 +1 −j +1 +1 −j −1 −1 −j −j −1 +j +1 +j +j +1 −j −j +1 +1 −j −1 +1 +1 +j −j +j +j +j −1 +1 |
| −1 −j −j +1 −1 +1 +1 +1 +j −j +j +1 +j +j +1 −j +j −1 −1 +j +1 −j +1 +1 −j −1 +1 +j +j +1 |
| −j +j +j −1 +1 −1 −1 −1 −j +j −j −1 −1 −j +j −j −j −j +1 −1 +1 −j +1 +1 −j −1 +1 +j +j +1 −j +1 |
| +j +j +1 −j +j −1 −1 +j +1 −1 −1 −j +j −j +j +j −1 +1 −1 +j +j −1 +1 −1 +1 +1 +j −j +j +1 +j |
| +j +1 −j −j +1 +1 −j −1 −j +1 +1 −j −1 −1 −j −j −1 +j −1 −1 +j −1 |

In other embodiments, the sequence pairs $Seq^{iTX}_{left,N}$ and $Seq^{iTX}_{right,N}$ of the length N=176, 385, 595, and/or 804 may use, for example, {+1, −1, +j, −j} symbols alphabet, e.g., according to one or more of the following Tables 9-16:

TABLE 9

| The sequence $Seq^{iTX}_{left,176}(k)$ |
|---|
| The Sequence $Seq^{1}_{left,176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 |
| +1 +1 +j +j +j −1 −1 −j +1 −1 −j +j −j −1 +j +j −j +j +1 −j −j −1 −1 −1 −j −j +j −1 −1 −j +1 −1 |
| −j +j −j −1 +j −j +j −j −1 +j +j +1 +1 +1 +j +j −j +1 +1 +j −1 +1 +j −j +j +1 −j −j +j −j −1 +j |
| +j +1 +1 +1 +j +j −1 −j −j +1 +j −j +1 −1 +1 −j −1 +1 −1 +1 −j −1 −1 +j +j +j −1 −1 −1 −j −j |
| +1 +j −j +1 −1 +1 −j −1 −1 +1 −1 +j +1 +1 −j −j −j +1 +1 |
| The Sequence $Seq^{2}_{left,176}(k)$, to be transmitted from left to right, up to down |
| +j −1 −1 −j +1 −1 −j +j −j −1 +j +1 −1 +1 −j −1 −1 +j +j +j −1 −1 +j −1 −1 −j +1 −1 −j +j −j −1 |
| +j −1 +1 −1 +j +1 +1 −j −j −j +1 +1 −1 −j −j +1 +j −j +1 −1 +1 −j −1 +j −j +j +1 −j −j −1 −1 |
| −1 −j −j +1 +j +j −1 −j +j −1 +1 −1 +j +1 +j −j +j +1 −j −j −1 −1 −1 −j −j +1 +j +j −1 −j +j −1 |
| +1 −1 +j +1 −j +j −j −1 +j +j +1 +1 +1 +j +j +1 +j +j −1 −j +j −1 +1 −1 +j +1 +j −j +j +1 |
| −j −j −1 −1 −1 −j −j −j +1 +1 +j −1 +1 +j −j +j +1 −j −1 +1 −1 +j +1 +1 −j −j −j +1 +1 +j −1 −1 |
| −j +1 −1 −j +j −j −1 +j −1 +1 −1 +j +1 +1 −j −j −j +1 +1 |
| The Sequence $Seq^{3}_{left,176}(k)$, to be transmitted from left to right, up to down |
| −1 −j −j +1 +j −j +1 −1 +1 −j −1 +1 −1 +1 −j −1 −1 +j +j +j −1 −1 −j +1 +1 +j −1 +1 +j −j +j |
| +1 −j −j +j −j −1 +j +j +1 +1 +1 +j +j −1 −j −j +1 +j −j +1 −1 +1 −j −1 +1 −1 +1 −j −1 −1 +j |
| +j +j −1 −1 +j −1 −1 −j +1 −1 −j +j −j −1 +j +j −j +j +1 −j −j −1 −1 −1 −j −j +j −1 −1 −j +1 −1 −j |
| +j −j −1 +j −j +j −j −1 +j +j +1 +1 +1 +j +j −1 −j −j +1 +j −j +1 −1 +1 −j −1 −1 +1 −1 +j +1 |
| +1 −j −j −j +1 +1 −j +1 +1 +j −1 +1 +j −j +j +1 −j +j −j +j +1 −j −j −1 −1 −1 −j −j −1 −j −j +1 |
| +j −j +1 −1 +1 −j −1 −1 +1 −1 +j +1 +1 −j −j −j +1 +1 |
| The Sequence $Seq^{4}_{left,176}(k)$, to be transm1tted from left to r1ght, up to down |
| −j +1 +1 +j −1 +1 +j −j +j +1 −j −j +j −j −1 +j +j +1 +1 +1 +j +j −j +1 +1 +j −1 +1 +j −j |
| +j +1 −j +j −j +j +1 −j −j −1 −1 −1 −j −j +j −1 −1 −j +1 −1 −j +j −j −1 +j +j −j +j +1 −j −j −1 −1 |
| −1 −j −j −j +1 +1 +j −1 +1 +j −j +j +1 −j +j −j +j +1 −j −j −1 −1 −1 −j −j −1 −j −j +1 +j −j +1 |
| −1 +1 −j −1 −1 +1 −1 +j +1 +1 −j −j −j +1 +1 −1 −j −j +1 +j −j +1 −1 +1 −j −1 +1 −1 +1 −j −1 |
| −1 +j +j +j −1 −1 −1 −j −j +1 +j −j +1 −1 +1 −j −1 −1 +1 −1 +j +1 +1 −j −j −j +1 +1 +1 +j +j |
| −1 −j +j −1 +1 −1 +j +1 −1 +1 −1 +j +1 +1 −j −j −j +1 +1 |
| The Sequence $Seq^{5}_{left,176}(k)$, to be transmitted from left to right, up to down |
| −1 −j −j +1 +j −j +1 −1 +1 −j −1 +1 −1 +1 −j −1 −1 +j +j +j −1 −1 +j −1 −1 −j +1 −1 −j +j −j −1 |
| +j +j −j +j +1 −j −j −1 −1 −1 −j −j +1 +j +j −1 −j +j −1 +1 −1 +j +1 −1 +1 −1 +j +1 +1 −j −j −j |
| +1 +1 +j −1 −1 −j +1 −1 −j +j −j −1 +j +j −j +j +1 −j −j −1 −1 −1 −j −j +j −1 −1 −j +1 −1 −j +j |
| −j −1 +j −j +j −j −1 +j +j +1 +1 +1 +j +j +1 +j +j −1 −j +j −1 +1 −1 +j +1 +1 −1 +1 −j −1 −1 |
| +j +j +j −1 −1 +j −1 −1 −j +1 −1 −j +j −j −1 +j −j +j −j −1 +j +j +1 +1 +1 +j +j −1 −j −j +1 +j |
| −j +1 −1 +1 −j −1 −1 +1 −1 +j +1 +1 −j −j −j +1 +1 |
| The Sequence $Seq^{6}_{left,176}(k)$, to be transmitted from left to right, up to down |
| −1 −j −j +1 +j −j +1 −1 +1 −j −1 −1 +1 −1 +j +1 +1 −j −j −j +1 +1 +j −1 −1 −j +1 −1 −j +j −j |
| −1 +j −j +j −j −1 +j +j +1 +1 +1 +j +j −1 −j −j +1 +j −j +1 −1 +1 −j −1 −1 +1 −1 +j +1 +1 −j |
| −j −j +1 +1 −j +1 +1 +j −1 +1 +j −j +j +1 −j +j −j +j +1 −j −j −1 −1 −1 −j −j +j −1 −1 −j +1 −1 |
| −j +j −j −1 +j +j −j +j +1 −j −j −1 −1 −1 −j −j +1 +j +j −1 −j +j −1 +1 −1 +j +1 −1 +1 −1 +j +1 |
| +1 −j −j −j +1 +1 −j +1 +1 +j −1 +1 +j −j +j +1 −j −j +j −j −1 +j +j +1 +1 +1 +j +j +1 +j |
| +j −1 −j +j −1 +1 −1 +j +1 −1 +1 −1 +j +1 +1 −j −j −j +1 +1 |
| The Sequence $Seq^{7}_{left,176}(k)$, to be transm1tted from left to r1ght, up to down |
| −1 −j −j +1 +j −j +1 −1 +1 −j −1 −j +j −j −1 +j +j +1 +1 +1 +j +j −j +1 +1 +j −1 +1 +j −j +j |
| +1 −j −1 +1 −1 +j +1 +1 −j −j −j +1 +1 −j +1 +1 +j −1 +1 +j −j +j +1 −j +1 −1 +1 −j −1 −1 |
| +j +j +j −1 −1 −1 −j −j +1 +j −j +1 −1 +1 −j −1 +j −j +j +1 −j −j −1 −1 −1 −j −j +j −1 −1 −j +1 |

TABLE 9-continued

| The sequence $Seq^{iTX}_{left,176}(k)$ |
|---|
| −1 −j +j −j −1 +j −1 +1 −1 +j +1 +1 −j −j −j +1 +1 −1 −j −j +1 +j −j +1 −1 +1 −j −1 +j −j +j +1 |
| −j −j −1 −1 −1 −j −j +1 +j +j −1 −j +j −1 +1 −1 +j +1 +j −j +j +1 −j −j −1 −1 −1 −j −j −j +1 +1 |
| +j −1 +1 +j −j +j +1 −j −1 +1 −1 +j +1 +1 −j −j −j +1 +1 |
| The Sequence $Seq^{8}_{left,176}(k)$, to be transmitted from left to right, up to down |
| +1 +j +j −1 −j +j −1 +1 −1 +j +1 −1 +1 −1 +j +1 +1 −j −j −j +1 +1 +1 +j +j −1 −j +j −1 +1 |
| −1 +j +1 +1 −1 +1 −j −1 −1 +j +j +j −1 −1 −j +1 +1 +j −1 +1 +j −j +j +1 −j +j −j +j +1 −j −j |
| −1 −1 −1 −j −j +j −1 −1 −j +1 −1 −j +j −j −1 +j +j −j +j +1 −j −j −1 −1 −1 −j −j −j +1 +1 +j −1 +1 |
| +j −j +j +1 −j +j −j +j +1 −j −j −1 −1 −1 −j −j −j +1 +1 +j −1 +1 +j −j +j +1 −j −j +j −j −1 +j |
| +j +1 +1 +1 +j +j +1 +j +j −1 −j +j −1 +1 −1 +j +1 −1 +1 −1 +j +1 +1 −j −j −j +1 +1 −1 −j |
| −j +1 +j −j +1 −1 +1 −j −1 −1 +1 −1 +j +1 +1 −j −j −j +1 +1 |

TABLE 10

| The sequence $Seq^{iTX}_{right,176}(k)$ |
|---|
| The Sequence $Seq^{1}_{right,176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 |
| +1 +1 +j +j +j −1 −1 −j +1 −1 −j +j −j −1 +j +j −j +j +1 −j −j −1 −1 −1 −j −j −j +1 +1 +j −1 +1 |
| +j −j +j +1 −j +j −j +j +1 −j −j −1 −1 −1 −j −j +j −1 −1 −j +1 −1 −j +j −j −1 +j +j −j +j +1 −j −j |
| −1 −1 −1 −j −j +1 +j +j −1 −j +j −1 +1 −1 +j +1 −1 +1 −1 +j +1 +1 −j −j −j +1 +1 +1 +j +j −1 |
| −j +j −1 +1 −1 +j +1 +1 −1 +1 −j −1 −1 +j +j +j −1 −1 |
| The Sequence $Seq^{2}_{right,176}(k)$, to be transmitted from left to right, up to down |
| +j −1 −1 −j +1 −1 −j +j −j −1 +j +1 −1 +1 −j −1 −1 +j +j +j −1 −1 +j −1 −1 −j +1 −1 −j +j −j −1 |
| +j −1 +1 −1 +j +1 +1 −j −j −j +1 +1 −1 −j −j +1 +j −j +1 −1 +1 −j −1 +j −j +j +1 −j −j −1 −1 |
| −1 −j −j +1 +j +j −1 −j +j −1 +1 −1 +j +1 +j −j +j +1 −j −j −1 −1 −1 −j −j −1 −j −j +1 +j −j +1 −1 |
| +1 −j −1 +j −j +j +1 −j −j −1 −1 −1 −j −j −1 −j −j +1 +j −j +1 −1 +1 −j −1 −j +j −j −1 +j +j +1 |
| +1 +1 +j +j +j −1 −1 −j +1 −1 −j +j −j −1 +j +1 −1 +1 −j −1 −1 +j +j +j −1 −1 −j +1 +1 +j −1 |
| +1 +j −j +j +1 −j +1 −1 +1 −j −1 −1 +j +j +j −1 −1 |
| The Sequence $Seq^{3}_{right,176}(k)$, to be transmitted from left to right, up to down |
| −1 −j −j +1 +j −j +1 −1 +1 −j −1 +1 −1 +1 −j −1 −1 +j +j +j −1 −1 −j +1 +1 +j −1 +1 +j −j +j |
| +1 −j −j +j −j −1 +j +j +1 +1 +1 +j +j −1 −j −j +1 +j −j +1 −1 +1 −j −1 +1 −1 +1 −j −1 −1 +j |
| +j +j −1 −1 +j −1 −1 −j +1 −1 −j +j −j −1 +j +j −j +j +1 −j −j −1 −1 −1 −j −j −j +1 +1 +j −1 +1 |
| +j −j +j +1 −j +j −j +j +1 −j −j −1 −1 −1 −j −j +1 +j +j −1 −j +j −1 +1 −1 +j +1 +1 −1 +1 −j −1 |
| −1 +j +j +j −1 −1 +j −1 −1 −j +1 −1 −j +j −j −1 +j −j +j −j −1 +j +j +1 +1 +1 +j +j +1 +j +j |
| −1 −j +j −1 +1 −1 +j +1 +1 −1 +1 −j −1 −1 +j +j +j −1 −1 |
| The Sequence $Seq^{4}_{right,176}(k)$, to be transmitted from left to right, up to down |
| −j +1 +1 +j −1 +1 +j −j +j +1 −j −j +j −j −1 +j +j +1 +1 +1 +j +j −j +1 +1 +j −1 +1 +j −j |
| +j +1 −j +j −j +j +1 −j −j −1 −1 −1 −j −j +j −1 −1 −j +1 −1 −j +j −j −1 +j +j −j +j +1 −j −j −1 −1 |
| −1 −j −j −j +1 +1 +j −1 +1 +j −j +j +1 −j +j −j +j +1 −j −j −1 −1 −1 −j −j +1 +j +j −1 −j +j −1 |
| +1 −1 +j +1 +1 −1 +1 −j −1 −1 +j +j +j −1 −1 +1 +j +j −1 −j +j −1 +1 −1 +j +1 −1 +1 −1 +j |
| +1 +1 −j −j −j +1 +1 +1 +j +j −1 −j +j −1 +1 −1 +j +1 +1 −1 +1 −j −1 −1 +j +j +j −1 −1 −1 −j |
| −j +1 +j −j +1 −1 +1 −j −1 +1 −1 +1 −j −1 −1 +j +j +j −1 −1 |
| The Sequence $Seq^{5}_{right,176}(k)$, to be transmitted from left to right, up to down |
| −1 −j −j +1 +j −j +1 −1 +1 −j −1 +1 −1 +1 −j −1 −1 +j +j +j −1 −1 +j −1 −1 −j +1 −1 −j +j −j −1 |
| +j +j −j +j +1 −j −j −1 −1 −1 −j −j +1 +j +j −1 −j +j −1 +1 −1 +j +1 −1 +1 −1 +j +1 +1 −j −j −j |
| +1 +1 +j −1 −1 −j +1 −1 −j +j −j −1 +j +j −j +j +1 −j −j −1 −1 −1 −j −j −j +1 +1 +j −1 +1 +j −j |
| +j +1 −j +j −j +j +1 −j −j −1 −1 −1 −j −j −1 −j −j +1 +j −j +1 −1 +1 −j −1 −1 +1 −1 +j +1 +1 −j |
| −j −j +1 +1 −j +1 +1 +j −1 +1 +j −j +j +1 −j +j −j +j +1 −j −j −1 −1 −1 −j −j +1 +j +j −1 −j +j |
| −1 +1 −1 +j +1 +1 −1 +1 −j −1 −1 +j +j +j −1 −1 |
| The Sequence $Seq^{6}_{right,176}(k)$, to be transmitted from left to right, up to down |
| −1 −j −j +1 +j −j +1 −1 +1 −j −1 −1 +1 −1 +j +1 +1 −j −j −j +1 +1 +j −1 −1 −j +1 −1 −j +j −j |
| −1 +j −j +j −j −1 +j +j +1 +1 +1 +j +j −1 −j −j +1 +j −j +1 −1 +1 −j −1 −1 +1 −1 +j +1 +1 −j |
| −j −j +1 +1 −j +1 +1 +j −1 +1 +j −j +j +1 −j +j −j +j +1 −j −j −1 −1 −1 −j −j −j +1 +1 +j −1 |
| +1 +j −j +j +1 −j −j +j −j −1 +j +j +1 +1 +1 +j +j −1 −j −j +1 +j −j +1 −1 +1 −j −1 +1 −1 +1 |
| −j −1 −1 +j +j +j −1 −1 +j −1 −1 −j +1 −1 −j +j −j −1 +j +j −j +j +1 −j −j −1 −1 −1 −j −j −1 −j −j |
| +1 +j −j +1 −1 +1 −j −1 +1 −1 +1 −j −1 −1 +j +j +j −1 −1 |
| The Sequence $Seq^{7}_{right,176}(k)$, to be transmitted from left to right, up to down |
| −1 −j −j +1 +j −j +1 −1 +1 −j −1 −j +j −j −1 +j +j +1 +1 +1 +j +j −j +1 +1 +j −1 +1 +j −j +j |
| +1 −j −1 +1 −1 +j +1 +1 −j −j −j +1 +1 −j +1 +1 +j −1 +1 +j −j +j +1 −j +1 −1 +1 −j −1 −1 |
| +j +j +j −1 −1 −1 −j −j +1 +j −j +1 −1 +1 −j −1 +j −j +j +1 −j −j −1 −1 −1 −j −j −j +1 +1 +j −1 |
| +1 +j −j +j +1 −j +1 −1 +1 −j −1 −1 +j +j +j −1 −1 +1 +j +j −1 −j +j −1 +1 −1 +j +1 −j +j −j |
| −1 +j +j +1 +1 +1 +j +j −1 −j −j +1 +j −j +1 −1 +1 −j −1 −j +j −j −1 +j +j +1 +1 +1 +j +j |
| +j −1 −1 −j +1 −1 −j +j −j −1 +j +1 −1 +1 −j −1 −1 +j +j +j −1 −1 |
| The Sequence $Seq^{8}_{right,176}(k)$, to be transmitted from left to right, up to down |
| +1 +j +j −1 −j +j −1 +1 −1 +j +1 −1 +1 −1 +j +1 +1 −j −j −j +1 +1 +1 +j +j −1 −j +j −1 +1 |
| −1 +j +1 +1 −1 +1 −j −1 −1 +j +j +j −1 −1 −j +1 +1 +j −1 +1 +j −j +j +1 −j +j −j +j +1 −j −j |

TABLE 10-continued

| The sequence $Seq^{iTX}_{right,176}(k)$ |
|---|
| −1 −1 −1 −j −j +j −1 −1 −j +1 −1 −j +j −j −1 +j +j −j +j +1 −j −j −1 −1 −1 −j −j +j −1 −1 −j +1 −1 |
| −j +j −j −1 +j −j +j −j −1 +j +j +1 +1 +1 +j +j +j −1 −1 −j +1 −1 −j +j −j −1 +j +j −j +j +1 −j |
| −j −1 −1 −1 −j −j −1 −j −j +1 +j −j +1 −1 +1 −j −1 +1 −1 +1 −j −1 −1 +j +j +j −1 −1 +1 +j +j −1 |
| −j +j −1 +1 −1 +j +1 +1 −1 +1 −j −1 −1 +j +j +j −1 −1 |

TABLE 11

| The sequence $Seq^{iTX}_{left,385}(k)$ |
|---|
| The Sequence $Seq^{1}_{left,385}(k)$, to be transmitted from left to right, up to down |
| +j +j −j −j −j +1 −j +j −j −j +j −1 +j +j −j −j −j +1 −j −j +j +j −j +1 −j −1 +1 +1 +1 +j +1 −1 |
| +1 +1 −1 −j −1 +1 −1 −1 −1 −j −1 −1 +1 +1 −1 −j −1 −j +j +j +j −1 +j −j +j +j −j +1 −j −j +j +j |
| +j −1 +j +j −j −j +j −1 +j −1 +1 +1 +1 +j +1 −1 +1 +1 −1 −j −1 +1 −1 −1 −1 −j −1 −1 +1 +1 |
| −1 −j −1 −1 +1 +1 +1 +j +1 −1 +1 +1 −1 −j −1 −1 +1 +1 +1 +j +1 +1 −1 −1 +1 +j +1 −j +j |
| +j +j −1 +j −j +j +j −j +1 −j +j −j −j −j +1 −j −j +j +j −j +1 −j −1 +1 +1 +1 +j +1 −1 +1 +1 |
| −1 −j −1 −1 +1 +1 +1 +j +1 +1 −1 −1 +1 +j +1 +j −j −j −j +1 −j +j −j −j +j −1 +j −j +j +j +j |
| −1 +j +j −j −j +j −1 +j +1 −1 −1 −1 −j −1 +1 −1 −1 +1 +j +1 +1 −1 −1 −1 −j −1 −1 +1 +1 −1 −j |
| −1 +j −j −j −j +1 −j +j −j −j +j −1 +j −j +j +j +j −1 +j +j −j −j +j −1 +j −1 +1 +1 +1 +j +1 −1 |
| +1 +1 −1 −j −1 −1 +1 +1 +1 +j +1 +1 −1 −1 +1 +j +1 +j −j −j −j +1 −j +j −j −j +j −1 +j −j +j |
| +j +j −1 +j +j −j −j +j −1 +j −j +j +j +j −1 +j −j +j +j −j +1 −j −j +j +j +j −1 +j +j −j −j +j −1 |
| +j +1 −1 −1 −1 −j −1 +1 −1 −1 +1 +j +1 −1 +1 +1 +1 +j +1 +1 −1 −1 +1 +j +1 −j +j +j +j |
| −1 +j −j +j +j −j +1 −j −j +j +j +j −1 +j +j −j −j +j −1 +j −1 +1 +1 +1 +j +1 −1 +1 +1 −1 −j |
| −1 +1 −1 −1 −1 −j −1 −1 +1 +1 −1 −j −1 |
| The Sequence $Seq^{2}_{left,385}(k)$, to be transmitted from left to right, up to down |
| −j +1 −1 −1 −1 −j −1 +1 −1 −1 +1 +j +1 +1 −1 −1 −1 −j −1 −1 +1 +1 −1 −j −1 +1 −1 −1 −1 −j −1 |
| +1 −1 −1 +1 +j +1 −1 +1 +1 +1 +j +1 +1 −1 −1 +1 +j +1 −j +j +j +j −1 +j −j +j +j −j +1 −j |
| −j +j +j +j −1 +j +j −j −j +j −1 +j +j −j −j −j +1 −j +j −j −j +j −1 +j −j +j +j +j −1 +j +j −j −j |
| +j −1 +j −1 +1 +1 +1 +j +1 −1 +1 +1 −1 −j −1 −1 +1 +1 +1 +j +1 +1 −1 −1 +1 +j +1 −1 |
| +1 +1 +1 +j +1 −1 +1 +1 −1 −j −1 +1 −1 −1 −1 −j −1 −1 +1 +1 −1 −j −1 −j +j +j +j −1 +j −j |
| +j +j −j +1 −j −j +j +j +j −1 +j +j −j −j +j −1 +j +j −j −j −j +1 −j +j −j −j +j −1 +j −j +j +j +j |
| −1 +j +j −j −j +j −1 +j −j +j +j +j −1 +j −j +j +j −j +1 −j −j +j +j +j −1 +j +j −j −j +j −1 +j −j |
| +j +j +j −1 +j −j +j +j −j +1 −j +j −j −j −j +1 −j −j +j +j −j +1 −j −1 +1 +1 +1 +j +1 −1 +1 |
| +1 −1 −j −1 −1 +1 +1 +1 +j +1 +1 −1 −1 +1 +j +1 +1 −1 −1 −1 −j −1 +1 −1 −1 +1 +j +1 −1 |
| +1 +1 +1 +j +1 +1 −1 −1 +1 +j +1 −j +j +j +j −1 +j −j +j +j −j +1 −j −j +j +j +j −1 +j +j −j |
| −j +j −1 +j −j +j +j +j −1 +j −j +j +j −j +1 −j +j −j −j −j +1 −j −j +j +j −j +1 −j +1 −1 −1 −1 −j |
| −1 +1 −1 −1 +1 +j +1 +1 −1 −1 −1 −j −1 −1 +1 +1 −1 −j −1 −1 +1 +1 +1 +j +1 −1 +1 +1 −1 |
| −j −1 +1 −1 −1 −1 −j −1 −1 +1 +1 −1 −j −1 |
| The Sequence $Seq^{3}_{left,385}(k)$, to be transmitted from left to right, up to down |
| +1 +1 −1 −1 −1 −j −1 +1 −1 −1 +1 +j +1 +1 −1 −1 −1 −j −1 −1 +1 +1 −1 −j −1 −j +j +j +j −1 |
| +j −j +j +j −j +1 −j +j −j −j −j +1 −j −j +j +j −j +1 −j +j −j −j −j +1 −j +j −j −j +j −1 +j +j −j −j |
| −j +1 −j −j +j +j −j +1 −j −1 +1 +1 +1 +j +1 −1 +1 +1 −1 −j −1 +1 −1 −1 −1 −j −1 −1 +1 +1 |
| −1 −j −1 +j −j −j −j +1 −j +j −j −j +j −1 +j +j −j −j −j +1 −j −j +j +j −j +1 −j +1 −1 −1 −1 −j −1 +1 |
| −1 −1 +1 +j +1 −1 +1 +1 +1 +j +1 +1 −1 −1 +1 +j +1 +1 −1 −1 −1 −j −1 +1 −1 −1 +1 +j +1 |
| +1 −1 −1 −1 −j −1 −1 +1 +1 −1 −j −1 +j −j −j −j +1 −j +j −j −j +j −1 +j −j +j +j +j −1 +j +j −j −j |
| +j −1 +j −j +j +j +j −1 +j −j +j +j −j +1 −j −j +j +j +j −1 +j +j −j −j +j −1 +j −1 +1 +1 +1 +j |
| +1 −1 +1 +1 −1 −j −1 +1 −1 −1 −1 −j −1 −1 +1 +1 −1 −j −1 +1 −1 −1 −1 −j −1 +1 −1 −1 +1 +j |
| +1 +1 −1 −1 −1 −j −1 −1 +1 +1 −1 −j −1 +j −j −j −j +1 −j +j −j −j +j −1 +j −j +j +j +j −1 +j +j |
| −j −j +j −1 +j −1 +1 +1 +1 +j +1 −1 +1 +1 −1 −j −1 −1 +1 +1 +1 +j +1 +1 −1 −1 +1 +j +1 |
| +j −j −j −j +1 −j +j −j −j +j −1 +j −j +j +j +j −1 +j +j −j −j +j −1 +j +j −j −j −j +1 −j +j −j −j +j |
| −1 +j +j −j −j −j +1 −j −j +j +j −j +1 −j −1 +1 +1 +1 +j +1 −1 +1 +1 −1 −j −1 +1 −1 −1 −1 −j |
| −1 −1 +1 +1 −1 −j −1 |
| The Sequence $Seq^{4}_{left,385}(k)$, to be transmitted from left to right, up to down |
| −j −j +j +j +j −1 +j −j +j +j −j +1 −j −j +j +j +j −1 +j +j −j −j +j −1 +j −1 +1 +1 +1 +j +1 −1 |
| +1 +1 −1 −j −1 +1 −1 −1 −1 −j −1 −1 +1 +1 −1 −j −1 −j +j +j +j −1 +j −j +j +j −j +1 −j −j +j +j |
| +j −1 +j +j −j −j +j −1 +j +1 −1 −1 −1 −j −1 +1 −1 −1 +1 +j +1 −1 +1 +1 +1 +j +1 +1 −1 −1 |
| +1 +j +1 −1 +1 +1 +1 +j +1 −1 +1 +1 −1 −j −1 −1 +1 +1 +1 +j +1 +1 −1 −1 +1 +j +1 +j |
| −j −j −j +1 −j +j −j −j +j −1 +j −j +j +j +j −1 +j +j −j −j +j −1 +j +1 −1 −1 −1 −j −1 +1 −1 −1 +1 |
| +j +1 +1 −1 −1 −1 −j −1 −1 +1 +1 −1 −j −1 +j −j −j −j +1 −j +j −j −j +j −1 +j −j +j +j +j −1 +j |
| +j −j −j +j −1 +j −1 +1 +1 +1 +j +1 −1 +1 +1 −1 −j −1 −1 +1 +1 +1 +j +1 +1 −1 −1 +1 +j |
| +1 +j −j −j −j +1 −j +j −j −j +j −1 +j −j +j +j +j −1 +j +j −j −j +j −1 +j −1 +1 +1 +1 +j +1 −1 |
| +1 +1 −1 −j −1 −1 +1 +1 +1 +j +1 +1 −1 −1 +1 +j +1 −j +j +j +j −1 +j −j +j +j −j +1 −j +j |
| −j −j −j +1 −j −j +j +j −j +1 −j −j +j +j +j −1 +j −j +j +j −j +1 −j −j +j +j +j −1 +j +j −j −j +j −1 |
| +j −1 +1 +1 +1 +j +1 −1 +1 +1 −1 −j −1 +1 −1 −1 −1 −j −1 −1 +1 +1 −1 −j −1 +j −j −j −j +1 −j |
| +j −j −j +j −1 +j +j −j −j −j +1 −j −j +j +j −j +1 −j −1 +1 +1 +1 +j +1 −1 +1 +1 −1 −j −1 +1 |
| −1 −1 −1 −j −1 −1 +1 +1 −1 −j −1 |
| The Sequence $Seq^{5}_{left,385}(k)$, to be transmitted from left to right, up to down |
| −j +1 −1 −1 −1 −j −1 +1 −1 −1 +1 +j +1 +1 −1 −1 −1 −j −1 −1 +1 +1 −1 −j −1 −1 +1 +1 +1 +j |
| +1 −1 +1 +1 −1 −j −1 +1 −1 −1 −1 −j −1 −1 +1 +1 −1 −j −1 −j +j +j +j −1 +j −j +j +j −j +1 −j |
| −j +j +j +j −1 +j +j −j −j +j −1 +j −j +j +j +j −1 +j −j +j +j −j +1 −j +j −j −j −j +1 −j −j +j +j −j |
| +1 −j +1 −1 −1 −1 −j −1 +1 −1 −1 +1 +j +1 +1 −1 −1 −1 −j −1 −1 +1 +1 −1 −j −1 −1 +1 +1 +1 |

TABLE 11-continued

| The sequence $Seq^{iTX}_{left,385}(k)$ |
|---|
| +j +1 −1 +1 +1 −1 −j −1 +1 −1 −1 −1 −j −1 −1 +1 +1 −1 −j −1 +j −j −j −j +1 −j +j −j −j +j −1 +j |
| +j −j −j −j +1 −j −j +j +j −j +1 −j +j −j −j −j +1 −j +j −j −j +j −1 +j −j +j +j +j −1 +j +j −j −j +j |
| −1 +j −j +j +j +j −1 +j −j +j +j −j +1 −j −j +j +j +j −1 +j +j −j −j +j −1 +j +j −j −j −j +1 −j +j |
| −j −j +j −1 +j −j +j +j +j −1 +j +j −j −j +j −1 +j −1 +1 +1 +1 +j +1 −1 +1 +1 −1 −j −1 −1 +1 |
| +1 +1 +j +1 +1 −1 −1 +1 +j +1 −1 +1 +1 +1 +j +1 −1 +1 +1 −1 −j −1 +1 −1 −1 −1 −j −1 −1 |
| +1 +1 −1 −j −1 +j −j −j −j +1 −j +j −j −j +j −1 +j +j −j −j −j +1 −j −j +j +j −j +1 −j −j +j +j +j |
| −1 +j −j +j +j −j +1 −j +j −j −j −j +1 −j −j +j +j −j +1 −j −1 +1 +1 +1 +j +1 −1 +1 +1 −1 −j −1 |
| −1 +1 +1 +1 +j +1 +1 −1 −1 +1 +j +1 −1 +1 +1 +1 +j +1 −1 +1 +1 −1 −j −1 +1 −1 −1 −1 −j |
| −1 −1 +1 +1 −1 −j −1 |
| The Sequence $Seq^{6}_{left,385}(k)$, to be transmitted from left to right, up to down |
| −j +j −j −j −j +1 −j +j −j −j +j −1 +j +j −j −j −j +1 −j −j +j +j −j +1 −j +1 −1 −1 −1 −j −1 +1 −1 |
| −1 +1 +j +1 −1 +1 +1 +1 +j +1 +1 −1 −1 +1 +j +1 −1 +1 +1 +1 +j +1 −1 +1 +1 −1 −j −1 −1 |
| +1 +1 +1 +j +1 +1 −1 −1 +1 +j +1 −j +j +j +j −1 +j −j +j +j −j +1 −j +j −j −j −j +1 −j −j +j |
| +j −j +1 −j +j −j −j −j +1 −j +j −j −j +j −1 +j +j −j −j −j +1 −j −j +j +j −j +1 −j +1 −1 −1 −1 −j |
| −1 +1 −1 −1 +1 +j +1 −1 +1 +1 +1 +j +1 +1 −1 −1 +1 +j +1 +1 −1 −1 −1 −j −1 +1 −1 −1 +1 |
| +j +1 +1 −1 −1 −1 −j −1 −1 +1 +1 −1 −j −1 +j −j −j −j +1 −j +j −j −j +j −1 +j −j +j +j +j −1 +j |
| +j −j −j +j −1 +j +1 −1 −1 −1 −j −1 +1 −1 −1 +1 +j +1 +1 −1 −1 −1 −j −1 −1 +1 +1 −1 −j −1 −j |
| +j +j +j −1 +j −j +j +j −j +1 −j +j −j −j −j +1 −j −j +j +j −j +1 −j +j −j −j −j +1 −j +j −j −j +j −1 |
| +j +j −j −j −j +1 −j −j +j +j −j +1 −j −1 +1 +1 +1 +j +1 −1 +1 +1 −1 −j −1 +1 −1 −1 −1 −j −1 |
| −1 +1 +1 −1 −j −1 −1 +1 +1 +1 +j +1 −1 +1 +1 −1 −j −1 −1 +1 +1 +1 +j +1 +1 −1 −1 +1 +j |
| +1 +j −j −j −j +1 −j +j −j −j +j −1 +j −j +j +j +j −1 +j +j −j −j +j −1 +j +j −j −j −j +1 −j +j −j −j |
| +j −1 +j +j −j −j −j +1 −j −j +j +j −j +1 −j −1 +1 +1 +1 +j +1 −1 +1 +1 −1 −j −1 +1 −1 −1 −1 |
| −j −1 −1 +1 +1 −1 −j −1 |
| The Sequence $Seq^{7}_{left,385}(k)$, to be transmitted from left to right, up to down |
| +1 +1 −1 −1 −1 −j −1 +1 −1 −1 +1 +j +1 +1 −1 −1 −1 −j −1 −1 +1 +1 −1 −j −1 +1 −1 −1 −1 −j |
| −1 +1 −1 −1 +1 +j +1 −1 +1 +1 +1 +j +1 +1 −1 −1 +1 +j +1 −1 +1 +1 +1 +j +1 −1 +1 +1 |
| −1 −j −1 −1 +1 +1 +1 +j +1 +1 −1 −1 +1 +j +1 +1 −1 −1 −1 −j −1 +1 −1 −1 +1 +j +1 −1 +1 |
| +1 +1 +j +1 +1 −1 −1 +1 +j +1 −j +j +j +j −1 +j −j +j +j −j +1 −j −j +j +j +j −1 +j +j −j −j |
| +j −1 +j −j +j +j +j −1 +j −j +j +j −j +1 −j +j −j −j −j +1 −j −j +j +j −j +1 −j −j +j +j +j −1 +j |
| −j +j +j −j +1 −j −j +j +j +j −1 +j +j −j −j +j −1 +j +j −j −j −j +1 −j +j −j −j +j −1 +j −j +j +j |
| +j −1 +j +j −j −j +j −1 +j −j +j +j +j −1 +j −j +j +j −j +1 −j −j +j +j +j −1 +j +j −j −j +j −1 +j |
| −j +j +j +j −1 +j −j +j +j −j +1 −j +j −j −j −j +1 −j −j +j +j −j +1 −j +j −j −j −j +1 −j +j −j −j +j |
| −1 +j +j −j −j −j +1 −j −j +j +j −j +1 −j −j +j +j +j −1 +j −j +j +j −j +1 −j +j −j −j −j +1 −j −j +j |
| +j −j +1 −j +1 −1 −1 −1 −j −1 +1 −1 −1 +1 +j +1 +1 −1 −1 −1 −j −1 −1 +1 +1 −1 −j −1 +1 −1 |
| −1 −1 −j −1 +1 −1 −1 +1 +j +1 −1 +1 +1 +1 +j +1 +1 −1 −1 +1 +j +1 +1 −1 −1 −1 −j −1 +1 |
| −1 −1 +1 +j +1 +1 −1 −1 −1 −j −1 −1 +1 +1 −1 −j −1 −1 +1 +1 +1 +j +1 −1 +1 +1 −1 −j −1 +1 |
| −1 −1 −1 −j −1 −1 +1 +1 −1 −j −1 |
| The Sequence $Seq^{8}_{left,385}(k)$, to be transmitted from left to right, up to down |
| +j +1 −1 −1 −1 −j −1 +1 −1 −1 +1 +j +1 +1 −1 −1 −1 −j −1 −1 +1 +1 −1 −j −1 +j −j −j −j +1 −j |
| +j −j −j +j −1 +j −j +j +j +j −1 +j +j −j −j +j −1 +j +1 −1 −1 −1 −j −1 +1 −1 −1 +1 +j +1 +1 |
| −1 −1 −1 −j −1 −1 +1 +1 −1 −j −1 −j +j +j +j −1 +j −j +j +j −j +1 −j +j −j −j −j +1 −j −j +j +j −j |
| +1 −j +1 −1 −1 −1 −j −1 +1 −1 −1 +1 +j +1 +1 −1 −1 −1 −j −1 −1 +1 +1 −1 −j −1 +j −j −j −j +1 |
| −j +j −j −j +j −1 +j −j +j +j +j −1 +j +j −j −j +j −1 +j −1 +1 +1 +1 +j +1 −1 +1 +1 −1 −j −1 |
| −1 +1 +1 +1 +j +1 +1 −1 −1 +1 +j +1 +j −j −j −j +1 −j +j −j −j +j −1 +j −j +j +j +j −1 +j +j |
| −j −j +j −1 +j −j +j +j +j −1 +j −j +j +j −j +1 −j −j +j +j +j −1 +j +j −j −j +j −1 +j +1 −1 −1 −1 |
| −j −1 +1 −1 −1 +1 +j +1 −1 +1 +1 +1 +j +1 +1 −1 −1 +1 +j +1 −j +j +j +j −1 +j −j +j +j −j |
| +1 −j −j +j +j +j −1 +j +j −j −j +j −1 +j −1 +1 +1 +1 +j +1 −1 +1 +1 −1 −j −1 +1 −1 −1 −1 −j |
| −1 −1 +1 +1 −1 −j −1 +j −j −j −j +1 −j +j −j −j +j −1 +j +j −j −j −j +1 −j −j +j +j −j +1 −j −1 +1 |
| +1 +1 +j +1 −1 +1 +1 −1 −j −1 +1 −1 −1 −1 −j −1 −1 +1 +1 −1 −j −1 −j +j +j +j −1 +j −j +j +j |
| −j +1 −j −j +j +j +j −1 +j +j −j −j +j −1 +j −1 +1 +1 +1 +j +1 −1 +1 +1 −1 −j −1 +1 −1 −1 −1 |
| −j −1 −1 +1 +1 −1 −j −1 |

TABLE 12

| The sequence $Seq^{iTX}_{right,385}(k)$ |
|---|
| The Sequence $Seq^{1}_{right,385}(k)$, to be transmitted from left to right, up to down |
| +j −j −j −j +1 −j +j −j −j +j −1 +j +j −j −j −j +1 −j −j +j +j −j +1 −j −1 +1 +1 +1 +j +1 −1 +1 |
| +1 −1 −j −1 +1 −1 −1 −1 −j −1 −1 +1 +1 −1 −j −1 −j +j +j +j −1 +j −j +j +j −j +1 −j −j +j +j +j |
| −1 +j +j −j −j +j −1 +j −1 +1 +1 +1 +j +1 −1 +1 +1 −1 −j −1 +1 −1 −1 −1 −j −1 −1 +1 +1 −1 |
| −j −1 −1 +1 +1 +1 +j +1 −1 +1 +1 −1 −j −1 −1 +1 +1 +1 +j +1 +1 −1 −1 +1 +j +1 −j +j +j |
| +j −1 +j −j +j +j −j +1 −j +j −j −j −j +1 −j −j +j +j −j +1 −j −1 +1 +1 +1 +j +1 −1 +1 +1 −1 −j |
| −1 −1 +1 +1 +1 +j +1 +1 −1 −1 +1 +j +1 +j −j −j −j +1 −j +j −j −j +j −1 +j −j +j +j +j −1 +j |
| +j −j −j +j −1 +j −1 +1 +1 +1 +j +1 −1 +1 +1 −1 −j −1 −1 +1 +1 +1 +j +1 +1 −1 −1 +1 +j |
| +1 −j +j +j +j −1 +j −j +j +j −j +1 −j +j −j −j −j +1 −j −j +j +j −j +1 −j +1 −1 −1 −1 −j −1 +1 |
| −1 −1 +1 +j +1 +1 −1 −1 −1 −j −1 −1 +1 +1 −1 −j −1 −j +j +j +j −1 +j −j +j +j −j +1 −j +j −j −j |
| −j +1 −j −j +j +j −j +1 −j +j −j −j −j +1 −j +j −j −j +j −1 +j +j −j −j −j +1 −j −j +j +j −j +1 −j −1 |
| +1 +1 +1 +j +1 −1 +1 +1 −1 −j −1 +1 −1 −1 −1 −j −1 −1 +1 +1 −1 −j −1 +j −j −j −j +1 −j +j −j |
| −j +j −1 +j +j −j −j −j +1 −j −j +j +j −j +1 −j +1 −1 −1 −1 −j −1 +1 −1 −1 +1 +j +1 −1 +1 +1 |
| +1 +j +1 +1 −1 −1 +1 +j +1 +j |

TABLE 12-continued

| The sequence $Seq^{iTX}_{right,385}(k)$ |
|---|
| The Sequence $Seq^{2}_{right,385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +1 −1 −1 −1 −j −1 |
| +1 −1 −1 +1 +j +1 −1 +1 +1 +1 +j +1 +1 −1 −1 +1 +j +1 −j +j +j +j −1 +j −j +j +j −j +1 −j |
| −j +j +j +j −1 +j +j −j −j +j −1 +j +j −j −j −j +1 −j +j −j −j +j −1 +j −j +j +j +j −1 +j +j −j −j |
| +j −1 +j −1 +1 +1 +1 +j +1 −1 +1 +1 −1 −j −1 −1 +1 +1 +1 +j +1 +1 −1 −1 +1 +j +1 −1 |
| +1 +1 +1 +j +1 −1 +1 +1 −1 −j −1 +1 −1 −1 −1 −j −1 −1 +1 +1 −1 −j −1 −j +j +j +j −1 +j −j |
| +j +j −j +1 −j −j +j +j +j −1 +j +j −j −j +j −1 +j +j −j −j −j +1 −j +j −j −j +j −1 +j −j +j +j +j |
| −1 +j +j −j −j +j −1 +j +j −j −j −j +1 −j +j −j −j +j −1 +j +j −j −j −j +1 −j −j +j +j −j +1 −j +j −j |
| −j −j +1 −j +j −j −j +j −1 +j −j +j +j +j −1 +j +j −j −j +j −1 +j +1 −1 −1 −1 −j −1 +1 −1 −1 +1 |
| +j +1 +1 −1 −1 −1 −j −1 −1 +1 +1 −1 −j −1 −1 +1 +1 +1 +j +1 −1 +1 +1 −1 −j −1 +1 −1 −1 −1 |
| −j −1 −1 +1 +1 −1 −j −1 +j −j −j −j +1 −j +j −j −j +j −1 +j +j −j −j −j +1 −j −j +j +j −j +1 −j +j |
| −j −j −j +1 −j +j −j −j +j −1 +j −j +j +j +j −1 +j +j −j −j +j −1 +j −1 +1 +1 +1 +j +1 −1 +1 +1 |
| −1 −j −1 −1 +1 +1 +1 +j +1 +1 −1 −1 +1 +j +1 +1 −1 −1 −1 −j −1 +1 −1 −1 +1 +j +1 −1 +1 |
| +1 +1 +j +1 +1 −1 −1 +1 +j +1 −1 |
| The Sequence $Seq^{3}_{right,385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 −j +j +j +j −1 +j −j |
| +j +j −j +1 −j +j −j −j −j +1 −j −j +j +j −j +1 −j +j −j −j −j +1 −j +j −j −j +j −1 +j +j −j −j −j +1 |
| −j −j +j +j −j +1 −j −1 +1 +1 +1 +j +1 −1 +1 +1 −1 −j −1 +1 −1 −1 −1 −j −1 −1 +1 +1 −1 −j −1 |
| +j −j −j −j +1 −j +j −j −j +j −1 +j +j −j −j −j +1 −j −j +j +j −j +1 −j +1 −1 −1 −1 −j −1 +1 −1 −1 |
| +1 +j +1 −1 +1 +1 +1 +j +1 +1 −1 −1 +1 +j +1 +1 −1 −1 −1 −j −1 +1 −1 −1 +1 +j +1 +1 |
| −1 −1 −1 −j −1 −1 +1 +1 −1 −j −1 +j −j −j −j +1 −j +j −j −j +j −1 +j −j +j +j +j −1 +j +j −j −j +j |
| −1 +j +j −j −j −j +1 −j +j −j −j +j −1 +j +j −j −j −j +1 −j −j +j +j −j +1 −j +1 −1 −1 −1 −j −1 +1 |
| −1 −1 +1 +j +1 −1 +1 +1 +1 +j +1 +1 −1 −1 +1 +j +1 −1 +1 +1 +1 +j +1 −1 +1 +1 −1 −j −1 |
| −1 +1 +1 +1 +j +1 +1 −1 −1 +1 +j +1 −j +j +j +j −1 +j −j +j +j −j +1 −j +j −j −j −j +1 −j −j |
| +j +j −j +1 −j +1 −1 −1 −1 −j −1 +1 −1 −1 +1 +j +1 +1 −1 −1 −1 −j −1 −1 +1 +1 −1 −j −1 −j +j |
| +j +j −1 +j −j +j +j −j +1 −j +j −j −j −j +1 −j −j +j +j −j +1 −j −j +j +j +j −1 +j −j +j +j −j +1 |
| −j −j +j +j +j −1 +j +j −j −j +j −1 +j +1 −1 −1 −1 −j −1 +1 −1 −1 +1 +j +1 −1 +1 +1 +1 +j +1 |
| +1 −1 −1 +1 +j +1 −j |
| The Sequence $Seq^{4}_{right,385}(k)$, to be transmitted from left to right, up to down |
| −j +j +j +j −1 +j −j +j +j −j +1 −j −j +j +j +j −1 +j +j −j −j +j −1 +j −1 +1 +1 +1 +j +1 −1 |
| +1 +1 −1 −j −1 +1 −1 −1 −1 −j −1 −1 +1 +1 −1 −j −1 −j +j +j +j −1 +j −j +j +j −j +1 −j −j +j +j |
| +j −1 +j +j −j −j +j −1 +j +1 −1 −1 −1 −j −1 +1 −1 −1 +1 +j +1 −1 +1 +1 +1 +j +1 +1 −1 −1 |
| +1 +j +1 −1 +1 +1 +1 +j +1 −1 +1 +1 −1 −j −1 −1 +1 +1 +1 +j +1 +1 −1 −1 +1 +j +1 +j |
| −j −j −j +1 −j +j −j −j +j −1 +j −j +j +j +j −1 +j +j −j −j +j −1 +j +1 −1 −1 −1 −j −1 +1 −1 −1 +1 |
| +j +1 +1 −1 −1 −1 −j −1 −1 +1 +1 −1 −j −1 +j −j −j −j +1 −j +j −j −j +j −1 +j −j +j +j +j −1 +j |
| +j −j −j +j −1 +j +1 −1 −1 −1 −j −1 +1 −1 −1 +1 +j +1 +1 −1 −1 −1 −j −1 −1 +1 +1 −1 −j −1 −j |
| +j +j +j −1 +j −j +j +j −j +1 −j +j −j −j −j +1 −j −j +j +j −j +1 −j +1 −1 −1 −1 −j −1 +1 −1 −1 |
| +1 +j +1 +1 −1 −1 −1 −j −1 −1 +1 +1 −1 −j −1 +j −j −j −j +1 −j +j −j −j +j −1 +j −j +j +j +j −1 |
| +j +j −j −j +j −1 +j +j −j −j −j +1 −j +j −j −j +j −1 +j +j −j −j −j +1 −j −j +j +j −j +1 −j +1 −1 |
| −1 −1 −j −1 +1 −1 −1 +1 +j +1 −1 +1 +1 +1 +j +1 +1 −1 −1 +1 +j +1 −j +j +j +j −1 +j −j +j |
| +j −j +1 −j −j +j +j +j −1 +j +j −j −j +j −1 +j +1 −1 −1 −1 −j −1 +1 −1 −1 +1 +j +1 −1 +1 +1 |
| +1 +j +1 +1 −1 −1 +1 +j +1 −j |
| The Sequence $Seq^{5}_{right,385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 −1 +1 +1 +1 +j +1 |
| −1 +1 +1 −1 −j −1 +1 −1 −1 −1 −j −1 −1 +1 +1 −1 −j −1 −j +j +j +j −1 +j −j +j +j −j +1 −j −j +j |
| +j +j −1 +j +j −j −j +j −1 +j −j +j +j +j −1 +j −j +j +j −j +1 −j +j −j −j −j +1 −j −j +j +j −j +1 |
| −j +1 −1 −1 −1 −j −1 +1 −1 −1 +1 +j +1 +1 −1 −1 −1 −j −1 −1 +1 +1 −1 −j −1 −1 +1 +1 +1 +j |
| +1 −1 +1 +1 −1 −j −1 +1 −1 −1 −1 −j −1 −1 +1 +1 −1 −j −1 +j −j −j −j +1 −j +j −j −j +j −1 +j +j |
| −j −j −j +1 −j −j +j +j −j +1 −j +j −j −j −j +1 −j +j −j −j +j −1 +j −j +j +j +j −1 +j +j −j −j +j −1 |
| +j +j −j −j −j +1 −j +j −j −j +j −1 +j +j −j −j −j +1 −j −j +j +j −j +1 −j −j +j +j +j −1 +j −j +j +j |
| −j +1 −j +j −j −j −j +1 −j −j +j +j −j +1 −j +1 −1 −1 −1 −j −1 +1 −1 −1 +1 +j +1 +1 −1 −1 −1 −j |
| −1 −1 +1 +1 −1 −j −1 +1 −1 −1 −1 −j −1 +1 −1 −1 +1 +j +1 −1 +1 +1 +1 +j +1 +1 −1 −1 +1 |
| +j +1 −j +j +j +j −1 +j −j +j +j −j +1 −j −j +j +j +j −1 +j +j −j −j +j −1 +j +j −j −j −j +1 −j +j |
| −j −j +j −1 +j −j +j +j +j −1 +j +j −j −j +j −1 +j +1 −1 −1 −1 −j −1 +1 −1 −1 +1 +j +1 +1 −1 |
| −1 −1 −j −1 −1 +1 +1 −1 −j −1 +1 −1 −1 −1 −j −1 +1 −1 −1 +1 +j +1 −1 +1 +1 +1 +j +1 +1 −1 |
| −1 +1 +j +1 −1 |
| The Sequence $Seq^{6}_{right,385}(k)$, to be transmitted from left to right, up to down |
| +j −j −j −j +1 −j +j −j −j +j −1 +j +j −j −j −j +1 −j −j +j +j −j +1 −j +1 −1 −1 −1 −j −1 +1 −1 −1 |
| +1 +j +1 −1 +1 +1 +1 +j +1 +1 −1 −1 +1 +j +1 −1 +1 +1 +1 +j +1 −1 +1 +1 −1 −j −1 −1 |
| +1 +1 +1 +j +1 +1 −1 −1 +1 +j +1 −j +j +j +j −1 +j −j +j +j −j +1 −j +j −j −j −j +1 −j −j +j |
| +j −j +1 −j +j −j −j −j +1 −j +j −j −j +j −1 +j +j −j −j −j +1 −j −j +j +j −j +1 −j +1 −1 −1 −1 −j |
| −1 +1 −1 −1 +1 +j +1 −1 +1 +1 +1 +j +1 +1 −1 −1 +1 +j +1 +1 −1 −1 −1 −j −1 +1 −1 −1 +1 |
| +j +1 +1 −1 −1 −1 −j −1 −1 +1 +1 −1 −j −1 +j −j −j −j +1 −j +j −j −j +j −1 +j −j +j +j +j −1 +j |
| +j −j −j +j −1 +j −1 +1 +1 +1 +j +1 −1 +1 +1 −1 −j −1 −1 +1 +1 +1 +j +1 +1 −1 −1 +1 +j |
| +1 +j −j −j −j +1 −j +j −j −j +j −1 +j −j +j +j +j −1 +j +j −j −j +j −1 +j −j +j +j +j −1 +j −j +j |
| +j −j +1 −j −j +j +j +j −1 +j +j −j −j +j −1 +j +1 −1 −1 −1 −j −1 +1 −1 −1 +1 +j +1 −1 +1 +1 |
| +1 +j +1 +1 −1 −1 +1 +j +1 +1 −1 −1 −1 −j −1 +1 −1 −1 +1 +j +1 +1 −1 −1 −1 −j −1 −1 +1 |
| +1 −1 −j −1 −j +j +j +j −1 +j −j +j +j −j +1 −j +j −j −j −j +1 −j −j +j +j −j +1 −j −j +j +j +j −1 |
| +j −j +j +j −j +1 −j −j +j +j +j −1 +j +j −j −j +j −1 +j +1 −1 −1 −1 −j −1 +1 −1 −1 +1 +j +1 −1 |
| +1 +1 +1 +j +1 +1 −1 −1 +1 +j +1 −1 |

TABLE 12-continued

| The sequence $Seq^{iTX}_{right,385}(k)$ |
|---|
| The Sequence $Seq^{7}_{right,385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +1 −1 −1 −1 −j −1 |
| +1 −1 −1 +1 +j +1 −1 +1 +1 +1 +j +1 +1 −1 −1 +1 +j +1 −1 +1 +1 +1 +j +1 −1 +1 +1 −1 |
| −j −1 −1 +1 +1 +1 +j +1 +1 −1 −1 +1 +j +1 +1 −1 −1 −1 −j −1 +1 −1 −1 +1 +j +1 −1 +1 +1 |
| +1 +j +1 +1 −1 −1 +1 +j +1 −j +j +j +j −1 +j −j +j +j −j +1 −j −j +j +j +j −1 +j +j −j −j +j |
| −1 +j −j +j +j +j −1 +j −j +j +j −j +1 −j +j −j −j −j +1 −j −j +j +j −j +1 −j −j +j +j +j −1 +j −j |
| +j +j −j +1 −j −j +j +j +j −1 +j +j −j −j +j −1 +j +j −j −j −j +1 −j +j −j −j +j −1 +j −j +j +j +j |
| −1 +j +j −j −j +j −1 +j +j −j −j −j +1 −j +j −j −j +j −1 +j +j −j −j −j +1 −j −j +j +j −j +1 −j +j −j |
| −j −j +1 −j +j −j −j +j −1 +j −j +j +j +j −1 +j +j −j −j +j −1 +j −j +j +j +j −1 +j −j +j +j −j +1 |
| −j −j +j +j +j −1 +j +j −j −j +j −1 +j +j −j −j −j +1 −j +j −j −j +j −1 +j −j +j +j +j −1 +j +j −j −j |
| +j −1 +j −1 +1 +1 +1 +j +1 −1 +1 +1 −1 −j −1 −1 +1 +1 +1 +j +1 +1 −1 −1 +1 +j +1 −1 |
| +1 +1 +1 +j +1 −1 +1 +1 −1 −j −1 +1 −1 −1 −1 −j −1 −1 +1 +1 −1 −j −1 −1 +1 +1 +1 +j +1 |
| −1 +1 +1 −1 −j −1 −1 +1 +1 +1 +j +1 +1 −1 −1 +1 +j +1 +1 −1 −1 −1 −j −1 +1 −1 −1 +1 +j |
| +1 −1 +1 +1 +1 +j +1 +1 −1 −1 +1 +j +1 −1 |
| The Sequence $Seq^{8}_{right,385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +j −j −j −j +1 −j +j |
| −j −j +j −1 +j −j +j +j +j −1 +j +j −j −j +j −1 +j +1 −1 −1 −1 −j −1 +1 −1 −1 +1 +j +1 +1 −1 |
| −1 −1 −j −1 −1 +1 +1 −1 −j −1 −j +j +j +j −1 +j −j +j +j −j +1 −j +j −j −j −j +1 −j −j +j +j −j +1 |
| −j +1 −1 −1 −1 −j −1 +1 −1 −1 +1 +j +1 +1 −1 −1 −1 −j −1 −1 +1 +1 −1 −j −1 +j −j −j −j +1 −j |
| +j −j −j +j −1 +j −j +j +j +j −1 +j +j −j −j +j −1 +j −1 +1 +1 +1 +j +1 −1 +1 +1 −1 −j −1 −1 |
| +1 +1 +1 +j +1 +1 −1 −1 +1 +j +1 +j −j −j −j +1 −j +j −j −j +j −1 +j −j +j +j +j −1 +j +j −j |
| −j +j −1 +j +j −j −j −j +1 −j +j −j −j +j −1 +j +j −j −j −j +1 −j −j +j +j −j +1 −j −1 +1 +1 +1 +j |
| +1 −1 +1 +1 −1 −j −1 +1 −1 −1 −1 −j −1 −1 +1 +1 −1 −j −1 +j −j −j −j +1 −j +j −j −j +j −1 +j +j |
| −j −j −j +1 −j −j +j +j −j +1 −j +1 −1 −1 −1 −j −1 +1 −1 −1 +1 +j +1 −1 +1 +1 +1 +j +1 +1 −1 |
| −1 +1 +j +1 −j +j +j +j −1 +j −j +j +j −j +1 −j −j +j +j +j −1 +j +j −j −j +j −1 +j +1 −1 −1 −1 |
| −j −1 +1 −1 −1 +1 +j +1 −1 +1 +1 +1 +j +1 +1 −1 −1 +1 +j +1 +j −j −j −j +1 −j +j −j −j +j |
| −1 +j +j −j −j −j +1 −j −j +j +j −j +1 −j +1 −1 −1 −1 −j −1 +1 −1 −1 +1 +j +1 −1 +1 +1 +1 +j |
| +1 +1 −1 −1 +1 +j +1 −j |

TABLE 13

| The sequence $Seq^{iTX}_{left,595}(k)$ |
|---|
| The Sequence $Seq^{1}_{left,595}(k)$, to be transmitted from left to right, up to down |
| −1 +1 −1 −1 −1 −j −j −1 −j −1 −1 +j −j −j −j +1 −j −j +j +j −j −j −j +1 −j +j −j −j +j −1 +j +1 −1 |
| −1 −1 −j −1 −1 +1 +1 −1 −j −1 −1 +1 +1 +1 +j +1 −1 +1 +1 −1 −j −1 −j +j +j +j −1 +j +j −j −j |
| +j −1 +j +j −j −j −j +1 −j +j −j −j +j −1 +j +1 −1 −1 −1 −j −1 −1 +1 +1 −1 −j −1 +1 −1 −1 −1 −j |
| −1 +1 −1 −1 +1 +j +1 +j −j −j −j +1 −j −j +j +j −j +1 −j +1 −1 −1 −1 −j −1 +1 −1 −1 +1 +j +1 |
| −j +j +j +j −1 +j +j −j −j +j −1 +j +j −j −j −j +1 −j +j −j −j +j −1 +j −1 +1 +1 +1 +j +1 +1 −1 |
| −1 +1 +j +1 −1 +1 +1 +1 +j +1 −1 +1 +1 −1 −j −1 +j −j −j −j +1 −j −j +j +j −j +1 −j +j −j −j |
| −j +1 −j +j −j −j +j −1 +j −1 +1 +1 +1 +j +1 +1 −1 −1 +1 +j +1 −1 +1 +1 +1 +j +1 −1 +1 |
| +1 −1 −j −1 +j −j −j −j +1 −j −j +j +j −j +1 −j −j +j +j +j −1 +j −j +j +j −j +1 −j +1 −1 −1 −1 −j |
| −1 −1 +1 +1 −1 −j −1 −1 +1 +1 +1 +j +1 −1 +1 +1 −1 −j −1 +j −j −j −j +1 −j −j +j +j −j +1 −j |
| +j −j −j −j +1 −j +j −j −j +j −1 +j −1 +1 +1 +1 +j +1 +1 −1 −1 +1 +j +1 +j −j −j −j +1 −j +j −j |
| −j +j −1 +j +1 −1 −1 −1 −j −1 −1 +1 +1 −1 −j −1 −1 +1 +1 +1 +j +1 −1 +1 +1 −1 −j −1 −j +j |
| +j +j −1 +j +j −j −j +j −1 +j −j +j +j +j −1 +j −j +j +j −j +1 −j −1 +1 +1 +1 +j +1 +1 −1 −1 |
| +1 +j +1 −1 +1 +1 +1 +j +1 −1 +1 +1 −1 −j −1 −j +j +j +j −1 +j +j −j −j +j −1 +j +j −j −j −j |
| +1 −j +j −j −j +j −1 +j +1 −1 −1 −1 −j −1 −1 +1 +1 −1 −j −1 −1 +1 +1 +1 +j +1 −1 +1 +1 −1 |
| −j −1 −j +j +j +j −1 +j +j −j −j +j −1 +j +j −j −j −j +1 −j +j −j −j +j −1 +j +1 −1 −1 −1 −j −1 −1 |
| +1 +1 −1 −j −1 +1 −1 −1 −1 −j −1 +1 −1 −1 +1 +j +1 +j −j −j −j +1 −j −j +j +j −j +1 −j +1 −1 |
| −1 −1 −j −1 +1 −1 −1 +1 +j +1 −j +j +j +j −1 +j +j −j −j +j −1 +j +j −j −j −j +1 −j +j −j −j +j −1 |
| +j −1 +1 +1 +1 +j +1 +1 −1 −1 +1 +j +1 −1 +1 +1 +1 +j +1 −1 +1 +1 −1 −j −1 +j −j −j −j |
| +1 −j −j +j +j −j +1 −j +j −j −j −j +1 −j +j −j −j +j −1 +j −1 +1 +1 +1 +j +1 +1 −1 −1 +1 +j |
| +1 |
| The Sequence $Seq^{2}_{left,595}(k)$, to be transmitted from left to right, up to down |
| −j −j −1 +j +1 −j −1 +1 +j +1 +j +1 +j −1 −j −1 −1 +j +1 +1 −1 −1 −1 −j −1 +1 −1 −1 +1 +j |
| +1 +1 −1 −1 −1 −j −1 −1 +1 +1 −1 −j −1 +j −j −j −j +1 −j +j −j −j +j −1 +j −j +j +j +j −1 +j +j |
| −j −j +j −1 +j +1 −1 −1 −1 −j −1 +1 −1 −1 +1 +j +1 +1 −1 −1 −1 −j −1 −1 +1 +1 −1 −j −1 −j +j |
| +j +j −1 +j −j +j +j −j +1 −j +j −j −j −j +1 −j −j +j +j −j +1 −j −j +j +j +j −1 +j −j +j +j −j +1 |
| −j −j +j +j +j −1 +j +j −j −j +j −1 +j +1 −1 −1 −1 −j −1 +1 −1 −1 +1 +j +1 −1 +1 +1 +1 +j +1 |
| +1 −1 −1 +1 +j +1 +j −j −j −j +1 −j +j −j −j +j −1 +j +j −j −j −j +1 −j −j +j +j −j +1 −j +1 −1 |
| −1 −1 −j −1 +1 −1 −1 +1 +j +1 −1 +1 +1 +1 +j +1 +1 −1 −1 +1 +j +1 +j −j −j −j +1 −j +j −j −j |
| +j −1 +j +j −j −j −j +1 −j −j +j +j −j +1 −j −1 +1 +1 +1 +j +1 −1 +1 +1 −1 −j −1 +1 −1 −1 −1 |
| −j −1 −1 +1 +1 −1 −j −1 +j −j −j −j +1 −j +j −j −j +j −1 +j +j −j −j −j +1 −j −j +j +j −j +1 −j +1 |
| −1 −1 −1 −j −1 +1 −1 −1 +1 +j +1 −1 +1 +1 +1 +j +1 +1 −1 −1 +1 +j +1 +1 −1 −1 −1 −j −1 |
| +1 −1 −1 +1 +j +1 +1 −1 −1 −1 −j −1 −1 +1 +1 −1 −j −1 +j −j −j −j +1 −j +j −j −j +j −1 +j −j +j |
| +j +j −1 +j +j −j −j +j −1 +j −1 +1 +1 +1 +j +1 −1 +1 +1 −1 −j −1 −1 +1 +1 +1 +j +1 +1 |
| −1 −1 +1 +j +1 +j −j −j −j +1 −j +j −j −j +j −1 +j −j +j +j +j −1 +j +j −j −j +j −1 +j +1 −1 −1 |
| −1 −j −1 +1 −1 −1 +1 +j +1 +1 −1 −1 −1 −j −1 −1 +1 +1 −1 −j −1 +j −j −j −j +1 −j +j −j −j +j −1 |
| +j −j +j +j +j −1 +j +j −j −j +j −1 +j +1 −1 −1 −1 −j −1 +1 −1 −1 +1 +j +1 +1 −1 −1 −1 −j −1 |
| −1 +1 +1 −1 −j −1 −j +j +j +j −1 +j −j +j +j −j +1 −j +j −j −j −j +1 −j −j +j +j −j +1 −j −j +j +j |

TABLE 13-continued

| The sequence $Seq^{iTX}_{left,595}(k)$ |
|---|
| +j –1 +j –j +j +j –j +1 –j –j +j +j +j –1 +j +j –j –j +j –1 +j +1 –1 –1 –1 –j –1 +1 –1 –1 +1 +j |
| +1 –1 +1 +1 +1 +j +1 +1 –1 –1 +1 +j +1 +j –j –j –j +1 –j +j –j –j +j –1 +j +j –j –j –j +1 –j |
| –j +j +j –j +1 –j +1 –1 –1 –1 –j –1 +1 –1 –1 +1 +j +1 –1 +1 +1 +1 +j +1 +1 –1 –1 +1 +j +1 |
| The Sequence $Seq^{3}_{left,595}(k)$, to be transmitted from left to right, up to down |
| +j +1 –1 –j +j +j –j –1 –1 +1 +j –j –1 +j –j –j +1 –1 +j –j +j +j +j –1 +j –j +j +j –j +1 –j +j |
| –j –j –j +1 –j –j +j +j –j +1 –j –1 +1 +1 +1 +j +1 –1 +1 +1 –1 –j –1 –1 +1 +1 +1 +j +1 +1 |
| –1 –1 +1 +j +1 +1 –1 –1 –1 –j –1 +1 –1 –1 +1 +j +1 –1 +1 +1 +1 +j +1 +1 –1 –1 +1 +j +1 |
| +j –j –j –j +1 –j +j –j –j +j –1 +j +j –j –j –j +1 –j –j +j +j –j +1 –j –1 +1 +1 +1 +j +1 –1 +1 |
| +1 –1 –j –1 +1 –1 –1 –1 –j –1 –1 +1 +1 –1 –j –1 +j –j –j –j +1 –j +j –j –j +j –1 +j +j –j –j –j |
| +1 –j –j +j +j –j +1 –j +j –j –j –j +1 –j +j –j –j +j –1 +j –j +j +j +j –1 +j +j –j –j +j –1 +j –1 |
| +1 +1 +1 +j +1 –1 +1 +1 –1 –j –1 –1 +1 +1 +1 +j +1 +1 –1 –1 +1 +j +1 +1 –1 –1 –1 –j –1 |
| +1 –1 –1 +1 +j +1 –1 +1 +1 +1 +j +1 +1 –1 –1 +1 +j +1 –j +j +j +j –1 +j –j +j +j –j +1 –j |
| –j +j +j +j –1 +j +j –j –j +j –1 +j +j –j –j –j +1 –j +j –j –j +j –1 +j –j +j +j +j –1 +j +j –j –j |
| +j –1 +j –1 +1 +1 +1 +j +1 –1 +1 +1 –1 –j –1 –1 +1 +1 +1 +j +1 +1 –1 –1 +1 +j +1 –j +j |
| +j +j –1 +j –j +j +j –j +1 –j +j –j –j –j +1 –j –j +j +j –j +1 –j –1 +1 +1 +1 +j +1 –1 +1 +1 |
| –1 –j –1 –1 +1 +1 +1 +j +1 +1 –1 –1 +1 +j +1 –1 +1 +1 +1 +j +1 –1 +1 +1 –1 –j –1 +1 –1 |
| –1 –1 –j –1 –1 +1 +1 –1 –j –1 –j +j +j +j –1 +j –j +j +j –j +1 –j –j +j +j +j –1 +j +j –j –j +j |
| –1 +j –j +j +j +j –1 +j –j +j +j –j +1 –j +j –j –j –j +1 –j –j +j +j –j +1 –j –1 +1 +1 +1 +j +1 |
| –1 +1 +1 –1 –j –1 –1 +1 +1 +1 +j +1 +1 –1 –1 +1 +j +1 +1 –1 –1 –1 –j –1 +1 –1 –1 +1 +j |
| +1 –1 +1 +1 +1 +j +1 +1 –1 –1 +1 +j +1 +j –j –j –j +1 –j +j –j –j +j –1 +j +j –j –j –j +1 –j |
| –j +j +j –j +1 –j –1 +1 +1 +1 +j +1 –1 +1 +1 –1 –j –1 +1 –1 –1 –1 –j –1 –1 +1 +1 –1 –j –1 +j |
| –j –j –j +1 –j +j –j –j +j –1 +j +j –j –j –j +1 –j –j +j +j –j +1 –j +j –j –j –j +1 –j +j –j –j +j –1 |
| +j –j +j +j +j –1 +j +j –j –j +j –1 +j –1 +1 +1 +1 +j +1 –1 +1 +1 –1 –j –1 –1 +1 +1 +1 +j |
| +1 +1 –1 –1 +1 +j +1 |
| The Sequence $Seq^{4}_{left,595}(k)$, to be transmitted from left to right, up to down |
| –j +j +1 +j –1 +1 +1 –1 +1 –j +1 +j –1 –1 +j +j +1 +1 +1 +j –j –j –j +1 –j +j –j –j +j –1 +j |
| –j +j +j +j –1 +j +j –j –j +j –1 +j +j –j –j –j +1 –j +j –j –j +j –1 +j +j –j –j –j +1 –j –j +j +j –j |
| +1 –j –j +j +j +j –1 +j –j +j +j –j +1 –j +j –j –j –j +1 –j –j +j +j –j +1 –j +j –j –j –j +1 –j +j –j |
| –j +j –1 +j +j –j –j –j +1 –j –j +j +j –j +1 –j +1 –1 –1 –1 –j –1 +1 –1 –1 +1 +j +1 –1 +1 +1 |
| +1 +j +1 +1 –1 –1 +1 +j +1 +1 –1 –1 –1 –j –1 +1 –1 –1 +1 +j +1 +1 –1 –1 –1 –j –1 –1 +1 |
| +1 –1 –j –1 +1 –1 –1 –1 –j –1 +1 –1 –1 +1 +j +1 –1 +1 +1 +1 +j +1 +1 –1 –1 +1 +j +1 –1 |
| +1 +1 +1 +j +1 –1 +1 +1 –1 –j –1 –1 +1 +1 +1 +j +1 +1 –1 –1 +1 +j +1 –1 +1 +1 +1 +j |
| +1 –1 +1 +1 –1 –j –1 +1 –1 –1 –1 –j –1 –1 +1 +1 –1 –j –1 –1 +1 +1 +1 +j +1 –1 +1 +1 –1 –j |
| –1 –1 +1 +1 +1 +j +1 +1 –1 –1 +1 +j +1 +1 –1 –1 –1 –j –1 +1 –1 –1 +1 +j +1 –1 +1 +1 |
| +1 +j +1 +1 –1 –1 +1 +j +1 –1 +1 +1 +1 +j +1 –1 +1 +1 –1 –j –1 –1 +1 +1 +1 +j +1 +1 |
| –1 –1 +1 +j +1 +j –j –j –j +1 –j +j –j –j +j –1 +j –j +j +j +j –1 +j +j –j –j +j –1 +j +j –j –j –j |
| +1 –j +j –j –j +j –1 +j +j –j –j –j +1 –j –j +j +j –j +1 –j +j –j –j –j +1 –j +j –j –j +j –1 +j –j +j |
| +j +j –1 +j +j –j –j +j –1 +j –j +j +j +j –1 +j –j +j +j –j +1 –j –j +j +j +j –1 +j +j –j –j +j –1 |
| +j +j –j –j –j +1 –j +j –j –j +j –1 +j –j +j +j +j –1 +j +j –j –j +j –1 +j +j –j –j –j +1 –j +j –j –j |
| +j –1 +j +j –j –j –j +1 –j –j +j +j –j +1 –j –j +j +j +j –1 +j –j +j +j –j +1 –j +j –j –j –j +1 –j –j |
| +j +j –j +1 –j +j –j –j –j +1 –j +j –j –j +j –1 +j +j –j –j –j +1 –j –j +j +j –j +1 –j +1 –1 –1 –1 |
| –j –1 +1 –1 –1 +1 +j +1 –1 +1 +1 +1 +j +1 +1 –1 –1 +1 +j +1 +1 –1 –1 –1 –j –1 +1 –1 –1 |
| +1 +j +1 +1 –1 –1 –1 –j –1 –1 +1 +1 –1 –j –1 +1 –1 –1 –1 –j –1 +1 –1 –1 +1 +j +1 –1 +1 +1 |
| +1 +j +1 +1 –1 –1 +1 +j +1 –1 +1 +1 +1 +j +1 –1 +1 +1 –1 –j –1 –1 +1 +1 +1 +j +1 +1 |
| –1 –1 +1 +j +1 |
| The Sequence $Seq^{5}_{left,595}(k)$, to be transmitted from left to right, up to down |
| +j –1 –j –1 –j +j +j –1 +j –1 –1 +1 –j +1 +1 –1 –1 –j –j +1 –1 –1 –1 –j –1 +1 –1 –1 +1 +j +1 |
| –1 +1 +1 +1 +j +1 +1 –1 –1 +1 +j +1 –1 +1 +1 +1 +j +1 –1 +1 +1 –1 –j –1 –1 +1 +1 +1 |
| +j +1 +1 –1 –1 +1 +j +1 +j –j –j –j +1 –j +j –j –j +j –1 +j –j +j +j +j –1 +j +j –j –j +j –1 +j |
| +j –j –j –j +1 –j +j –j –j +j –1 +j +j –j –j –j +1 –j –j +j +j –j +1 –j –j +j +j +j –1 +j –j +j +j –j |
| +1 –j +j –j –j –j +1 –j –j +j +j –j +1 –j +j –j –j –j +1 –j +j –j –j +j –1 +j +j –j –j –j +1 –j –j +j |
| +j –j +1 –j –1 +1 +1 +1 +j +1 –1 +1 +1 –1 –j –1 +1 –1 –1 –1 –j –1 –1 +1 +1 –1 –j –1 –1 +1 |
| +1 +1 +j +1 –1 +1 +1 –1 –j –1 –1 +1 +1 +1 +j +1 +1 –1 –1 +1 +j +1 +j –j –j –j +1 –j +j –j |
| –j +j –1 +j –j +j +j +j –1 +j +j –j –j +j –1 +j –j +j +j +j –1 +j –j +j +j –j +1 –j –j +j +j +j –1 |
| +j +j –j –j +j –1 +j –1 +1 +1 +1 +j +1 –1 +1 +1 –1 –j –1 +1 –1 –1 –1 –j –1 –1 +1 +1 –1 –j |
| –1 –1 +1 +1 +1 +j +1 –1 +1 +1 –1 –j –1 –1 +1 +1 +1 +j +1 +1 –1 –1 +1 +j +1 +1 –1 –1 –1 |
| –j –1 +1 –1 –1 +1 +j +1 –1 +1 +1 +1 +j +1 +1 –1 –1 +1 +j +1 –1 +1 +1 +1 +j +1 –1 +1 |
| +1 –1 –j –1 –1 +1 +1 +1 +j +1 +1 –1 –1 +1 +j +1 –j +j +j +j –1 +j –j +j +j –j +1 –j +j –j –j |
| –j +1 –j –j +j +j –j +1 –j –j +j +j +j –1 +j –j +j +j –j +1 –j –j +j +j +j –1 +j +j –j –j +j –1 +j |
| +1 –1 –1 –1 –j –1 +1 –1 –1 +1 +j +1 –1 +1 +1 +1 +j +1 +1 –1 –1 +1 +j +1 –1 +1 +1 +1 |
| +j +1 –1 +1 +1 –1 –j –1 –1 +1 +1 +1 +j +1 +1 –1 –1 +1 +j +1 +j –j –j –j +1 –j +j –j –j +j |
| –1 +j –j +j +j +j –1 +j +j –j –j +j –1 +j +j –j –j –j +1 –j +j –j –j +j –1 +j +j –j –j –j +1 –j –j +j |
| +j –j +1 –j –j +j +j +j –1 +j –j +j +j –j +1 –j +j –j –j –j +1 –j –j +j +j –j +1 –j +j –j –j –j +1 –j |
| +j –j –j +j –1 +j +j –j –j –j +1 –j –j +j +j –j +1 –j –1 +1 +1 +1 +j +1 –1 +1 +1 –1 –j –1 +1 |
| –1 –1 –1 –j –1 –1 +1 +1 –1 –j –1 –1 +1 +1 +1 +j +1 –1 +1 +1 –1 –j –1 –1 +1 +1 +1 +j +1 |
| +1 –1 –1 +1 +j +1 |
| The Sequence $Seq^{6}_{left,595}(k)$, to be transmitted from left to right, up to down |
| +1 +j +j +j –j –j –1 –1 –1 +j +j –j +j +j +1 –1 –j +j –j –1 +1 +1 +1 +j +1 –1 +1 +1 –1 –j –1 |
| –j +j +j +j –1 +j +j –j –j +j –1 +j –1 +1 +1 +1 +j +1 –1 +1 +1 –1 –j –1 +j –j –j –j +1 –j –j +j |
| +j –j +1 –j +1 –1 –1 –1 –j –1 +1 –1 –1 +1 +j +1 +j –j –j –j +1 –j –j +j +j –j +1 –j –1 +1 +1 |
| +1 +j +1 –1 +1 +1 –1 –j –1 +j –j –j –j +1 –j –j +j +j –j +1 –j +j –j –j –j +1 –j +j –j –j +j –1 +j |
| –1 +1 +1 +1 +j +1 +1 –1 –1 +1 +j +1 +j –j –j –j +1 –j +j –j –j +j –1 +j +1 –1 –1 –1 –j –1 –1 |
| +1 +1 –1 –j –1 +j –j –j –j +1 –j +j –j –j +j –1 +j –1 +1 +1 +1 +j +1 +1 –1 –1 +1 +j +1 –j +j |
| +j +j –1 +j –j +j +j –j +1 –j –1 +1 +1 +1 +j +1 +1 –1 –1 +1 +j +1 –j +j +j +j –1 +j –j +j |

TABLE 13-continued

| The sequence $Seq^{iTX}_{left,595}(k)$ |
| --- |
| +j −j +1 −j +1 −1 −1 −1 −j −1 −1 +1 +1 −1 −j −1 −j +j +j +j −1 +j −j +j +j −j +1 −j −1 +1 +1 |
| +1 +j +1 +1 −1 −1 +1 +j +1 +j −j −j −j +1 −j +j −j −j +j −1 +j −1 +1 +1 +1 +j +1 +1 −1 −1 |
| +1 +j +1 −j +j +j +j −1 +j −j +j +j −j +1 −j −1 +1 +1 +1 +j +1 +1 −1 −1 +1 +j +1 −1 +1 |
| +1 +1 +j +1 −1 +1 +1 −1 −j −1 −j +j +j +j −1 +j +j −j −j +j −1 +j −1 +1 +1 +1 +j +1 −1 +1 |
| +1 −1 −j −1 +j −j −j −j +1 −j −j +j +j −j +1 −j −1 +1 +1 +1 +j +1 −1 +1 +1 −1 −j −1 −j +j +j |
| +j −1 +j +j −j −j +j −1 +j +1 −1 −1 −1 −j −1 +1 −1 −1 +1 +j +1 −j +j +j +j −1 +j +j −j −j +j −1 |
| +j −1 +1 +1 +1 +j +1 −1 +1 +1 −1 −j −1 −j +j +j +j −1 +j +j −j −j +j −1 +j −1 +1 +1 +1 +j |
| +1 −1 +1 +1 −1 −j −1 +j −j −j −j +1 −j −j +j +j −j +1 −j +1 −1 −1 −1 −j −1 +1 −1 −1 +1 +j +1 |
| +j −j −j −j +1 −j −j +j +j −j +1 −j −1 +1 +1 +1 +j +1 −1 +1 +1 −1 −j −1 +j −j −j −j +1 −j −j +j |
| +j −j +1 −j +j −j −j −j +1 −j +j −j −j +j −1 +j −1 +1 +1 +1 +j +1 +1 −1 −1 +1 +j +1 +j −j −j −j |
| +1 −j +j −j −j +j −1 +j +1 −1 −1 −1 −j −1 −1 +1 +1 −1 −j −1 +j −j −j −j +1 −j +j −j −j +j −1 +j |
| −1 +1 +1 +1 +j +1 +1 −1 −1 +1 +j +1 −j +j +j +j −1 +j −j +j +j −j +1 −j −1 +1 +1 +1 +j +1 |
| +1 −1 −1 +1 +j +1 |
| The Sequence $Seq^{7}_{left,595}(k)$, to be transmitted from left to right, up to down |
| +1 −1 +j +1 +1 −j +1 +j −1 −1 −1 −1 +1 +1 +1 −1 −1 +j −1 −j +j +j +j −1 +j −j +j +j −j +1 −j |
| +1 −1 −1 −1 −j −1 −1 +1 +1 −1 −j −1 −j +j +j +j −1 +j −j +j +j −j +1 −j −1 +1 +1 +1 +j +1 +1 |
| −1 −1 +1 +j +1 +1 −1 −1 −1 −j −1 +1 −1 −1 +1 +j +1 +j −j −j −j +1 −j −j +j +j −j +1 −j −1 +1 |
| +1 +1 +j +1 −1 +1 +1 −1 −j −1 +j −j −j −j +1 −j −j +j +j −j +1 −j −1 +1 +1 +1 +j +1 −1 +1 |
| +1 −1 −j −1 −j +j +j +j −1 +j +j −j −j +j −1 +j −1 +1 +1 +1 +j +1 −1 +1 +1 −1 −j −1 +j −j −j |
| −j +1 −j −j +j +j −j +1 −j +j −j −j −j +1 −j +j −j −j +j −1 +j −1 +1 +1 +1 +j +1 +1 −1 −1 +1 +j |
| +1 −j +j +j +j −1 +j −j +j +j −j +1 −j −1 +1 +1 +1 +j +1 +1 −1 −1 +1 +j +1 +1 −1 −1 −1 −j |
| −1 +1 −1 −1 +1 +j +1 +j −j −j −j +1 −j −j +j +j −j +1 −j +1 −1 −1 −1 −j −1 +1 −1 −1 +1 +j +1 |
| −j +j +j +j −1 +j +j −j −j +j −1 +j +j −j −j −j +1 −j +j −j −j +j −1 +j −1 +1 +1 +1 +j +1 +1 −1 |
| −1 +1 +j +1 −j +j +j +j −1 +j −j +j +j −j +1 −j −1 +1 +1 +1 +j +1 +1 −1 −1 +1 +j +1 −j +j |
| +j +j −1 +j −j +j +j −j +1 −j +1 −1 −1 −1 −j −1 −1 +1 +1 −1 −j −1 −j +j +j +j −1 +j −j +j +j −j |
| +1 −j −1 +1 +1 +1 +j +1 +1 −1 −1 +1 +j +1 −1 +1 +1 +1 +j +1 −1 +1 +1 −1 −j −1 −j +j +j |
| +j −1 +j +j −j −j +j −1 +j +1 −1 −1 −1 −j −1 +1 −1 −1 +1 +j +1 −j +j +j +j −1 +j +j −j −j +j −1 |
| +j −j +j +j +j −1 +j −j +j +j −j +1 −j +1 −1 −1 −1 −j −1 −1 +1 +1 −1 −j −1 −j +j +j +j −1 +j −j |
| +j +j −j +1 −j −1 +1 +1 +1 +j +1 +1 −1 −1 +1 +j +1 +1 −1 −1 −1 −j −1 +1 −1 −1 +1 +j +1 |
| +j −j −j −j +1 −j −j +j +j −j +1 −j −1 +1 +1 +1 +j +1 −1 +1 +1 −1 −j −1 +j −j −j −j +1 −j −j +j |
| +j −j +1 −j −1 +1 +1 +1 +j +1 −1 +1 +1 −1 −j −1 −j +j +j +j −1 +j +j −j −j +j −1 +j −1 +1 +1 |
| +1 +j +1 −1 +1 +1 −1 −j −1 +j −j −j −j +1 −j −j +j +j −j +1 −j +j −j −j −j +1 −j +j −j −j +j −1 +j |
| −1 +1 +1 +1 +j +1 +1 −1 −1 +1 +j +1 −j +j +j +j −1 +j −j +j +j −j +1 −j −1 +1 +1 +1 +j |
| +1 +1 −1 −1 +1 +j +1 |
| The Sequence $Seq^{8}_{left,595}(k)$, to be transmitted from left to right, up to down |
| −j −j +1 +1 −1 −j −j +j −j +1 −j −1 +j −j −1 −1 −j −j +j +1 −1 −1 −1 −j −1 +1 −1 −1 +1 +j +1 −1 |
| +1 +1 +1 +j +1 +1 −1 −1 +1 +j +1 −j +j +j +j −1 +j −j +j +j −j +1 −j −j +j +j +j −1 +j +j −j |
| −j +j −1 +j +1 −1 −1 −1 −j −1 +1 −1 −1 +1 +j +1 −1 +1 +1 +1 +j +1 +1 −1 −1 +1 +j +1 +j |
| −j −j −j +1 −j +j −j −j +j −1 +j +j −j −j −j +1 −j −j +j +j −j +1 −j −j +j +j +j −1 +j −j +j +j −j +1 |
| −j +j −j −j −j +1 −j −j +j +j −j +1 −j −1 +1 +1 +1 +j +1 −1 +1 +1 −1 −j −1 −1 +1 +1 +1 +j +1 |
| +1 −1 −1 +1 +j +1 +j −j −j −j +1 −j +j −j −j +j −1 +j −j +j +j +j −1 +j +j −j −j +j −1 +j −1 +1 |
| +1 +1 +j +1 −1 +1 +1 −1 −j −1 −1 +1 +1 +1 +j +1 +1 −1 −1 +1 +j +1 +j −j −j −j +1 −j +j −j |
| −j +j −1 +j −j +j +j +j −1 +j +j −j −j +j −1 +j +1 −1 −1 −1 −j −1 +1 −1 −1 +1 +j +1 +1 −1 −1 |
| −1 −j −1 −1 +1 +1 −1 −j −1 +j −j −j −j +1 −j +j −j −j +j −1 +j −j +j +j +j −1 +j +j −j −j +j −1 +j |
| −1 +1 +1 +1 +j +1 −1 +1 +1 −1 −j −1 −1 +1 +1 +1 +j +1 +1 −1 −1 +1 +j +1 +1 −1 −1 −1 −j |
| −1 +1 −1 −1 +1 +j +1 −1 +1 +1 +1 +j +1 +1 −1 −1 +1 +j +1 −j +j +j +j −1 +j −j +j +j −j |
| +1 −j −j +j +j +j −1 +j +j −j −j +j −1 +j −1 +1 +1 +1 +j +1 −1 +1 +1 −1 −j −1 +1 −1 −1 −1 −j |
| −1 −1 +1 +1 −1 −j −1 −j +j +j +j −1 +j −j +j +j −j +1 −j −j +j +j +j −1 +j +j −j −j +j −1 +j +1 |
| −1 −1 −1 −j −1 +1 −1 −1 +1 +j +1 −1 +1 +1 +1 +j +1 +1 −1 −1 +1 +j +1 −j +j +j +j −1 +j −j |
| +j +j −j +1 −j −j +j +j +j −1 +j +j −j −j +j −1 +j +1 −1 −1 −1 −j −1 +1 −1 −1 +1 +j +1 −1 +1 |
| +1 +1 +j +1 +1 −1 −1 +1 +j +1 +j −j −j −j +1 −j +j −j −j +j −1 +j +j −j −j −j +1 −j −j +j +j −j |
| +1 −j −j +j +j +j −1 +j −j +j +j −j +1 −j +j −j −j −j +1 −j −j +j +j −j +1 −j −1 +1 +1 +1 +j +1 |
| −1 +1 +1 −1 −j −1 −1 +1 +1 +1 +j +1 +1 −1 −1 +1 +j +1 +j −j −j −j +1 −j +j −j −j +j −1 +j −j |
| +j +j +j −1 +j +j −j −j +j −1 +j −1 +1 +1 +1 +j +1 −1 +1 +1 −1 −j −1 −1 +1 +1 +1 +j +1 |
| +1 −1 −1 +1 +j +1 |

TABLE 14

| The sequence $Seq^{iTX}_{right,595}(k)$ |
| --- |
| The Sequence $Seq^{1}_{right,595}(k)$, to be transmitted from left to right, up to down |
| −j +j +j +j −1 +j −j +j +j −j +1 −j −1 +1 +1 +1 +j +1 +1 −1 −1 +1 +j +1 +1 −1 −1 −1 −j −1 |
| +1 −1 −1 +1 +j +1 +j −j −j −j +1 −j −j +j +j −j +1 −j −j +j +j +j −1 +j −j +j +j −j +1 −j −1 +1 |
| +1 +1 +j +1 +1 −1 −1 +1 +j +1 −1 +1 +1 +1 +j +1 −1 +1 +1 −1 −j −1 −j +j +j +j −1 +j +j |
| −j −j +j −1 +j +1 −1 −1 −1 −j −1 +1 −1 −1 +1 +j +1 −j +j +j +j −1 +j +j −j −j +j −1 +j +j −j −j |
| −j +1 −j +j −j −j +j −1 +j −1 +1 +1 +1 +j +1 +1 −1 −1 +1 +j +1 −1 +1 +1 +1 +j +1 −1 +1 |
| +1 −1 −j −1 +j −j −j −j +1 −j −j +j +j −j +1 −j +j −j −j −j +1 −j +j −j −j +j −1 +j −1 +1 +1 +1 +j |
| +1 +1 −1 −1 +1 +j +1 +j −j −j −j +1 −j +j −j −j +j −1 +j +1 −1 −1 −1 −j −1 −1 +1 +1 −1 −j −1 |
| −1 +1 +1 +1 +j +1 −1 +1 +1 −1 −j −1 −j +j +j +j −1 +j +j −j −j +j −1 +j +j −j −j −j +1 −j +j −j |
| −j +j −1 +j +1 −1 −1 −1 −j −1 −1 +1 +1 −1 −j −1 +1 −1 −1 −1 −j −1 +1 −1 −1 +1 +j +1 +j −j −j |
| −j +1 −j −j +j +j −j +1 −j −1 +1 +1 +1 +j +1 −1 +1 +1 −1 −j −1 +j −j −j −j +1 −j −j +j +j −j +1 |
| −j −j +j +j +j −1 +j −j +j +j −j +1 −j +1 −1 −1 −1 −j −1 −1 +1 +1 −1 −j −1 +1 −1 −1 −1 −j −1 +1 |

TABLE 14-continued

| The sequence $Seq^{iTX}_{right,595}(k)$ |
|---|
| −1 −1 +1 +j +1 −j +j +j +j −1 +j +j −j −j +j −1 +j −j +j +j +j −1 +j −j +j +j −j +1 −j +1 −1 −1 |
| −1 −j −1 −1 +1 +1 −1 −j −1 +j −j −j −j +1 −j +j −j −j +j −1 +j +1 −1 −1 −1 −j −1 −1 +1 +1 −1 −j |
| −1 −1 +1 +1 +1 +j +1 −1 +1 +1 −1 −j −1 −j +j +j +j −1 +j +j −j −j +j −1 +j +j −j −j −j +1 −j |
| +j −j −j +j −1 +j +1 −1 −1 −1 −j −1 −1 +1 +1 −1 −j −1 +1 −1 −1 −1 −j −1 +1 −1 −1 +1 +j +1 +j |
| −j −j −j +1 −j −j +j +j −j +1 −j −1 +1 +1 +1 +j +1 −1 +1 +1 −1 −j −1 +j −j −j −j +1 −j −j +j +j |
| −j +1 −j −j +j +j +j −1 +j −j +j +j −j +1 −j +1 −1 −1 −1 −j −1 −1 +1 +1 −1 −j −1 +1 −1 −1 −1 −j |
| −1 +1 −1 −1 +1 +j +1 −j +j +j +j −1 +j +j −j −j +j −1 +j −j +j +j +j −1 +j −j +j +j −j +1 −j +1 |
| −1 −1 −1 −j −1 −1 +1 +1 −1 −j −1 −1 +1 +j −1 +j +j +j +1 −1 +1 −j +1 −1 −1 −1 +1 −1 −1 +1 |
| The Sequence $Seq^{2}_{right,595}(k)$, to be transmitted from left to right, up to down |
| −1 +1 +1 +1 +j +1 −1 +1 +1 −1 −j −1 −1 +1 +1 +1 +j +1 +1 −1 −1 +1 +j +1 −j +j +j +j −1 |
| +j −j +j +j −j +1 −j +j −j −j −j +1 −j −j +j +j −j +1 −j −1 +1 +1 +1 +j +1 −1 +1 +1 −1 −j −1 −1 |
| +1 +1 +1 +j +1 +1 −1 −1 +1 +j +1 +j −j −j −j +1 −j +j −j −j +j −1 +j −j +j +j +j −1 +j +j −j |
| −j +j −1 +j −j +j +j +j −1 +j −j +j +j −j +1 −j −j +j +j +j −1 +j +j −j −j +j −1 +j +1 −1 −1 −1 −j |
| −1 +1 −1 −1 +1 +j +1 −1 +1 +1 +1 +j +1 +1 −1 −1 +1 +j +1 +j −j −j −j +1 −j +j −j −j +j −1 |
| +j +j −j −j −j +1 −j −j +j +j −j +1 −j +1 −1 −1 −1 −j −1 +1 −1 −1 +1 +j +1 −1 +1 +1 +1 +j +1 |
| +1 −1 −1 +1 +j +1 +1 −1 −1 −1 −j −1 +1 −1 −1 +1 +j +1 +1 −1 −1 −1 −j −1 −1 +1 +1 −1 −j −1 |
| +j −j −j −j +1 −j +j −j −j +j −1 +j −j +j +j +j −1 +j +j −j −j +j −1 +j +1 −1 −1 −1 −j −1 +1 −1 −1 |
| +1 +j +1 +1 −1 −1 −1 −j −1 −1 +1 +1 −1 −j −1 −j +j +j +j −1 +j −j +j +j −j +1 −j +j −j −j −j +1 |
| −j −j +j +j −j +1 −j +j −j −j −j +1 −j +j −j −j +j −1 +j +j −j −j −j +1 −j −j +j +j −j +1 −j −1 +1 |
| +1 +1 +j +1 −1 +1 +1 −1 −j −1 +1 −1 −1 −1 −j −1 −1 +1 +1 −1 −j −1 −j +j +j +j −1 +j −j +j +j |
| −j +1 −j −j +j +j +j −1 +j +j −j −j +j −1 +j −1 +1 +1 +1 +j +1 −1 +1 +1 −1 −j −1 +1 −1 −1 −1 |
| −j −1 −1 +1 +1 −1 −j −1 +1 −1 −1 −1 −j −1 +1 −1 −1 +1 +j +1 +1 −1 −1 −1 −j −1 −1 +1 +1 −1 |
| −j −1 +j −j −j −j +1 −j +j −j −j +j −1 +j −j +j +j +j −1 +j +j −j −j +j −1 +j +1 −1 −1 −1 −j −1 +1 |
| −1 −1 +1 +j +1 +1 −1 −1 −1 −j −1 −1 +1 +1 −1 −j −1 −j +j +j +j −1 +j −j +j +j −j +1 −j +j −j −j |
| −j +1 −j −j +j +j −j +1 −j +j −j −j −j +1 −j +j −j −j +j −1 +j +j −j −j −j +1 −j −j +j +j −j +1 −j −1 |
| +1 +1 +1 +j +1 −1 +1 +1 −1 −j −1 +1 −1 −1 −1 −j −1 −1 +1 +1 −1 −j −1 −j +j +j +j −1 +j −j |
| +j +j −j +1 −j −j +j +j +j −1 +j +j −j −j +j −1 +j −1 +1 +1 +1 +j +1 −1 +1 +1 −1 −j −1 +1 −1 |
| −1 −1 −j −1 −1 +1 +1 −1 −j −1 +1 +j +j +j +1 −1 +1 +j −1 −j +1 −1 +1 +1 −1 +1 −j +1 −1 |
| The Sequence $Seq^{3}_{right,595}(k)$, to be transmitted from left to right, up to down |
| +j −j −j −j +1 −j +j −j −j +j −1 +j −j +j +j +j −1 +j +j −j −j +j −1 +j +1 −1 −1 −1 −j −1 +1 −1 −1 |
| +1 +j +1 +1 −1 −1 −1 −j −1 −1 +1 +1 −1 −j −1 −1 +1 +1 +1 +j +1 −1 +1 +1 −1 −j −1 +1 −1 |
| −1 −1 −j −1 −1 +1 +1 −1 −j −1 −j +j +j +j −1 +j −j +j +j −j +1 −j −j +j +j +j −1 +j +j −j −j +j −1 |
| +j −1 +1 +1 +1 +j +1 −1 +1 +1 −1 −j −1 +1 −1 −1 −1 −j −1 −1 +1 +1 −1 −j −1 +j −j −j −j +1 −j |
| +j −j −j +j −1 +j +j −j −j −j +1 −j −j +j +j −j +1 −j +j −j −j −j +1 −j +j −j −j +j −1 +j −j +j +j +j |
| −1 +j +j −j −j +j −1 +j −1 +1 +1 +1 +j +1 −1 +1 +1 −1 −j −1 −1 +1 +1 +1 +j +1 +1 −1 −1 |
| +1 +j +1 −j +j +j +j −1 +j −j +j +j −j +1 −j +j −j −j −j +1 −j −j +j +j −j +1 −j −1 +1 +1 +1 +j |
| +1 −1 +1 +1 −1 −j −1 −1 +1 +1 +1 +j +1 +1 −1 −1 +1 +j +1 +1 −1 −1 −1 −j −1 +1 −1 −1 +1 |
| +j +1 −1 +1 +1 +1 +j +1 +1 −1 −1 +1 +j +1 +j −j −j −j +1 −j +j −j −j +j −1 +j +j −j −j −j +1 |
| −j −j +j +j −j +1 −j +1 −1 −1 −1 −j −1 +1 −1 −1 +1 +j +1 −1 +1 +1 +1 +j +1 +1 −1 −1 +1 +j |
| +1 −j +j +j +j −1 +j −j +j +j −j +1 −j −j +j +j +j −1 +j +j −j −j +j −1 +j −j +j +j +j −1 +j −j +j |
| +j −j +1 −j +j −j −j −j +1 −j −j +j +j −j +1 −j +1 −1 −1 −1 −j −1 +1 −1 −1 +1 +j +1 +1 −1 −1 −1 |
| −j −1 −1 +1 +1 −1 −j −1 −j +j +j +j −1 +j −j +j +j −j +1 −j +j −j −j −j +1 −j −j +j +j −j +1 −j −1 |
| +1 +1 +1 +j +1 −1 +1 +1 −1 −j −1 −1 +1 +1 +1 +j +1 +1 −1 −1 +1 +j +1 +1 −1 −1 −1 −j −1 |
| +1 −1 −1 +1 +j +1 −1 +1 +1 +1 +j +1 +1 −1 −1 +1 +j +1 +j −j −j −j +1 −j +j −j −j +j −1 +j |
| +j −j −j −j +1 −j −j +j +j −j +1 −j +1 −1 −1 −1 −j −1 +1 −1 −1 +1 +j +1 −1 +1 +1 +1 +j +1 +1 |
| −1 −1 +1 +j +1 −j +j +j +j −1 +j −j +j +j −j +1 −j −j +j +j +j −1 +j +j −j −j +j −1 +j −j +j +j |
| +j −1 +j −j +j +j −j +1 −j +j −j −j −j +1 −j −j +j +j −j +1 −j +1 −1 −1 −1 −j −1 +1 −1 −1 +1 +j |
| +1 +1 −1 −1 −1 −j −1 −1 +1 +1 −1 −j −1 +j −j −j −j −j +j −j +j +j +j −j +1 +1 +1 −j +1 +j +1 |
| +j |
| The Sequence $Seq^{4}_{right,595}(k)$, to be transmitted from left to right, up to down |
| −j +j +j +j −1 +j −j +j +j −j +1 −j +j −j −j −j +1 −j −j +j +j −j +1 −j −j +j +j +j −1 +j −j +j +j |
| −j +1 −j −j +j +j +j −1 +j +j −j −j +j −1 +j +j −j −j −j +1 −j +j −j −j +j −1 +j −j +j +j +j −1 +j |
| +j −j −j +j −1 +j −j +j +j +j −1 +j −j +j +j −j +1 −j −j +j +j +j −1 +j +j −j −j +j −1 +j +1 −1 −1 |
| −1 −j −1 +1 −1 −1 +1 +j +1 −1 +1 +1 +1 +j +1 +1 −1 −1 +1 +j +1 +1 −1 −1 −1 −j −1 +1 −1 |
| −1 +1 +j +1 +1 −1 −1 −1 −j −1 −1 +1 +1 −1 −j −1 +1 −1 −1 −1 −j −1 +1 −1 −1 +1 +j +1 −1 +1 |
| +1 +1 +j +1 +1 −1 −1 +1 +j +1 −1 +1 +1 +1 +j +1 −1 +1 +1 −1 −j −1 −1 +1 +1 +1 +j +1 |
| +1 −1 −1 +1 +j +1 +j −j −j −j +1 −j +j −j −j +j −1 +j −j +j +j +j −1 +j +j −j −j +j −1 +j +j −j −j |
| −j +1 −j +j −j −j +j −1 +j +j −j −j −j +1 −j −j +j +j −j +1 −j −j +j +j +j −1 +j −j +j +j −j +1 −j |
| +j −j −j −j +1 −j −j +j +j −j +1 −j +j −j −j −j +1 −j +j −j −j +j −1 +j +j −j −j −j +1 −j −j +j +j −j |
| +1 −j −1 +1 +1 +1 +j +1 −1 +1 +1 −1 −j −1 +1 −1 −1 −1 −j −1 −1 +1 +1 −1 −j −1 −1 +1 +1 |
| +1 +j +1 −1 +1 +1 −1 −j −1 −1 +1 +1 +1 +j +1 +1 −1 −1 +1 +j +1 −1 +1 +1 +1 +j +1 −1 |
| +1 +1 −1 −j −1 +1 −1 −1 −1 −j −1 −1 +1 +1 −1 −j −1 +1 −1 −1 −1 −j −1 +1 −1 −1 +1 +j +1 +1 |
| −1 −1 −1 −j −1 −1 +1 +1 −1 −j −1 +j −j −j −j +1 −j +j −j −j +j −1 +j −j +j +j +j −1 +j +j −j −j +j |
| −1 +j +j −j −j −j +1 −j +j −j −j +j −1 +j +j −j −j −j +1 −j −j +j +j −j +1 −j −j +j +j +j −1 +j −j +j |
| +j −j +1 −j +j −j −j −j +1 −j −j +j +j −j +1 −j +j −j −j −j +1 −j +j −j −j +j −1 +j +j −j −j −j +1 −j |
| −j +j +j −j +1 −j −1 +1 +1 +1 +j +1 −1 +1 +1 −1 −j −1 +1 −1 −1 −1 −j −1 −1 +1 +1 −1 −j −1 |
| −1 +1 +1 +1 +j +1 −1 +1 +1 −1 −j −1 −1 +1 +1 +1 +j +1 +1 −1 −1 +1 +j +1 −1 +1 +1 +1 |
| +j +1 −1 +1 +1 −1 −j −1 +1 −1 −1 −1 −j −1 −1 +1 +1 −1 −j −1 +1 −1 −1 −1 −j −1 +1 −1 −1 +1 |
| +j +1 +1 −1 −1 −1 −j −1 −1 +1 +1 −1 −j −1 +1 −1 +1 +1 −1 −j +1 −j −1 +1 −j −j −1 +1 −1 −1 |
| +1 +j −1 |
| The Sequence $Seq^{5}_{right,595}(k)$, to be transmitted from left to right, up to down |
| −1 +1 +1 +1 +j +1 −1 +1 +1 −1 −j −1 +1 −1 −1 −1 −j −1 −1 +1 +1 −1 −j −1 +1 −1 −1 −1 −j −1 |
| +1 −1 −1 +1 +j +1 +1 −1 −1 −1 −j −1 −1 +1 +1 −1 −j −1 −j +j +j +j −1 +j −j +j +j −j +1 −j +j |
| −j −j −j +1 −j −j +j +j −j +1 −j −j +j +j +j −1 +j −j +j +j −j +1 −j −j +j +j +j −1 +j +j −j −j +j |

TABLE 14-continued

The sequence $Seq^{iTX}_{right,595}(k)$

−1 +j −j +j +j +j −1 +j −j +j +j −j +1 −j +j −j −j −j +1 −j −j +j +j −j +1 −j +j −j −j −j +1 −j +j −j
−j +j −1 +j +j −j −j −j +1 −j −j +j +j −j +1 −j −1 +1 +1 +1 +j +1 −1 +1 +1 −1 −j −1 +1 −1 −1
−1 −j −1 −1 +1 +1 −1 −j −1 −1 +1 +1 +1 +j +1 −1 +1 +1 −1 −j −1 −1 +1 +1 +1 +j +1 +1 −1
−1 +1 +j +1 +1 −1 −1 −1 −j −1 +1 −1 −1 +1 +j +1 −1 +1 +1 +1 +j +1 +1 −1 −1 +1 +j +1 −1
+1 +1 +1 +j +1 −1 +1 +1 −1 −j −1 −1 +1 +1 +1 +j +1 +1 −1 −1 +1 +j +1 +j −j −j −j +1 −j
+j −j −j +j −1 +j −j +j +j +j −1 +j +j −j −j +j −1 +j +j −j −j −j +1 −j +j −j −j +j −1 +j +j −j −j −j
+1 −j −j +j +j −j +1 −j +j −j −j −j +1 −j +j −j −j +j −1 +j −j +j +j +j −1 +j +j −j −j +j −1 +j −j
+j +j +j −1 +j −j +j +j −j +1 −j −j +j +j +j −1 +j +j −j −j +j −1 +j +1 −1 −1 −1 −j −1 +1 −1 −1
+1 +j +1 −1 +1 +1 +1 +j +1 +1 −1 −1 +1 +j +1 +1 −1 −1 −1 −j −1 +1 −1 −1 +1 +j +1 +1
−1 −1 −1 −j −1 −1 +1 +1 −1 −j −1 +1 −1 −1 −1 −j −1 +1 −1 −1 +1 +j +1 −1 +1 +1 +1 +j +1 +1
−1 −1 +1 +j +1 −1 +1 +1 +1 +j +1 −1 +1 +1 −1 −j −1 −1 +1 +1 +1 +j +1 +1 −1 −1 +1 +j
+1 +j −j −j −j +1 −j +j −j −j +j −1 +j −j +j +j +j −1 +j +j −j −j +j −1 +j +j −j −j −j +1 −j +j −j −j
+j −1 +j +j −j −j −j +1 −j −j +j +j −j +1 −j +j −j −j −j +1 −j +j −j −j +j −1 +j −j +j +j +j −1 +j
+j −j −j +j −1 +j −j +j +j +j −1 +j −j +j +j −j +1 −j −j +j +j +j −1 +j +j −j −j +j −1 +j +1 −1 −1
−1 −j −1 +1 −1 −1 +1 +j +1 −1 +1 +1 +1 +j +1 +1 −1 −1 +1 +j +1 +1 −1 −1 −1 −j −1 +1 −1
−1 +1 +j +1 +1 −1 −1 −1 −j −1 −1 +1 +1 −1 −j −1 −j +j −1 −j −j −j −1 +1 −j +j +j −j +j +j −j −1
+j +j −j

The Sequence $Seq^{6}_{right,595}(k)$, to be transmitted from left to right, up to down +1 −1 −1 −1 −j −1 +1 −1 −1 +1 +j +1 +j −j −j −j +1 −j −j +j +j −j +1 −j +1 −1 −1 −1 −j −1 +1
−1 −1 +1 +j +1 −j +j +j +j −1 +j +j −j −j +j −1 +j −1 +1 +1 +1 +j +1 −1 +1 +1 −1 −j −1 −j +j
+j +j −1 +j +j −j −j +j −1 +j +1 −1 −1 −1 −j −1 +1 −1 −1 +1 +j +1 −j +j +j +j −1 +j +j −j −j +j
−1 +j +j −j −j −j +1 −j +j −j −j +j −1 +j −1 +1 +1 +1 +j +1 +1 −1 −1 +1 +j +1 +j −j −j −j +1
−j +j −j −j +j −1 +j +1 −1 −1 −1 −j −1 −1 +1 +1 −1 −j −1 +j −j −j −j +1 −j +j −j −j +j −1 +j −1 +1
+1 +1 +j +1 +1 −1 −1 +1 +j +1 −j +j +j +j −1 +j −j +j +j −j +1 −j −1 +1 +1 +1 +j +1 +1
−1 −1 +1 +j +1 −1 +1 +1 +1 +j +1 −1 +1 +1 −1 −j −1 −j +j +j +j −1 +j +j −j −j +j −1 +j −1
+1 +1 +1 +j +1 −1 +1 +1 −1 −j −1 +j −j −j −j +1 −j −j +j +j −j +1 −j +1 −1 −1 −1 −j −1 +1 −1
−1 +1 +j +1 +j −j −j −j +1 −j −j +j +j −j +1 −j −1 +1 +1 +1 +j +1 −1 +1 +1 −1 −j −1 +j −j −j
−j +1 −j −j +j +j −j +1 −j −j +j +j +j −1 +j −j +j +j −j +1 −j +1 −1 −1 −1 −j −1 −1 +1 +1 −1 −j
−1 −j +j +j +j −1 +j −j +j +j −j +1 −j −1 +1 +1 +1 +j +1 +1 −1 −1 +1 +j +1 −j +j +j +j −1 +j
−j +j +j −j +1 −j +1 −1 −1 −1 −j −1 −1 +1 +1 −1 −j −1 +j −j −j −j +1 −j +j −j −j +j −1 +j +1 −1
−1 −1 −j −1 −1 +1 +1 −1 −j −1 −1 +1 +1 +1 +j +1 −1 +1 +1 −1 −j −1 −j +j +j +j −1 +j +j −j −j
+j −1 +j −1 +1 +1 +1 +j +1 −1 +1 +1 −1 −j −1 +j −j −j −j +1 −j −j +j +j −j +1 −j +1 −1 −1 −1
−j −1 +1 −1 −1 +1 +j +1 +j −j −j −j +1 −j −j +j +j −j +1 −j −1 +1 +1 +1 +j +1 −1 +1 +1 −1 −j
−1 +j −j −j −j +1 −j −j +j +j −j +1 −j −j +j +j +j −1 +j −j +j +j −j +1 −j +1 −1 −1 −1 −j −1 −1 +1
+1 −1 −j −1 −j +j +j +j −1 +j −j +j +j −j +1 −j −1 +1 +1 +1 +j +1 +1 −1 −1 +1 +j +1 −j +j +j
+j −1 +j −j +j +j −j +1 −j +1 −1 −1 −1 −j −1 −1 +1 +1 −1 −j −1 +j −j −j −j +1 −j +j −j −j +j −1
+j +1 −1 −1 −1 −j −1 −1 +1 +1 −1 −j −1 −1 −1 +1 +1 −1 +j −j −1 +1 +1 −j −j −1 −j −j +j −j −j +j The Sequence $Seq^{7}_{right,595}(k)$, to be transmitted from left to right, up to down +j −j −j −j +1 −j +j −j −j +j −1 +j −1 +1 +1 +1 +j +1 +1 −1 −1 +1 +j +1 +j −j −j −j +1 −j +j −j
−j +j −1 +j +1 −1 −1 −1 −j −1 −1 +1 +1 −1 −j −1 −1 +1 +1 +1 +j +1 −1 +1 +1 −1 −j −1 −j +j
+j +j −1 +j +j −j −j +j −1 +j +1 −1 −1 −1 −j −1 +1 −1 −1 +1 +j +1 −j +j +j +j −1 +j +j −j −j +j
−1 +j −1 +1 +1 +1 +j +1 −1 +1 +1 −1 −j −1 −j +j +j +j −1 +j +j −j −j +j −1 +j −1 +1 +1 +1
+j +1 −1 +1 +1 −1 −j −1 +j −j −j −j +1 −j −j +j +j −j +1 −j +j −j −j −j +1 −j +j −j −j +j −1 +j −1
+1 +1 +1 +j +1 +1 −1 −1 +1 +j +1 −j +j +j +j −1 +j −j +j +j −j +1 −j −1 +1 +1 +1 +j +1
+1 −1 −1 +1 +j +1 −j +j +j +j −1 +j −j +j +j −j +1 −j +1 −1 −1 −1 −j −1 −1 +1 +1 −1 −j −1 −j
+j +j +j −1 +j −j +j +j −j +1 −j −1 +1 +1 +1 +j +1 +1 −1 −1 +1 +j +1 +1 −1 −1 −1 −j −1 +1
−1 −1 +1 +j +1 +j −j −j −j +1 −j −j +j +j −j +1 −j −1 +1 +1 +1 +j +1 −1 +1 +1 −1 −j −1 +j −j
−j −j +1 −j −j +j +j −j +1 −j +1 −1 −1 −1 −j −1 +1 −1 −1 +1 +j +1 +j −j −j −j +1 −j −j +j +j −j
+1 −j +1 −1 −1 −1 −j −1 +1 −1 −1 +1 +j +1 −j +j +j +j −1 +j +j −j −j +j −1 +j −j +j +j +j −1
+j −j +j +j −j +1 −j +1 −1 −1 −1 −j −1 −1 +1 +1 −1 −j −1 +j −j −j −j +1 −j +j −j −j +j −1 +j +1
−1 −1 −1 −j −1 −1 +1 +1 −1 −j −1 −j +j +j +j −1 +j −j +j +j −j +1 −j +1 −1 −1 −1 −j −1 −1 +1 +1
−1 −j −1 −j +j +j +j −1 +j −j +j +j −j +1 −j −1 +1 +1 +1 +j +1 +1 −1 −1 +1 +j +1 +1 −1 −1
−1 −j −1 +1 −1 −1 +1 +j +1 +j −j −j −j +1 −j −j +j +j −j +1 −j −1 +1 +1 +1 +j +1 −1 +1 +1 −1
−j −1 +j −j −j −j +1 −j −j +j +j −j +1 −j +1 −1 −1 −1 −j −1 +1 −1 −1 +1 +j +1 +j −j −j −j +1 −j −j
+j +j −j +1 −j +1 −1 −1 −1 −j −1 +1 −1 −1 +1 +j +1 −j +j +j +j −1 +j +j −j −j +j −1 +j −j +j +j
+j −1 +j −j +j +j −j +1 −j +1 −1 −1 −1 −j −1 −1 +1 +1 −1 −j −1 +j −j −j −j +1 −j +j −j −j +j −1
+j +1 −1 −1 −1 −j −1 −1 +1 +1 −1 −j −1 +1 +j +j −j −1 +j +1 +j −j +1 −1 +1 +1 −j +1 +1 −j
−1 +1

The Sequence $Seq^{8}_{right,595}(k)$, to be transmitted from left to right, up to down −1 +1 +1 +1 +j +1 −1 +1 +1 −1 −j −1 +1 −1 −1 −1 −j −1 −1 +1 +1 −1 −j −1 +j −j −j −j +1 −j +j
−j −j +j −1 +j +j −j −j −j +1 −j −j +j +j −j +1 −j −1 +1 +1 +1 +j +1 −1 +1 +1 −1 −j −1 +1 −1
−1 −1 −j −1 −1 +1 +1 −1 −j −1 −j +j +j +j −1 +j −j +j +j −j +1 −j −j +j +j +j −1 +j +j −j −j +j −1
+j −j +j +j +j −1 +j −j +j +j −j +1 −j +j −j −j −j +1 −j −j +j +j −j +1 −j −1 +1 +1 +1 +j +1 −1
+1 +1 −1 −j −1 −1 +1 +1 +1 +j +1 +1 −1 −1 +1 +j +1 +j −j −j −j +1 −j +j −j −j +j −1 +j −j +j
+j +j −1 +j +j −j −j +j −1 +j −1 +1 +1 +1 +j +1 −1 +1 +1 −1 −j −1 −1 +1 +1 +1 +j +1 +1
−1 −1 +1 +j +1 +1 −1 −1 −1 −j −1 +1 −1 −1 +1 +j +1 −1 +1 +1 +1 +j +1 +1 −1 −1 +1 +j +1
−j +j +j +j −1 +j −j +j +j −j +1 −j −j +j +j +j −1 +j +j −j −j +j −1 +j +1 −1 −1 −1 −j −1 +1 −1
−1 +1 +j +1 −1 +1 +1 +1 +j +1 +1 −1 −1 +1 +j +1 +j −j −j −j +1 −j +j −j −j +j −1 +j +j −j −j
−j +1 −j −j +j +j −j +1 −j +j −j −j −j +1 −j +j −j −j +j −1 +j −j +j +j +j −1 +j +j −j −j +j −1 +j
+1 −1 −1 −1 −j −1 +1 −1 −1 +1 +j +1 +1 −1 −1 −1 −j −1 −1 +1 +1 −1 −j −1 −j +j +j +j −1 +j −j
+j +j −j +1 −j +j −j −j −j +1 −j −j +j +j −j +1 −j +1 −1 −1 −1 −j −1 +1 −1 −1 +1 +j +1 +1 −1 −1
−1 −j −1 −1 +1 +1 −1 −j −1 +1 −1 −1 −1 −j −1 +1 −1 −1 +1 +j +1 −1 +1 +1 +1 +j +1 +1 −1 −1
+1 +j +1 −j +j +j +j −1 +j −j +j +j −j +1 −j −j +j +j +j −1 +j +j −j −j +j −1 +j +1 −1 −1 −1 −j
−1 +1 −1 −1 +1 +j +1 −1 +1 +1 +1 +j +1 +1 −1 −1 +1 +j +1 +j −j −j −j +1 −j +j −j −j +j −1
+j +j −j −j −j +1 −j −j +j +j −j +1 −j +j −j −j −j +1 −j +j −j −j +j −1 +j −j +j +j +j −1 +j +j −j −j TABLE 14-continued

| The sequence $Seq^{iTX}_{right,595}(k)$ |
|---|
| +j −1 +j +1 −1 −1 −1 −j −1 +1 −1 −1 +1 +j +1 +1 −1 −1 −1 −j −1 −1 +1 +1 −1 −j −1 −j +j +j +j |
| −1 +j −j +j +j −j +1 −j +j −j −j −j +1 −j −j +j +j −j +1 −j +1 −1 −1 −1 −j −1 +1 −1 −1 +1 +j +1 |
| +1 −1 −1 −1 −j −1 −1 +1 +1 −1 −j −1 −j +1 −j +j −1 −1 +j +j +1 +j +1 −1 +1 +j +1 +1 +j −j |
| +j |

TABLE 15

| The sequence $Seq^{iTX}_{left,804}(k)$ |
|---|
| The Sequence $Seq^{1}_{left,804}(k)$, to be transmitted from left to right, up to down |
| −1 −j −1 +1 +j +j +1 −1 +1 +j +1 +1 +j −1 −j −j −1 +1 −1 +j +1 +1 +j −1 +j +j +1 −1 +1 +j |
| +1 +1 +j −1 +j +j +1 −1 +1 −j −1 −1 −j +1 −j −j −1 +1 −1 −j −1 −1 −j +1 +j +j +1 −1 +1 −j −1 |
| −1 −j +1 +j +j +1 −1 +1 +j +1 +1 +j −1 +j +j +1 −1 +1 −j −1 −1 −j +1 +1 +1 −j +j −j +1 −j |
| −j +1 +j −1 −1 +j −j +j +1 −j −j +1 +j +1 +1 −j +j −j +1 −j −j +1 +j +1 +1 −j +j −j −1 +j +j −1 |
| −j +1 +1 −j +j −j +1 −j −j +1 +j −1 −1 +j −j +j +1 −j −j +1 +j −1 −1 +j −j +j −1 +j +j −1 −j −1 |
| −1 +j −j +j +1 −j −j +1 +j +1 +1 −j +j −j +1 −j −j +1 +j −1 −1 +j −j +j +1 −j −j +1 +j +1 +1 |
| −j +j −j +1 −j −j +1 +j +1 +1 −j +j −j −1 +j +j −1 −j −1 −1 +j −j +j −1 +j +j −1 −j +1 +1 −j +j |
| −j −1 +j +j −1 −j +1 +1 −j +j −j +1 −j −j +1 +j +1 +1 −j +j −j −1 +j +j −1 −j −j −j −1 +1 −1 −j |
| −1 −1 −j +1 +j +j +1 −1 +1 −j −1 −1 −j +1 −j −j −1 +1 −1 −j −1 −1 −j +1 −j −j −1 +1 −1 +j +1 |
| +1 +j −1 −j −j −1 +1 −1 −j −1 −1 −j +1 +j +j +1 −1 +1 −j −1 −1 −j +1 +j +j +1 −1 +1 +j +1 |
| +1 +j −1 +j +j +1 −1 +1 −j −1 −1 −j +1 +1 +1 −j +j −j +1 −j −j +1 +j −1 −1 +j −j +j +1 −j −j |
| +1 +j +1 +1 −j +j −j +1 −j −j +1 +j +1 +1 −j +j −j −1 +j +j −1 −j −1 −1 +j −j +j −1 +j +j −1 −j |
| +1 +1 −j +j −j −1 +j +j −1 −j +1 +1 −j +j −j +1 −j −j +1 +j +1 +1 −j +j −j −1 +j +j −1 −j −j −j |
| −1 +1 −1 −j −1 −1 −j +1 +j +j +1 −1 +1 −j −1 −1 −j +1 −j −j −1 +1 −1 −j −1 −1 −j +1 −j −j −1 +1 |
| −1 +j +1 +1 +j −1 −j −j −1 +1 −1 −j −1 −1 −j +1 +j +j +1 −1 +1 −j −1 −1 −j +1 +j +j +1 −1 +1 |
| +j +1 +1 +j −1 +j +j +1 −1 +1 −j −1 −1 −j +1 +j +j +1 −1 +1 +j +1 +1 +j −1 −j −j −1 +1 −1 |
| +j +1 +1 +j −1 +j +j +1 −1 +1 +j +1 +1 +j −1 +j +j +1 −1 +1 −j −1 −1 −j +1 −j −j −1 +1 −1 |
| −j −1 −1 −j +1 +j +j +1 −1 +1 −j −1 −1 −j +1 +j +j +1 −1 +1 +j +1 +1 +j −1 +j +j +1 −1 +1 |
| −j −1 −1 −j +1 +1 +1 −j +j −j +1 −j −j +1 +j −1 −1 +j −j +j +1 −j −j +1 +j +1 +1 −j +j −j +1 −j |
| −j +1 +j +1 +1 −j +j −j −1 +j +j −1 −j +1 +1 −j +j −j +1 −j −j +1 +j −1 −1 +j −j +j +1 −j −j +1 |
| +j −1 −1 +j −j +j −1 +j +j −1 −j −1 −1 +j −j +j +1 −j −j +1 +j −1 −1 +j −j +j −1 +j +j −1 −j +1 |
| +1 −j +j −j −1 +j +j −1 −j −1 −1 +j −j +j −1 +j +j −1 −j −1 −1 +j −j +j +1 −j −j +1 +j +1 +1 −j |
| +j −j +1 −j −j +1 +j −1 −1 +j −j +j +1 −j −j +1 +j −1 −1 +j −j +j −1 +j +j −1 −j −1 −1 +j −j +j |
| +1 −j −j +1 +j +j +j +1 −1 +1 +j +1 +1 +j −1 −j −j −1 +1 −1 +j +1 +1 +j −1 +j +j +1 −1 +1 |
| +j +1 +1 +j −1 +j +j +1 −1 +1 −j −1 −1 −j +1 +j +j +1 −1 +1 +j +1 +1 +j −1 −j −j −1 +1 −1 |
| +j +1 +1 +j −1 −j −j −1 +1 −1 −j −1 −1 −j +1 −j −j −1 +1 −1 +j +1 +1 +j −1 |
| The Sequence $Seq^{2}_{left,804}(k)$, to be transmitted from left to right, up to down |
| −1 −1 +1 +j +1 +1 −j +j −j +1 −j −j +1 +j +1 +1 −j +j −j −1 +j +j −1 −j −1 −1 +j −j +j −1 +j |
| +j −1 −j +1 +1 −j +j −j −1 +j +j −1 −j −j −j −1 +1 −1 −j −1 −1 −j +1 −j −j −1 +1 −1 +j +1 +1 +j |
| −1 −j −j −1 +1 −1 −j −1 −1 −j +1 +j +j +1 −1 +1 −j −1 −1 −j +1 −j −j −1 +1 −1 −j −1 −1 −j +1 −j |
| −j −1 +1 −1 +j +1 +1 +j −1 +j +j +1 −1 +1 +j +1 +1 +j −1 −j −j −1 +1 −1 +j +1 +1 +j −1 |
| +1 +1 −j +j −j +1 −j −j +1 +j +1 +1 −j +j −j −1 +j +j −1 −j +1 +1 −j +j −j +1 −j −j +1 +j −1 |
| −1 +j −j +j +1 −j −j +1 +j −j −j −1 +1 −1 −j −1 −1 −j +1 −j −j −1 +1 −1 +j +1 +1 +j −1 +j +j +1 |
| −1 +1 +j +1 +1 +j −1 −j −j −1 +1 −1 +j +1 +1 +j −1 −1 −1 +j −j +j −1 +j +j −1 −j −1 −1 +j −j |
| +j +1 −j −j +1 +j −1 −1 +j −j +j −1 +j +j −1 −j +1 +1 −j +j −j −1 +j +j −1 −j −1 −1 +j −j +j −1 |
| +j +j −1 −j −1 −1 +j −j +j +1 −j −j +1 +j +1 +1 −j +j −j +1 −j −j +1 +j −1 −1 +j −j +j +1 −j −j |
| +1 +j −j −j −1 +1 −1 −j −1 −1 −j +1 −j −j −1 +1 −1 +j +1 +1 +j −1 −j −j −1 +1 −1 −j −1 −1 −j +1 |
| +j +j +1 −1 +1 −j −1 −1 −j +1 −j −j −1 +1 −1 −j −1 −1 −j +1 −j −j −1 +1 −1 +j +1 +1 +j −1 +j |
| +j +1 −1 +1 +j +1 +1 +j −1 −j −j −1 +1 −1 +j +1 +1 +j −1 −1 −1 +j −j +j −1 +j +j −1 −j −1 −1 |
| +j −j +j +1 −j −j +1 +j −1 −1 +j −j +j −1 +j +j −1 −j +1 +1 −j +j −j −1 +j +j −1 −j −1 −1 +j −j |
| +j −1 +j +j −1 −j −1 −1 +j −j +j +1 −j −j +1 +j +1 +1 −j +j −j +1 −j −j +1 +j −1 −1 +j −j +j +1 |
| −j −j +1 +j −j −j −1 +1 −1 −j −1 −1 −j +1 −j −j −1 +1 −1 +j +1 +1 +j −1 −j −j −1 +1 −1 −j −1 −1 |
| −j +1 +j +j +1 −1 +1 −j −1 −1 −j +1 +1 +1 −j +j −j +1 −j −j +1 +j +1 +1 −j +j −j −1 +j +j −1 |
| −j −1 −1 +j −j +j −1 +j +j −1 −j +1 +1 −j +j −j −1 +j +j −1 −j −j −j −1 +1 −1 −j −1 −1 −j +1 −j −j |
| −1 +1 −1 +j +1 +1 +j −1 −j −j −1 +1 −1 −j −1 −1 −j +1 +j +j +1 −1 +1 −j −1 −1 −j +1 −j −j −1 |
| +1 −1 −j −1 −1 −j +1 −j −j −1 +1 −1 +j +1 +1 +j −1 +j +j +1 −1 +1 +j +1 +1 +j −1 −j −j −1 |
| +1 −1 +j +1 +1 +j −1 +1 +1 −j +j −j +1 −j −j +1 +j +1 +1 −j +j −j −1 +j +j −1 −j +1 +1 −j +j |
| −j +1 −j −j +1 +j −1 −1 +j −j +j +1 −j −j +1 +j +j +j +1 −1 +1 +j +1 +1 +j −1 +j +j +1 −1 |
| +1 −j −1 −1 −j +1 −j −j −1 +1 −1 −j −1 −1 −j +1 +j +j +1 −1 +1 −j −1 −1 −j +1 +1 +1 −j +j −j |
| +1 −j −j +1 +j +1 +1 −j +j −j −1 +j +j −1 −j +1 +1 −j +j −j +1 −j −j +1 +j −1 −1 +j −j +j +1 −j |
| −j +1 +j +1 +1 −j +j −j +1 −j −j +1 +j +1 +1 −j +j −j −1 +j +j −1 −j −1 −1 +j −j +j −1 +j +j −1 |
| −j +1 +1 −j +j −j −1 +j +j −1 −j +j +j +1 −1 +1 +j +1 +1 +j −1 +j +j +1 −1 +1 −j −1 −1 −j +1 |
| +j +j +1 −1 +1 +j +1 +1 +j −1 −j −j −1 +1 −1 +j +1 +1 +j −1 |
| The Sequence $Seq^{3}_{left,804}(k)$, to be transmitted from left to right, up to down |
| +j +1 −j +1 +1 +1 −j +j −j +1 −j −j +1 +j −1 −1 +j −j +j +1 −j −j +1 +j −j −j −1 +1 −1 −j −1 −1 |
| −j +1 −j −j −1 +1 −1 +j +1 +1 +j −1 +1 +1 −j +j −j +1 −j −j +1 +j −1 −1 +j −j +j +1 −j −j +1 |
| +j +j +j +1 −1 +1 +j +1 +1 +j −1 +j +j +1 −1 +1 −j −1 −1 −j +1 −j −j −1 +1 −1 −j −1 −1 −j +1 |
| +j +j +1 −1 +1 −j −1 −1 −j +1 −1 −1 +j −j +j −1 +j +j −1 −j −1 −1 +j −j +j +1 −j −j +1 +j +j +j |
| +1 −1 +1 +j +1 +1 +j −1 −j −j −1 +1 −1 +j +1 +1 +j −1 −1 −1 +j −j +j −1 +j +j −1 −j −1 −1 +j |
| −j +j +1 −j −j +1 +j −j −j −1 +1 −1 −j −1 −1 −j +1 +j +j +1 −1 +1 −j −1 −1 −j +1 −1 −1 +j −j +j |
| −1 +j +j −1 −j −1 −1 +j −j +j +1 −j −j +1 +j −j −j −1 +1 −1 −j −1 −1 −j +1 +j +j +1 −1 +1 −j −1 |
| −1 −j +1 +1 +1 −j +j −j +1 −j −j +1 +j +1 +1 −j +j −j −1 +j +j −1 −j −1 −1 +j −j +j −1 +j +j −1 |

TABLE 15-continued

| The sequence $Seq^{iTX}_{left,804}(k)$ |
|---|
| −j +1 +1 −j +j −j −1 +j +j −1 −j +j +j +1 −1 +1 +j +1 +1 +j −1 +j +j +1 −1 +1 −j −1 −1 −j +1 |
| +1 +1 −j +j −j +1 −j −j +1 +j −1 −1 +j −j +j +1 −j −j +1 +j +j +j +1 −1 +1 +j +1 +1 +j −1 |
| +j +j +1 −1 +1 −j −1 −1 −j +1 −j −j −1 +1 −1 −j −1 −1 −j +1 +j +j +1 −1 +1 −j −1 −1 −j +1 −1 |
| −1 +j −j +j −1 +j +j −1 −j −1 −1 +j −j +j +1 −j −j +1 +j −j −j −1 +1 −1 −j −1 −1 −j +1 +j +j +1 |
| −1 +1 −j −1 −1 −j +1 +1 +1 −j +j −j +1 −j −j +1 +j +1 +1 −j +j −j −1 +j +j −1 −j −1 −1 +j −j +j |
| −1 +j +j −1 −j +1 +1 −j +j −j −1 +j +j −1 −j +j +j +1 −1 +1 +j +1 +1 +j −1 +j +j +1 −1 +1 −j |
| −1 −1 −j +1 +1 +1 −j +j −j +1 −j −j +1 +j −1 −1 +j −j +j +1 −j −j +1 +j +j +j +1 −1 +1 +j +1 |
| +1 +j −1 +j +j +1 −1 +1 −j −1 −1 −j +1 +1 +1 −j +j −j +1 −j −j +1 +j −1 −1 +j −j +j +1 −j −j |
| +1 +j −j −j −1 +1 −1 −j −1 −1 −j +1 −j −j −1 +1 −1 +j +1 +1 +j −1 +1 +1 −j +j −j +1 −j −j +1 |
| +j −1 −1 +j −j +j +1 −j −j +1 +j +j +j +1 −1 +1 +j +1 +1 +j −1 +j +j +1 −1 +1 −j −1 −1 −j |
| +1 −j −j −1 +1 −1 −j −1 −1 −j +1 +j +j +1 −1 +1 −j −1 −1 −j +1 −1 −1 +j −j +j −1 +j +j −1 −j −1 |
| −1 +j −j +j +1 −j −j +1 +j +j +j +1 −1 +1 +j +1 +1 +j −1 −j −j −1 +1 −1 +j +1 +1 +j −1 −1 |
| −1 +j −j +j −1 +j +j −1 −j −1 −1 +j −j +j +1 −j −j +1 +j +j +j +1 −1 +1 +j +1 +1 +j −1 −j −j −1 |
| +1 −1 +j +1 +1 +j −1 +1 +1 −j +j −j +1 −j −j +1 +j +1 +1 −j +j −j −1 +j +j −1 −j +j +j +1 −1 |
| +1 +j +1 +1 +j −1 −j −j −1 +1 −1 +j +1 +1 +j −1 −1 −1 +j −j +j −1 +j +j −1 −j −1 −1 +j −j +j |
| +1 −j −j +1 +j +1 +1 −j +j −j +1 −j −j +1 +j −1 −1 +j −j +j +1 −j −j +1 +j −j −j −1 +1 −1 −j −1 |
| −1 −j +1 −j −j −1 +1 −1 +j +1 +1 +j −1 −1 −1 +j −j +j −1 +j +j −1 −j +1 +1 −j +j −j −1 +j +j |
| −1 −j −j −j −1 +1 −1 −j −1 −1 −j +1 −j −j −1 +1 −1 +j +1 +1 +j −1 |
| The Sequence $Seq^{4}_{left,804}(k)$, to be transmitted from left to right, up to down |
| −j +j +1 +1 +1 +1 −j +j −j +1 −j −j +1 +j +j +j +1 −1 +1 −j −1 −1 −j +1 +1 +1 −j +j −j +1 −j |
| −j +1 +j −j −j −1 +1 −1 +j +1 +1 +j −1 +1 +1 −j +j −j +1 −j −j +1 +j +j +j +1 −1 +1 −j −1 −1 |
| −j +1 −1 −1 +j −j +j −1 +j +j −1 −j +j +j +1 −1 +1 −j −1 −1 −j +1 −j −j −1 +1 −1 −j −1 −1 −j +1 |
| +1 +1 −j +j −j −1 +j +j −1 −j −j −j −1 +1 −1 −j −1 −1 −j +1 −1 −1 +j −j +j +1 −j −j +1 +j +j +j |
| +1 −1 +1 +j +1 +1 +j −1 −1 −1 +j −j +j +1 −j −j +1 +j −j −j −1 +1 −1 −j −1 −1 −j +1 −1 −1 +j |
| −j +j +1 −j −j +1 +j −j −j −1 +1 −1 −j −1 −1 −j +1 +1 +1 −j +j −j −1 +j +j −1 −j −j −j −1 +1 −1 |
| −j −1 −1 −j +1 −1 −1 +j −j +j +1 −j −j +1 +j −j −j −1 +1 −1 −j −1 −1 −j +1 +1 +1 −j +j −j −1 +j |
| +j −1 −j +j +j +1 −1 +1 +j +1 +1 +j −1 +1 +1 −j +j −j −1 +j +j −1 −j −1 −1 +j −j +j −1 +j +j |
| −1 −j −j −j −1 +1 −1 +j +1 +1 +j −1 −1 −1 +j −j +j −1 +j +j −1 −j +j +j +1 −1 +1 −j −1 −1 −j |
| +1 +1 +1 −j +j −j +1 −j −j +1 +j +j +j +1 −1 +1 −j −1 −1 −j +1 −1 −1 +j −j +j −1 +j +j −1 −j |
| +j +j +1 −1 +1 −j −1 −1 −j +1 −j −j −1 +1 −1 −j −1 −1 −j +1 +1 +1 −j +j −j −1 +j +j −1 −j −j −j |
| −1 +1 −1 −j −1 −1 −j +1 −1 −1 +j −j +j +1 −j −j +1 +j −j −j −1 +1 −1 −j −1 −1 −j +1 +1 +1 −j +j |
| −j −1 +j +j −1 −j +j +j +1 −1 +1 +j +1 +1 +j −1 +1 +1 −j +j −j −1 +j +j −1 −j −1 −1 +j −j +j |
| −1 +j +j −1 −j −j −j −1 +1 −1 +j +1 +1 +j −1 −1 −1 +j −j +j −1 +j +j −1 −j +j +j +1 −1 +1 −j −1 |
| −1 −j +1 +1 +1 −j +j −j +1 −j −j +1 +j +j +j +1 −1 +1 −j −1 −1 −j +1 −1 −1 +j −j +j −1 +j +j |
| −1 −j +j +j +1 −1 +1 −j −1 −1 −j +1 +1 +1 −j +j −j +1 −j −j +1 +j +j +j +1 −1 +1 −j −1 −1 −j |
| +1 +1 +1 −j +j −j +1 −j −j +1 +j −j −j −1 +1 −1 +j +1 +1 +j −1 +1 +1 −j +j −j +1 −j −j +1 +j |
| +j +j +1 −1 +1 −j −1 −1 −j +1 −1 −1 +j −j +j −1 +j +j −1 −j +j +j +1 −1 +1 −j −1 −1 −j +1 −j −j |
| −1 +1 −1 −j −1 −1 −j +1 +1 +1 −j +j −j −1 +j +j −1 −j −j −j −1 +1 −1 −j −1 −1 −j +1 −1 −1 +j −j |
| +j +1 −j −j +1 +j +j +j +1 −1 +1 +j +1 +1 +j −1 −1 −1 +j −j +j +1 −j −j +1 +j −j −j −1 +1 −1 |
| −j −1 −1 −j +1 −1 −1 +j −j +j +1 −j −j +1 +j +j +j +1 −1 +1 +j +1 +1 +j −1 −1 −1 +j −j +j +1 |
| −j −j +1 +j +j +j +1 −1 +1 +j +1 +1 +j −1 +1 +1 −j +j −j −1 +j +j −1 −j +j +j +1 −1 +1 +j |
| +1 +1 +j −1 −1 −1 +j −j +j +1 −j −j +1 +j −j −j −1 +1 −1 −j −1 −1 −j +1 −1 −1 +j −j +j +1 −j −j |
| +1 +j +1 +1 −j +j −j +1 −j −j +1 +j +j +j +1 −1 +1 −j −1 −1 −j +1 +1 +1 −j +j −j +1 −j −j +1 |
| +j −j −j −1 +1 −1 +j +1 +1 +j −1 −1 −1 +j −j +j −1 +j +j −1 −j −j −j −1 +1 −1 +j +1 +1 +j −1 |
| +1 +1 −j +j −j +1 −j −j +1 +j −j −j −1 +1 −1 +j +1 +1 +j −1 |
| The Sequence $Seq^{5}_{left,804}(k)$, to be transmitted from left to right, up to down |
| +1 +j −j +1 +j +j +1 −1 +1 +j +1 +1 +j −1 +1 +1 −j +j −j −1 +j +j −1 −j −1 −1 +j −j +j −1 +j |
| +j −1 −j −j −j −1 +1 −1 +j +1 +1 +j −1 +j +j +1 −1 +1 +j +1 +1 +j −1 +1 +1 −j +j −j −1 +j |
| +j −1 −j +1 +1 −j +j −j +1 −j −j +1 +j +j +j +1 −1 +1 −j −1 −1 −j +1 +1 +1 −j +j −j +1 −j −j |
| +1 +j −j −j −1 +1 −1 +j +1 +1 +j −1 +j +j +1 −1 +1 +j +1 +1 +j −1 −1 −1 +j −j +j +1 −j −j |
| +1 +j −1 −1 +j −j +j −1 +j +j −1 −j +j +j +1 −1 +1 −j −1 −1 −j +1 +j +j +1 −1 +1 +j +1 +1 |
| +j −1 −1 −1 +j −j +j +1 −j −j +1 +j +1 +1 −j +j −j +1 −j −j +1 +j −j −j −1 +1 −1 +j +1 +1 +j |
| −1 +j +j +1 −1 +1 +j +1 +1 +j −1 −1 −1 +j −j +j +1 −j −j +1 +j +1 +1 −j +j −j +1 −j −j +1 +j |
| −j −j −1 +1 −1 +j +1 +1 +j −1 −j −j −1 +1 −1 −j −1 −1 −j +1 +1 +1 −j +j −j −1 +j +j −1 −j −j −j |
| −1 +1 −1 −j −1 −1 −j +1 −1 −1 +j −j +j +1 −j −j +1 +j +1 +1 −j +j −j +1 −j −j +1 +j +j +j +1 |
| −1 +1 −j −1 −1 −j +1 +j +j +1 −1 +1 +j +1 +1 +j −1 +1 +1 −j +j −j −1 +j +j −1 −j +1 +1 −j +j |
| −j +1 −j −j +1 +j +j +j +1 −1 +1 −j −1 −1 −j +1 +1 +1 −j +j −j +1 −j −j +1 +j −j −j −1 +1 −1 |
| +j +1 +1 +j −1 +j +j +1 −1 +1 +j +1 +1 +j −1 −1 −1 +j −j +j +1 −j −j +1 +j +1 +1 −j +j −j |
| +1 −j −j +1 +j −j −j −1 +1 −1 +j +1 +1 +j −1 −j −j −1 +1 −1 −j −1 −1 −j +1 +1 +1 −j +j −j −1 |
| +j +j −1 −j −j −j −1 +1 −1 −j −1 −1 −j +1 −1 −1 +j −j +j +1 −j −j +1 +j +1 +1 −j +j −j +1 −j −j |
| +1 +j +j +j +1 −1 +1 −j −1 −1 −j +1 +j +j +1 −1 +1 +j +1 +1 +j −1 +1 +1 −j +j −j −1 +j +j |
| −1 −j +1 +1 −j +j −j +1 −j −j +1 +j +j +j +1 −1 +1 −j −1 −1 −j +1 +j +j +1 −1 +1 +j +1 +1 |
| +j −1 +1 +1 −j +j −j −1 +j +j −1 −j −1 −1 +j −j +j −1 +j +j −1 −j −j −j −1 +1 −1 +j +1 +1 +j −1 |
| +j +j +1 −1 +1 +j +1 +1 +j −1 +1 +1 −j +j −j −1 +j +j −1 −j +1 +1 −j +j −j +1 −j −j +1 +j |
| +j +j +1 −1 +1 −j −1 −1 −j +1 +1 +1 −j +j −j +1 −j −j +1 +j −j −j −1 +1 −1 +j +1 +1 +j −1 +j |
| +j +1 −1 +1 +j +1 +1 +j −1 −1 −1 +j −j +j +1 −j −j +1 +j −1 −1 +j −j +j −1 +j +j −1 −j +j +j |
| +1 −1 +1 −j −1 −1 −j +1 +j +j +1 −1 +1 +j +1 +1 +j −1 −1 −1 +j −j +j +1 −j −j +1 +j −1 −1 |
| +j −j +j −1 +j +j −1 −j +j +j +1 −1 +1 −j −1 −1 −j +1 −j −j −1 +1 −1 −j −1 −1 −j +1 +1 +1 −j +j |
| −j −1 +j +j −1 −j −1 −1 +j −j +j −1 +j +j −1 −j +j +j +1 −1 +1 −j −1 −1 −j +1 +j +j +1 −1 +1 |
| +j +1 +1 +j −1 −1 −1 +j −j +j +1 −j −j +1 +j +j +j +1 −1 +1 +j +1 +1 +j −1 +1 +1 −j +j −j |
| −1 +j +j −1 −j −1 −1 +j −j +j −1 +j +j −1 −j −j −j −1 +1 −1 +j +1 +1 +j −1 −j −j −1 +1 −1 −j −1 |
| −1 −j +1 −1 −1 +j −j +j +1 −j −j +1 +j −1 −1 +j −j +j −1 +j +j −1 −j −j −j −1 +1 −1 +j +1 +1 +j |
| −1 |

TABLE 15-continued

| The sequence $Seq^{iTX}_{left,804}(k)$ |
|---|
| The Sequence $Seq^{6}_{left,804}(k)$, to be transmitted from left to right, up to down |
| +1 −j +j +1 +1 +1 −j +j −j +1 −j −j +1 +j −1 −1 +j −j +j +1 −j −j +1 +j −1 −1 +j −j +j −1 +j |
| +j −1 −j −1 −1 +j −j +j +1 −j −j +1 +j +j +j +1 −1 +1 +j +1 +1 +j −1 −j −j −1 +1 −1 +j +1 +1 |
| +j −1 +j +j +1 −1 +1 +j +1 +1 +j −1 +j +j +1 −1 +1 −j −1 −1 −j +1 −j −j −1 +1 −1 −j −1 −1 −j |
| +1 +j +j +1 −1 +1 −j −1 −1 −j +1 +j +j +1 −1 +1 +j +1 +1 +j −1 +j +j +1 −1 +1 −j −1 −1 −j |
| +1 −1 −1 +j −j +j −1 +j +j −1 −j +1 +1 −j +j −j −1 +j +j −1 −j −1 −1 +j −j +j −1 +j +j −1 −j −1 |
| −1 +j −j +j +1 −j −j +1 +j −j −j −1 +1 −1 −j −1 −1 −j +1 +j +j +1 −1 +1 −j −1 −1 −j +1 +j +j |
| +1 −1 +1 +j +1 +1 +j −1 +j +j +1 −1 +1 −j −1 −1 −j +1 +1 +1 −j +j −j +1 −j −j +1 +j −1 −1 |
| +j −j +j +1 −j −j +1 +j +1 +1 −j +j −j +1 −j −j +1 +j +1 +1 −j +j −j −1 +j +j −1 −j −1 −1 +j −j |
| +j −1 +j +j −1 −j +1 +1 −j +j −j −1 +j +j −1 −j +1 +1 −j +j −j +1 −j −j +1 +j +1 +1 −j +j −j −1 |
| +j +j −1 −j +j +j +1 −1 +1 +j +1 +1 +j −1 −j −j −1 +1 −1 +j +1 +1 +j −1 +j +j +1 −1 +1 +j |
| +1 +1 +j −1 +j +j +1 −1 +1 −j −1 −1 −j +1 −j −j −1 +1 −1 −j −1 −1 −j +1 +j +j +1 −1 +1 −j −1 |
| −1 −j +1 +j +j +1 −1 +1 +j +1 +1 +j −1 +j +j +1 −1 +1 −j −1 −1 −j +1 +1 +1 −j +j −j +1 −j |
| −j +1 +j −1 −1 +j −j +j +1 −j −j +1 +j +1 +1 −j +j −j +1 −j −j +1 +j +1 +1 −j +j −j −1 +j +j −1 |
| −j −1 −1 +j −j +j −1 +j +j −1 −j +1 +1 −j +j −j −1 +j +j −1 −j +1 +1 −j +j −j +1 −j −j +1 +j +1 |
| +1 −j +j −j −1 +j +j −1 −j +j +j +1 −1 +1 +j +1 +1 +j −1 −j −j −1 +1 −1 +j +1 +1 +j −1 +j +j |
| +1 −1 +1 +j +1 +1 +j −1 +j +j +1 −1 +1 −j −1 −1 −j +1 +1 +1 −j +j −j +1 −j −j +1 +j −1 −1 |
| +j −j +j +1 −j −j +1 +j −1 −1 +j −j +j −1 +j +j −1 −j −1 −1 +j −j +j +1 −j −j +1 +j +j +j +1 −1 |
| +1 +j +1 +1 +j −1 −j −j −1 +1 −1 +j +1 +1 +j −1 +j +j +1 −1 +1 +j +1 +1 +j −1 +j +j +1 |
| −1 +1 −j −1 −1 −j +1 −j −j −1 +1 −1 −j −1 −1 −j +1 +j +j +1 −1 +1 −j −1 −1 −j +1 +j +j +1 −1 |
| +1 +j +1 +1 +j −1 +j +j +1 −1 +1 −j −1 −1 −j +1 −1 −1 +j −j +j −1 +j +j −1 −j +1 +1 −j +j −j |
| −1 +j +j −1 −j −1 −1 +j −j +j −1 +j +j −1 −j −1 −1 +j −j +j +1 −j −j +1 +j +j +j +1 −1 +1 +j |
| +1 +1 +j −1 −j −j −1 +1 −1 +j +1 +1 +j −1 −j −j −1 +1 −1 −j −1 −1 −j +1 −j −j −1 +1 −1 +j +1 |
| +1 +j −1 −1 −1 +j −j +j −1 +j +j −1 −j +1 +1 −j +j −j −1 +j +j −1 −j −1 −1 +j −j +j −1 +j +j −1 |
| −j −1 −1 +j −j +j +1 −j −j +1 +j +1 +1 −j +j −j +1 −j −j +1 +j −1 −1 +j −j +j +1 −j −j +1 +j −1 |
| −1 +j −j +j −1 +j +j −1 −j −1 −1 +j −j +j +1 −j −j +1 +j −j −j −1 +1 −1 −j −1 −1 −j +1 +j +j +1 |
| −1 +1 −j −1 −1 −j +1 −j −j −1 +1 −1 −j −1 −1 −j +1 −j −j −1 +1 −1 +j +1 +1 +j −1 |
| The Sequence $Seq^{7}_{left,804}(k)$, to be transmitted from left to right, up to down |
| −1 +j +1 −1 +1 +1 −j +j −j +1 −j −j +1 +j −j −j −1 +1 −1 +j +1 +1 +j −1 +j +j +1 −1 +1 +j |
| +1 +1 +j −1 −1 −1 +j −j +j +1 −j −j +1 +j +j +j +1 −1 +1 +j +1 +1 +j −1 +1 +1 −j +j −j −1 |
| +j +j −1 −j +1 +1 −j +j −j +1 −j −j +1 +j +j +j +1 −1 +1 −j −1 −1 −j +1 −j −j −1 +1 −1 −j −1 −1 |
| −j +1 −1 −1 +j −j +j +1 −j −j +1 +j +1 +1 −j +j −j +1 −j −j +1 +j +j +j +1 −1 +1 −j −1 −1 −j |
| +1 −1 −1 +j −j +j −1 +j +j −1 −j +j +j +1 −1 +1 −j −1 −1 −j +1 +j +j +1 −1 +1 +j +1 +1 +j |
| −1 −1 −1 +j −j +j +1 −j −j +1 +j −j −j −1 +1 −1 −j −1 −1 −j +1 −1 −1 +j −j +j +1 −j −j +1 +j +1 |
| +1 −j +j −j +1 −j −j +1 +j +j +j +1 −1 +1 −j −1 −1 −j +1 +1 +1 −j +j −j +1 −j −j +1 +j −j −j −1 |
| +1 −1 +j +1 +1 +j −1 −j −j −1 +1 −1 −j −1 −1 −j +1 +1 +1 −j +j −j −1 +j +j −1 −j −1 −1 +j −j |
| +j −1 +j +j −1 −j +j +j +1 −1 +1 −j −1 −1 −j +1 −j −j −1 +1 −1 −j −1 −1 −j +1 +1 +1 −j +j −j −1 |
| +j +j −1 −j +j +j +1 −1 +1 +j +1 +1 +j −1 +1 +1 −j +j −j −1 +j +j −1 −j +1 +1 −j +j −j +1 −j |
| −j +1 +j +j +j +1 −1 +1 −j −1 −1 −j +1 −j −j −1 +1 −1 −j −1 −1 −j +1 −1 −1 +j −j +j +1 −j −j +1 |
| +j +1 +1 −j +j −j +1 −j −j +1 +j +j +j +1 −1 +1 −j −1 −1 −j +1 +1 +1 −j +j −j +1 −j −j +1 +j |
| −j −j −1 +1 −1 +j +1 +1 +j −1 −j −j −1 +1 −1 −j −1 −1 −j +1 +1 +1 −j +j −j −1 +j +j −1 −j −1 −1 |
| +j −j +j −1 +j +j −1 −j +j +j +1 −1 +1 −j −1 −1 −j +1 −j −j −1 +1 −1 −j −1 −1 −j +1 +1 +1 −j +j |
| −j −1 +j +j −1 −j +j +j +1 −1 +1 +j +1 +1 +j −1 +1 +1 −j +j −j −1 +j +j −1 −j +1 +1 −j +j −j |
| +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 +j +j +1 −1 +1 +j +1 +1 +j −1 −1 −1 +j −j +j +1 −j −j +1 +j +j +j +1 −1 +1 +j |
| +1 +1 +j −1 +1 +1 −j +j −j −1 +j +j −1 −j +1 +1 −j +j −j +1 −j −j +1 +j +j +j +1 −1 +1 −j −1 |
| −1 −j +1 −j −j −1 +1 −1 −j −1 −1 −j +1 −1 −1 +j −j +j +1 −j −j +1 +j +1 +1 −j +j −j +1 −j −j +1 |
| +j +j +j +1 −1 +1 −j −1 −1 −j +1 −1 −1 +j −j +j −1 +j +j −1 −j +j +j +1 −1 +1 −j −1 −1 −j +1 |
| +j +j +1 −1 +1 +j +1 +1 +j −1 −1 −1 +j −j +j +1 −j −j +1 +j +j +j +1 −1 +1 +j +1 +1 +j −1 |
| +1 +1 −j +j −j −1 +j +j −1 −j −1 −1 +j −j +j −1 +j +j −1 −j −j −j −1 +1 −1 +j +1 +1 +j −1 −1 −1 |
| +j −j +j −1 +j +j −1 −j +j +j +1 −1 +1 −j −1 −1 −j +1 +j +j +1 −1 +1 +j +1 +1 +j −1 −1 −1 +j |
| −j +j +1 −j −j +1 +j +1 +1 −j +j −j +1 −j −j +1 +j −j −j −1 +1 −1 +j +1 +1 +j −1 +j +j +1 −1 |
| +1 +j +1 +1 +j −1 −1 −1 +j −j +j +1 −j −j +1 +j −j −j −1 +1 −1 −j −1 −1 −j +1 −1 −1 +j −j +j |
| +1 −j −j +1 +j −1 −1 +j −j +j −1 +j +j −1 −j −j −j −1 +1 −1 +j +1 +1 +j −1 |
| The Sequence $Seq^{8}_{left,804}(k)$, to be transmitted from left to right, up to down |
| +j −j +j +1 −j −j −1 +1 −1 −j −1 −1 −j +1 −1 −1 +j −j +j +1 −j −j +1 +j −j −j −1 +1 −1 −j −1 −1 |
| −j +1 +1 +1 −j +j −j −1 +j +j −1 −j −1 −1 +j −j +j −1 +j +j −1 −j +j +j +1 −1 +1 −j −1 −1 −j +1 |
| +1 +1 −j +j −j +1 −j −j +1 +j +j +j +1 −1 +1 −j −1 −1 −j +1 −1 −1 +j −j +j −1 +j +j −1 −j +j |
| +j +1 −1 +1 −j −1 −1 −j +1 −1 −1 +j −j +j −1 +j +j −1 −j −j −j −1 +1 −1 +j +1 +1 +j −1 −j −j −1 |
| +1 −1 −j −1 −1 −j +1 −1 −1 +j −j +j +1 −j −j +1 +j +j +j +1 −1 +1 +j +1 +1 +j −1 −1 −1 +j −j |
| +j +1 −j −j +1 +j −1 −1 +j −j +j −1 +j +j −1 −j +j +j +1 −1 +1 −j −1 −1 −j +1 −1 −1 +j −j +j −1 |
| +j +j −1 −j −j −j −1 +1 −1 +j +1 +1 +j −1 +j +j +1 −1 +1 +j +1 +1 +j −1 +1 +1 −j +j −j −1 |
| +j +j −1 −j −j −j −1 +1 −1 −j −1 −1 −j +1 +1 +1 −j +j −j −1 +j +j −1 −j +j +j +1 −1 +1 +j +1 |
| +1 +j −1 +1 +1 −j +j −j −1 +j +j −1 −j +j +j +1 −1 +1 +j +1 +1 +j −1 −1 −1 +j −j +j +1 −j −j |
| +1 +j −1 −1 +j −j +j −1 +j +j −1 −j +j +j +1 −1 +1 −j −1 −1 −j +1 +1 +1 −j +j −j +1 −j −j +1 |
| +j +j +j +1 −1 +1 −j −1 −1 −j +1 −1 −1 +j −j +j −1 +j +j −1 −j +j +j +1 −1 +1 −j −1 −1 −j +1 |
| −1 −1 +j −j +j −1 +j +j −1 −j −j −j −1 +1 −1 +j +1 +1 +j −1 +j +j +1 −1 +1 +j +1 +1 +j −1 +1 |
| +1 −j +j −j −1 +j +j −1 −j −j −j −1 +1 −1 −j −1 −1 −j +1 +1 +1 −j +j −j −1 +j +j −1 −j +j +j +1 |
| −1 +1 +j +1 +1 +j −1 +1 +1 −j +j −j −1 +j +j −1 −j +j +j +1 −1 +1 +j +1 +1 +j −1 −1 −1 +j |
| −j +j +1 −j −j +1 +j −1 −1 +j −j +j −1 +j +j −1 −j +j +j +1 −1 +1 −j −1 −1 −j +1 +1 +1 −j +j −j |
| +1 −j −j +1 +j +j +j +1 −1 +1 −j −1 −1 −j +1 −j −j −1 +1 −1 −j −1 −1 −j +1 −1 −1 +j −j +j +1 −j |
| −j +1 +j −j −j −1 +1 −1 −j −1 −1 −j +1 +1 +1 −j +j −j −1 +j +j −1 −j −1 −1 +j −j +j −1 +j +j −1 |
| −j +j +j +1 −1 +1 −j −1 −1 −j +1 +1 +1 −j +j −j +1 −j −j +1 +j +j +j +1 −1 +1 −j −1 −1 −j +1 |
| −1 −1 +j −j +j −1 +j +j −1 −j +j +j +1 −1 +1 −j −1 −1 −j +1 −1 −1 +j −j +j −1 +j +j −1 −j −j −j |
| −1 +1 −1 +j +1 +1 +j −1 −j −j −1 +1 −1 −j −1 −1 −j +1 −1 −1 +j −j +j +1 −j −j +1 +j +j +j +1 |

TABLE 15-continued

| The sequence $Seq^{iTX}_{left,804}(k)$ |
|---|
| −1 +1 +j +1 +1 +j −1 −1 −1 +j −j +j +1 −j −j +1 +j +1 +1 −j +j −j +1 −j −j +1 +j −j −j −1 +1 |
| −1 +j +1 +1 +j −1 +1 +1 −j +j −j +1 −j −j +1 +j +j +j +1 −1 +1 −j −1 −1 −j +1 −j −j −1 +1 −1 |
| −j −1 −1 −j +1 −1 −1 +j −j +j +1 −j −j +1 +j +j +j +1 −1 +1 +j +1 +1 +j −1 −1 −1 +j −j +j +1 |
| −j −j +1 +j −j −j −1 +1 −1 −j −1 −1 −j +1 −1 −1 +j −j +j +1 −j −j +1 +j −j −j −1 +1 −1 −j −1 −1 −j |
| +1 +1 +1 −j +j −j −1 +j +j −1 −j +1 +1 −j +j −j +1 −j −j +1 +j −j −j −1 +1 −1 +j +1 +1 +j −1 |
| −1 −1 +j −j +j −1 +j +j −1 −j −j −j −1 +1 −1 +j +1 +1 +j −1 |

TABLE 16

| The sequence $Seq^{iTX}_{right,804}(k)$ |
|---|
| The Sequence $Seq^{1}_{right,804}(k)$, to be transmitted from left to right, up to down |
| +j +j +1 −1 +1 +j +1 +1 +j −1 −j −j −1 +1 −1 +j +1 +1 +j −1 +j +j +1 −1 +1 +j +1 +1 +j |
| −1 +j +j +1 −1 +1 −j −1 −1 −j +1 −j −j −1 +1 −1 −j −1 −1 −j +1 +j +j +1 −1 +1 −j −1 −1 −j +1 |
| +j +j +1 −1 +1 +j +1 +1 +j −1 +j +j +1 −1 +1 −j −1 −1 −j +1 −1 −1 +j −j +j −1 +j +j −1 −j |
| +1 +1 −j +j −j −1 +j +j −1 −j −1 −1 +j −j +j −1 +j +j −1 −j −1 −1 +j −j +j +1 −j −j +1 +j −1 −1 |
| +j −j +j −1 +j +j −1 −j +1 +1 −j +j −j −1 +j +j −1 −j +1 +1 −j +j −j +1 −j −j +1 +j +1 +1 −j +j |
| −j −1 +j +j −1 −j +j +j +1 −1 +1 +j +1 +1 +j −1 −j −j −1 +1 −1 +j +1 +1 +j −1 +j +j +1 −1 |
| +1 +j +1 +1 +j −1 +j +j +1 −1 +1 −j −1 −1 −j +1 −j −j −1 +1 −1 −j −1 −1 −j +1 +j +j +1 −1 |
| +1 −j −1 −1 −j +1 +j +j +1 −1 +1 +j +1 +1 +j −1 +j +j +1 −1 +1 −j −1 −1 −j +1 −1 −1 +j −j |
| +j −1 +j +j −1 −j +1 +1 −j +j −j −1 +j +j −1 −j −1 −1 +j −j +j −1 +j +j −1 −j −1 −1 +j −j +j +1 |
| −j −j +1 +j −1 −1 +j −j +j −1 +j +j −1 −j +1 +1 −j +j −j −1 +j +j −1 −j +1 +1 −j +j −j +1 −j −j |
| +1 +j +1 +1 −j +j −j −1 +j +j −1 −j +1 +1 −j +j −j +1 −j −j +1 +j −1 −1 +j −j +j +1 −j −j +1 |
| +j +1 +1 −j +j −j +1 −j −j +1 +j +1 +1 −j +j −j −1 +j +j −1 −j −1 −1 +j −j +j −1 +j +j −1 −j +1 |
| +1 −j +j −j −1 +j +j −1 −j +1 +1 −j +j −j +1 −j −j +1 +j +1 +1 −j +j −j −1 +j +j −1 −j +j +j +1 |
| −1 +1 +j +1 +1 +j −1 −j −j −1 +1 −1 +j +1 +1 +j −1 +j +j +1 −1 +1 +j +1 +1 +j −1 +j +j |
| +1 −1 +1 −j −1 −1 −j +1 +j +j +1 −1 +1 +j +1 +1 +j −1 −j −j −1 +1 −1 +j +1 +1 +j −1 −j −j |
| −1 +1 −1 −j −1 −1 −j +1 −j −j −1 +1 −1 +j +1 +1 +j −1 −1 −1 +j −j +j −1 +j +j −1 −j +1 +1 −j |
| +j −j −1 +j +j −1 −j −1 −1 +j −j +j −1 +j +j −1 −j −1 −1 +j −j +j +1 −j −j +1 +j +1 +1 −j +j −j |
| +1 −j −j +1 +j −1 −1 +j −j +j +1 −j −j +1 +j −1 −1 +j −j +j −1 +j +j −1 −j −1 −1 +j −j +j +1 −j |
| −j +1 +j −j −j −1 +1 −1 −j −1 −1 −j +1 +j +j +1 −1 +1 −j −1 −1 −j +1 −j −j −1 +1 −1 −j −1 −1 −j |
| +1 −j −j −1 +1 −1 +j +1 +1 +j −1 −j −j −1 +1 −1 −j −1 −1 −j +1 +j +j +1 −1 +1 −j −1 −1 −j +1 |
| +j +j +1 −1 +1 +j +1 +1 +j −1 +j +j +1 −1 +1 −j −1 −1 −j +1 +1 +1 −j +j −j +1 −j −j +1 +j |
| −1 −1 +j −j +j +1 −j −j +1 +j +1 +1 −j +j −j +1 −j −j +1 +j +1 +1 −j +j −j −1 +j +j −1 −j −1 −1 |
| +j −j +j −1 +j +j −1 −j +1 +1 −j +j −j −1 +j +j −1 −j +1 +1 −j +j −j +1 −j −j +1 +j +1 +1 −j +j |
| −j −1 +j +j −1 −j +j +j +1 −1 +1 +j +1 +1 +j −1 −j −j −1 +1 −1 +j +1 +1 +j −1 +j +j +1 −1 |
| +1 +j +1 +1 +j −1 +j +j +1 −1 +1 −j −1 −1 −j +1 +j +j +1 −1 +1 +j +1 +1 +j −1 −j −j −1 +1 |
| −1 +j +1 +1 +j −1 −j −j −1 +1 −1 −j −1 −1 −j +1 −j −j −1 +1 −1 +j +1 +1 +j −1 +1 −1 −j +j |
| The Sequence $Seq^{2}_{right,804}(k)$, to be transmitted from left to right, up to down |
| +1 +1 −j +j −j +1 −j −j +1 +j +1 +1 −j +j −j −1 +j +j −1 −j −1 −1 +j −j +j −1 +j +j −1 −j +1 |
| +1 −j +j −j −1 +j +j −1 −j −j −j −1 +1 −1 −j −1 −1 −j +1 −j −j −1 +1 −1 +j +1 +1 +j −1 −j −j −1 |
| +1 −1 −j −1 −1 −j +1 +j +j +1 −1 +1 −j −1 −1 −j +1 +j +j +1 −1 +1 +j +1 +1 +j −1 +j +j +1 |
| −1 +1 −j −1 −1 −j +1 −j −j −1 +1 −1 −j −1 −1 −j +1 +j +j +1 −1 +1 −j −1 −1 −j +1 −1 −1 +j −j +j |
| −1 +j +j −1 −j −1 −1 +j −j +j +1 −j −j +1 +j −1 −1 +j −j +j −1 +j +j −1 −j +1 +1 −j +j −j −1 +j |
| +j −1 −j +1 +1 −j +j −j +1 −j −j +1 +j +1 +1 −j +j −j −1 +j +j −1 −j −1 −1 +j −j +j −1 +j +j −1 |
| −j +1 +1 −j +j −j −1 +j +j −1 −j −j −j −1 +1 −1 −j −1 −1 −j +1 −j −j −1 +1 −1 +j +1 +1 +j −1 −j |
| −j −1 +1 −1 −j −1 −1 −j +1 +j +j +1 −1 +1 −j −1 −1 −j +1 +j +j +1 −1 +1 +j +1 +1 +j −1 +j |
| +j +1 −1 +1 −j −1 −1 −j +1 −j −j −1 +1 −1 −j −1 −1 −j +1 +j +j +1 −1 +1 −j −1 −1 −j +1 −1 −1 |
| +j −j +j −1 +j +j −1 −j −1 −1 +j −j +j +1 −j −j +1 +j −1 −1 +j −j +j −1 +j +j −1 −j +1 +1 −j +j |
| −j −1 +j +j −1 −j −j −j −1 +1 −1 −j −1 −1 −j +1 −j −j −1 +1 −1 +j +1 +1 +j −1 +j +j +1 −1 +1 |
| +j +1 +1 +j −1 −j −j −1 +1 −1 +j +1 +1 +j −1 −1 −1 +j −j +j −1 +j +j −1 −j −1 −1 +j −j +j +1 |
| −j −j +1 +j −1 −1 +j −j +j −1 +j +j −1 −j +1 +1 −j +j −j −1 +j +j −1 −j +1 +1 −j +j −j +1 −j −j |
| +1 +j +1 +1 −j +j −j −1 +j +j −1 −j −1 −1 +j −j +j −1 +j +j −1 −j +1 +1 −j +j −j −1 +j +j −1 −j |
| +j +j +1 −1 +1 +j +1 +1 +j −1 +j +j +1 −1 +1 −j −1 −1 −j +1 +j +j +1 −1 +1 +j +1 +1 +j |
| −1 −j −j −1 +1 −1 +j +1 +1 +j −1 +j +j +1 −1 +1 +j +1 +1 +j −1 +j +j +1 −1 +1 −j −1 −1 −j |
| +1 −j −j −1 +1 −1 −j −1 −1 −j +1 +j +j +1 −1 +1 −j −1 −1 −j +1 +1 +1 −j +j −j +1 −j −j +1 +j |
| +1 +1 −j +j −j −1 +j +j −1 −j +1 +1 −j +j −j +1 −j −j +1 +j −1 −1 +j −j +j +1 −j −j +1 +j −1 −1 |
| +j −j +j −1 +j +j −1 −j −1 −1 +j −j +j +1 −j −j +1 +j +1 +1 −j +j −j +1 −j −j +1 +j −1 −1 +j −j |
| +j +1 −j −j +1 +j −j −j −1 +1 −1 −j −1 −1 −j +1 −j −j −1 +1 −1 +j +1 +1 +j −1 −j −j −1 +1 −1 −j |
| −1 −1 −j +1 +j +j +1 −1 +1 −j −1 −1 −j +1 −j −j −1 +1 −1 −j −1 −1 −j +1 −j −j −1 +1 −1 +j +1 |
| +1 +j −1 +j +j +1 −1 +1 +j +1 +1 +j −1 −j −j −1 +1 −1 +j +1 +1 +j −1 −1 −1 +j −j +j −1 +j |
| +j −1 −j −1 −1 +j −j +j +1 −j −j +1 +j −1 −1 +j −j +j −1 +j +j −1 −j +1 +1 −j +j −j −1 +j +j −1 |
| −j +1 +1 −j +j −j +1 −j −j +1 +j +1 +1 −j +j −j −1 +j +j −1 −j −1 −1 +j −j +j −1 +j +j −1 −j +1 |
| +1 −j +j −j −1 +j +j −1 −j +j +j +1 −1 +1 +j +1 +1 +j −1 +j +j +1 −1 +1 −j −1 −1 −j +1 +j +j |
| +1 −1 +1 +j +1 +1 +j −1 −j −j −1 +1 −1 +j +1 +1 +j −1 −j +1 +1 +j |
| The Sequence $Seq^{3}_{right,804}(k)$, to be transmitted from left to right, up to down |
| +1 +1 −j +j −j +1 −j −j +1 +j −1 −1 +j −j +j +1 −j −j +1 +j −j −j −1 +1 −1 −j −1 −1 −j +1 −j −j |
| −1 +1 −1 +j +1 +1 +j −1 +1 +1 −j +j −j +1 −j −j +1 +j −1 −1 +j −j +j +1 −j −j +1 +j +j +j +1 |
| −1 +1 +j +1 +1 +j −1 +j +j +1 −1 +1 −j −1 −1 −j +1 +j +j +1 −1 +1 +j +1 +1 +j −1 −j −j −1 |
| +1 −1 +j +1 +1 +j −1 +1 +1 −j +j −j +1 −j −j +1 +j +1 +1 −j +j −j −1 +j +j −1 −j −j −j −1 +1 |
| −1 −j −1 −1 −j +1 +j +j +1 −1 +1 −j −1 −1 −j +1 +1 +1 −j +j −j +1 −j −j +1 +j +1 +1 −j +j −j |
| −1 +j +j −1 −j +1 +1 −j +j −j +1 −j −j +1 +j −1 −1 +j −j +j +1 −j −j +1 +j −j −j −1 +1 −1 −j −1 |

TABLE 16-continued

| The sequence $Seq^{iTX}_{right,804}(k)$ |
|---|
| −1 −j +1 −j −j −1 +1 −1 +j +1 +1 +j −1 +1 +1 −j +j −j +1 −j −j +1 +j −1 −1 +j −j +j +1 −j −j |
| +1 +j +j +j +1 −1 +1 +j +1 +1 +j −1 +j +j +1 −1 +1 −j −1 −1 −j +1 +j +j +1 −1 +1 +j +1 |
| +1 +j −1 −j −j −1 +1 −1 +j +1 +1 +j −1 +1 +1 −j +j −j +1 −j −j +1 +j +1 +1 −j +j −j −1 +j +j |
| −1 −j −j −j −1 +1 −1 −j −1 −1 −j +1 +j +j +1 −1 +1 −j −1 −1 −j +1 +1 +1 −j +j −j +1 −j −j +1 +j |
| +1 +1 −j +j −j −1 +j +j −1 −j −j −j −1 +1 −1 −j −1 −1 −j +1 +j +j +1 −1 +1 −j −1 −1 −j +1 −1 −1 |
| +j −j +j −1 +j +j −1 −j −1 −1 +j −j +j +1 −j −j +1 +j −j −j −1 +1 −1 −j −1 −1 −j +1 +j +j +1 −1 |
| +1 −j −1 −1 −j +1 +1 +1 −j +j −j +1 −j −j +1 +j +1 +1 −j +j −j −1 +j +j −1 −j +1 +1 −j +j −j |
| +1 −j −j +1 +j −1 −1 +j −j +j +1 −j −j +1 +j −j −j −1 +1 −1 −j −1 −1 −j +1 −j −j −1 +1 −1 +j +1 |
| +1 +j −1 −1 −1 +j −j +j −1 +j +j −1 −j +1 +1 −j +j −j −1 +j +j −1 −j −j −j −1 +1 −1 −j −1 −1 −j |
| +1 −j −j −1 +1 −1 +j +1 +1 +j −1 +j +j +1 −1 +1 +j +1 +1 +j −1 −j −j −1 +1 −1 +j +1 +1 +j |
| −1 +1 +1 −j +j −j +1 −j −j +1 +j +1 +1 −j +j −j −1 +j +j −1 −j +j +j +1 −1 +1 +j +1 +1 +j −1 |
| −j −j −1 +1 −1 +j +1 +1 +j −1 −1 −1 +j −j +j −1 +j +j −1 −j −1 −1 +j −j +j +1 −j −j +1 +j −1 −1 |
| +j −j +j −1 +j +j −1 −j +1 +1 −j +j −j −1 +j +j −1 −j +j +j +1 −1 +1 +j +1 +1 +j −1 +j +j +1 |
| −1 +1 −j −1 −1 −j +1 +1 +1 −j +j −j +1 −j −j +1 +j −1 −1 +j −j +j +1 −j −j +1 +j +j +j +1 −1 |
| +1 +j +1 +1 +j −1 +j +j +1 −1 +1 −j −1 −1 −j +1 −j −j −1 +1 −1 −j −1 −1 −j +1 +j +j +1 −1 |
| +1 −j −1 −1 −j +1 −1 −1 +j −j +j −1 +j +j −1 −j −1 −1 +j −j +j +1 −j −j +1 +j −j −j −1 +1 −1 −j |
| −1 −1 −j +1 +j +j +1 −1 +1 −j −1 −1 −j +1 +1 +1 −j +j −j +1 −j −j +1 +j +1 +1 −j +j −j −1 +j |
| +j −1 −j +1 +1 −j +j −j +1 −j −j +1 +j −1 −1 +j −j +j +1 −j −j +1 +j −j −j −1 +1 −1 −j −1 −1 −j |
| +1 −j −j −1 +1 −1 +j +1 +1 +j −1 −1 −1 +j −j +j −1 +j +j −1 −j +1 +1 −j +j −j −1 +j +j −1 −j −j |
| −j −1 +1 −1 −j −1 −1 −j +1 −j −j −1 +1 −1 +j +1 +1 +j −1 +j −j +j −1 |
| The Sequence $Seq^{4}_{right,804}(k)$, to be transmitted from left to right, up to down |
| +1 +1 −j +j −j +1 −j −j +1 +j +j +j +1 −1 +1 −j −1 −1 −j +1 +1 +1 −j +j −j +1 −j −j +1 +j −j |
| −j −1 +1 −1 +j +1 +1 +j −1 +1 +1 −j +j −j +1 −j −j +1 +j +j +j +1 −1 +1 −j −1 −1 −j +1 −1 −1 |
| +j −j +j −1 +j +j −1 −j +j +j +1 −1 +1 −j −1 −1 −j +1 +j +j +1 −1 +1 +j +1 +1 +j −1 −1 −1 +j |
| −j +j +1 −j −j +1 +j +j +j +1 −1 +1 +j +1 +1 +j −1 +1 +1 −j +j −j −1 +j +j −1 −j −j −j −1 +1 |
| −1 −j −1 −1 −j +1 +1 +1 −j +j −j −1 +j +j −1 −j +j +j +1 −1 +1 +j +1 +1 +j −1 +1 +1 −j +j −j |
| −1 +j +j −1 −j +1 +1 −j +j −j +1 −j −j +1 +j +j +j +1 −1 +1 −j −1 −1 −j +1 +1 +1 −j +j −j +1 |
| −j −j +1 +j −j −j −1 +1 −1 +j +1 +1 +j −1 +1 +1 −j +j −j +1 −j −j +1 +j +j +j +1 −1 +1 −j −1 |
| −1 −j +1 −1 −1 +j −j +j −1 +j +j −1 −j +j +j +1 −1 +1 −j −1 −1 −j +1 +j +j +1 −1 +1 +j +1 +1 |
| +j −1 −1 −1 +j −j +j +1 −j −j +1 +j +j +j +1 −1 +1 +j +1 +1 +j −1 +1 +1 −j +j −j −1 +j +j −1 |
| −j −j −j −1 +1 −1 −j −1 −1 −j +1 +1 +1 −j +j −j −1 +j +j −1 −j +j +j +1 −1 +1 +j +1 +1 +j −1 |
| +1 +1 −j +j −j −1 +j +j −1 −j −j −j −1 +1 −1 −j −1 −1 −j +1 +1 +1 −j +j −j −1 +j +j −1 −j −j −j |
| −1 +1 −1 −j −1 −1 −j +1 −1 −1 +j −j +j +1 −j −j +1 +j −j −j −1 +1 −1 −j −1 −1 −j +1 +1 +1 −j +j |
| −j −1 +j +j −1 −j +j +j +1 −1 +1 +j +1 +1 +j −1 +1 +1 −j +j −j −1 +j +j −1 −j +1 +1 −j +j −j |
| +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 −1 −1 +j −j +j −1 +j +j −1 −j −j −j −1 +1 −1 +j +1 +1 +j −1 +1 +1 −j +j −j +1 −j |
| −j +1 +j −j −j −1 +1 −1 +j +1 +1 +j −1 +j +j +1 −1 +1 +j +1 +1 +j −1 −1 −1 +j −j +j +1 −j −j |
| +1 +j +j +j +1 −1 +1 +j +1 +1 +j −1 +1 +1 −j +j −j −1 +j +j −1 −j +j +j +1 −1 +1 +j +1 |
| +1 +j −1 −1 −1 +j −j +j +1 −j −j +1 +j −j −j −1 +1 −1 −j −1 −1 −j +1 −1 −1 +j −j +j +1 −j −j +1 |
| +j −1 −1 +j −j +j −1 +j +j −1 −j −j −j −1 +1 −1 +j +1 +1 +j −1 −1 −1 +j −j +j −1 +j +j −1 −j +j |
| +j +1 −1 +1 −j −1 −1 −j +1 +1 +1 −j +j −j +1 −j −j +1 +j +j +j +1 −1 +1 −j −1 −1 −j +1 −1 −1 |
| +j −j +j −1 +j +j −1 −j +j +j +1 −1 +1 −j −1 −1 −j +1 −j −j −1 +1 −1 −j −1 −1 −j +1 +1 +1 −j +j |
| −j −1 +j +j −1 −j −j −j −1 +1 −1 −j −1 −1 −j +1 −1 −1 +j −j +j +1 −j −j +1 +j −j −j −1 +1 −1 −j −1 |
| −1 −j +1 +1 +1 −j +j −j −1 +j +j −1 −j +j +j +1 −1 +1 +j +1 +1 +j −1 +1 +1 −j +j −j −1 +j +j |
| −1 −j +1 +1 −j +j −j +1 −j −j +1 +j +j +j +1 −1 +1 −j −1 −1 −j +1 +1 +1 −j +j −j +1 −j −j +1 |
| +j −j −j −1 +1 −1 +j +1 +1 +j −1 −1 −1 +j −j +j −1 +j +j −1 −j −j −j −1 +1 −1 +j +1 +1 +j −1 |
| +1 +1 −j +j −j +1 −j −j +1 +j −j −j −1 +1 −1 +j +1 +1 +j −1 −1 −j +j −j |
| The Sequence $Seq^{5}_{right,804}(k)$, to be transmitted from left to right, up to down |
| +j +j +1 −1 +1 +j +1 +1 +j −1 +1 +1 −j +j −j −1 +j +j −1 −j −1 −1 +j −j +j −1 +j +j −1 −j −j |
| −j −1 +1 −1 +j +1 +1 +j −1 +j +j +1 −1 +1 +j +1 +1 +j −1 +1 +1 −j +j −j −1 +j +j −1 −j +1 |
| +1 −j +j −j +1 −j −j +1 +j +j +j +1 −1 +1 −j −1 −1 −j +1 −1 −1 +j −j +j −1 +j +j −1 −j +j +j |
| +1 −1 +1 −j −1 −1 −j +1 −j −j −1 +1 −1 −j −1 −1 −j +1 +1 +1 −j +j −j −1 +j +j −1 −j +1 +1 −j |
| +j −j +1 −j −j +1 +j −j −j −1 +1 −1 +j +1 +1 +j −1 −j −j −1 +1 −1 −j −1 −1 −j +1 +1 +1 −j +j −j |
| −1 +j +j −1 −j +j +j +1 −1 +1 +j +1 +1 +j −1 +1 +1 −j +j −j −1 +j +j −1 −j −1 −1 +j −j +j −1 |
| +j +j −1 −j −j −j −1 +1 −1 +j +1 +1 +j −1 +j +j +1 −1 +1 +j +1 +1 +j −1 +1 +1 −j +j −j −1 |
| +j +j −1 −j +1 +1 −j +j −j +1 −j −j +1 +j +j +j +1 −1 +1 −j −1 −1 −j +1 −1 −1 +j −j +j −1 +j |
| +j −1 −j +j +j +1 −1 +1 −j −1 −1 −j +1 −j −j −1 +1 −1 −j −1 −1 −j +1 +1 +1 −j +j −j −1 +j +j −1 |
| −j +1 +1 −j +j −j +1 −j −j +1 +j −j −j −1 +1 −1 +j +1 +1 +j −1 −j −j −1 +1 −1 −j −1 −1 −j +1 |
| +1 +1 −j +j −j −1 +j +j −1 −j +1 +1 −j +j −j +1 −j −j +1 +j −j −j −1 +1 −1 +j +1 +1 +j −1 +j |
| +j +1 −1 +1 +j +1 +1 +j −1 −1 −1 +j −j +j +1 −j −j +1 +j +1 +1 −j +j −j +1 −j −j +1 +j −j −j |
| −1 +1 −1 +j +1 +1 +j −1 −j −j −1 +1 −1 −j −1 −1 −j +1 +1 +1 −j +j −j −1 +j +j −1 −j +j +j +1 |
| −1 +1 +j +1 +1 +j −1 +1 +1 −j +j −j −1 +j +j −1 −j −1 −1 +j −j +j −1 +j +j −1 −j −j −j −1 +1 |
| −1 +j +1 +1 +j −1 −j −j −1 +1 −1 −j −1 −1 −j +1 −1 −1 +j −j +j +1 −j −j +1 +j −1 −1 +j −j +j −1 |
| +j +j −1 −j −j −j −1 +1 −1 +j +1 +1 +j −1 −1 −1 +j −j +j −1 +j +j −1 −j +j +j +1 −1 +1 −j −1 |
| −1 −j +1 −j −j −1 +1 −1 −j −1 −1 −j +1 +1 +1 −j +j −j −1 +j +j −1 −j −1 −1 +j −j +j −1 +j +j −1 −j |
| +j +j +1 −1 +1 −j −1 −1 −j +1 +j +j +1 −1 +1 +j +1 +1 +j −1 −1 −1 +j −j +j +1 −j −j +1 +j −j |
| −j −1 +1 −1 −j −1 −1 −j +1 −1 −1 +j −j +j +1 −j −j +1 +j +1 +1 −j +j −j +1 −j −j +1 +j +j +j |
| +1 −1 +1 −j −1 −1 −j +1 +j +j +1 −1 +1 +j +1 +1 +j −1 +1 +1 −j +j −j −1 +j +j −1 −j +1 +1 |
| −j +j −j +1 −j −j +1 +j +j +j +1 −1 +1 −j −1 −1 −j +1 +1 +1 −j +j −j +1 −j −j +1 +j −j −j −1 +1 |
| −1 +j +1 +1 +j −1 +j +j +1 −1 +1 +j +1 +1 +j −1 −1 −1 +j −j +j +1 −j −j +1 +j +1 +1 −j +j |
| −j +1 −j −j +1 +j −j −j −1 +1 −1 +j +1 +1 +j −1 −j −j −1 +1 −1 −j −1 −1 −j +1 +1 +1 −j +j −j −1 |
| +j +j −1 −j +j +j +1 −1 +1 +j +1 +1 +j −1 +1 +1 −j +j −j −1 +j +j −1 −j −1 −1 +j −j +j −1 +j |
| +j −1 −j −j −j −1 +1 −1 +j +1 +1 +j −1 −j −j −1 +1 −1 −j −1 −1 −j +1 −1 −1 +j −j +j +1 −j −j +1 |
| +j −1 −1 +j −j +j −1 +j +j −1 −j −j −j −1 +1 −1 +j +1 +1 +j −1 +j −j +j +1 |

TABLE 16-continued

The sequence $Seq^{iTX}_{right,804}(k)$

The Sequence $Seq^{6}_{right,804}(k)$, to be transmitted from left to right, up to down +1 +1 −j +j −j +1 −j −j +1 +j −1 −1 +j −j +j +1 −j −j +1 +j −1 −1 +j −j +j −1 +j +j −1 −j −1 −1
+j −j +j +1 −j −j +1 +j +j +j +1 −1 +1 +j +1 +1 +j −1 −j −j −1 +1 −1 +j +1 +1 +j −1 +j +j
+1 −1 +1 +j +1 +1 +j −1 +j +j +1 −1 +1 −j −1 −1 −j +1 +j +j +1 −1 +1 +j +1 +1 +j −1 −j −j
−1 +1 −1 +j +1 +1 +j −1 −j −j −1 +1 −1 −j −1 −1 −j +1 −j −j −1 +1 −1 +j +1 +1 +j −1 +1 +1 −j
+j −j +1 −j −j +1 +j −1 −1 +j −j +j +1 −j −j +1 +j +1 +1 −j +j −j +1 −j −j +1 +j +1 +1 −j +j −j
−1 +j +j −1 −j +1 +1 −j +j −j +1 −j −j +1 +j −1 −1 +j −j +j +1 −j −j +1 +j −1 −1 +j −j +j −1 +j
+j −1 −j −1 −1 +j −j +j +1 −j −j +1 +j +j +j +1 −1 +1 +j +1 +1 +j −1 −j −j −1 +1 −1 +j +1 +1
+j −1 +j +j +1 −1 +1 +j +1 +1 +j −1 +j +j +1 −1 +1 −j −1 −1 −j +1 +j +j +1 −1 +1 +j +1
+1 +j −1 −j −j −1 +1 −1 +j +1 +1 +j −1 −j −j −1 +1 −1 −j −1 −1 −j +1 −j −j −1 +1 −1 +j +1 +1
+j −1 +1 +1 −j +j −j +1 −j −j +1 +j −1 −1 +j −j +j +1 −j −j +1 +j +1 +1 −j +j −j +1 −j −j +1
+j +1 +1 −j +j −j −1 +j +j −1 −j −j −j −1 +1 −1 −j −1 −1 −j +1 +j +j +1 −1 +1 −j −1 −1 −j +1 +j
+j +1 −1 +1 +j +1 +1 +j −1 +j +j +1 −1 +1 −j −1 −1 −j +1 +1 +1 −j +j −j +1 −j −j +1 +j −1
−1 +j −j +j +1 −j −j +1 +j +1 +1 −j +j −j +1 −j −j +1 +j +1 +1 −j +j −j −1 +j +j −1 −j +1 +1 −j
+j −j +1 −j −j +1 +j −1 −1 +j −j +j +1 −j −j +1 +j −1 −1 +j −j +j −1 +j +j −1 −j −1 −1 +j −j +j
+1 −j −j +1 +j −j −j −1 +1 −1 −j −1 −1 −j +1 +j +j +1 −1 +1 −j −1 −1 −j +1 −j −j −1 +1 −1 −j −1
−1 −j +1 −j −j −1 +1 −1 +j +1 +1 +j −1 +j +j +1 −1 +1 +j +1 +1 +j −1 −j −j −1 +1 −1 +j +1
+1 +j −1 −j −j −1 +1 −1 −j −1 −1 −j +1 −j −j −1 +1 −1 +j +1 +1 +j −1 −1 −1 +j −j +j −1 +j +j
−1 −j +1 +1 −j +j −j −1 +j +j −1 −j −1 −1 +j −j +j −1 +j +j −1 −j −1 −1 +j −j +j +1 −j −j +1 +j
−1 −1 +j −j +j −1 +j +j −1 −j +1 +1 −j +j −j −1 +j +j −1 −j +1 +1 −j +j −j +1 −j −j +1 +j +1 +1
−j +j −j −1 +j +j −1 −j +j +j +1 −1 +1 +j +1 +1 +j −1 −j −j −1 +1 −1 +j +1 +1 +j −1 +j +j +1
−1 +1 +j +1 +1 +j −1 +j +j +1 −1 +1 −j −1 −1 −j +1 −j −j −1 +1 −1 −j −1 −1 −j +1 +j +j +1 −1
+1 −j −1 −1 −j +1 +j +j +1 −1 +1 +j +1 +1 +j −1 +j +j +1 −1 +1 −j −1 −1 −j +1 +1 +1 −j +j
−j +1 −j −j +1 +j −1 −1 +j −j +j +1 −j −j +1 +j +1 +1 −j +j −j +1 −j −j +1 +j +1 +1 −j +j −j −1
+j +j −1 −j +1 +1 −j +j −j +1 −j −j +1 +j −1 −1 +j −j +j +1 −j −j +1 +j −1 −1 +j −j +j −1 +j +j
−1 −j −1 −1 +j −j +j +1 −j −j +1 +j −j −j −1 +1 −1 −j −1 −1 −j +1 +j +j +1 −1 +1 −j −1 −1 −j +1
−j −j −1 +1 −1 −j −1 −1 −j +1 −j −j −1 +1 −1 +j +1 +1 +j −1 +1 −j +1 +1

The Sequence $Seq^{7}_{right,804}(k)$, to be transmitted from left to right, up to down +1 +1 −j +j −j +1 −j −j +1 +j −j −j −1 +1 −1 +j +1 +1 +j −1 +j +j +1 −1 +1 +j +1 +1 +j −1
−1 −1 +j −j +j +1 −j −j +1 +j +j +j +1 −1 +1 +j +1 +1 +j −1 +1 +1 −j +j −j −1 +j +j −1 −j +1
+1 −j +j −j +1 −j −j +1 +j +j +j +1 −1 +1 −j −1 −1 −j +1 +j +j +1 −1 +1 +j +1 +1 +j −1 +1
+1 −j +j −j −1 +j +j −1 −j −1 −1 +j −j +j −1 +j +j −1 −j −j −j −1 +1 −1 +j +1 +1 +j −1 +1 +1 −j
+j −j +1 −j −j +1 +j −j −j −1 +1 −1 +j +1 +1 +j −1 −j −j −1 +1 −1 −j −1 −1 −j +1 +1 +1 −j +j −j
−1 +j +j −1 −j +1 +1 −j +j −j +1 −j −j +1 +j −j −j −1 +1 −1 +j +1 +1 +j −1 +j +j +1 −1 +1 +j
+1 +1 +j −1 −1 −1 +j −j +j +1 −j −j +1 +j +j +j +1 −1 +1 +j +1 +1 +j −1 +1 +1 −j +j −j −1
+j +j −1 −j +1 +1 −j +j −j +1 −j −j +1 +j +j +j +1 −1 +1 −j −1 −1 −j +1 +j +j +1 −1 +1 +j +1
+1 +j −1 +1 +1 −j +j −j −1 +j +j −1 −j −1 −1 +j −j +j −1 +j +j −1 −j −j −j −1 +1 −1 +j +1 +1
+j −1 +1 +1 −j +j −j +1 −j −j +1 +j −j −j −1 +1 −1 +j +1 +1 +j −1 −j −j −1 +1 −1 −j −1 −1 −j
+1 +1 +1 −j +j −j −1 +j +j −1 −j −j −j −1 +1 −1 −j −1 −1 −j +1 −1 −1 +j −j +j +1 −j −j +1 +j +1
+1 −j +j −j +1 −j −j +1 +j +j +j +1 −1 +1 −j −1 −1 −j +1 +1 +1 −j +j −j +1 −j −j +1 +j −j −j −1
+1 −1 +j +1 +1 +j −1 −j −j −1 +1 −1 −j −1 −1 −j +1 +1 +1 −j +j −j −1 +j +j −1 −j +1 +1 −j +j
−j +1 −j −j +1 +j −j −j −1 +1 −1 +j +1 +1 +j −1 +j +j +1 −1 +1 +j +1 +1 +j −1 −1 −1 +j −j +j
+1 −j −j +1 +j −j −j −1 +1 −1 −j −1 −1 −j +1 −1 −1 +j −j +j +1 −j −j +1 +j −1 −1 +j −j +j −1 +j
+j −1 −j −j −j −1 +1 −1 +j +1 +1 +j −1 +j +j +1 −1 +1 +j +1 +1 +j −1 +1 +1 −j +j −j −1 +j
+j −1 −j −1 −1 +j −j +j −1 +j +j −1 −j −j −j −1 +1 −1 +j +1 +1 +j −1 −1 −1 +j −j +j −1 +j +j −1
−j +j +j +1 −1 +1 −j −1 −1 −j +1 +j +j +1 −1 +1 +j +1 +1 +j −1 −1 −1 +j −j +j +1 −j −j +1 +j
−1 −1 +j −j +j −1 +j +j −1 −j +j +j +1 −1 +1 −j −1 −1 −j +1 −j −j −1 +1 −1 −j −1 −1 −j +1 +1
+1 −j +j −j −1 +j +j −1 −j +j +j +1 −1 +1 +j +1 +1 +j −1 +1 +1 −j +j −j −1 +j +j −1 −j +1 +1
−j +j −j +1 −j −j +1 +j +j +j +1 −1 +1 −j −1 −1 −j +1 −j −j −1 +1 −1 −j −1 −1 −j +1 −1 −1 +j −j
+j +1 −j −j +1 +j +1 +1 −j +j −j +1 −j −j +1 +j +j +j +1 −1 +1 −j −1 −1 −j +1 +1 +1 −j +j −j
+1 −j −j +1 +j −j −j −1 +1 −1 +j +1 +1 +j −1 −j −j −1 +1 −1 −j −1 −1 −j +1 +1 +1 −j +j −j −1
+j +j −1 −j +1 +1 −j +j −j +1 −j −j +1 +j −j −j −1 +1 −1 +j +1 +1 +j −1 +j +j +1 −1 +1 +j +1
+1 +j −1 −1 −1 +j −j +j +1 −j −j +1 +j −j −j −1 +1 −1 −j −1 −1 −j +1 −1 −1 +j −j +j +1 −j −j +1
+j −1 −1 +j −j +j −1 +j +j −1 −j −j −j −1 +1 −1 +j +1 +1 +j −1 +j +j +1 −j The Sequence $Seq^{8}_{right,804}(k)$, to be transmitted from left to right, up to down −j −j −1 +1 −1 −j −1 −1 −j +1 −1 −1 +j −j +j +1 −j −j +1 +j −j −j −1 +1 −1 −j −1 −1 −j +1 +1 +1
−j +j −j −1 +j +j −1 −j −1 −1 +j −j +j −1 +j +j −1 −j +j +j +1 −1 +1 −j −1 −1 −j +1 +1 +1 −j +j
−j +1 −j −j +1 +j +j +j +1 −1 +1 −j −1 −1 −j +1 +1 +1 −j +j −j +1 −j −j +1 +j −j −j −1 +1 −1
+j +1 +1 +j −1 +1 +1 −j +j −j +1 −j −j +1 +j +j +j +1 −1 +1 −j −1 −1 −j +1 +j +j +1 −1 +1
+j +1 +1 +j −1 +1 +1 −j +j −j −1 +j +j −1 −j −j −j −1 +1 −1 −j −1 −1 −j +1 +1 +1 −j +j −j −1
+j +j −1 −j −j −j −1 +1 −1 −j −1 −1 −j +1 −1 −1 +j −j +j +1 −j −j +1 +j −j −j −1 +1 −1 −j −1 −1 −j
+1 +1 +1 −j +j −j −1 +j +j −1 −j −1 −1 +j −j +j −1 +j +j −1 −j +j +j +1 −1 +1 −j −1 −1 −j +1
+1 +1 −j +j −j +1 −j −j +1 +j +j +j +1 −1 +1 −j −1 −1 −j +1 +1 +1 −j +j −j +1 −j −j +1 +j −j
−j −1 +1 −1 +j +1 +1 +j −1 +1 +1 −j +j −j +1 −j −j +1 +j +j +j +1 −1 +1 −j −1 −1 −j +1 +j +j
+1 −1 +1 +j +1 +1 +j −1 +1 +1 −j +j −j −1 +j +j −1 −j −j −j −1 +1 −1 −j −1 −1 −j +1 +1 +1 −j
+j −j −1 +j +j −1 −j −1 −1 +j −j +j −1 +j +j −1 −j +j +j +1 −1 +1 −j −1 −1 −j +1 −1 −1 +j −j +j
−1 +j +j −1 −j −j −j −1 +1 −1 +j +1 +1 +j −1 +j +j +1 −1 +1 +j +1 +1 +j −1 +1 +1 −j +j −j
−1 +j +j −1 −j −j −j −1 +1 −1 −j −1 −1 −j +1 +1 +1 −j +j −j −1 +j +j −1 −j −j −j −1 +1 −1 −j −1 −1
−j +1 −1 −1 +j −j +j +1 −j −j +1 +j −j −j −1 +1 −1 −j −1 −1 −j +1 +1 +1 −j +j −j −1 +j +j −1 −j
+1 +1 −j +j −j +1 −j −j +1 +j −j −j −1 +1 −1 +j +1 +1 +j −1 −1 −1 +j −j +j −1 +j +j −1 −j −j −j
−1 +1 −1 +j +1 +1 +j −1 +1 +1 −j +j −j +1 −j −j +1 +j −j −j −1 +1 −1 +j +1 +1 +j −1 +1 +1
−j +j −j +1 −j −j +1 +j +j +j +1 −1 +1 −j −1 −1 −j +1 −j −j −1 +1 −1 −j −1 −1 −j +1 −1 −1 +j −j
+j +1 −j −j +1 +j +j +j +1 −1 +1 +j +1 +1 +j −1 −1 −1 +j −j +j +1 −j −j +1 +j +j +j +1 −1
+1 +j +1 +1 +j −1 +1 +1 −j +j −j −1 +j +j −1 −j +j +j +1 −1 +1 +j +1 +1 +j −1 −1 −1 +j −j
+j +1 −j −j +1 +j −1 −1 +j −j +j −1 +j +j −1 −j +j +j +1 −1 +1 −j −1 −1 −j +1 +1 +1 −j +j −j TABLE 16-continued

| The sequence $Seq^{iTX}_{right,804}(k)$ |
|---|
| +1 −j −j +1 +j +j +j +1 −1 +1 −j −1 −1 −j +1 −1 −1 +j −j +j −1 +j +j −1 −j +j +j +1 −1 +1 −j |
| −1 −1 −j +1 −1 −1 +j −j +j −1 +j +j −1 −j −j −j −1 +1 −1 +j +1 +1 +j −1 +j +j +1 −1 +1 +j +1 |
| +1 +j −1 +1 +1 −j +j −j −1 +j +j −1 −j −j −j −1 +1 −1 −j −1 −1 −j +1 +1 +1 −j +j −j −1 +j +j −1 |
| −j −j −j −1 +1 −1 −j −1 −1 −j +1 −1 −1 +j −j +j +1 −j −j +1 +j −j −j −1 +1 −1 −j −1 −1 −j +1 +1 |
| +1 −j +j −j −1 +j +j −1 −j +1 +1 −j +j −j +1 −j −j +1 +j −j −j −1 +1 −1 +j +1 +1 +j −1 −1 −1 |
| +j −j +j −1 +j +j −1 −j −j −j −1 +1 −1 +j +1 +1 +j −1 −1 +j −1 −j |

In some demonstrative embodiments, some or all of the sequences of Tables 1-8 and/or Tables 9-16, and/or any other additional or alternative sequences may be used.

In some demonstrative embodiments, the sequences of Tables 1-8 and/or Tables 9-16 may be configured to provide one or more technical benefits and/or address one or more technical problems and/or issues, e.g., as described below.

In some demonstrative embodiments, the sequences of one or more of Tables 1-8 and/or Tables 9-16 may be designed to have reduced (low) Peak-to-Average-Power Ratio (PAPR) properties, e.g., as described below.

In some demonstrative embodiments, the sequences of one or more of Tables 1-8 and/or Tables 9-16 may be designed to have a PAPR, which may be different from a PAPR of one or more other portions of a PPDU including a TRN subfield based on the sequences of one or more of Tables 1-8 and/or Tables 9-16, e.g., as described below.

For example, devices 102 and/or 140 may be configured to generate, transmit, receive and/or process a PPDU including a first field, e.g., a data field, having a first PAPR, and a second field, e.g., a TRN field, which may be based on the sequences of one or more of Tables 1-8 and/or Tables 9-16, and may have a second PAPR, e.g., different from the first PAPR.

In some demonstrative embodiments, the sequences of one or more of Tables 1-8 may be designed to have a margin, e.g., a good or increased margin, from a PAPR of a data part of PPDU including the TRN subfields generated according to the sequences of one or more of Tables 1-8 and/or Tables 9-16, e.g., as described below.

In some demonstrative embodiments, the sequences of one or more of Tables 1-8 and/or Tables 9-16 may be designed to have a low PAPR and good autocorrelation properties, for example, with side lobes of less than 0.2-0.3, and/or low cross correlation of less than 0.2-0.3.

In some demonstrative embodiments, the sequences of one or more of Tables 1-8 and/or Tables 9-16 may be designed to use simple alphabet of {±1, ±j}, and may be implemented even without requiring implementation of a matched filter.

In some demonstrative embodiments, the improved PAPR properties provided by the sequences of Tables 1-8 and/or Tables 9-16 may allow a technical benefit by allowing to perform channel estimation in a linear regime of power amplifier, for example, by avoiding distortion of the channel estimation.

In some demonstrative embodiments, the improved cross correlation properties provided by the sequences of Tables 1-8 and/or Tables 9-16 may allow a technical benefit by allowing to avoid an effect of unintentional beamforming at the reception.

In some demonstrative embodiments, a simulation of the PAPR, autocorrelation, and/or cross correlation properties of the sequences of Tables 1-8 and/or Tables 9-16 may be performed, for example, based on the following assumptions:

Original signal waveform defined @ 2.64×NCB GHz;
Up-sampled signal waveform:
Zero Order Holder (ZOH), up-sampling factor of ×8;
Low Passband Filter (LPF):
Chebyshev type 2, 5th order filter;
Stopband ripple R=26 dB; and/or
Stopband edge frequency W=NCB×2×1.7 GHz.

Figure 3:
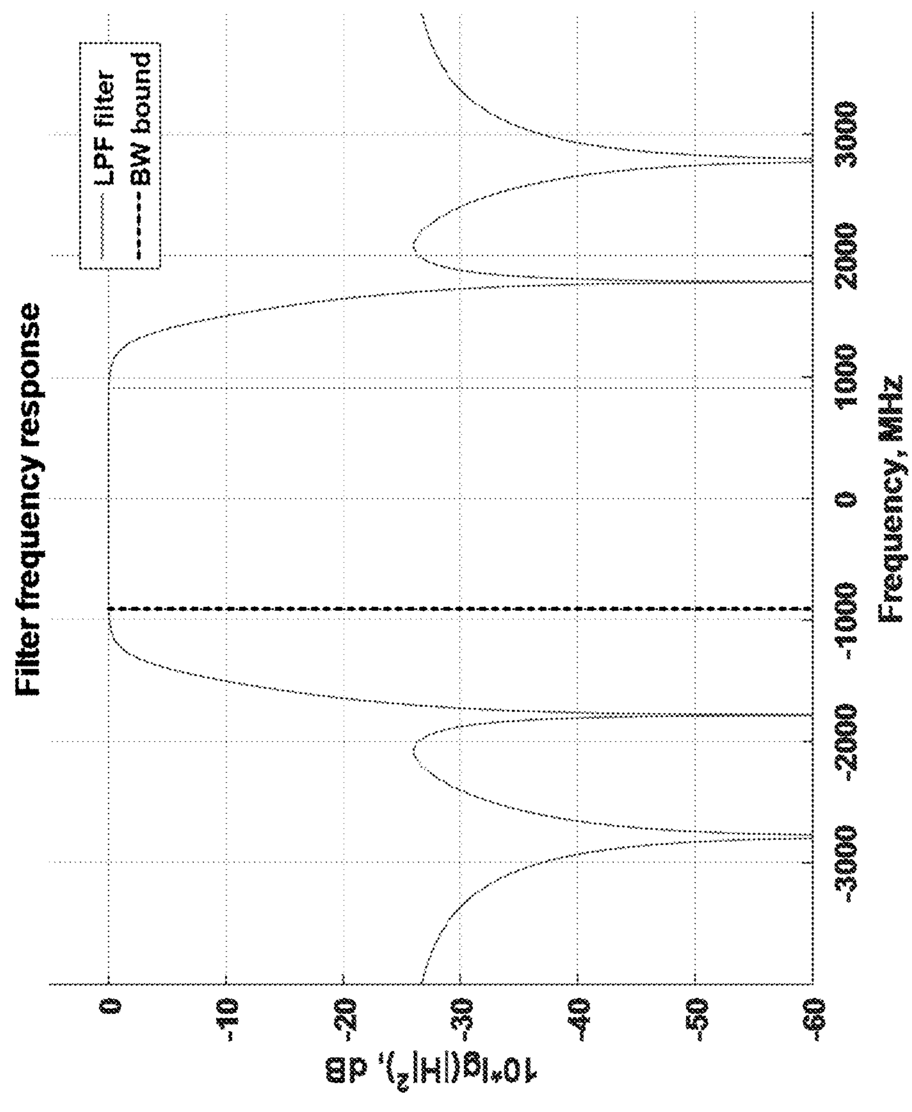
FIG. 3 is a schematic illustration of a simulated filter frequency response, which may be implemented in accordance with some demonstrative embodiments.

Reference is made to FIG. 3, which schematically illustrates a simulated filter frequency response 300, which may be implemented in accordance with some demonstrative embodiments.

For example, simulated filter frequency response 300 may correspond to the factor $N_{CB}$=1.

As shown in FIG. 3, simulated filter frequency response 300 may be sufficiently flat for in-band subcarriers.

As shown in FIG. 3, the active subcarriers for $N_{CB}$=1 may be {−177:177}.

In some demonstrative embodiments, for example, for $N_{CB}$>1, the filter bandwidth may be scaled proportionally to the $N_{CB}$.

Figure 4:
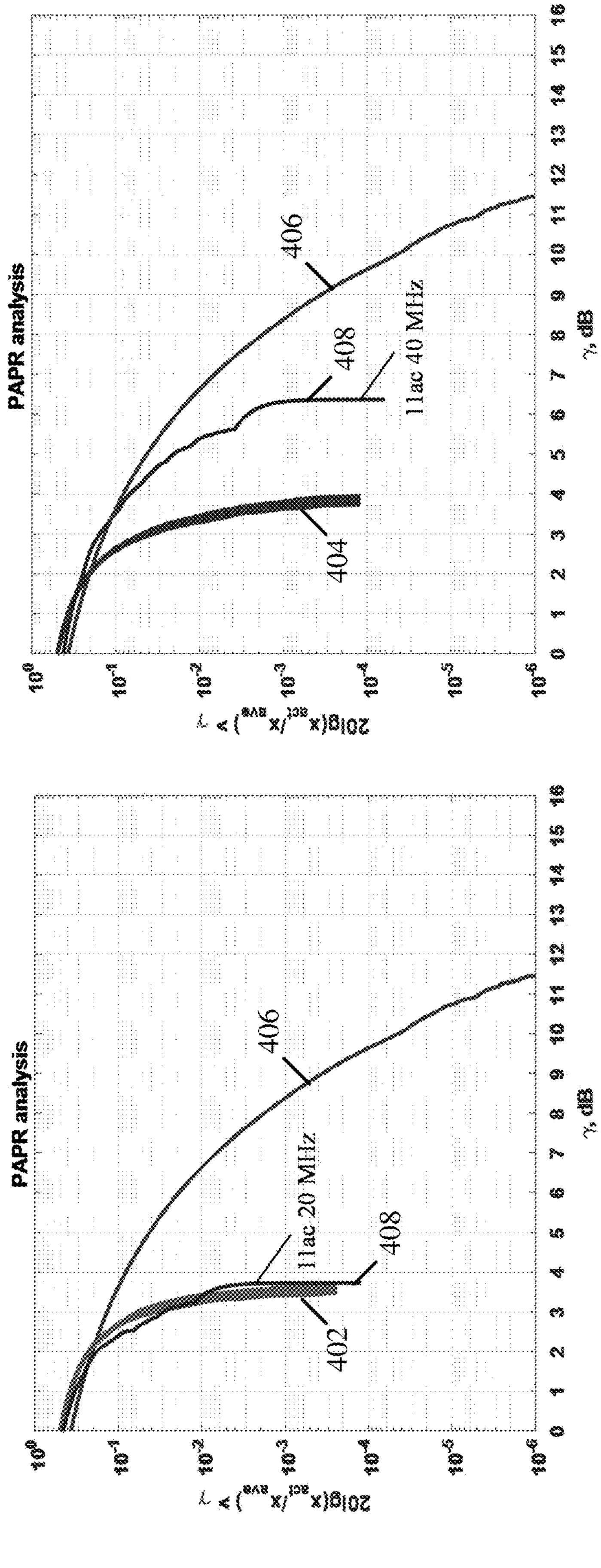
FIG. 4 is a schematic illustration of simulated Peak-to-Average-Power Ratio (PAPR) properties of Training (TRN) sequence sets corresponding to a factor $N_{CB}=1$ and a factor $N_{CB}=2$, in accordance with some demonstrative embodiments.

Reference is made to FIG. 4, which schematically illustrates simulated PAPR properties of the TRN sequence sets corresponding to a factor $N_{CB}$=1 and a factor $N_{CB}$=2, in accordance with some demonstrative embodiments.

For example, the PAPR properties of FIG. 4 may correspond to the TRN sequence set including 8 sequences for 8 streams/Tx chains, for example, the TRN sequence set based on Tables 1 and 2 ($N_{CB}$=1), and the TRN sequence set based on Tables 3 and 4 ($N_{CB}$=2), e.g., as described above.

For example, as shown in FIG. 4, a PAPR 402 of the TRN sequence set for the factor $N_{CB}$=1 and a PAPR 404 the TRN sequence set for the factor $N_{CB}$=2 may be less than, and spaced apart from, a PAPR 406 of the data portion.

Also shown in FIG. 4, is a PAPR 408 of a preamble (20 MHZ/40 MHz channel) according to an IEEE 802.11ac Specification.

Figure 5:
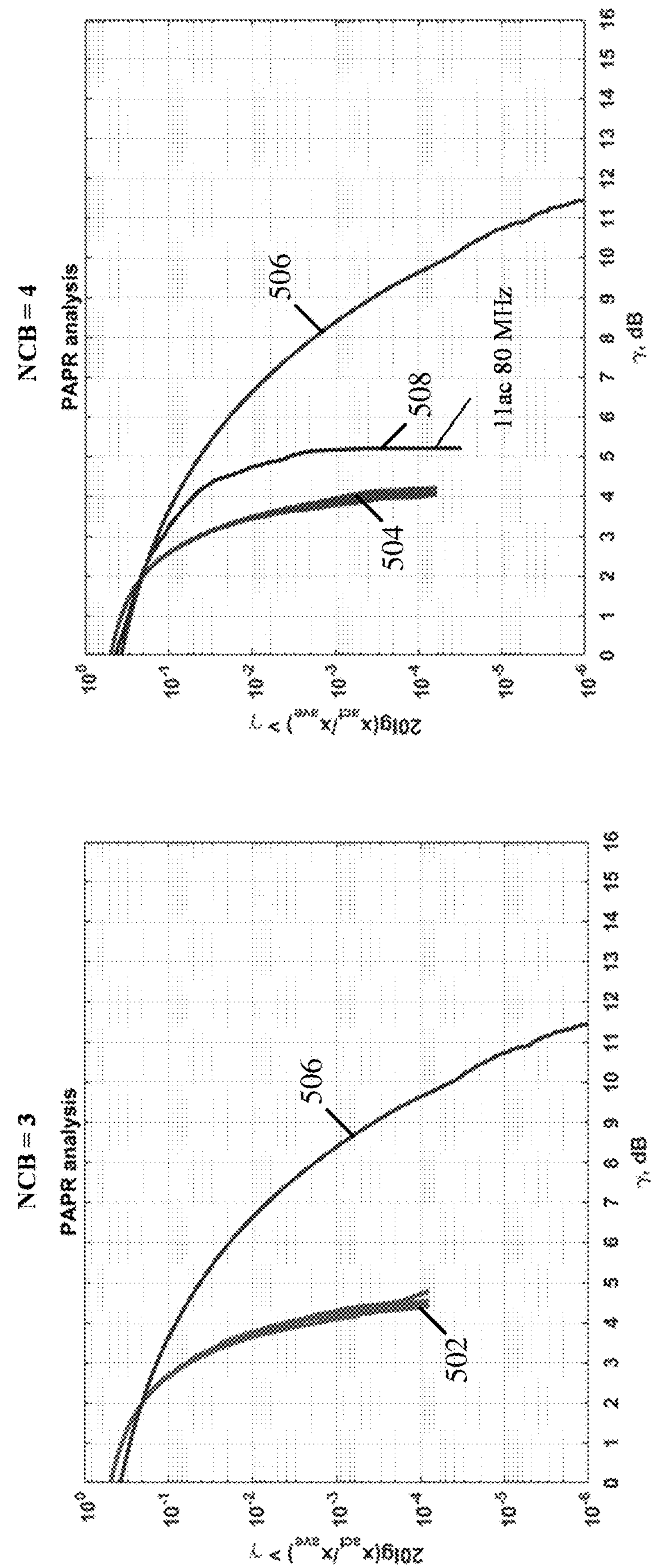
FIG. 5 is a schematic illustration of simulated PAPR properties of TRN sequence sets corresponding to a factor $N_{CB}=3$ and a factor $N_{CB}=4$, in accordance with some demonstrative embodiments.

Reference is made to FIG. 5, which schematically illustrates simulated PAPR properties of the TRN sequence sets corresponding to a factor $N_{CB}$=3 and a factor $N_{CB}$=4, in accordance with some demonstrative embodiments.

For example, the PAPR properties of FIG. 5 may correspond to the TRN sequence set including 8 sequences for 8 streams/Tx chains, for example, the TRN sequence set based on Tables 5 and 6 ($N_{CB}$=3), and the TRN sequence set based on Tables 7 and 8 ($N_{CB}$=4), e.g., as described above.

For example, as shown in FIG. 5, a PAPR 502 of the TRN sequence set for the factor $N_{CB}$=3 and a PAPR 504 of the TRN sequence set for the factor $N_{CB}$=4 may be less than, and spaced apart from, a PAPR 506 of the data portion.

Also shown in FIG. 5, is a PAPR 508 of a preamble (80 MHz channel) according to an IEEE 802.11ac Specification.

Figure 6:
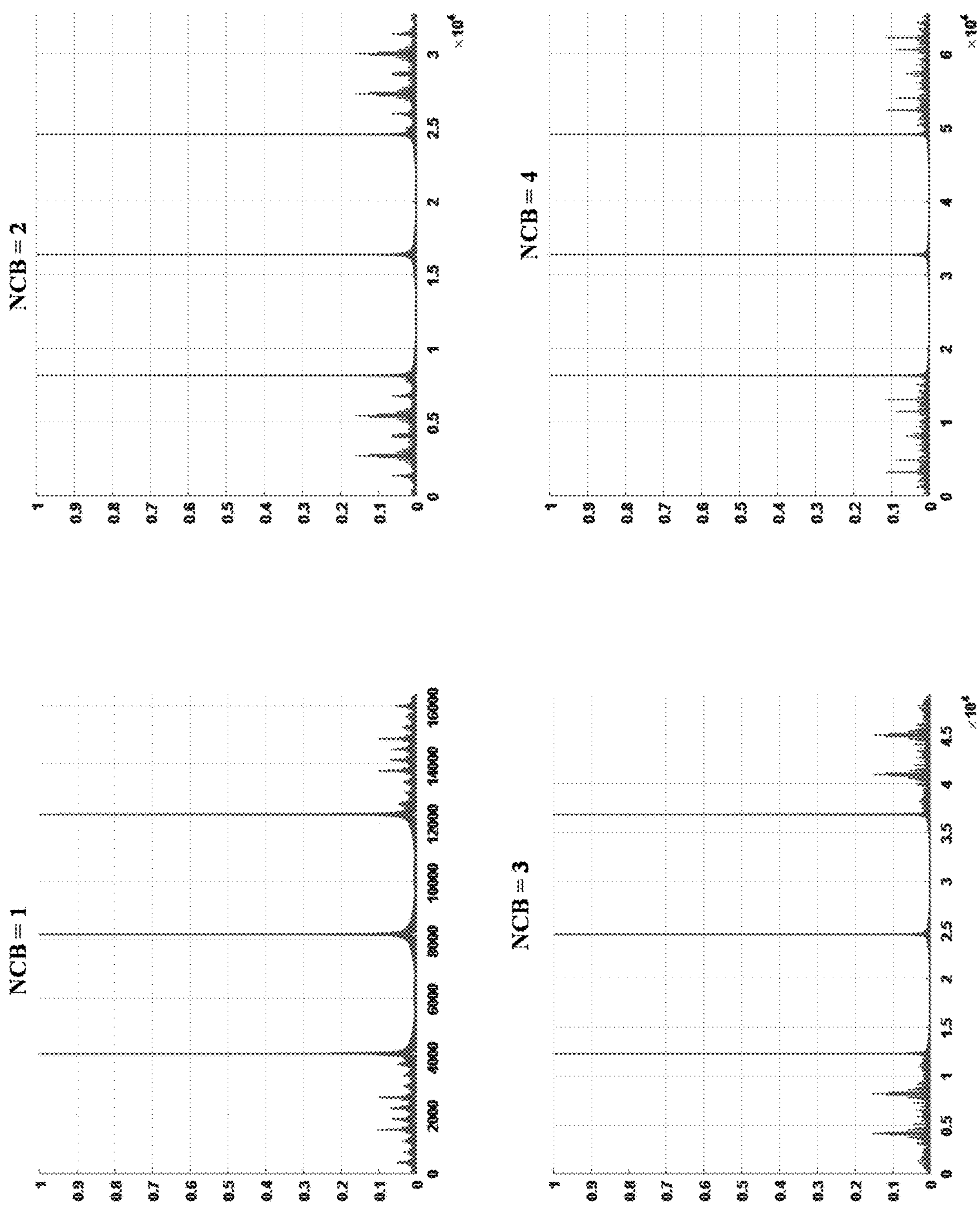
FIG. 6 is a schematic illustration of simulated autocorrelation properties of the TRN sequence sets corresponding to the factors $N_{CB}=1$, $N_{CB}=2$, $N_{CB}=3$, and $N_{CB}=4$, in accordance with some demonstrative embodiments.

Reference is made to FIG. 6, which schematically illustrates simulated autocorrelation properties of the TRN sequence sets corresponding to the factors $N_{CB}$=1, $N_{CB}$=2, $N_{CB}$=3, and $N_{CB}$=4, in accordance with some demonstrative embodiments.

For example, as shown in FIG. 6, the eight sequences in a TRN sequence set may have similar autocorrelation properties.

For example, the eight sequences of the TRN sequence set based on Tables 1 and 2 (e.g., $N_{CB}=1$) may have similar autocorrelation properties; the eight sequences of the TRN sequence set based on Tables 3 and 4 (e.g., $N_{CB}=2$) may have similar autocorrelation properties; the eight sequences of the TRN sequence set based on Tables 5 and 6 (e.g., $N_{CB}=3$) may have similar autocorrelation properties; and/or the eight sequences of the TRN sequence set based on Tables 7 and 8 (e.g., $N_{CB}=4$) may have similar autocorrelation properties.

In some demonstrative embodiments, for example, as shown in FIG. 6, a peak to side-lobe ratio of about 13 dB may be obtained (circular convolution).

Figure 7:
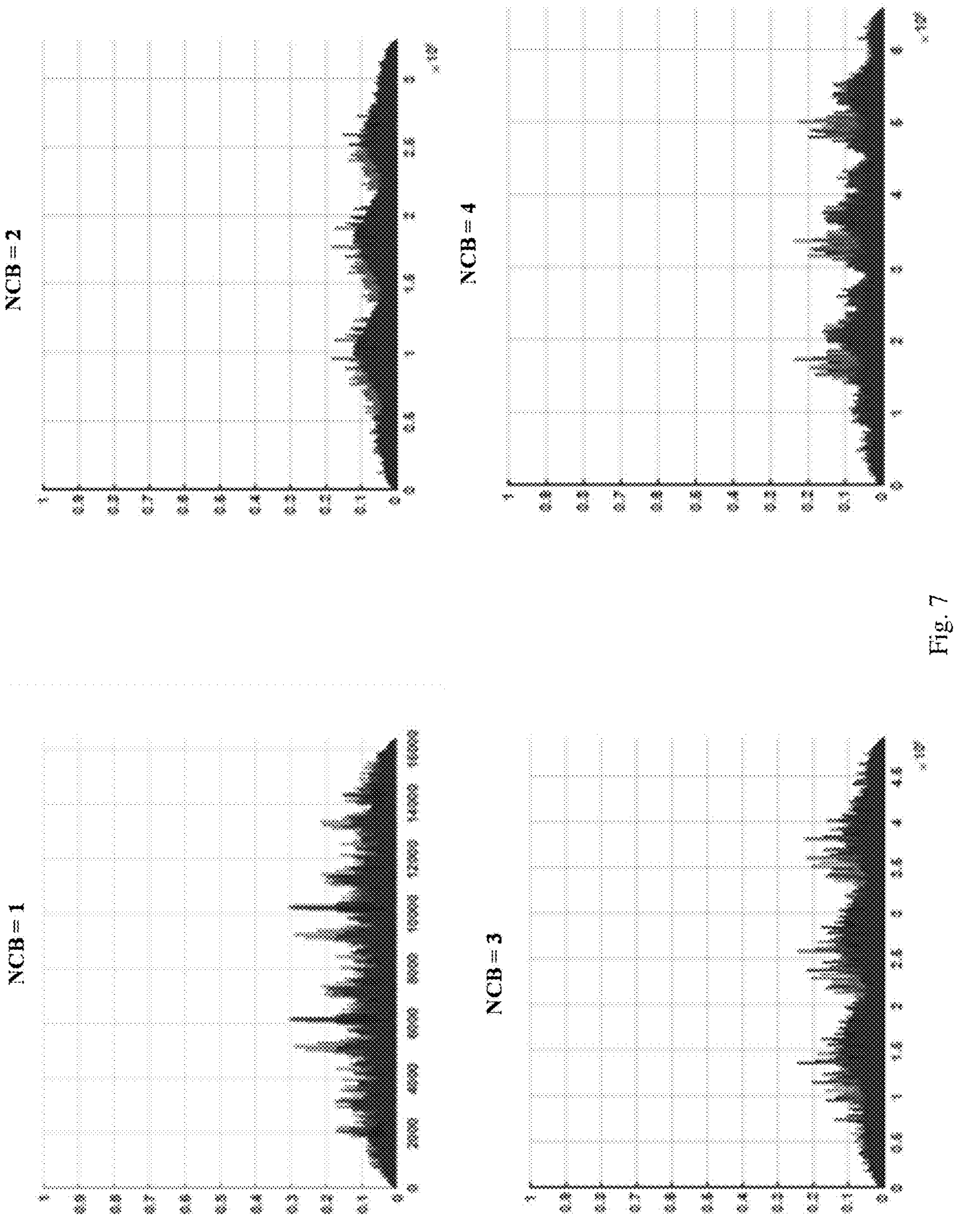
FIG. 7 is a schematic illustration of simulated cross-correlation properties of the TRN sequence sets corresponding to the factors $N_{CB}=1$, $N_{CB}=2$, $N_{CB}=3$, and $N_{CB}=4$, in accordance with some demonstrative embodiments.

Reference is made to FIG. 7, which schematically illustrates simulated cross-correlation properties of the TRN sequence sets corresponding to the factors $N_{CB}=1$, $N_{CB}=2$, $N_{CB}=3$, and $N_{CB}=4$, in accordance with some demonstrative embodiments.

In some demonstrative embodiments, as shown in FIG. 7, for $N_{CB}=$, a maximum value of about 0.2-0.3 dB and/or a peak suppression ratio of about (−14.0)-(−10.5) dB may be obtained.

In some demonstrative embodiments, as shown in FIG. 7, for $N_{CB}=2$, 3, 4, a maximum value of about 0.2 dB and/or a peak suppression ratio of about (−14.0) dB may be obtained.

For example, MF may be for the sequence #1, e.g., according to Table 1, and/or 3 repetitions of the sequences 2-8, e.g., according to Tables 2-8, may be the input to the MF.

Referring back to FIG. 1, in some demonstrative embodiments devices 102 and/or 140 may be configured to utilize OFDM TRN sequences, which may be based on the one or more transmit chains for transmission of the EDMG PPDU, e.g., as described above.

In other embodiments, the OFDM TRN sequences may be defined and/or determined based on any other additional or alternative parameters.

In some demonstrative embodiments, the OFDM TRN sequences may be defined and/or determined based on one or more space-time streams for transmission of the EDMG PPDU, e.g., as described below.

In some demonstrative embodiments, devices 102 and/or 140 may be configured to generate, transmit, receive and/or process a PPDU, for example, an EDMG PPDU, e.g., an EDMG OFDM PPDU, for example, according to the format of EDMG PPDU 200 (FIG. 2), including an EDMG-CEF, e.g., EDMG-CEF 214 (FIG. 2), e.g., as described below.

In some demonstrative embodiments, the EDMG-CEF may be defined in a frequency domain, for example, using a set of sequences, e.g., as described below.

In some demonstrative embodiments, devices 102 and/or 140 may be configured to transmit the OFDM TRN field and/or the EDMG-CEF, for example, using one or more, e.g., a number of, transmit chains, e.g., $N_{TX}$ transmit chains. For example, different space-time streams (also referred to as "spatial streams") may use different frequency domain sequences, e.g., as described below.

In some demonstrative embodiments, a sequence length of the frequency domain sequences may be dependent, for example, on the number of 2.16 GHz channels used for PPDU transmission.

In one example, the sequence length may be defined by the factor $N_{CB}$, which may be equal, for example, to 1, 2, 3 or 4.

In some demonstrative embodiments, for example, the sequence length of the frequency domain sequences may be defined, for example, in accordance with one or more OFDM signal parameters for OFDM PPDU, e.g., in accordance with a subclause defining OFDM signal parameters for an IEEE 802.11ay Specification.

Other additional or alternative parameters may be used.

In some demonstrative embodiments, devices 102 and/or 140 may be configured to generate, transmit, receive and/or process the TRN field according to an OFDM TRN subfield definition, which may be defined, for example, in a frequency domain, e.g., as described below.

In some demonstrative embodiments, controller 124 may be configured to cause, trigger, and/or control the wireless station implemented by device 102 to generate an EDMG PPDU including at least a TRN field, for example, EDMG PPDU 200 including TRN field 224 (FIG. 2), e.g., as described below.

In some demonstrative embodiments, the TRN field may include one or more OFDM TRN subfields defined in a frequency domain, e.g., as described below.

In some demonstrative embodiments, controller 124 may be configured to cause, trigger, and/or control the wireless station implemented by device 102 to transmit the EDMG PPDU in an OFDM transmission over a channel bandwidth in a frequency band above 45 GHz, e.g., as described below.

In other embodiments, device 102 may transmit the EDMG PPDU in the OFDM transmission over any other frequency band.

In some demonstrative embodiments, an OFDM TRN subfield of the one or more OFDM TRN subfields may be based on an OFDM TRN sequence in the frequency domain, e.g., as described below.

In some demonstrative embodiments, the OFDM TRN sequence may be based on the channel bandwidth, e.g., as described below.

In some demonstrative embodiments, the OFDM TRN sequence may be based on a space-time stream index, e.g., as described below.

In some demonstrative embodiments, controller 124 may be configured to cause, trigger, and/or control the wireless station implemented by device 102 to determine an OFDM TRN subfield waveform of the OFDM TRN subfield in a time domain based on the OFDM TRN sequence in the frequency domain and a TRN mapping matrix, e.g., as described below.

In some demonstrative embodiments, devices 102 and/or 140 may be configured to generate, transmit, receive and/or process the EDMG-CEF, for example, EDMG-CEF 214 (FIG. 2), according to an OFDM EDMG-CEF definition, which may be defined, for example, in a frequency domain, e.g., as described below.

In some demonstrative embodiments, the OFDM TRN subfield definition in the frequency domain and/or the OFDM EDMG-CEF definition in the frequency domain may allow, for example, one or more technical benefits and/or solving one or more technical problems. In one example, utilizing OFDM TRN subfields and/or the EDMG-CEF defined in the frequency domain may allow, for example, at least to process the OFDM TRN fields and/or the EDMG-CEF on a per subcarrier basis, for example, to support at least performing beamforming training and/or channel estimation per subcarrier basis.

In some demonstrative embodiments, the OFDM TRN subfield definition in the frequency domain and/or the EDMG-CEF definition in the frequency domain may allow, for example, one or more technical benefits, for example, compared to a solution, which defines the TRN subfields and/or the EDMG-CEF in a time domain, for example, for SC and/or Control PHY. For example, such a definition in the time domain may not support channel estimation in the frequency domain.

In some demonstrative embodiments, devices 102 and/or 140 may be configured to generate, transmit, receive and/or process the TRN field according to a TRN subfield definition for EDMG OFDM PHY, e.g., as described below.

In some demonstrative embodiments, the TRN subfields may be defined in the frequency domain, for example, per transmit chain and/or space-time stream, for example, using a sequence set, e.g., as described below.

In some demonstrative embodiments, devices 102 and/or 140 may be configured to generate, transmit, receive and/or process the EDMG-CEF according to an EDMG-CEF definition for EDMG OFDM PHY, e.g., as described below.

In some demonstrative embodiments, the EDMG-CEF may be defined in the frequency domain, for example, per transmit chain and/or space-time stream, for example, using a sequence set, e.g., as described below.

In some demonstrative embodiments, for example, a number of different sequences in the sequence set may be based on, e.g., may be equal to, the number of space-time streams, e.g., as described below. In other embodiments, the number of different sequences in the sequence set may be based on any other additional or alternative parameter.

In some demonstrative embodiments, the sequences for the TRN subfield and/or the EDMG-CEF may be defined for a plurality of different channel bonding factors, e.g., for $N_{CB}$=1, 2, 3, and/or 4, any other channel bonding factor, and/or any other additional or alternative factor or parameter.

In some demonstrative embodiments, an OFDM TRN subfield of an EDMG PPDU may be defined, for example, based on, and/or in compliance with, a definition of the EDMG-CEF, e.g., as described below.

In some demonstrative embodiments, the OFDM TRN subfield definition may be identical to the EDMG-CEF definition, e.g., as described below.

Some demonstrative embodiments are described with respect to an implementation in which the definition of the OFDM TRN subfield may be identical to the definition of the EDMG-CEF. However, in other embodiments, different definitions may be implemented for the OFDM TRN subfield and the EDMG-CEF, for example, using different sequences.

In some demonstrative embodiments, for example, the EDMG-CEF may be defined based on one or more EDMG-CEF sequences, which may be based on the one or more space-time streams, e.g., as described below; and/or the OFDM TRN subfield may be defined based on one or more OFDM TRN sequences which may be defined based on the one or more transmit chains, e.g., as described above.

In some demonstrative embodiments, an OFDM TRN subfield of an EDMG PPDU may be defined, for example, based on one or more sequences ("OFDM TRN sequences"), which may be based on one or more parameters, for example, including at least a channel bandwidth to be used for transmitting the EDMG PPDU, e.g., as described below.

In some demonstrative embodiments, for example, the OFDM TRN sequences may be defined, for example, to support a channel bandwidth of 2.16 GHz, a channel bandwidth of 4.32 GHz, a channel bandwidth of 6.48 GHz, and/or a channel bandwidth of 8.64 GHz, e.g., as described below. In other embodiments, the OFDM TRN sequences may be defined and/or configured with respect to any other additional or alternative channel bandwidth.

In some demonstrative embodiments, for example, the OFDM TRN sequences may be defined, for example, to support transmission over one or more space-time streams (spatial streams) and/or via one or more transmit chains, e.g., as described below.

In some demonstrative embodiments, the OFDM TRN sequences may be configured to support transmission over 1, 2, 3, 4, 5, 6, 7 or 8 space-time streams, e.g., as described below. In other embodiments, any other number of space-time streams may be utilized, for example, more than 8 space-time streams, for example, up to 16 space-time streams, or even more than 16 space-time streams.

In some demonstrative embodiments, an OFDM TRN subfield to be transmitted over a space-time stream may be determined, for example, based on an OFDM TRN sequence, which may be based at least on an index of the space-time stream, e.g., as described below. For example, a first OFDM TRN subfield to be transmitted over a first space-time stream may be determined, for example, based on a first OFDM TRN sequence, which may be based at least on the index of the first space-time stream, and a second OFDM TRN subfield to be transmitted over a second space-time stream may be determined, for example, based on a second OFDM TRN sequence, e.g., different from the first OFDM TRN sequence, which may be based at least on the index of the second space-time stream, e.g., as described below.

In some demonstrative embodiments, an EDMG-CEF of an EDMG PPDU may be defined, for example, based on one or more sequences ("OFDM EDMG-CEF sequences"), which may be based on one or more parameters, for example, including at least a channel bandwidth to be used for transmitting the EDMG PPDU, e.g., as described below.

In some demonstrative embodiments, for example, the OFDM EDMG-CEF sequences may be defined, for example, to support a channel bandwidth of 2.16 GHz, a channel bandwidth of 4.32 GHz, a channel bandwidth of 6.48 GHz, and/or a channel bandwidth of 8.64 GHz, e.g., as described below. In other embodiments, the OFDM EDMG-CEF sequences may be defined and/or configured with respect to any other additional or alternative channel bandwidth and/or based on any other additional or alternative parameter or factor.

In some demonstrative embodiments, for example, the OFDM EDMG-CEF sequences may be defined, for example, to support transmission over one or more space-time streams (spatial streams) and/or via one or more transmit chains, e.g., as described below.

In some demonstrative embodiments, the OFDM EDMG-CEF sequences may be configured to support transmission over 1, 2, 3, 4, 5, 6, 7 or 8 space-time streams, e.g., as described below. In other embodiments, any other number of space-time streams may be utilized, for example, more than 8 space-time streams, for example, up to 16 space-time streams, or even more than 16 space-time streams.

In some demonstrative embodiments, an OFDM EDMG-CEF to be transmitted over a space-time stream may be determined, for example, based on an OFDM EDMG-CEF sequence, which may be based at least on an index of the space-time stream, e.g., as described below. For example, a first OFDM EDMG-CEF to be transmitted over a first space-time stream may be determined, for example, based on a first OFDM EDMG-CEF sequence, which may be based at least on the index of the first space-time stream, and a second OFDM EDMG-CEF subfield to be transmitted over a second space-time stream may be determined, for example, based on a second OFDM EDMG-CEF sequence, e.g., different from the first OFDM EDMG-CEF sequence, which may be based at least on the index of the second space-time stream, e.g., as described below.

In some demonstrative embodiments, devices 102 and/or 140 may be configured to define an OFDM TRN subfield and/or the EDMG-CEF to be transmitted via a space-time stream over a channel bandwidth, for example, based on a sequence (also referred to as "EDMG-CEF sequence" or "EDMG-TRN sequence"), which may correspond, for example, to the space-time stream and/or the channel bandwidth, e.g., as described below.

Some demonstrative embodiments are described herein with respect to an OFDM TRN subfield utilizing one or more EDMG-CEF sequences. In other embodiments, one or more OFDM TRN subfields may be defined utilizing any other additional or alternative sequences, e.g., identical to or different from the EDMG-CEF sequences.

In some demonstrative embodiments, for example, for EDMG PPDU transmissions using the EDMG OFDM mode over a 2.16 GHz channel, the EDMG-CEF sequence and/or the EDMG-TRN sequence may be defined in the frequency domain for an i-th ($i_{STS}$-th) space-time stream, e.g., as follows:

$$\text{EDMG-TRN}^{iSTS}_{-177,177}=\text{EDMG-CEF}^{iSTS}_{-177,177}=[\text{Seq}^{iSTS}_{left,176},0,0,0,\text{Seq}^{iSTS}_{right,176}],\ \text{for } i_{STS}=1,2,3,4,5,6,7,8 \quad (8)$$

In some demonstrative embodiments, for example, for EDMG PPDU transmissions using the EDMG OFDM mode over a 4.32 GHz channel, the EDMG-CEF sequence and/or the EDMG-TRN sequence may be defined in the frequency domain for an i-th ($i_{STS}$-th) space-time stream, e.g., as follows:

$$\text{EDMG-CEF}^{iSTS}_{-386,386}=\text{EDMG-TRN}^{iSTS}_{-386,386}=[\text{Seq}^{iSTS}_{left,385},0,0,0,\text{Seq}^{iSTS}_{right,385}],\ \text{for } i_{STS}=1,2,3,4,5,6,7,8 \quad (9)$$

In some demonstrative embodiments, for example, for EDMG PPDU transmissions using the EDMG OFDM mode over a 6.48 GHz channel, the EDMG-CEF sequence and/or the EDMG-TRN sequence may be defined in the frequency domain for an i-th ($i_{STS}$-th) space-time stream, e.g., as follows:

$$\text{EDMG-CEF}^{iSTS}_{-96,596}=\text{EDMG-TRN}^{iSTS}_{-596,596}=[\text{Seq}^{iSTS}_{left,595},0,0,0,\text{Seq}^{iSTS}_{right,595}],\ \text{for } i_{STS}=1,2,3,4,5,6,7,8 \quad (10)$$

In some demonstrative embodiments, for example, for EDMG PPDU transmissions using the EDMG OFDM mode over a 8.64 GHz channel, the EDMG-CEF sequence and/or the EDMG-TRN sequence may be defined in the frequency domain for an i-th ($i_{STS}$-th) space-time stream, e.g., as follows:

$$\text{EDMG-CEF}^{iSTS}_{-805,805}=\text{EDMG-TRN}^{iSTS}_{-805,805}=[\text{Seq}^{iSTS}_{left,804},0,0,0,\text{Seq}^{iSTS}_{right,804}],\ \text{for } i_{STS}=1,2,3,4,5,6,7,8 \quad (11)$$

In some demonstrative embodiments, the sequences $\text{Seq}^{iSTS}_{left,N}$ and/or $\text{Seq}^{iSTS}_{right,N}$ may include sequences of a length N corresponding to the $i_{STS}$-th space-time stream, e.g., as described above with reference to Tables 1-8 and/or Tables 9-16.

In some demonstrative embodiments, some or all of the EDMG-CEF sequences and/or EDMG-TRN sequences defined above may be used, and/or one or more additional or alternative EDMG-CEF sequences and/or EDMG-TRN sequences may be defined, e.g., based on the channel bandwidth, the space-time stream, the channel bonding factor, and/or any other additional or alternative parameters.

In some demonstrative embodiments, devices 102 and/or 140 may be configured to define the EDMG-CEF according to an EDMG-CEF waveform in a time domain, which may be based, for example, on the EDMG-CEF sequences, e.g., as described below.

In some demonstrative embodiments, for example, an EDMG-CEF field transmit waveform, e.g., for an $i_{TX}$-th transmit chain, in the time domain shall be defined at an OFDM sampling rate, denoted $F_s$, for example, at the sampling rate $F_s$ equal to $N_{CB}$*2.64 GHz, and/or at a sample time duration, denoted $T_s$, for example, at the sample time duration $T_s=1/F_s$ nanoseconds (ns), e.g., as follows:

$$r^{n,i_{TX}}_{EDMG-CEF}(qT_s)=\frac{1}{\sqrt{N_{STS}\cdot N^{Tone}_{EDMG-CEF}}}w(qT_s)\cdot\sum_{k=-N_{SR}}^{N_{SR}}\sum_{i_{STS}=1}^{N_{STS}}[Q_k]_{i_{TX}i_{STS}}[P_{EDMG-CEF}]_{i_{STS},n}EDMG-CEF_k^{i_{STS}}\exp(j2\pi k\Delta_F(qT_s-T_{GI\ long}))1\le n\le N^{N_{STS}}_{EDMG-CEF} \quad (12)$$

wherein:

$N_{EDMG-CEF}^{Tone}=N_{ST}-N_{DC}$ denotes the total number of active tones;

$Q_k$ denotes the spatial mapping matrix per k-th subcarrier;

$P_{EDMG-CEF}$ denotes an EDMG-CEF mapping matrix, e.g., as defined below and/or any other mapping matrix;

$N_{EDMG-CEF}^{N_{STS}}$ denotes the number of OFDM symbols in EDMG-CEF for given total number of space-time streams $N_{STS}$, e.g., defined below or according to any other definition;

$[\ ]_{m,n}$ denotes a matrix element from m-th row and n-th column;

$w(qT_s)$ denotes a window function applied to smooth the transitions between consecutive OFDM symbols, this function may be defined, for example, in an implementation specific manner; and/or q denotes a time sample index.

In other embodiments, the OFDM EDMG-CEF waveform may be defined using any other additional or alternative parameters.

In some demonstrative embodiments, the EDMG-CEF mapping matrix $P_{EDMG-CEF}$ may be defined, for example, based on the number of space-time streams, e.g., as described below.

In some demonstrative embodiments, a number of rows in the EDMG-CEF mapping matrix $P_{EDMG-CEF}$ may be configured, for example, based on the value of $N_{STS}$ to be supported, for example, such that the EDMG-CEF waveform may be defined using $N_{STS}$ rows from the EDMG-CEF mapping matrix $P_{EDMG-CEF}$.

In some demonstrative embodiments, a number of columns in the EDMG-CEF mapping matrix $P_{EDMG-CEF}$ may be configured, for example, based on the value of $N_{EDMG-CEF}^{N_{STS}}$ to be supported. For example, the number of columns in the EDMG-CEF mapping matrix $P_{EDMG-CEF}$ may be equal to $N_{EDMG-CEF}^{N_{STS}}$.

In some demonstrative embodiments, the EDMG-CEF mapping matrix $P_{EDMG-CEF}$ may be defined, for example, for $N_{STS}=1$, e.g., as follows:

$$P_{EDMG-CEF}=[+1-1],N_{EDMG-CEF}^{N_{STS}}=2 \quad (13)$$

In some demonstrative embodiments, the EDMG-CEF mapping matrix $P_{EDMG\text{-}CEF}$ may be defined, for example, for $N_{STS}$=2, e.g., as follows:

$$P_{EDMG-CEF} = \begin{bmatrix} +1 & -1 \\ +1 & +1 \end{bmatrix}, N_{EDMG-CEF}^{N_{STS}} = 2 \quad (14)$$

In some demonstrative embodiments, the EDMG-CEF mapping matrix $P_{EDMG\text{-}CEF}$ may be defined, for example, for $N_{STS}$=3, e.g., as follows:

$$P_{EDMG-CEF} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), N_{EDMG-CEF}^{N_{STS}} = 3 \quad (15)$$

In some demonstrative embodiments, the EDMG-CEF mapping matrix $P_{EDMG\text{-}CEF}$ may be defined, for example, for $N_{STS}$=4, e.g., as follows:

$$P_{EDMG-CEF} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, N_{EDMG-CEF}^{N_{STS}} = 4 \quad (16)$$

In some demonstrative embodiments, the EDMG-CEF mapping matrix $P_{EDMG\text{-}CEF}$ may be defined, for example, for $N_{STS}$=5,6, e.g., as follows:

$$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix}, \quad (17)$$

$$w_6 = \exp(-j2\pi/6), N_{EDMG-CEF}^{N_{STS}} = 6$$

In some demonstrative embodiments, the EDMG-CEF mapping matrix $P_{EDMG\text{-}CEF}$ may be defined, for example, for $N_{STS}$=7,8, e.g., as follows:

$$P_{EDMG-CEF} = \begin{bmatrix} P_{4\times4} & P_{4\times4} \\ P_{4\times4} & -P_{4\times4} \end{bmatrix}, N_{EDMG-CEF}^{N_{STS}} = 8 \quad (18)$$

In other embodiments, any other additional or alternative definition of the EDMG-CEF mapping matrix may be utilized.

In some demonstrative embodiments, devices 102 and/or 140 may be configured to define the TRN subfield according to TRN subfield waveform in a time domain, which may be based, for example, on the EDMG TRN sequences and/or EDMG-CEF sequences, e.g., as described below.

In some demonstrative embodiments, for example, a TRN subfield transmit waveform, e.g., for an $i_{TX}$-th transmit chain, in the time domain shall be defined at an OFDM sampling rate, denoted $F_s$, for example, at the sampling rate $F_s$ equal to $N_{CB}$*2.64 GHz, and/or at a sample time duration, denoted $T_s$, for example, at the sample time duration $T_s=1/F_s$ nanoseconds (ns), e.g., as follows:

$$r_{TRN}^{n,i_{TX}}(qT_s) = \frac{1}{\sqrt{N_{STS}\cdot N_{TRN}^{Tone}}} w(qT_s)\cdot\cdot \sum_{k=-N_{SR}}^{N_{SR}} \sum_{i_{STS}=1}^{N_{STS}} [Q_k]_{i_{TX},i_{STS}} [P_{TRN}]_{i_{STS},n} EDMG-CEF_k^{i_{STS}} \exp(j2\pi k\Delta_F(qT_s - T_{GI\ long}))1 \le n \le N_{TRN}^{N_{STS}} \quad (19)$$

wherein:

$N_{TRN}^{Tone}=N_{ST}-N_{DC}$ denotes the total number of active tones;

$Q_k$ denotes the spatial mapping matrix per k-th subcarrier;

$P_{TRN}$ denotes a TRN mapping matrix, e.g., as defined below and/or any other mapping matrix;

$N_{TRN}^{N_{STS}}$ denotes the number of OFDM symbols in the TRN subfield for given total number of space-time streams $N_{STS}$, e.g., defined below or according to any other definition;

$[\ ]_{m,n}$ denotes a matrix element from m-th row and n-th column;

$w(qT_s)$ denotes a window function applied to smooth the transitions between consecutive OFDM symbols, this function may be defined, for example, in an implementation specific manner; and/or q denotes a time sample index.

In other embodiments, the OFDM TRN subfield waveform may be defined using any other additional or alternative parameters.

In some demonstrative embodiments, the OFDM TRN mapping matrix $P_{TRN}$ may be defined, for example, based on the number of space-time streams, e.g., as described below.

In some demonstrative embodiments, a number of rows in the TRN mapping matrix $P_{TRN}$ may be configured, for example, based on the value of $N_{STS}$ to be supported, for example, such that the TRN waveform may be defined using $N_{STS}$ rows from the TRN mapping matrix $P_{TRN}$.

In some demonstrative embodiments, a number of columns in the TRN mapping matrix $P_{TRN}$ may be configured, for example, based on the value of $N_{TRN}^{N_{STS}}$ to be supported. For example, the number of columns in the TRN mapping matrix $P_{TRN}$ may be equal to $N_{TRN}^{N_{STS}}$.

In some demonstrative embodiments, the OFDM TRN mapping matrix $P_{TRN}$ may be defined, for example, for $N_{STS}$=1 and $N_{TRN}^{N_{STS}}$=2, e.g., as follows:

$$P_{TRN}=[+1\ -1], N_{TRN}^{N_{STS}}=2 \quad (20)$$

In some demonstrative embodiments, the OFDM TRN mapping matrix $P_{TRN}$ may be defined, for example, for $N_{STS}$=2 and $N_{TRN}^{N_{STS}}$=2, e.g., as follows:

$$P_{TRN} = \begin{bmatrix} +1 & -1 \\ +1 & +1 \end{bmatrix}, N_{TRN}^{N_{STS}} = 2 \quad (21)$$

In some demonstrative embodiments, the OFDM TRN mapping matrix $P_{TRN}$ may be defined, for example, for $N_{STS}$=3 and $N_{TRN}^{N_{STS}}$=3, e.g., as follows:

$$P_{TRN} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), N_{TRN}^{N_{STS}} = 3 \quad (22)$$

In some demonstrative embodiments, the OFDM TRN mapping matrix $P_{TRN}$ may be defined, for example, for $N_{STS}=4$ and $N_{TRN}^{N_{STS}}=4$, e.g., as follows:

$$P_{TRN} = P_{4\times4} = \begin{bmatrix} +1 -1 +1 +1 \\ +1 +1 -1 +1 \\ +1 +1 +1 -1 \\ -1 +1 +1 +1 \end{bmatrix}, N_{TRN}^{N_{STS}} = 4 \tag{23}$$

In some demonstrative embodiments, the OFDM TRN mapping matrix $P_{TRN}$ may be defined, for example, for $N_{STS}=5,6$ and $N_{TRN}^{N_{STS}}=6$, e.g., as follows:

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix}, \tag{24}$$

$$w_6 = \exp(-j2\pi/6), N_{TRN}^{N_{STS}} = 6$$

In some demonstrative embodiments, the OFDM TRN mapping matrix $P_{TRN}$ may be defined, for example, for $N_{STS}=7,8$ and $N_{TRN}^{N_{STS}}=8$, e.g., as follows:

$$P_{TRN} = \begin{bmatrix} P_{4\times4} & P_{4\times4} \\ P_{4\times4} & -P_{4\times4} \end{bmatrix}, N_{TRN}^{N_{STS}} = 8 \tag{25}$$

In other embodiments, any other additional or alternative definition of the TRN mapping matrix may be utilized.

In some demonstrative embodiments, the sequences $Seq^{iSTS}_{left,N}$ and/or $Seq^{iSTS}_{right,N}$ may include sequences of a length N corresponding to the $i_{STS\text{-}th}$ space-time stream, e.g., according to Tables 1-8 and/or Tables 9-16.

In some demonstrative embodiments, the sequences $Seq^{iSTS}_{left,N}$ and/or $Seq^{iSTS}_{right,N}$ may be defined for the lengths N=176, 385, 595, and/or 804, e.g., as described above. In other embodiments, any other additional or alternative sequences $Seq^{iSTS}_{left,N}$ and/or $Seq^{iSTS}_{right,N}$ may be defined for the lengths N=176, 385, 595, and/or 804, and/or for any other additional or alternative lengths.

In some demonstrative embodiments, the sequence pairs $Seq^{iSTS}_{left,N}$ and $Seq^{iSTS}_{right,N}$ of the length N=176, 385, 595, and/or 804 may use {+1, −1, +j, −j} symbols alphabet, for example, as defined in one or more of the Tables 1-8 and/or Tables 9-16.

Figure 8:
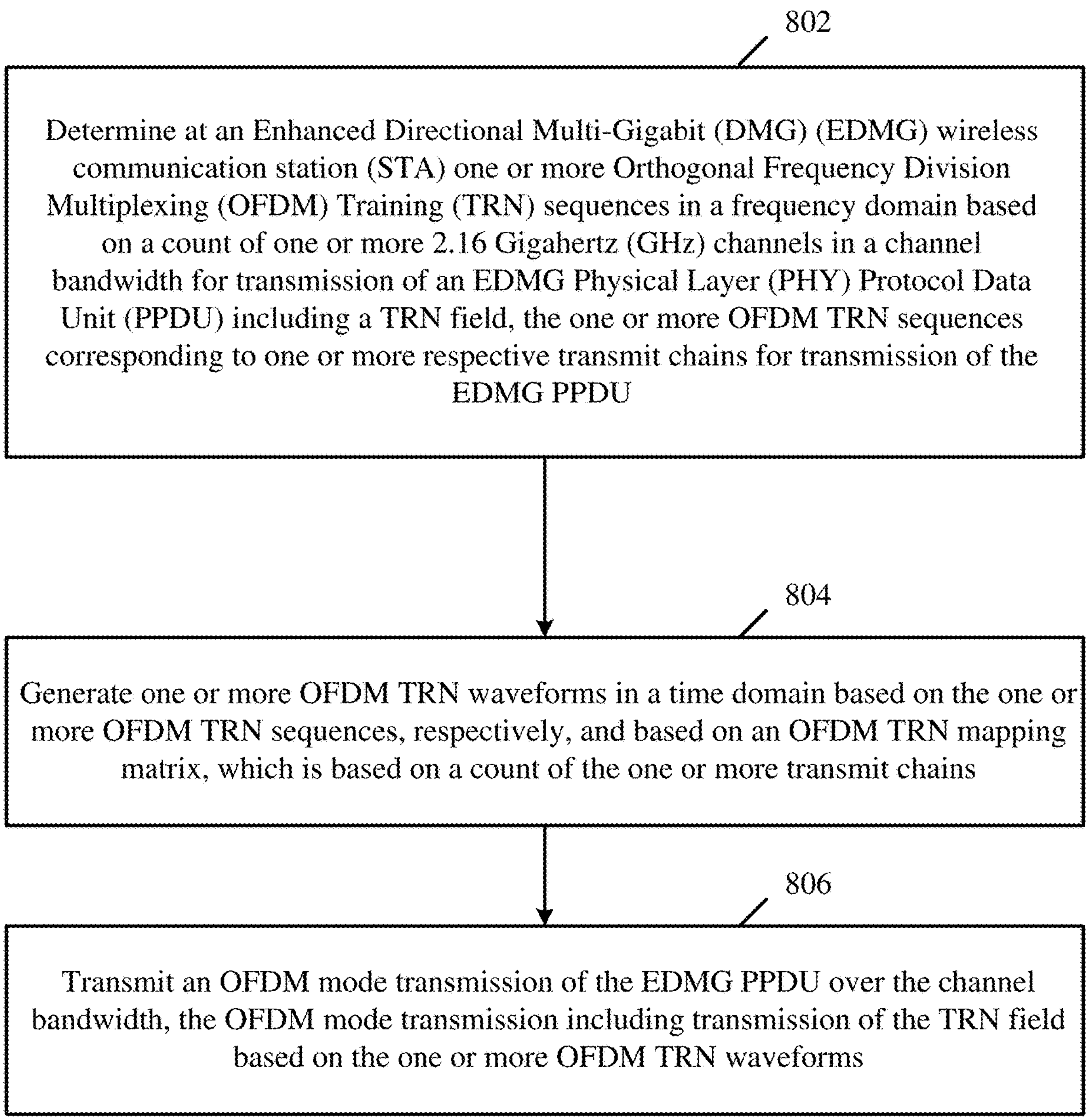
FIG. 8 is a schematic flow-chart illustration of a method of communicating a PPDU including a training field, in accordance with some demonstrative embodiments.

Reference is made to FIG. 8, which schematically illustrates a method of communicating a PPDU including a TRN field, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include determining at an EDMG STA one or more OFDM TRN sequences in a frequency domain based on a count of one or more 2.16 GHz channels in a channel bandwidth for transmission of an EDMG PPDU including a TRN field. For example, controller 124 (FIG. 1) may be configured to cause, trigger, and/or control the wireless station implemented by device 102 (FIG. 1) to determine the one or more OFDM TRN sequences in the frequency domain based on the count of the one or more 2.16 GHz channels in the channel bandwidth for transmission of the EDMG PPDU including the TRN field, e.g., as described above.

In some demonstrative embodiments, the one or more OFDM TRN sequences may correspond to one or more respective transmit chains for transmission of the EDMG PPDU, e.g., as described above.

As indicated at block 804, the method may include generating one or more OFDM TRN waveforms in a time domain based on the one or more OFDM TRN sequences, respectively, and based on an OFDM TRN mapping matrix, which is based on a count of the one or more transmit chains. For example, controller 124 (FIG. 1) may be configured to cause, trigger, and/or control the wireless station implemented by device 102 (FIG. 1) to generate the one or more OFDM TRN waveforms in the time domain based on the one or more OFDM TRN sequences, respectively, and based on the OFDM TRN mapping matrix, which is based on the count of the one or more transmit chains, e.g., as described above.

As indicated at block 806, the method may include transmitting an OFDM mode transmission of the EDMG PPDU over the channel bandwidth, the OFDM mode transmission including transmission of the TRN field based on the one or more OFDM TRN waveforms. For example, controller 124 (FIG. 1) may be configured to cause, trigger, and/or control the wireless station implemented by device 102 (FIG. 1) to transmit the OFDM mode transmission of the EDMG PPDU over the channel bandwidth, e.g., as described above.

Figure 9:
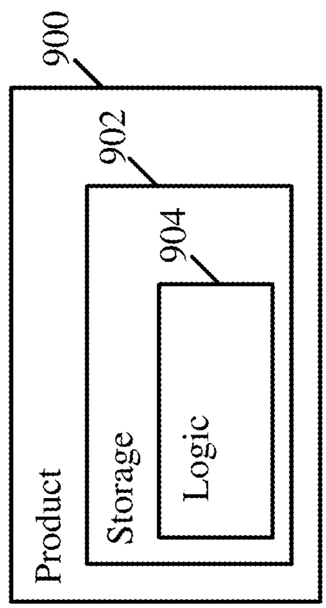
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 900 and/or machine readable storage media 902 may include one or more types of computer-readable storage media capable of storing data, including volatile memory, non-volatile memory, removable or non-removable memory, erasable or non-erasable memory, writeable or rewriteable memory, and the like. For example, machine readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising logic and circuitry configured to cause an Enhanced Directional Multi-Gigabit (DMG) (EDMG) wireless communication station (STA) to determine one or more Orthogonal Frequency Division Multiplexing (OFDM) Training (TRN) sequences in a frequency domain based on a count of one or more 2.16 Gigahertz (GHz) channels in a channel bandwidth for transmission of an EDMG Physical Layer (PHY) Protocol Data Unit (PPDU) comprising a TRN field, the one or more OFDM TRN sequences corresponding to one or more respective transmit chains for transmission of the EDMG PPDU; generate one or more OFDM TRN waveforms in a time domain based on the one or more OFDM TRN sequences, respectively, and based on an OFDM TRN mapping matrix, which is based on a count of the one or more transmit chains; and transmit an OFDM mode transmission of the EDMG PPDU over the channel bandwidth, the OFDM mode transmission comprising transmission of the TRN field based on the one or more OFDM TRN waveforms.

Example 2 includes the subject matter of Example 1, and optionally, wherein an OFDM TRN sequence of the one or more OFDM TRN sequences comprises first and second predefined sequences corresponding to an index of a transmit chain of the one or more transmit chains.

Example 3 includes the subject matter of Example 2, and optionally, wherein the OFDM TRN sequence comprises the first predefined sequence followed by three zeros, which are followed by the second predefined sequence.

Example 4 includes the subject matter of Example 2 or 3, and optionally, wherein the first and second predefined sequences have a same length.

Example 5 includes the subject matter of any one of Examples 2-4, and optionally, wherein each of the first and second predefined sequences comprises a predefined sequence of symbols, each symbol of the sequence of symbols is +1, −1, +j, or −j.

Example 6 includes the subject matter of any one of Examples 1-5, and optionally, wherein the apparatus is configured to cause the EDMG STA to determine the one or more OFDM TRN sequences according to one of the following definitions:

- $\text{TRN-BASIC}^{iTX}_{-177,\ 177}=[\text{Seq}^{iTX}_{left,\ 176}, 0, 0, 0, \text{Seq}^{iTX}_{right,\ 176}]$, for $i_{TX}=1, 2, 3, 4, 5, 6, 7, 8$, when the channel bandwidth comprises a 2.16 GHz channel, wherein $i_{TX}$ denotes a transmit chain index, $\text{TRN-BASIC}^{iTX}_{-177,\ 177}$ denotes an OFDM TRN sequence for the 2.16 GHz channel and the transmit chain index $i_{TX}$, $\text{Seq}^{iTX}_{left,\ 176}$ denotes a first predefined sequence of length 176 corresponding to the transmit chain index $i_{TX}$, and $\text{Seq}^{iTX}_{right,\ 176}$ denotes a second predefined sequence of length 176 corresponding to the transmit chain index $i_{TX}$;
- $\text{TRN-BASIC}^{iTX}_{-386,\ 386}=[\text{Seq}^{iTX}_{left,\ 385}, 0, 0, 0, \text{Seq}^{iTX}_{right,\ 385}]$, for $i_{TX}=1, 2, 3, 4, 5, 6, 7, 8$, when the channel bandwidth comprises a 4.32 GHz channel, wherein $i_{TX}$ denotes a transmit chain index, $\text{TRN-BASIC}^{iTX}_{-386,\ 386}$ denotes an OFDM TRN sequence for the 4.32 GHz channel and the transmit chain index $i_{TX}$, $\text{Seq}^{iTX}_{left,\ 385}$ denotes a first predefined sequence of length 385 corresponding to the transmit chain index $i_{TX}$, and $\text{Seq}^{iTX}_{right,\ 385}$ denotes a second predefined sequence of length 385 corresponding to the transmit chain index $i_{TX}$;
- $\text{TRN-BASIC}^{iTX}_{-596,\ 596}=[\text{Seq}^{iTX}_{left,\ 595}, 0, 0, 0, \text{Seq}^{iTX}_{right,\ 595}]$, for $i_{TX}=1, 2, 3, 4, 5, 6, 7, 8$, when the channel bandwidth comprises a 6.48 GHz channel, wherein $i_{TX}$ denotes a transmit chain index, $\text{TRN-BASIC}^{iTX}_{-595,\ 595}$ denotes an OFDM TRN sequence for the 6.48 GHz channel and the transmit chain index $i_{TX}$, $\text{Seq}^{iTX}_{left,\ 595}$ denotes a first predefined sequence of length 595 corresponding to the transmit chain index $i_{TX}$, and $\text{Seq}^{iTX}_{right,\ 595}$ denotes a second predefined sequence of length 595 corresponding to the transmit chain index $i_{TX}$; and
- $\text{TRN-BASIC}^{iTX}_{-805,\ 805}=[\text{Seq}^{iTX}_{left,\ 804}, 0, 0, 0, \text{Seq}^{iTX}_{right,\ 804}]$, for $i_{TX}=1, 2, 3, 4, 5, 6, 7, 8$, when the channel bandwidth comprises a 8.64 GHz channel, wherein $i_{TX}$ denotes a transmit chain index, $\text{TRN-BASIC}^{iTX}_{-805,\ 805}$ denotes an OFDM TRN sequence for the 8.64 GHz channel and the transmit chain index $i_{TX}$, $\text{Seq}^{iTX}_{left,\ 804}$ denotes a first predefined sequence of length 804 corresponding to the transmit chain index $i_{TX}$, and $Seq^{iTX}_{right,\ 804}$ denotes a second predefined sequence of length 804 corresponding to the transmit chain index $i_{TX}$.

Example 7 includes the subject matter of any one of Examples 1-6, and optionally, wherein a length of each of the one or more OFDM TRN sequences is based on the count of the one or more 2.16 GHz channels.

Example 8 includes the subject matter of any one of Examples 1-7, and optionally, wherein the count of the one or more transmit chains is 1, 2, 3, 4, 5, 6, 7, or 8.

Example 9 includes the subject matter of any one of Examples 1-8, and optionally, wherein the OFDM TRN mapping matrix, denoted $P_{TRN}$, is based on the count of the one or more transmit chains, denoted $N_{TX}$, as follows:

$$P_{TRN}=[+1-1], \text{ for } N_{TX}=1$$

$$P_{TRN} = \begin{bmatrix} +1 & -1 \\ +1 & +1 \end{bmatrix}, \text{ for } N_{TX} = 2$$

$$P_{TRN} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), \text{ for } N_{TX} = 3$$

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, \text{ for } N_{TX} = 4$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6), \text{ for } N_{TX} = 5 \text{ or } 6$$

$$P_{TRN} = \begin{bmatrix} P_{4\times4} & P_{4\times4} \\ P_{4\times4} & -P_{4\times4} \end{bmatrix}, \text{ for } N_{TX} = 7 \text{ or } 8$$

Example 10 includes the subject matter of any one of Examples 1-9, and optionally, wherein the apparatus is configured to cause the EDMG STA to generate the one or more OFDM TRN waveforms based on a number of OFDM symbols in a TRN subfield, the number of OFDM symbols in the TRN subfield is based on the count of the one or more transmit chains.

Example 11 includes the subject matter of Example 10, and optionally, wherein the number of OFDM symbols in the TRN subfield, denoted NV, is based on the count of the one or more transmit chains, denoted $N_{TX}$, as follows:

$$N_{TRN}^{N_{TX}}=2, \text{ for } N_{TX}=1$$

$$N_{TRN}^{N_{TX}}=2, \text{ for } N_{TX}=2$$

$$N_{TRN}^{N_{TX}}=3, \text{ for } N_{TX}=3$$

$$N_{TRN}^{N_{TX}}=4, \text{ for } N_{TX}=4$$

$$N_{TRN}^{N_{TX}}=6, \text{ for } N_{TX}=5 \text{ or } 6$$

$$N_{TRN}^{N_{TX}}=8, \text{ for } N_{TX},=7 \text{ or } 8$$

Example 12 includes the subject matter of any one of Examples 1-11, and optionally, wherein the apparatus is configured to cause the EDMG STA to generate an OFDM TRN waveform, denoted $r_{TRN}^{n,i_{TX}}(qT_s)$, corresponding to a transmit chain having a transmit chain index $i_{TX}$ as follows:

$$r_{TRN}^{n,iTX}(qT_s) = \frac{1}{\sqrt{N_{TRN}^{Tone}}} w(qT_s) \cdot \cdot \sum_{k=-N_{SR}}^{N_{SR}} [P_{TRN}]_{i_{TX},n} TRN - BASIC_k^{iTX} \exp(j2\pi k\Delta_F(qT_s - T_{GI\ long})) 1 \leq n \leq N_{TRN}^{NTX}$$

wherein:

$N_{TRN}^{Tone}=N_{ST}-N_{DC}$ denotes a total number of active tones;

$P_{TRN}$ denotes the OFDM TRN mapping matrix;

TRN-$BASIC_k^{i_{TX}}$ denotes a k-th element of an OFDM TRN sequence corresponding to the transmit chain index $i_{TX}$;

$N_{TRN}^{N_{TX}}$ denotes a number of OFDM symbols in a TRN subfield for the count of transmit chains, denoted $N_{TX}$;

$[\ ]_{m,n}$ denotes a matrix element from m-th row and n-th column;

$w(qT_s)$ denotes a window function to smooth transitions between consecutive OFDM symbols; and q denotes a time sample index.

Example 13 includes the subject matter of any one of Examples 1-12, and optionally, wherein the channel bandwidth is 2.16 GHz, 4.32 GHz, 6.48 GHz, or 8.64 GHz.

Example 14 includes the subject matter of any one of Examples 1-13, and optionally, comprising a radio.

Example 15 includes the subject matter of any one of Examples 1-14, and optionally, comprising one or more antennas.

Example 16 includes a system of wireless communication comprising an Enhanced Directional Multi-Gigabit (DMG) (EDMG) wireless communication station (STA), the EDMG STA comprising a radio; a memory; a processor; one or more antennas; and a controller configured to cause the EDMG STA to determine one or more Orthogonal Frequency Division Multiplexing (OFDM) Training (TRN) sequences in a frequency domain based on a count of one or more 2.16 Gigahertz (GHz) channels in a channel bandwidth for transmission of an EDMG Physical Layer (PHY) Protocol Data Unit (PPDU) comprising a TRN field, the one or more OFDM TRN sequences corresponding to one or more respective transmit chains for transmission of the EDMG PPDU; generate one or more OFDM TRN waveforms in a time domain based on the one or more OFDM TRN sequences, respectively, and based on an OFDM TRN mapping matrix, which is based on a count of the one or more transmit chains; and transmit an OFDM mode transmission of the EDMG PPDU over the channel bandwidth, the OFDM mode transmission comprising transmission of the TRN field based on the one or more OFDM TRN waveforms.

Example 17 includes the subject matter of Example 16, and optionally, wherein an OFDM TRN sequence of the one or more OFDM TRN sequences comprises first and second predefined sequences corresponding to an index of a transmit chain of the one or more transmit chains.

Example 18 includes the subject matter of Example 17, and optionally, wherein the OFDM TRN sequence comprises the first predefined sequence followed by three zeros, which are followed by the second predefined sequence.

Example 19 includes the subject matter of Example 17 or 18, and optionally, wherein the first and second predefined sequences have a same length.

Example 20 includes the subject matter of any one of Examples 17-19, and optionally, wherein each of the first and second predefined sequences comprises a predefined sequence of symbols, each symbol of the sequence of symbols is +1, −1, +j, or −j.

Example 21 includes the subject matter of any one of Examples 16-20, and optionally, wherein the controller is configured to cause the EDMG STA to determine the one or more OFDM TRN sequences according to one of the following definitions:

$\text{TRN-BASIC}^{iTX}_{-177,\ 177}=[\text{Seq}^{iTX}_{left,\ 176}, 0, 0, 0, \text{Seq}^{iTX}_{right,\ 176}]$, for $i_{TX}=1, 2, 3, 4, 5, 6, 7, 8$, when the channel bandwidth comprises a 2.16 GHz channel, wherein $i_{TX}$ denotes a transmit chain index, $\text{TRN-BASIC}^{iTX}_{-177,\ 177}$ denotes an OFDM TRN sequence for the 2.16 GHz channel and the transmit chain index $i_{TX}$, $\text{Seq}^{iTX}_{left,\ 176}$ denotes a first predefined sequence of length 176 corresponding to the transmit chain index $i_{TX}$, and $\text{Seq}^{iTX}_{right,\ 176}$ denotes a second predefined sequence of length 176 corresponding to the transmit chain index $i_{TX}$;

$\text{TRN-BASIC}^{iTX}_{-386,\ 386}=[\text{Seq}^{iTX}_{left,\ 385}, 0, 0, 0, \text{Seq}^{iTX}_{right,\ 385}]$, for $i_{TX}=1, 2, 3, 4, 5, 6, 7, 8$, when the channel bandwidth comprises a 4.32 GHz channel, wherein $i_{TX}$ denotes a transmit chain index, $\text{TRN-BASIC}^{iTX}_{-386,\ 386}$ denotes an OFDM TRN sequence for the 4.32 GHz channel and the transmit chain index $i_{TX}$, $\text{Seq}^{iTX}_{left,\ 385}$ denotes a first predefined sequence of length 385 corresponding to the transmit chain index $i_{TX}$, and $\text{Seq}^{iTX}_{right,\ 385}$ denotes a second predefined sequence of length 385 corresponding to the transmit chain index $i_{TX}$;

$\text{TRN-BASIC}^{iTX}_{-596,\ 596}=[\text{Seq}^{iTX}_{left,\ 595}, 0, 0, 0, \text{Seq}^{iTX}_{right,\ 595}]$, for $i_{TX}=1, 2, 3, 4, 5, 6, 7, 8$, when the channel bandwidth comprises a 6.48 GHz channel, wherein $i_{TX}$ denotes a transmit chain index, $\text{TRN-BASIC}^{iTX}_{-595,\ 595}$ denotes an OFDM TRN sequence for the 6.48 GHz channel and the transmit chain index $i_{TX}$, $\text{Seq}^{iTX}_{left,\ 595}$ denotes a first predefined sequence of length 595 corresponding to the transmit chain index $i_{TX}$, and $\text{Seq}^{iTX}_{right,\ 595}$ denotes a second predefined sequence of length 595 corresponding to the transmit chain index $i_{TX}$; and $\text{TRN-BASIC}^{iTX}_{-805,\ 805}=[\text{Seq}^{iTX}_{left,\ 804}, 0, 0, 0, \text{Seq}^{iTX}_{right,\ 804}]$, for $i_{TX}=1, 2, 3, 4, 5, 6, 7, 8$, when the channel bandwidth comprises a 8.64 GHz channel, wherein $i_{TX}$ denotes a transmit chain index, $\text{TRN-BASIC}^{iTX}_{-805,\ 805}$ denotes an OFDM TRN sequence for the 8.64 GHz channel and the transmit chain index $i_{TX}$, $\text{Seq}^{iTX}_{left,\ 804}$ denotes a first predefined sequence of length 804 corresponding to the transmit chain index $i_{TX}$, and $\text{Seq}^{iTX}_{right,\ 804}$ denotes a second predefined sequence of length 804 corresponding to the transmit chain index $i_{TX}$.

Example 22 includes the subject matter of any one of Examples 16-21, and optionally, wherein a length of each of the one or more OFDM TRN sequences is based on the count of the one or more 2.16 GHz channels.

Example 23 includes the subject matter of any one of Examples 16-22, and optionally, wherein the count of the one or more transmit chains is 1, 2, 3, 4, 5, 6, 7, or 8.

Example 24 includes the subject matter of any one of Examples 16-23, and optionally, wherein the OFDM TRN mapping matrix, denoted $P_{TRN}$, is based on the count of the one or more transmit chains, denoted $N_{TX}$, as follows:

$$P_{TRN} = [+1\ -1], \text{ for } N_{TX} = 1$$

$$P_{TRN} = \begin{bmatrix} +1 & -1 \\ +1 & +1 \end{bmatrix}, \text{ for } N_{TX} = 2$$

$$P_{TRN} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), \text{ for } N_{TX} = 3$$

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, \text{ for } N_{TX} = 4$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix}, w_6 = \exp(-j2\pi/6), \text{ for } N_{TX} = 5 \text{ or } 6$$

$$P_{TRN} = \begin{bmatrix} P_{4\times4} & P_{4\times4} \\ P_{4\times4} & -P_{4\times4} \end{bmatrix}, \text{ for } N_{TX} = 7 \text{ or } 8$$

Example 25 includes the subject matter of any one of Examples 16-24, and optionally, wherein the controller is configured to cause the EDMG STA to generate the one or more OFDM TRN waveforms based on a number of OFDM symbols in a TRN subfield, the number of OFDM symbols in the TRN subfield is based on the count of the one or more transmit chains.

Example 26 includes the subject matter of Example 25, and optionally, wherein the number of OFDM symbols in the TRN subfield, denoted $N_{TRN}^{N_{TX}}$, is based on the count of the one or more transmit chains, denoted $N_{TX}$, as follows:

$$N_{TRN}^{N_{TX}}=2, \text{ for } N_{TX}=1$$

$$N_{TRN}^{N_{TX}}=2, \text{ for } N_{TX}=2$$

$$N_{TRN}^{N_{TX}}=3, \text{ for } N_{TX}=3$$

$$N_{TRN}^{N_{TX}}=4, \text{ for } N_{TX}=4$$

$$N_{TRN}^{N_{TX}}=6, \text{ for } N_{TX}=5 \text{ or } 6$$

$$N_{TRN}^{N_{TX}}=8, \text{ for } N_{TX}=7 \text{ or } 8$$

Example 27 includes the subject matter of any one of Examples 16-26, and optionally, wherein the controller is configured to cause the EDMG STA to generate an OFDM TRN waveform, denoted $r_{TRN}^{n,i_{TX}}(qT_s)$, corresponding to a transmit chain having a transmit chain index $i_{TX}$ as follows:

$$r_{TRN}^{n,i_{TX}}(qT_s)=\frac{1}{\sqrt{N_{TRN}^{Tone}}}w(qT_s)\cdot\cdot\sum_{k=-N_{SR}}^{N_{SR}}[P_{TRN}]_{i_{TX}n}\,TRN\text{-}BASIC_k^{i_{TX}}\exp(j2\pi k\Delta_F(qT_s-T_{GI\ long}))1\le n\le N_{TRN}^{N_{TX}}$$

wherein:

$N_{TRN}^{Tone}=N_{ST}-N_{DC}$ denotes a total number of active tones;

$P_{TRN}$ denotes the OFDM TRN mapping matrix;

TRN-BASIC$_k^{i_{TX}}$ denotes a k-th element of an OFDM TRN sequence corresponding to the transmit chain index $i_{TX}$;

$N_{TRN}^{N_{TX}}$ denotes a number of OFDM symbols in a TRN subfield for the count of transmit chains, denoted $N_{TX}$;

$[\ ]_{m,n}$ denotes a matrix element from m-th row and n-th column;

$w(qT_s)$ denotes a window function to smooth transitions between consecutive OFDM symbols; and q denotes a time sample index.

Example 28 includes the subject matter of any one of Examples 16-27, and optionally, wherein the channel bandwidth is 2.16 GHz, 4.32 GHz, 6.48 GHz, or 8.64 GHz.

Example 29 includes a method to be performed at an Enhanced Directional Multi-Gigabit (DMG) (EDMG) wireless communication station (STA), the method comprising determining one or more Orthogonal Frequency Division Multiplexing (OFDM) Training (TRN) sequences in a frequency domain based on a count of one or more 2.16 Gigahertz (GHz) channels in a channel bandwidth for transmission of an EDMG Physical Layer (PHY) Protocol Data Unit (PPDU) comprising a TRN field, the one or more OFDM TRN sequences corresponding to one or more respective transmit chains for transmission of the EDMG PPDU; generating one or more OFDM TRN waveforms in a time domain based on the one or more OFDM TRN sequences, respectively, and based on an OFDM TRN mapping matrix, which is based on a count of the one or more transmit chains; and transmitting an OFDM mode transmission of the EDMG PPDU over the channel bandwidth, the OFDM mode transmission comprising transmission of the TRN field based on the one or more OFDM TRN waveforms.

Example 30 includes the subject matter of Example 29, and optionally, wherein an OFDM TRN sequence of the one or more OFDM TRN sequences comprises first and second predefined sequences corresponding to an index of a transmit chain of the one or more transmit chains.

Example 31 includes the subject matter of Example 30, and optionally, wherein the OFDM TRN sequence comprises the first predefined sequence followed by three zeros, which are followed by the second predefined sequence.

Example 32 includes the subject matter of Example 30 or 31, and optionally, wherein the first and second predefined sequences have a same length.

Example 33 includes the subject matter of any one of Examples 30-32, and optionally, wherein each of the first and second predefined sequences comprises a predefined sequence of symbols, each symbol of the sequence of symbols is +1, −1, +j, or −j.

Example 34 includes the subject matter of any one of Examples 29-33, and optionally, comprising determining the one or more OFDM TRN sequences according to one of the following definitions:

TRN-BASIC$^{iTX}_{-177,\ 177}$=[Seq$^{iTX}_{left,\ 176}$, 0, 0, 0, Seq$^{iTX}_{right,\ 176}$], for $i_{TX}$=1, 2, 3, 4, 5, 6, 7, 8, when the channel bandwidth comprises a 2.16 GHz channel, wherein $i_{TX}$ denotes a transmit chain index, TRN-BASIC$^{iTX}_{-177,\ 177}$ denotes an OFDM TRN sequence for the 2.16 GHz channel and the transmit chain index $i_{TX}$, Seq$^{iTX}_{left,\ 176}$ denotes a first predefined sequence of length 176 corresponding to the transmit chain index $i_{TX}$, and Seq$^{iTX}_{right,\ 176}$ denotes a second predefined sequence of length 176 corresponding to the transmit chain index $i_{TX}$;

TRN-BASIC$^{iTX}_{-386,\ 386}$=[Seq$^{iTX}_{left,\ 385}$, 0, 0, 0, Seq$^{iTX}_{right,\ 385}$], for $i_{TX}$=1, 2, 3, 4, 5, 6, 7, 8, when the channel bandwidth comprises a 4.32 GHz channel, wherein $i_{TX}$ denotes a transmit chain index, TRN-BASIC$^{iTX}_{-386,\ 386}$ denotes an OFDM TRN sequence for the 4.32 GHz channel and the transmit chain index $i_{TX}$, Seq$^{iTX}_{left,\ 385}$ denotes a first predefined sequence of length 385 corresponding to the transmit chain index $i_{TX}$, and Seq$^{iTX}_{right,\ 385}$ denotes a second predefined sequence of length 385 corresponding to the transmit chain index $i_{TX}$;

TRN-BASIC$^{iTX}_{-596,\ 596}$=[Seq$^{iTX}_{left,\ 595}$, 0, 0, 0, Seq$^{iTX}_{right,\ 595}$], for $i_{TX}$=1, 2, 3, 4, 5, 6, 7, 8, when the channel bandwidth comprises a 6.48 GHz channel, wherein $i_{TX}$ denotes a transmit chain index, TRN-BASIC$^{iTX}_{-595,\ 595}$ denotes an OFDM TRN sequence for the 6.48 GHz channel and the transmit chain index $i_{TX}$, Seq$^{iTX}_{left,\ 595}$ denotes a first predefined sequence of length 595 corresponding to the transmit chain index $i_{TX}$, and Seq$^{iTX}_{right,\ 595}$ denotes a second predefined sequence of length 595 corresponding to the transmit chain index $i_{TX}$; and TRN-BASIC$^{iTX}_{-805,\ 805}$=[Seq$^{iTX}_{left,\ 804}$, 0, 0, 0, Seq$^{iTX}_{right,\ 804}$], for $i_{TX}$=1, 2, 3, 4, 5, 6, 7, 8, when the channel bandwidth comprises a 8.64 GHz channel, wherein $i_{TX}$ denotes a transmit chain index, TRN-BASIC$^{iTX}_{-805,\ 805}$ denotes an OFDM TRN sequence for the 8.64 GHz channel and the transmit chain index $i_{TX}$, Seq$^{iTX}_{left,\ 804}$ denotes a first predefined sequence of length 804 corresponding to the transmit chain index $i_{TX}$, and Seq$^{iTX}_{right,\ 804}$ denotes a second predefined sequence of length 804 corresponding to the transmit chain index $i_{TX}$.

Example 35 includes the subject matter of any one of Examples 29-34, and optionally, wherein a length of each of the one or more OFDM TRN sequences is based on the count of the one or more 2.16 GHz channels.

Example 36 includes the subject matter of any one of Examples 29-35, and optionally, wherein the count of the one or more transmit chains is 1, 2, 3, 4, 5, 6, 7, or 8.

Example 37 includes the subject matter of any one of Examples 29-36, and optionally, wherein the OFDM TRN mapping matrix, denoted $P_{TRN}$, is based on the count of the one or more transmit chains, denoted $N_{TX}$, as follows:

$$P_{TRN}=[+1\ -1],\ \text{for } N_{TX}=1$$

$$P_{TRN}=\begin{bmatrix}+1 & -1\\ +1 & +1\end{bmatrix},\ \text{for } N_{TX}=2$$

$$P_{TRN}=\begin{bmatrix}+1 & -1 & +1\\ +1 & -w_3^1 & w_3^2\\ +1 & -w_3^2 & w_3^4\end{bmatrix},\ w_3=\exp(-j2\pi/3),\ \text{for } N_{TX}=3$$

-continued $$P_{TRN} = P_{4\times4} = \begin{bmatrix} +1 - 1 + 1 + 1 \\ +1 + 1 - 1 + 1 \\ +1 + 1 + 1 - 1 \\ -1 + 1 + 1 + 1 \end{bmatrix}, \text{ for } N_{TX} = 4$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6), \text{ for } N_{TX} = 5 \text{ or } 6$$

$$P_{TRN} = \begin{bmatrix} P_{4\times4} & P_{4\times4} \\ P_{4\times4} & -P_{4\times4} \end{bmatrix}, \text{ for } N_{TX} = 7 \text{ or } 8$$

Example 38 includes the subject matter of any one of Examples 29-37, and optionally, comprising generating the one or more OFDM TRN waveforms based on a number of OFDM symbols in a TRN subfield, the number of OFDM symbols in the TRN subfield is based on the count of the one or more transmit chains.

Example 39 includes the subject matter of Example 38, and optionally, wherein the number of OFDM symbols in the TRN subfield, denoted $N_{TRN}^{N_{TX}}$, is based on the count of the one or more transmit chains, denoted $N_{TX}$, as follows:

$N_{TRN}^{N_{TX}}$=2, for $N_{TX}$=1

$N_{TRN}^{N_{TX}}$=2, for $N_{TX}$=2

$N_{TRN}^{N_{TX}}$3, for $N_{TX}$=3

$N_{TRN}^{N_{TX}}$=4, for $N_{TX}$=4

$N_{TRN}^{N_{TX}}$=6, for $N_{TX}$=5 or 6

$N_{TRN}^{N_{TX}}$=8, for $N_{TX}$=7 or 8

Example 40 includes the subject matter of any one of Examples 29-39, and optionally, comprising generating an OFDM TRN waveform, denoted $r_{TRN}^{n,i_{TX}}(qT_s)$, corresponding to a transmit chain having a transmit chain index $i_{TX}$ as follows:

$$r_{TRN}^{n,i_{TX}}(qT_s) = \frac{1}{\sqrt{N_{TRN}^{Tone}}} w(qT_s)\cdot\cdot \sum_{k=-N_{SR}}^{N_{SR}} [P_{TRN}]_{i_{TX},n}\, TRN - BASIC_k^{i_{TX}} \exp(j2\pi k\Delta_F(qT_s - T_{GI\ long}))1 \le n \le N_{TRN}^{N_{TX}}$$

wherein:

$N_{TRN}^{Tone}$=$N_{ST}$–$N_{DC}$ denotes a total number of active tones;

$P_{TRN}$ denotes the OFDM TRN mapping matrix;

TRN-$BASIC_k^{i_{TX}}$ denotes a k-th element of an OFDM TRN sequence corresponding to the transmit chain index $i_{TX}$;

$N_{TRN}^{N_{TX}}$ denotes a number of OFDM symbols in a TRN subfield for the count of transmit chains, denoted $N_{TX}$;

$[\,]_{m,n}$ denotes a matrix element from m-th row and n-th column;

$w(qT_s)$ denotes a window function to smooth transitions between consecutive OFDM symbols; and q denotes a time sample index.

Example 41 includes the subject matter of any one of Examples 29-40, and optionally, wherein the channel bandwidth is 2.16 GHz, 4.32 GHz, 6.48 GHz, or 8.64 GHz.

Example 42 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to determine one or more Orthogonal Frequency Division Multiplexing (OFDM) Training (TRN) sequences in a frequency domain based on a count of one or more 2.16 Gigahertz (GHz) channels in a channel bandwidth for transmission of an EDMG Physical Layer (PHY) Protocol Data Unit (PPDU) comprising a TRN field, the one or more OFDM TRN sequences corresponding to one or more respective transmit chains for transmission of the EDMG PPDU; generate one or more OFDM TRN waveforms in a time domain based on the one or more OFDM TRN sequences, respectively, and based on an OFDM TRN mapping matrix, which is based on a count of the one or more transmit chains; and transmit an OFDM mode transmission of the EDMG PPDU over the channel bandwidth, the OFDM mode transmission comprising transmission of the TRN field based on the one or more OFDM TRN waveforms.

Example 43 includes the subject matter of Example 42, and optionally, wherein an OFDM TRN sequence of the one or more OFDM TRN sequences comprises first and second predefined sequences corresponding to an index of a transmit chain of the one or more transmit chains.

Example 44 includes the subject matter of Example 43, and optionally, wherein the OFDM TRN sequence comprises the first predefined sequence followed by three zeros, which are followed by the second predefined sequence.

Example 45 includes the subject matter of Example 43 or 44, and optionally, wherein the first and second predefined sequences have a same length.

Example 46 includes the subject matter of any one of Examples 43-45, and optionally, wherein each of the first and second predefined sequences comprises a predefined sequence of symbols, each symbol of the sequence of symbols is +1, −1, +j, or −j.

Example 47 includes the subject matter of any one of Examples 42-46, and optionally, wherein the instructions, when executed, cause the EDMG STA to determine the one or more OFDM TRN sequences according to one of the following definitions:

TRN-$BASIC^{iTX}_{-177,\ 177}$=[$Seq^{iTX}_{left,\ 176}$, 0, 0, 0, $Seq^{iTX}_{right,\ 176}$], for $i_{TX}$=1, 2, 3, 4, 5, 6, 7, 8, when the channel bandwidth comprises a 2.16 GHz channel, wherein $i_{TX}$ denotes a transmit chain index, TRN-$BASIC^{iTX}_{-177,\ 177}$ denotes an OFDM TRN sequence for the 2.16 GHz channel and the transmit chain index $i_{TX}$, $Seq^{iTX}_{left,\ 176}$ denotes a first predefined sequence of length 176 corresponding to the transmit chain index $i_{TX}$, and $Seq^{iTX}_{right,\ 176}$ denotes a second predefined sequence of length 176 corresponding to the transmit chain index $i_{TX}$;

TRN-$BASIC^{iTX}_{-386,\ 386}$=[$Seq^{iTX}_{left,\ 385}$, 0, 0, 0, $Seq^{iTX}_{right,\ 385}$], for $i_{TX}$=1, 2, 3, 4, 5, 6, 7, 8, when the channel bandwidth comprises a 4.32 GHz channel, wherein $i_{TX}$ denotes a transmit chain index, TRN-$BASIC^{iTX}_{-386,\ 386}$ denotes an OFDM TRN sequence for the 4.32 GHz channel and the transmit chain index $i_{TX}$, $Seq^{iTX}_{left,\ 385}$ denotes a first predefined sequence of length 385 corresponding to the transmit chain index $i_{TX}$, and $Seq^{iTX}_{right,\ 385}$ denotes a second predefined sequence of length 385 corresponding to the transmit chain index $i_{TX}$;

TRN-BASIC$^{iTX}_{-596,\ 596}$=[Seq$^{iTX}_{left,\ 595}$, 0, 0, 0, Seq$^{iTX}_{right,\ 595}$], for $i_{TX}$=1, 2, 3, 4, 5, 6, 7, 8, when the channel bandwidth comprises a 6.48 GHz channel, wherein $i_{TX}$ denotes a transmit chain index, TRN-BASIC$^{iTX}_{-595,\ 595}$ denotes an OFDM TRN sequence for the 6.48 GHz channel and the transmit chain index $i_{TX}$, Seq$^{iTX}_{left,\ 595}$ denotes a first predefined sequence of length 595 corresponding to the transmit chain index $i_{TX}$, and Seq$^{iTX}_{right,\ 595}$ denotes a second predefined sequence of length 595 corresponding to the transmit chain index $i_{TX}$; and TRN-BASIC$^{iTX}_{-805,\ 805}$=[Seq$^{iTX}_{left,\ 804}$, 0, 0, 0, Seq$^{iTX}_{right,\ 804}$], for $i_{TX}$=1, 2, 3, 4, 5, 6, 7, 8, when the channel bandwidth comprises a 8.64 GHz channel, wherein $i_{TX}$ denotes a transmit chain index, TRN-BASIC$^{iTX}_{-805,\ 805}$ denotes an OFDM TRN sequence for the 8.64 GHz channel and the transmit chain index $i_{TX}$, Seq$^{iTX}_{left,\ 804}$ denotes a first predefined sequence of length 804 corresponding to the transmit chain index $i_{TX}$, and Seq$^{iTX}_{right,\ 804}$ denotes a second predefined sequence of length 804 corresponding to the transmit chain index $i_{TX}$.

Example 48 includes the subject matter of any one of Examples 42-47, and optionally, wherein a length of each of the one or more OFDM TRN sequences is based on the count of the one or more 2.16 GHz channels.

Example 49 includes the subject matter of any one of Examples 42-48, and optionally, wherein the count of the one or more transmit chains is 1, 2, 3, 4, 5, 6, 7, or 8.

Example 50 includes the subject matter of any one of Examples 42-49, and optionally, wherein the OFDM TRN mapping matrix, denoted $P_{TRN}$, is based on the count of the one or more transmit chains, denoted $N_{TX}$, as follows:

$$P_{TRN} = [+1\ -1],\ \text{for } N_{TX} = 1$$

$$P_{TRN} = \begin{bmatrix} +1 & -1 \\ +1 & +1 \end{bmatrix},\ \text{for } N_{TX} = 2$$

$$P_{TRN} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ \text{for } N_{TX} = 3$$

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ \text{for } N_{TX} = 4$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},\ w_6 = \exp(-j2\pi/6),\ \text{for } N_{TX} = 5 \text{ or } 6$$

$$P_{TRN} = \begin{bmatrix} P_{4\times4} & P_{4\times4} \\ P_{4\times4} & -P_{4\times4} \end{bmatrix},\ \text{for } N_{TX} = 7 \text{ or } 8$$

Example 51 includes the subject matter of any one of Examples 42-50, and optionally, wherein the instructions, when executed, cause the EDMG STA to generate the one or more OFDM TRN waveforms based on a number of OFDM symbols in a TRN subfield, the number of OFDM symbols in the TRN subfield is based on the count of the one or more transmit chains.

Example 52 includes the subject matter of Example 51, and optionally, wherein the number of OFDM symbols in the TRN subfield, denoted $N_{TRN}^{N_{TX}}$, is based on the count of the one or more transmit chains, denoted $N_{TX}$, as follows:

$N_{TRN}^{N_{TX}}$=2, for $N_{TX}$=1

$N_{TRN}^{N_{TX}}$=2, for $N_{TX}$=2

$N_{TRN}^{N_{TX}}$=3, for $N_{TX}$=3

$N_{TRN}^{N_{TX}}$=4, for $N_{TX}$=4

$N_{TRN}^{N_{TX}}$=6, for $N_{TX}$=5 or 6

$N_{TRN}^{N_{TX}}$=8, for $N_{TX}$=7 or 8

Example 53 includes the subject matter of any one of Examples 42-52, and optionally, wherein the instructions, when executed, cause the EDMG STA to generate an OFDM TRN waveform, denoted $r_{TRN}^{n,i_{TX}}(qT_s)$, corresponding to a transmit chain having a transmit chain index $i_{TX}$ as follows:

$$r_{TRN}^{n,i_{TX}}(qT_s) = \frac{1}{\sqrt{N_{TRN}^{Tone}}} w(qT_s) \cdot \cdot \sum_{k=-N_{SR}}^{N_{SR}} [P_{TRN}]_{i_{TX},n} TRN-BASIC_k^{i_{TX}} \exp(j2\pi k \Delta_F (qT_s - T_{GI\ long}))\ 1 \le n \le N_{TRN}^{N_{TX}}$$

wherein:

$N_{TRN}^{Tone}=N_{ST}-N_{DC}$ denotes a total number of active tones;

$P_{TRN}$ denotes the OFDM TRN mapping matrix;

TRN-BASIC$_k^{i_{TX}}$ denotes a k-th element of an OFDM TRN sequence corresponding to the transmit chain index $i_{TX}$;

$N_{TRN}^{N_{TX}}$ denotes a number of OFDM symbols in a TRN subfield for the count of transmit chains, denoted $N_{TX}$;

$[\ ]_{m,n}$ denotes a matrix element from m-th row and n-th column;

$w(qT_s)$ denotes a window function to smooth transitions between consecutive OFDM symbols; and q denotes a time sample index.

Example 54 includes the subject matter of any one of Examples 42-53, and optionally, wherein the channel bandwidth is 2.16 GHz, 4.32 GHz, 6.48 GHz, or 8.64 GHz.

Example 55 includes an apparatus of wireless communication by an Enhanced Directional Multi-Gigabit (DMG) (EDMG) wireless communication station (STA), the apparatus comprising means for determining one or more Orthogonal Frequency Division Multiplexing (OFDM) Training (TRN) sequences in a frequency domain based on a count of one or more 2.16 Gigahertz (GHz) channels in a channel bandwidth for transmission of an EDMG Physical Layer (PHY) Protocol Data Unit (PPDU) comprising a TRN field, the one or more OFDM TRN sequences corresponding to one or more respective transmit chains for transmission of the EDMG PPDU; means for generating one or more OFDM TRN waveforms in a time domain based on the one or more OFDM TRN sequences, respectively, and based on an OFDM TRN mapping matrix, which is based on a count of the one or more transmit chains; and means for transmitting an OFDM mode transmission of the EDMG PPDU over the channel bandwidth, the OFDM mode transmission comprising transmission of the TRN field based on the one or more OFDM TRN waveforms.

Example 56 includes the subject matter of Example 55, and optionally, wherein an OFDM TRN sequence of the one or more OFDM TRN sequences comprises first and second predefined sequences corresponding to an index of a transmit chain of the one or more transmit chains.

Example 57 includes the subject matter of Example 56, and optionally, wherein the OFDM TRN sequence comprises the first predefined sequence followed by three zeros, which are followed by the second predefined sequence.

Example 58 includes the subject matter of Example 56 or 57, and optionally, wherein the first and second predefined sequences have a same length.

Example 59 includes the subject matter of any one of Examples 56-58, and optionally, wherein each of the first and second predefined sequences comprises a predefined sequence of symbols, each symbol of the sequence of symbols is +1, −1, +j, or −j.

Example 60 includes the subject matter of any one of Examples 55-59, and optionally, comprising means for determining the one or more OFDM TRN sequences according to one of the following definitions:

$\text{TRN-BASIC}^{iTX}_{-177,\ 177}$ $[\text{Seq}^{iTX}_{left,\ 176}, 0, 0, 0, \text{Seq}^{iTX}_{right,\ 176}]$, for $i_{TX}$=1, 2, 3, 4, 5, 6, 7, 8, when the channel bandwidth comprises a 2.16 GHz channel, wherein $i_{TX}$ denotes a transmit chain index, $\text{TRN-BASIC}^{iTX}_{-177,\ 177}$ denotes an OFDM TRN sequence for the 2.16 GHz channel and the transmit chain index $i_{TX}$, $\text{Seq}^{iTX}_{left,\ 176}$ denotes a first predefined sequence of length 176 corresponding to the transmit chain index $i_{TX}$, and $\text{Seq}^{iTX}_{right,\ 176}$ denotes a second predefined sequence of length 176 corresponding to the transmit chain index $i_{TX}$;

$\text{TRN-BASIC}^{iTX}_{-386,\ 386}=[\text{Seq}^{iTX}_{left,\ 385}, 0, 0, 0, \text{Seq}^{iTX}_{right,\ 385}]$, for $i_{TX}$=1, 2, 3, 4, 5, 6, 7, 8, when the channel bandwidth comprises a 4.32 GHz channel, wherein $i_{TX}$ denotes a transmit chain index, $\text{TRN-BASIC}^{iTX}_{-386,\ 386}$ denotes an OFDM TRN sequence for the 4.32 GHz channel and the transmit chain index $i_{TX}$, $\text{Seq}^{iTX}_{left,\ 385}$ denotes a first predefined sequence of length 385 corresponding to the transmit chain index $i_{TX}$, and $\text{Seq}^{iTX}_{right,\ 385}$ denotes a second predefined sequence of length 385 corresponding to the transmit chain index $i_{TX}$;

$\text{TRN-BASIC}^{iTX}_{-596,\ 596}=[\text{Seq}^{iTX}_{left,\ 595}, 0, 0, 0, \text{Seq}^{iTX}_{right,\ 595}]$, for $i_{TX}$=1, 2, 3, 4, 5, 6, 7, 8, when the channel bandwidth comprises a 6.48 GHz channel, wherein $i_{TX}$ denotes a transmit chain index, $\text{TRN-BASIC}^{iTX}_{-595,\ 595}$ denotes an OFDM TRN sequence for the 6.48 GHz channel and the transmit chain index $i_{TX}$, $\text{Seq}^{iTX}_{left,\ 595}$ denotes a first predefined sequence of length 595 corresponding to the transmit chain index $i_{TX}$, and $\text{Seq}^{iTX}_{right,\ 595}$ denotes a second predefined sequence of length 595 corresponding to the transmit chain index $i_{TX}$; and $\text{TRN-BASIC}^{iTX}_{-805,\ 805}=[\text{Seq}^{iTX}_{left,\ 804}, 0, 0, 0, \text{Seq}^{iTX}_{right,\ 804}]$, for $i_{TX}$=1, 2, 3, 4, 5, 6, 7, 8, when the channel bandwidth comprises a 8.64 GHz channel, wherein $i_{TX}$ denotes a transmit chain index, $\text{TRN-BASIC}^{iTX}_{-805,\ 805}$ denotes an OFDM TRN sequence for the 8.64 GHz channel and the transmit chain index $i_{TX}$, $\text{Seq}^{iTX}_{left,\ 804}$ denotes a first predefined sequence of length 804 corresponding to the transmit chain index $i_{TX}$, and $\text{Seq}^{iTX}_{right,\ 804}$ denotes a second predefined sequence of length 804 corresponding to the transmit chain index $i_{TX}$.

Example 61 includes the subject matter of any one of Examples 55-60, and optionally, wherein a length of each of the one or more OFDM TRN sequences is based on the count of the one or more 2.16 GHz channels.

Example 62 includes the subject matter of any one of Examples 55-61, and optionally, wherein the count of the one or more transmit chains is 1, 2, 3, 4, 5, 6, 7, or 8.

Example 63 includes the subject matter of any one of Examples 55-62, and optionally, wherein the OFDM TRN mapping matrix, denoted $P_{TRN}$, is based on the count of the one or more transmit chains, denoted $N_{TX}$, as follows:

$$P_{TRN} = [+1\ -1],\ \text{for } N_{TX} = 1$$

$$P_{TRN} = \begin{bmatrix} +1 & -1 \\ +1 & +1 \end{bmatrix},\ \text{for } N_{TX} = 2$$

$$P_{TRN} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ \text{for } N_{TX} = 3$$

$$P_{TRN} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ \text{for } N_{TX} = 4$$

$$P_{TRN} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},\ w_6 = \exp(-j2\pi/6),\ \text{for } N_{TX} = 5 \text{ or } 6$$

$$P_{TRN} = \begin{bmatrix} P_{4\times4} & P_{4\times4} \\ P_{4\times4} & -P_{4\times4} \end{bmatrix},\ \text{for } N_{TX} = 7 \text{ or } 8$$

Example 64 includes the subject matter of any one of Examples 55-63, and optionally, comprising means for generating the one or more OFDM TRN waveforms based on a number of OFDM symbols in a TRN subfield, the number of OFDM symbols in the TRN subfield is based on the count of the one or more transmit chains.

Example 65 includes the subject matter of Example 64, and optionally, wherein the number of OFDM symbols in the TRN subfield, denoted $N_{TRN}^{N_{TX}}$, is based on the count of the one or more transmit chains, denoted $N_{TX}$, as follows:

$N_{TRN}^{N_{TX}}=2$, for $N_{TX}=1$ $N_{TRN}^{N_{TX}}=2$, for $N_{TX}=2$ $N_{TRN}^{N_{TX}}=3$, for $N_{TX}=3$ $N_{TRN}^{N_{TX}}=4$, for $N_{TX}=4$ $N_{TRN}^{N_{TX}}=6$, for $N_{TX}=5$ or 6

$N_{TRN}^{N_{TX}}=8$, for $N_{TX}=7$ or 8

Example 66 includes the subject matter of any one of Examples 55-65, and optionally, comprising means for generating an OFDM TRN waveform, denoted $r_{TRN}^{n,i_{TX}}(qT_s)$, corresponding to a transmit chain having a transmit chain index $i_{TX}$ as follows:

$$r_{TRN}^{n,i_{TX}}(qT_s)=\frac{1}{\sqrt{N_{TRN}^{Tone}}}w(qT_s)\cdot\cdot\sum_{k=-N_{SR}}^{N_{SR}}[P_{TRN}]_{i_{TX},n}TRN-BASIC_k^{i_{TX}}\exp(j2\pi k\Delta_F(qT_s-T_{GI\ long}))1\le n\le N_{TRN}^{N_{TX}}$$

wherein:

$N_{TRN}^{Tone}=N_{ST}-N_{DC}$ denotes a total number of active tones;

$P_{TRN}$ denotes the OFDM TRN mapping matrix;

$TRN\text{-}BASIC_k^{i_{TX}}$ denotes a k-th element of an OFDM TRN sequence corresponding to the transmit chain index $i_{TX}$;

$N_{TRN}^{N_{TX}}$ denotes a number of OFDM symbols in a TRN subfield for the count of transmit chains, denoted $N_{TX}$;

$[\ ]_{m,n}$ denotes a matrix element from m-th row and n-th column;

$w(qT_s)$ denotes a window function to smooth transitions between consecutive OFDM symbols; and q denotes a time sample index.

Example 67 includes the subject matter of any one of Examples 55-66, and optionally, wherein the channel bandwidth is 2.16 GHz, 4.32 GHz, 6.48 GHz, or 8.64 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

Enhanced Directional Multi-Gigabit (DMG) (EDMG) Physical Layer (PHY) circuitry configured to:

provide a plurality of Orthogonal Frequency Division Multiplexing (OFDM) Training (TRN) sequences in a frequency domain, the plurality of OFDM TRN sequences corresponding to a plurality of transmit chains to transmit a TRN field of an EDMG OFDM PHY Protocol Data Unit (PPDU) over a channel bandwidth of 2.16 Gigahertz (GHz), the plurality of OFDM TRN sequences comprising a first OFDM TRN sequence corresponding to a first transmit chain, and a second OFDM TRN sequence corresponding to a second transmit chain, wherein the first OFDM TRN sequence comprises a sequence $TRN\text{-}BASIC^1_{-177,177}=[Seq^1_{left,\ 176}, 0, 0, 0, Seq^1_{right,\ 176}]$, wherein $Seq^1_{left,\ 176}$={−1 −j −j +1 +j −j +1 −1 +1 −j −1 +1 −1 +1 −j −1 −1 +j +j +j −1 −1 +1 +j +j −1 −j +j −1 +1 −1 +j +1 +1 −1 +1 −j −1 −1 +j +j +j −1 −1 +j −1 −1 −j +1 −1 −j +j −j −1 +j −j +j −j −1 +j +j +1 +1 +1 +j +j +j −1 −1 −j +1 −1 −j +j −j −1 +j +j −j +j +1 −j −j −1 −1 −1 −j −j +j −1 −1 −j +1 −1 −j +j −j −1 +j −j +j −j −1 +j +j +1 +1 +1 +j +j −j +1 +1 +j −1 +1 +j −j +j +1 −j −j +j −j −1 +j +j +1 +1 +1 +j +j −1 −j −j +1 +j −j +1 −1 +1 −j −1 +1 −1 +1 −j −1 −1 +j +j +j −1 −1 −1 −j −j +1 +j −j +1 −1 +1 −j −1 −1 +1 −1 +j +1 +1 −j −j −j +1 +1}, and $Seq^1_{right,\ 176}$={−1 −j −j +1 +j −j +1 −1 +1 −j −1 +1 −1 +1 −j −1 −1 +j +j +j −1 −1 +1 +j +j −1 −j +j −1 +1 −1 +j +1 +1 −1 +1 −j −1 −1 +j +j +j −1 −1 +j −1 −1 −j +1 −1 −j +j −j −1 +j −j +j −j −1 +j +j +1 +1 +1 +j +j +j −1 −1 −j +1 −1 −j +j −j −1 +j +j −j +j +1 −j −j −1 −1 −1 −j −j −j +1 +1 +j −1 +1 +j −j +j +1 −j +j −j +j +1 −j −j −1 −1 −1 −j −j +j −1 −1 −j +1 −1 −j +j −j −1 +j +j −j +j +1 −j −j −1 −1 −1 −j −j +1 +j +j −1 −j +j −1 +1 −1 +j +1 −1 +1 −1 +j +1 +1 −j −j −j +1 +1 +1 +j +j −1 −j +j −1 +1 −1 +j +1 +1 −1 +1 −j −1 −1 +j +j +j −1 −1}, wherein the second OFDM TRN sequence comprises a sequence $TRN\text{-}BASIC^2_{-177,177}=[Seq^2_{left,\ 176}, 0, 0, 0, Seq^2_{right,\ 176}]$, wherein $Seq^2_{left,\ 176}$={+1 −j −j −1 +j −j −1 +1 −1 −j +1 +1 −j −j −1 +j −j −1 +1 −1 −j +1 +j +1 +1 −j −1 +1 −j +j −j +1 +j −j −1 −1 +j +1 −1 +j −j +j −1 −j +1 −1 +1 +j −1 −1 −j −j −j −1 −1 +1 −1 +1 +j −1 −1 −j −j −j −1 −1 +j −j +j −1 −j −j +1 +1 +1 −j −j −j +j −j +1 +j +j −1 −1 −1 +j +j +j +1 +1 −j −1 +1 −j +j −j +1 +j −j −1 −1 +j +1 −1 +j −j +j −1 −j −1 +j +j +1 −j +j +1 −1 +1 +j −1 −1 +j +j +1 −j +j +1 −1 +1 +j −1 −j +j −j +1 +j +j −1 −1 −1 +j +j +j −j +j −1 −j −j +1 +1 +1 −j −j +1 −1 +1 +j −1 −1 −j −j −j −1 −1 +1 −1 +1 +j −1 −1 −j −j −j −1 −1}, and $Seq^2_{right,\ 176}$={−1 +j +j +1 −j +j +1 −1 +1 +j 1 −1 +j +j +1 −j +j +1 −1 +1 +j −1 +j +1 +1 −j −1 +1 −j +j −j +1 +j −j −1 −1 +j +1 −1 +j −j +j −1 −j −1 +1 −1 −j +1 +1 +j +j +j +1 +1 −1 +1 −1 −j +1 +1 +j +j +j +1 +1 +j −j +j −1 −j −j +1 ++1 −j −j −j +j −j +1 +j +j −1 −1 −1 +j +j −j −1 −1 +j +1 −1 +j −j +j −1 −j +j +1 +1 −j −1 +1 −j +j −j +1 +j −1 +j +j +1 −j +j +1 −1 +1 +j −1 −1 +j +j +1 −j +j +1 −1 +1 +j −1 +j −j +j −1 −j −j +1 +1 +1 −j −j −j +j −j +1 +j +j −1 −1 −1 +j +j +1 −1 +1 +j −1 −1 −j −j −j −1 −1 +1 −1 +1 +j −1 −1 −j −j −j −1 −1}; and generate a plurality of TRN transmit waveforms in a time domain based on the plurality of OFDM TRN sequences, wherein the plurality of TRN transmit waveforms comprises a first TRN transmit waveform based on the first OFDM TRN sequence corresponding to the first transmit chain, and a second TRN transmit waveform based on the second OFDM TRN sequence corresponding to the second transmit chain; and memory circuitry to store information processed by the EDMG PHY circuitry.

2. The apparatus of claim 1, wherein the plurality of OFDM TRN sequences comprises a third OFDM TRN sequence TRN-BASIC$^3_{-177,177}$=[Seq$^3_{left,\ 176}$, 0, 0, 0, Seq$^3_{right,\ 176}$] corresponding to a third transmit chain, wherein Seq$^3_{left,\ 176}$={+1 +1 +j +j +j +1 +1 −j −1 +1 −1 +1 +1 +j +j +j +1 +1 −j −1 +1 −1 +j +j −1 −1 −1 +j +j +1 −j +j −j −j −j +1 +1 +1 −j −j −1 +j −j +j +j +j −1 −1 −1 +j +j +1 −j +j −j +j +j −1−1 −1 +j +j +1 −j +j −j +1 +1 +j +j +j +1 +1 −j −1 +1 −1 −1 −1 −j −j −j −1 −1 +j +1 −1 +1 −j −1 +j −j +j −1 +1 +j −1 −1 −j +j +1 −j +j −j +1 −1 −j +1 +1 +j +1 −j −1 +1 −1 −j +j −1 −j −j +1 +1 −j −1 +1 −1 −j +j −1 −j −j +1 +1 −j −1 +1 −1 −j +j −1 −j −j +1 −1 +j +1 −1 +1 +j −j +1 +j +j −1 −j −1 +j −j +j −1 +1 +j −1 −1 −j −j −1 +j −j +j −1 +1 +j −1 −1 −j}, and wherein Seq$^3_{right,\ 176}$={−1 −1 −j −j −j −1 −1 +j +1 −1 +1 −1 −1 −j −j −j −1 −1 +j +1 −1 +1 −j −j +1 +1 +1 −j −j −1 +j −j +j +j +j −1 −1 −1 +j +j +1 −j +j −j +j +j −1 −1 −1 +j +j +1 −j +j −j +j +j −1 −1 −1 +j +j +1 −j +j −j +1 +1 +j +j +j +1 +1 −j −1 +1 −1 −1 −1 −j −j −j −1 −1 +j +1 −1 +1 +j +1 −j +j −j +1 −1 −j +1 +1 +j −j −1 +j −j +j −1 +1 +j −1 −1 −j −1 +j +1 −1 +1 +j −j +1 +j +j −1 −1 +j +1 −1 +1 +j −j +1 +j +j −1 +1 −j −1 +1 −1 −j +j −1 −j −j +1 −1 +j +1 −1 +1 +j −j +1 +j +j −1 −j −1 +j −j +j −1 +1 +j −1 −1 −j −j −1 +j −j +j −1 +1 +j −1 −1 −j}.

3. The apparatus of claim 2, wherein the plurality of OFDM TRN sequences comprises a fourth TRN sequence TRN-BASIC$^4_{-177,177}$=[Seq$^4_{left,\ 176}$, 0, 0, 0, Seq$^4_{right,\ 176}$] corresponding to a fourth transmit chain, wherein Seq$^4_{left,\ 176}$={−1 +j +j +1 −j +j +1 −1 +1 +j −1 −j −1 −1 +j +1 −1 +j −j +j −1 −j +j −j +j −1 −j −j +1 +1 +1 −j −j −1 +1 −1 −j +1 +1 +j +j +j +1 +1 −1 +j +j +1 −j +j +1 −1 +1 +j −1 −j −1−1 +j +1 −1 +j −j +j −1 −j −j +j −j +1 +j +j −1 −1 −1 +j +j +1 −1 +1 +j −1 −1 −j −j −j −1 −1 +1 −j −j −1 +j −j −1 +1 −1 −j +1 −j −1 −1 +j +1 −1 +j −j +j −1 −j −j +j −j +1 +j +j −1 −1 −1 +j +j −1 +1 −1 −j +1 +1 +j +j +j +1 +1 −1 +j +j +1 −j +j +1 −1 +1 +j −1 +j +1 +1 −j −1 +1 −j +j −j +1 +j −j +j −j +1 +j +j −1 −1 −1 +j +j −1 +1 −1 −j +1 +1 +j +j +j +1 +1}, and wherein Seq$^4_{right,\ 176}$={+1 −j −j −1 +j −j −1 +1 −1 −j +1 −j −1 −1 +j +1 −1 +j −j +j −1 −j −j +j −j +1 +j +j −1 −1 −1 +j +j −1 +1 −1 −j +1 +1 +j +j +j +1 +1 +1 −j −j −1 +j −j −1 +1 −1 −j +1 −j −1 −1 +j +1 −1 +j −j +j −1 −j +j −j +j −1 −j −j +1 +1 +1 −j −j +1 −1 +1 +j −1 −1 −j −j −j −1 −1 −1 +j +j +1 −j +j +1 −1 +1 +j −1 −j −1 −1 +j +1 −1 +j −j +j −1 −j +j −j +j −1 −j −j +1 +1 +1 −j −j −1 +1 −1 −j +1 +1 +j +j +j +1 +1 +1 −j −j −1 +j −j −1 +1 −1 −j +1 +j +1 +1 −j −1 +1 −j +j −j +1 +j +j −j +j −1 −j −j +1 +1 +1 −j −j −1 +1 −1 −j +1 +1 +j +j +j +1 +1}.

4. The apparatus of claim 3, wherein the plurality of OFDM TRN sequences comprises a fifth OFDM TRN sequence TRN-BASIC$^5_{-177,177}$=[Seq$^5_{left,\ 176}$, 0, 0, 0, Seq$^5_{right,\ 176}$] corresponding to a fifth transmit chain, wherein Seq$^5_{left,\ 176}$={+1 −1 +1 −j −1 −1 +j +j +j −1 −1 +1 +j +j −1 −j +j −1 +1 −1 +j +1 +1 −1 +1 −j −1 −1 +j +j +j −1 −1 +1 +j +j −1 −j +j −1 +1 −1 +j +1 +j −j +j +1 −j −j −1 −1 −1 −j −j +j −1 −1 −j +1 −1 −j +j −j −1 +j −j +j −j −1 +j +j +1 +1 +1 +j +j −j +1 +1 +j −1 +1 +j −j +j +1 −j −j +j −j −1 +j +j +1 +1 +1 +j +j +j −1 −1 −j +1 −1 −j +j −j −1 +j +j −j +j +1 −j −j −1 −1 −1 −j −j −j +1 +1 +j −1 +1 +j −j +j +1 −j +1 −1 +1 −j −1 +1 −1 +j −j −1 −1 +j +j +j −1 −1 −1 −j −j +1 +j −j +1 −1 +1 +1 −j −1 −1 +j +j +j −1 −1 −1 −j −j +1 +j −j +1 −1 +1 −j −1}, and wherein Seq$^5_{right,\ 176}$={1 +1 −1 +j +1 +1 −j −j −j +1 +1 −1 −j −j +1 +j −j +1 −1 +1 −j −1 −1 +1 −1 +j +1 +1 −j −j −j +1 +1 −1 −j −j +1 +j −j +1 −1 +1 −j −1 +j −j +j +1 −j −j −1 −1 −1 −j −j +j −1 −1 −j +1 −1 −j +j −j −1 +j −j +j −j −1 +j +j +1 +1 +1 +j +j −j +1 +1 +j −1 +1 +j −j +j +1 −j +j −j +j +1 −j −j −1 −1 −1 −j −j −j +1 +1 +j −1 +1 +j −j +j +1 −j −j +j −j −1 +j +j ++1 +1 +j +j +j −1 −1 −j +1 −1 −j +j −j −1 +j +1 −1 +1 −j −1 −1 +j +j +j −1 −1 −1 −j −j +1 +j −j +1 −1 +1 −j −1 +1 −1 +1 −j −1 −1 +j +j +j −1 −1 −1 −j −j +1 +j −j +1 −1 +1 −j −1}.

5. The apparatus of claim 4, wherein the plurality of OFDM TRN sequences comprises a sixth OFDM TRN sequence TRN-BASIC$^6_{-177,177}$=[Seq$^6_{left,\ 176}$, 0, 0, 0, Seq$^6_{right,\ 176}$] corresponding to a sixth transmit chain, wherein Seq$^6_{left,\ 176}$={+1 +j −1 +1 −1 +j −j −1 +j +j +1 −1 −j +1 −1 +1 −j +j +1 −j −j −1 +j −1 −j +j −j −1 +1 −j −1 −1 +j −j +1 +j −j +j +1 −1 +j +1 +1 −j +j +j +1 ++1 +j +j −1 −j +j −j +j +j +1 +1 +1 +j +j −1 −j +j −j −1 −1 +j +j +j −1 −1 −j +1 −1 +1 −1 −1 +j +j +j −1 −1 −j +1 −1 +1 +j −1 −j +j −j −1 +1 −j −1 −1 +j +j −1 −j +j −j −1 +1 −j −1 −1 +j +1 +j −1 +1 −1 +j −j −1 +j +j +1 +1 +j −1 +1 −1 +j −j −1 +j +j +1 −1 −1 +j +j +j −1 −1 −j +1 −1 +1 +1 +1 −j −j −j +1 +1 +j −1 +1 −1 +j +j +1 +1 +1 +j +j −1 −j +j −j −j −j −1 −1 −1 −j −j +1 +j −j +j}, and wherein Seq$^6_{right,\ 176}$={−1 −j +1 −1 +1 −j +j +1 −j −j −1 +1 +j −1 +1 −1 +j −j −1 +j +j +1 +j −1 −j +j −j −1 +1 −j −1 −1 +j −j +1 +j −j +j +1 −1 +j +1 +1 −j −j −j −1 −1 −1 −j −j +1 +j −j +j −j −j −1−1 −1 −j −j +1 +j −j +j −1 −1 +j +j +j −1 −1 −j +1 −1 +1 −1 −1 +j +j +j −1 −1 −j +1 −1 +1 −j +1 +j −j +j +1 −1 +j +1 +1 −j −j +1 +j −j +j +1 −1 +j +1 +1 −j +1 +j −1 +1 −1 +j −j −1 +j +j +1 +1 +j −1 +1 −1 +j −j −1 +j +j +1 +1 +1 −j −j −j +1 +1 +j −1 +1 −1 −1 −1 +j +j +j −1 −1 −j +1 −1 +1 +j +j +1 +1 +1 +j +j −1 −j +j −j −j −j −1 −1 −1 −j −j +1 +j −j +j}.

6. The apparatus of claim 5, wherein the plurality of OFDM TRN sequences comprises a seventh OFDM TRN sequence TRN-BASIC$^7_{-177,177}$=[Seq$^7_{left,\ 176}$, 0, 0, 0, Seq$^7_{right,\ 176}$] corresponding to a seventh transmit chain, wherein Seq$^7_{left,\ 176}$={−j −1 +j −j +j −1 +1 +j −1 −1 −j +j +j −1 −1 −1 +j +j +1 −j +j −j +1 −j −1 +1 −1 −j +j −1 −j −j +1 −1 −1 −j −j −j −1 −1 +j +1 −1 +1 +1 −j −1 +1 −1 −j +j −1 −j −j +1 −1 −1 −j −j −j −1 −1 +j +1 −1 +1 −j −1 +j −j +j −1 +1 +j −1 −1 −j +j +j −1 −1 −1 +j +j +1 −j +j −j +1 −j −1 +1 −1 −j +j −1 −j −j +1 +1 +1 +j +j +j +1 +1 −j −1 +1 −1 −j −1 +j −j +j −1 +1 +j −1 −1 −j −j −j +1 +1 +1 −j −j −1 +j −j +j +j +1 −j +j −j +1 −1 −j +1 +1 +j +j +j −1 −1 −1 +j +j +1 −j +j −j −1 +j +1 −1 +1 +j −j +1 +j +j −1 −1 −1 −j −j −j −1 −1 +j +1 −1 +1}, and wherein Seq$^7_{right,\ 176}$={+j +1 −j +j −j +1 −1 −j +1 +1 +j −j −j +1 +1 +1 −j −j −1 +j −j +j −1 +j +1 −1 +1 +j −j +1 +j +j −1 +1 +1 +j +j +j +1 +1 −j −1 +1 −1 +1 −j −1 +1 −1 −j +j −1 −j −j +1 −1 −1 −j −j −j −1 −1 +j +1 −1 +1 −j −1 +j −j +j −1 +1 +j −1 −1 −j +j +j −1 −1 −1 +j +j +1 −j +j −j −1 +j +1 −1 +1 +j −j +1 +j +j −1−1 −1 −j −j −j −1 −1 +j +1 −1 +1 +j +1 −j +j −j +1 −1 −j +1 +1 +j +j +j −1 −1 −1 +j +j +1 −j +j −j +j +1 −j +j −j +1 −1 −j ++1 +j +j +j −1 −1 −1 +j +j +1 −j +j −j −1 +j +1 −1 +1 +j −j +1 +j +j −1 −1 −1 −j −j −j −1 −1 +j +1 −1 +1}.

7. The apparatus of claim 6, wherein the plurality of OFDM TRN sequences comprises an eighth OFDM TRN sequence $TRN\text{-}BASIC^{8}_{-177,177}=[Seq^{8}_{left,\ 176},\ 0,\ 0,\ 0,\ Seq^{8}_{right,\ 176}]$ corresponding to an eighth transmit chain, wherein $Seq^{8}_{left,\ 176}$={+1 −1 +1 +j −1 −1 −j −j −j −1 −1 +j −j +j −1 −j −j +1 +1 +1 −j −j −j +j −j +1 +j +j −1 −1 −1 +j +j +1 −1 +1 +j −1 −1 −j −j −j −1 −1 +1 −1 +1 +j −1 −1 −j −j −j −1 −1 −j +j −j +1 +j +j −1 −1 −1 +j +j +j −j +j −1 −j −j +1 +1 +1 −j −j +1 −1 +1 +j −1 −1 −j −j −j −1 −1 +j +1 +1 −j −1 +1 −j +j −j +1 +j −1 +j +j +1 −j +j +1 −1 +1 +j −1 −1 +j +j +1 −j +j +1 −1 +1 +j −1 −j −1 −1 +j +1 −1 +j −j +j −1 −j +j +1 +1 −j −1 +1 −j +j −j +1 +j +1 −j −j −1 +j −j −1 +1 −1 −j +1 +1 −j −j −1 +j −j −1 +1 −1 −j +1 −j −1 −1 +j +1 −1 +j −j +j −1 −j}, and wherein $Seq^{8}_{right,\ 176}$={−1 +1 −1 −j +1 +1 +j +j +j +1 +1 +j −j +j −1 −j −j +1 +1 +1 −j −j +j −j +j −1 −j −j +1 +1 +1 −j −j +1 −1 +1 +j −1 −1 −j −j −j −1 −1 −1 +1 −1 −j +1 +1 +j +j +j +1 +1 −j +j −j +1 +j +j −1 −1 −1 +j +j −j +j −j +1 +j +j −1 −1 −1 +j +j +1 −1 +1 +j −1 −1 −j −j −j −1 −1 −j −1 −1 +j +1 −1 +j −j +j −1 −j −1 +j +j +1 −j +j +1 −1 +1 +j −1 +1 −j −j −1 +j −j −1 +1 −1 −j +1 −j −1 −1 +j +1 −1 +j −j +j −1 −j −j −1 −1 +j +1 −1 +j −j +j −1 −j +1 −j −j −1 +j −j −1 +1 −1 −j +1 −1 +j +j +1 −j +j +1 −1 +1 +j −1 −j −1 −1 +j +1 −1 +j −j +j −1 −j}.

8. The apparatus of claim 1, wherein the TRN field is after a data field of the EDMG OFDM PPDU.

9. The apparatus of claim 1 comprising the plurality of transmit chains to transmit the TRN field of the EDMG OFDM PPDU based on the plurality of TRN transmit waveforms.

10. The apparatus of claim 9 comprising a plurality of antennas connected to the plurality of transmit chains, and a processor to execute instructions of an Operating System (OS).

11. An apparatus comprising:

Enhanced Directional Multi-Gigabit (DMG) (EDMG) Physical Layer (PHY) circuitry configured to:

provide a plurality of Orthogonal Frequency Division Multiplexing (OFDM) Training (TRN) sequences in a frequency domain, the plurality of OFDM TRN sequences corresponding to a plurality of transmit chains to transmit a TRN field of an EDMG OFDM PHY Protocol Data Unit (PPDU) over a channel bandwidth of 4.32 Gigahertz (GHz), the plurality of OFDM TRN sequences comprising a first OFDM TRN sequence corresponding to a first transmit chain, and a second OFDM TRN sequence corresponding to a second transmit chain, wherein the first OFDM TRN sequence comprises a sequence $TRN\text{-}BASIC^{1}_{-386,386}=[Seq^{1}_{left,\ 385},\ 0,\ 0,\ 0,\ Seq^{1}_{right,\ 385}]$, wherein $Seq^{1}_{left,\ 385}$={−1 −1 +j −1 +1 +1 −1 +j +1 +j +j +j −j −j −1 −j +j +j −j +1 −j +1 +1 +1 −1 −1 +j −1 +1 +1 −1 +j +1 +j +j +j −j +j +1 +j −j −j +j −1 +j −1−1 −1 +1 +1 −j +1 −1 −1 +1 −j −1 −j −j −j +j +j +1 +j −j −j +j −1 +j −1−1 −1 +1 −1 +j −1 +1 +1 −1 +j +1 +j +j +j −j +j +1 +j −j −j +j −1 +j −1 −1 −1 +1 −1 +j −1 +1 +1 −1 +j +1 +j +j +j −j −j −1 −j +j +j −j +1 −j +1 +1 +1 −1 −1 +j −1 +1 +1 −1 +j +1 +j +j +j −j +j +1 +j −j −j +j −1 +j −1 −1 −1 +1 −1 +j −1 +1 +1 −1 +j +1 +j +j +j −j −j −1 −j +j +j −j +1 −j +1 +1 +1 +1 −1 +1 −j +1 −1 −1 +1 −j −1 −j −j −j +j −j −1 −j +j +j −j +1 −j +1 +1 +1 −1 −j −1 −j +j −j −1 +j −1−1 −1 +1 +1 −j +1 −1 −1 +1 +j +1 +j +j −j −j −j +1 −j +1 +1 +1 −1 −1 +j −1 +1 +1 −1 −j −1 −j −j −j +j +j +1 +j −j −j +j −1 +j −1−1 −1 +1 −1 +j −1 +1 +1 −1 −j −1 −j −j −j +j +j +1 +j −j −j +j −1 +j −1−1 −1 +1 −1 +j −1 +1 +1 −1 −j −1 −j −j −j +j +j +1 +j −j −j +j −1 +j −1−1 −1 +1 −1 +j −1 +1 +1 −1 −j −1 −j −j −j +j +j +1 +j −j −j +j −1 +j −1 −1 −1 +1 −1 +j −1 +1 +1 −1 −j −1 −j −j −j +j +j +1 +j −j −j +j +1 −j +1 +1 +1 −1 −j −1 −j +j −j −1 +j −1 −1 −1 +1 −1 +j −1 +1 +1 −1 −j −1 −j −j −j +j +j +1 +j −j −j +j +1 −j +1 +1 +1 −1 −j −1 −j +j −j −1 +j −1 −1 −1 +1 −1 +j −1 +1 +1 −1 −j −1 −j −j −j +j}, and $Seq^{1}_{right,\ 385}$={+1 −j +1 −1 −1 +1 −j −1 −j −j −j +j +j +1 +j −j −j +j −1 +j −1 −1 −1 +1 +1 −j +1 −1 −1 +1 −j −1 −j −j −j +j −j −1 −j +j +j −j +1 −j +1 +1 +1 −1 −1 +j −1 +1 +1 −1 +j +1 +j +j +j −j −j −1 −j +j +j −j +1 −j +1 +1 +1 −1 +1 −j +1 −1 −1 +1 −j −1 −j −j −j +j −j −1 −j +j +j −j +1 −j +1 +1 +1 −1 +1 −j +1 −1 −1 +1 −j −1 −j −j −j +j +j +1 +j −j −j +j −1 +j −1 −1 −1 +1 +1 −j +1 −1 −1 +1 −j −1 −j −j −j +j −j −1 −j +j +j −j +1 −j +1 +1 +1 −1 +1 −j +1 −1 −1 +1 −j −1 −j −j −j +j +j +1 +j −j −j +j −1 +j −1 −1 −1 +1 −1 +j −1 +1 +1 −1 +j +1 +j +j +j −j +j +1 +j −j −j +j −1 +j −1−1 −1 +1 −j −1 −j +j +j −j −1 +j −1 −1 −1 +1 +1 −j +1 −1 −1 +1 +j +1 +j +j +j −j −j −1 −j +j +j −j −1 +j −1−1 −1 +1 −1 +j −1 +1 +1 −1 −j −1 −j −j −j +j +j +1 +j −j −j +j +1 −j +1 +1 +1 −1 −1 +j −1 +1 +1 −1 −j −1 −j −j −j +j −j −1 −j +j +j −j −1 +j −1−1 −1 +1 −1 +j −1 +1 +1 −1 −j −1 −j −j −j +j +j +1 +j −j −j +j +1 −j +1 +1 −1 −j −1 −j +j +j −j −1 +j −1 −1 −1 +1 −1 +j −1 +1 +1 −1 +j +1 +j +j +j −j +j +1 +j −j −j +j +1 −j +1 +1 +1 −1 −1 +j −1 +1 +1 −1 −j −1 −j −j −j +j −j −1 −j +j +j −j −1 +j −1 −1 −1 +1 −1 +j −1 +1 +1 −1 −j −1 −j −j −j +j +j}, wherein the second OFDM TRN sequence comprises a sequence $TRN\text{-}BASIC^{2}_{-386,386}=[Seq^{2}_{left,\ 385},\ 0,\ 0,\ 0,\ Seq^{2}_{right,\ 385}]$, wherein $Seq^{2}_{left,\ 385}$={−j +1 −1 −1 −1 +j −1 −j +j +j +j +1 +j +j −j −j +j +1 +j −1 +1 +1 −1 +j −1 −1 +1 +1 +1 −j +1 +j −j −j −j −1 −j −j +j +j −j −1 −j +1 −1 −1 +1 −j +1 +1 −1 −1 −1 +j −1 −j +j +j +j +1 +j +j −j −j +j +1 +j −1 +1 +1 −1 +j −1 +1 −1 −1 −1 +j −1 −j +j +j +j +1 +j +j −j −j +j +1 +j −1 +1 +1 −1 +j −1 +1 −1 −1 −1 +j −1 −j +j +j +j +1 +j +j −j +j −1 +1 −1 −1 −1 +j −1 −j +j +j +j +1 +j +j −j −j +j +1 +j −1 +1 +1 −1 −j +j +1 +j −1 +1 +1 −1 +j −1 +1 −1 −1 −1 +j −1 −j +j +j +j +1 +j +j −j −j +j +1 +j −1 +1 +1 −1 +j −1 −1 +1 +1 +1 −j +1 +j −j −j −j −1 −j −j +j +j −j −1 −j +1 −1 −1 +1 −j +1 +j −j −j −j −1 −j −1 +1 +1 +1 −j +1 −1 +1 +1 −1 +j −1 +j −j −j +j +1 +j −j +j +j +j +1 +j +1 −1 −1 −1 +j −1 +1 −1 −1 +1 −j +1 −j +j +j −j −1 −j +j −j −j −j −1 −j −1 +1 +1 +1 −j +1 −1 +1 +1 −1 +j −1 +j −j −j +j +1 +j +j −j −j −j −1 −j −1 +1 +1 +1 −j +1 −1 +1 +1 −1 +j −1 +j +j +1 +j +1 −1 −1 −1 +j −1 +1 −1 −1 +1 −j +1 −j +j +j −j −1 −j −j +j +j +j +1 +j +1 −1 −1 −1 +j −1 +1 −1 −1 +1 −j +1 −j +j +j −j −1 −j −j +j +j +j +1 +j +1 −1 −1 −1 +j −1 +1 −1 −1 +1 −j +1 −j +j +j −j −1 −j −j +j +j +j +1 +j +1 −1 −1 −1 +j −1 +1 −1 −1 +1 −j +1 −j +j +j −j −1 −j +j −j −j −j −1 −j −1 +1 +1 +1 −j +1 −1 +1 +1 −1 +j −1 +j −j −j +j +1 +j}, and $Seq^{2}_{right,\ 385}$={−1 +1 +1 +1 −j +1 +j −j −j −j −1 −j −j +j +j −j −1 −j +1 −1 −1 +1 −j +1 +1 −1 −1 −1 +j −1 −j +j +j +j +1 +j +j −j −j +j +1 +j −1 +1 +1 −1 +j −1 +1 −1 −1 −1 +j −1 −j +j +j +j +1 +j +j −j −j +j +1 +j −1 +1 +1 −1 +j −1 +1 −1 −1 −1 +j −1 −j +j +j +j +1 +j +j −j −j +j +1 +j −1 +1 +1 −1 +j −1 −1 +1 +1 +1 −j +1 +j −j −j −j −1 −j −j +j +j −j −1 −j +1 −1 −1 +1 −j +1 −1 +1 +1 +1 −j +1 +j −j −j −j −1 −j −j +j +j −j −1 −j +1 −1 −1 +1 −j +1 +1 −1 −1 −1 +j −1 −j +j +j +j +1 +j +j −j −j +j +1 +j −1 +1 +1 −1 +j −1 −1 +1 +1 +1 −j +1 +j −j −j −j −1 −j −j +j +j −j −1 −j +1 −1 −1 +1 −j +1 −j +j +j +j +1 +j +1 −1 −1 −1 +j −1 +1 −1 −1 +1 −j +1 −j +j +j −j −1 −j +j −j −j −j −1 −j −1 +1 +1 +1 −j +1 −1 +1 +1 −1 +j −1 +j −j −j +j +1 +j +j −j −j −j −1 −j −1 +1 +1 +1 −j +1 −1 +1 +1 −1 +j −1 +j −j −j +j +1 +j +j −j −j −j −1 −j −1 +1 +1 +1 −j +1 −1 +1 +1 −1 +j −1 +j −j −j +j +1 +j +j −j −j −j −1 −j −1 +1 +1 +1 −j +1 −1 −j +1 +1 +1 −j +1 −1 +1 +1 −1 +j −1 +j −j −j +j +1 +j +j −j −j −j −1 −j −1 +1 +1 +1 −j +1 −1 +1 +1 −1 +j −1 +j −j −j +j +1 +j −j +j +j +j +1 +j −1 −1 −1 +j −1 +1 −1 −1 +1 −j +1 −j +j +j −j +j +j −j −1 −j +j −j −j −j −1 −j −1 +1 +1 +1 −j +1 −1 +1 +1 −1 +j −1 +j −j −j +j +1 +j −j}; and generate a plurality of TRN transmit waveforms in a time domain based on the plurality of OFDM TRN sequences, wherein the plurality of TRN transmit waveforms comprises a first TRN transmit waveform based on the first OFDM TRN sequence corresponding to the first transmit chain, and a second TRN transmit waveform based on the second OFDM TRN sequence corresponding to the second transmit chain; and memory circuitry to store information processed by the EDMG PHY circuitry.

12. The apparatus of claim 11, wherein the plurality of OFDM TRN sequences comprises a third OFDM TRN sequence TRN-BASIC$^{3}_{-386,386}$=[$Seq^{3}_{left,\ 385}$, 0, 0, 0, $Seq^{3}_{right,\ 385}$] corresponding to a third transmit chain, wherein $Seq^{3}_{left,\ 385}$={+1 −1 +j −1 +1 −j +1 +j +1 +j −j −1 −j +1 −j +1 −1 +j −1 +j +1 +j −j −1 −j +1 −j +1 −1 +j −1 +j +1 +j −j −1 −j −1 +j −1 +1 −j +1 +j +1 +j −j −1 −j +1 +1 −1 −1 −1 +1 −j −j +j +j +j −j +1 +1 −1 −1 −1 +1 +j +j −j −j −j +j −1 −1 +1 +1 +1 −1 −j −j +j +j +j −j −1 −1 +1 +1 +1 −1 +j +j −j −j −+j +j +1 +j −j −1 −j +1 −j +1 −1 +j −1 −j −j −j +j +1 +j +1 −j +1 −1 +j −1 +j +1 +j −j −1 −j −1 +j −1 +1 −j +1 −j −1 −j +j +1 +j −1 +j −1 +1 −j +1 −j −j +j +j +j −j −1 −1 +1 +1 +1 −1 −j −j +j +j +j −j +1 +1 −1 −1 −1 +1 −j −j +j +j +j −j +1 +1 −1−1 −1 +1 −j −j +j +j +j −j −1 −1 +1 +1 +1 −1 +j +1 +j +j +1 +j +1 −j +1 +1 −j +1 −j −1 −j −j −1 −j +1 −j +1 +1 −j +1 −j −1 −j −j −1 −j +1 −j +1 +1 −j +1 +j +1 +j +j +1 +j +1 −j +1 +1 −j +1 −j −j +j −j −j +j −1 −1 +1 −1 −1 +1 −j −j +j −j −j +j +1 +1 −1 +1 +1 −1 +j +j −j +j +j −j −1 −1 +1 −1 −1 +1 +j +j −j +j +j −j +1 +1 −1 +1 +1 −1 −1 +j −1 −1 +j −1 +j +1 +j +j +1 +j +1 −j +1 +1 −j +1 +j +1 +j +j +1 +j −1 +j −1 −1 +j −1 −j −1 −j −j −1 −j +1 −j +1 +1 −j +1 −j −1 −j −j −1 −j +1 +1 −1 +1 +1 −1 −j −j +j −j −j +j +1 +1 −1 +1 +1 −1 +j +j −j +j +j −j +1 +1 −1 +1 +1 −1 +j +j −j +j +j −j +1 +1 −1 +1 +1 −1 −j −j +j −j −j +j}, and wherein $Seq^{3}_{right,\ 385}$={+1 −j +1 +1 −j +1 −j −1−−j −j −j −1 +j −1 −1 +j −1 −j −1 −j −j −1 −j −1 +j −1 −1 +j −1 −j −1 −j −j −1 −j +1 −j +1 +1 −j +1 j −1 j −j −1 −j −1 −1 +1 −1 −1 +1 +j +j −j +j +j −j −1 −1 +1 −1 −1 +1 −j −j +j −j −j +j +1 +1 −1 +1 +1 −1 +j +j −j +j +j −j +1 +1 −1 +1 +1 −1 −j −j +j −j −j +j −j −1 −j −j −1 −j −1 +j −1 −1 +j −1 +j +1 +j +j +1 +j −1 +j −1 −1 +j −1 −j −1 −j −j −1 −j +1 −j +1 +1 −j +1 +j +1 +j +j +1 +j +1 −j +1 +1 −j +1 +j +j −j +j +j −j +1 +1 −1 +1 +1 −1 +j +j −j +j +j −j −1 −1 +1 −1 −1 +1 −j −j +j −j −j +j −1 −1 +1 −1 −1 +1 −1 +j +1 +j −1 +j +1 +j +1 +j −j −1 −j −1 +j −1 +j −1 +1 −j +1 −j +1 −1 −j +1 +j +1 +j +1 +j −j −1 −j −1 −1 −j +j +1 +j −1 +j −1 +1 −j +1 +j +j −j −j −j +j +1 +1 −1 −1 −1 +1 +j +j −j −j −j +j −1 −1 +1 +1 +1 −1 −j −j +j +j +j −j +1 +1 −1 −1 −1 +1 −j −j +j +j +j −j −1 −1 +1 +1 +1 −1 +1 −j +1 −1 +j −1 −j −1 −j +j +1 +j −1 +j −1 +1 −j +1 −j −1 −j +j +1 +j +1 −j +1 −1 +j −1 +j +1 +j +1 +j −j −1 −j −1 +j −1 +1 −j +1 +j +1 +j −j −1 −j −1 −1 +1 +1 +1 −1 +j +j −j −j −j +j −1 −1 +1 +1 +1 −1 −j −j +j +j +j −j −1 −1 +1 +1 +1 −1 +j +j −j −j −j +j +j}.

13. The apparatus of claim 12, wherein the plurality of OFDM TRN sequences comprises a fourth OFDM TRN sequence TRN-BASIC$^{4}_{-386,386}$=[$Seq^{4}_{left,\ 385}$, 0, 0, 0, $Seq^{4}_{right,\ 385}$] corresponding to a fourth transmit chain, wherein $Seq^{4}_{left,\ 385}$={−1 −1 +j −1 +j +1 +j +1 +1 −1 −j −j +j −j −1 −j +1 −j +1 +j +j −j −1 −1 +1 +1 −j +1 −j −1 −j −1 −1 +1 +j +j −j +j +1 +j −1 +j −1 −j −j +j +1 +1 −1 −j −1 −j −1 +j −1 −j −j +j −1 −1 +1 +1 −j +1 +j +1 +j +1 +1 −1 +j +j −j +j +1 +j +1 −j +1 +j +j −j +1 +1 −1 −1 +j −1 −j −1 −j −1 −1 +1 −j −j +j −1 +j −1 +j +1 +j +1 +1 −1 −j −j +j −j −1 −j +1 −j +1 +j +j −j −1 −1 +1 −1 +j −1 +j +1 +j +1 +1 −1 −j −j +j −j −1 −j +1 −j +1 +j +j −j −1 −1 +1 +j +1 +j +1 −j +1 +j +j −j +1 +1 −1 −1 +j −1 −j −1 −j −1 −1 +1 −j −j +j +j +1 +j +1 −j +1 +j +j −j +1 +1 −1 −1 +j −1 −j −1 −j −1 −1 +1 −j −j +j +j +1 +j −1 +j −1 −j −j +j +1 +1 −1 −1 +j −1 +j +1 +j +1 +1 −1 −j −+j +j +1 +j −1 +j −1 −j −j +j +1 +1 −1 −1 +j −1 +j +1 +j +1 +1 −1 −j −j +j −1 +j −1 −j −1 −j −1 −1 +1 −j −j +j −j −1 −j −1 +j −1 −j −j +j −1 −1 +1 −1 +j −1 −j −1 −j −1 −1 +1 −j −j +j −j −1 −j −1 +j −1 −j −j +j −1 −1 +1 +j +1 +j −1 +j −1 −j −j +j +1 +1 −1 −1 +j −1 +j +1 +j +1 +1 −1 −j −j +j −j −1 −j +1 −j +1 +j +j −j −1 −1 +1 +1 −j +1 −j −1 −j −1 −1 +1 +j +j −j +1 −j +1 +j +1 +j +1 +1 −1 +j +j −j +j +1 +j +1 −j +1 +j +j −j +1 +1 −1 −1 +j −1 −j −1 −j −1 −1 +1 −j −j +j −j −1 −j −1 +j −1 −j −j +j −1 −1 +1}, and wherein $Seq^{4}_{right,\ 385}$={+1 −j +1 −j −1 −j −1 −1 +1 +j +j −j −j −1 −j +1 −j +1 +j +j −j −1 −1 +1 −1 +j −1 +j +1 +j +1 +1 −1 −j −j +j +j +1 +j −1 +j −1 −j −j +j +1 +1 −1 +j +1 +j +1 −j +1 +j +j −j +1 +1 −1 +1 −j +1 +j +1 +j +1 +1 −1 +j +j −j −j −−j −1 +j −1 −j −j +j −1 −1 +1 −1 +j −1 −j −1 −j −1 −1 +1 −j −j +j +1 −j +1 −j −1 −j −1 −1 +1 +j +j −j −j −1 −j +1 −j +1 +j +j −j −1 −1 +1 +1 −j +1 −j −1 −j −1 −1 +1 +j +j −j −j −−j +1 −j +1 +j +j −j −1 −1 +1 −j −−j −1 +j −1 −j −j +j −1 −1 +1 −1 +j −1 −j −1 −j −1 −1 +1 −j −j +j −j −1 −j −1 +j −1 −j −j +j −1 −1 +1 −1 +j −1 −j −1 −j −1 −1 +1 −j −j +j −j −1 −j +1 −j +1 +j +j −j −1 −1 +1 −1 +j −1 +j +1 +j +1 +1 −1 −j −j +j −j −1 −j +1 −j +1 +j +j −j −1 −1 +1 −1 +j −1 +j +1 +j +1 +1 −1 −j −j +j +1 −j +1 +j +1 +j +1 +1 −1 +j +j −j −j −−j −1 +j −1 −j −j +j −1 −1 +1 +1 −j +1 +j +1 +j +1 +1 −1 +j +j −j −j −1 −j −1 +j −1 −j −j +j −1 −1 +1 −j −1 −j +1 −j +1 +j +j −j −1 −1 +1 −1 +j −1 +j +1 +j +1 +1 −1 −j −j +j +j +1 +j −1 +j −1 −j −j +j +1 +1 −1 +1 −j +1 −j −1 −j −1 −1 +1 +j +j −j −1 +j −1 −j −1 −1 +1 −j −j +j +j +1 +j +1 −j +1 +j +j −j +1 +1 −1 +1 −j +1 +j +1 +j +1 +1 −1 +j +j −j −j −1 −j −1 +j −1 −j −j +j −1 −1 +1 −j}.

14. The apparatus of claim 13, wherein the plurality of OFDM TRN sequences comprises a fifth OFDM TRN sequence TRN-BASIC$^{5}_{-386,386}$=[$Seq^{5}_{left,\ 385}$, 0, 0, 0, $Seq^{5}_{right,\ 385}$] corresponding to a fifth transmit chain, wherein $Seq^{5}_{left,\ 385}$={−j −1 +1 +1 −1 +1 +1 +j −j −j +j −j −j −j +j +j +j −j −j −1 +1 +1 +1 −1 −1 −1 +1 +1 +1 −1

−1 +j −j −j −j +j +j −j +j +j −j +j +j −1 +1 +1 −1 +1 +1 +1 −1 −1 +1 −1 −1 +j −j −j +j −j −j +j −j −j −j +j +j −1 +1 +1 +1 −1 −1 +1 −1 −1 −1 +1 +1 +j −j −j −j +j +j +j −j −j +j −j −j −1 +1 +1 −1 +1 +1 −j +j +j −j +j +j +1 −1 −1 +1 −1 −1 +1 −1 −1 −1 +1 +1 +j −j −−j +j +j +j −j −1 −j +j +j −1 +1 +1 +1 −1 −1 −1 +1 +1 −1 +1 +1 −j +j +j −j +j +j +j −j −j +j −j −j +1 −1 −1 +1 −1 −1 −1 +1 +1 +1 −1 −1 +j −j −j −j +j +j −j +j +j +j −j −j −1 +1 +1 +1 −1 −1 +1 −1 −1 +1 −1 −1 −j +j +j −j +j +j +1 −j +1 +1 −j +1 −j −1 −j −j −1 −j +j +1 +j −j −1 −j +1 −j +1 −1 +j −1 +1 −j +1 −1 +j −1 −j −1 −j +j +1 +j +j +1 +j +j +1 +j +1 −j +1 +1 −j +1 +1 −j +1 +1 −j +1 +j +1 +j +j +1 +j +j +1 +j −j −1 −j −1 +j −1 +1 −j +1 +1 −j +1 −1 +j −1 +j +1 +j −j −1 −j +j +1 +j +j +1 +j −1 +j −1 −1 +j −1 +j +1 +j +j +1 +j −1 +j −1 −1 +j −1 −1 +j −1 +1 −j +1 −j −1 −j +j +1 +j −j −1 −j +j +1 +j +1 −j +1 −1 +j −1 +1 −j +1 +1 −j +1 +j +1 +j +j +1 +j +j +1 +j +j +1 +j +1 −j +1 +1 −j +1 −1 +j −1 +1 −j +1 +j +1 +j −j −−j −j −1 −j +j +1 +j −1 +j −1 +1 −j +1 +1 −j +1 +1 −j +1 −j −1 −j −j −1 −j}, and wherein $Seq^5_{right,\ 385}$={+1 −1 −1 +1 −1 −1 −j +j +j −j +j +j −j +j +j +j −−j −1 +1 +1 +1 −1 −1 +1 −1 −1 −1 +1 +1 −j +j +j +j −j −1 −j +j +j −j +j +j −1 +1 +1 −1 +1 +1 −1 +1 +1 −1 +1 +1 −j +j +j −j +j +j +j −j −1 −j +j +j −1 +1 +1 +1 −1 −1 −1 +1 +1 +1 −1 −1 −j +j +j +j −j −j +j −j −j +j −j −j −1 +1 +1 −1 +1 +1 +j −j −j +j −j −j −1 +1 +1 −1 +1 +1 +1 −1 −1 −1 +1 +1 +1 +j −j −1 −j +j +j −j +j +j +j −j −j +1 −1 −1 −1 +1 +1 −1 +1 +1 −1 +1 +1 −j +j +j −j +j +j −j +j +j −j +j +j −1 +1 +1 −1 +1 +1 −1 +1 +1 +1 −1 −1 +j −j −j −j +j +j +j −j −j −j +j +j +1 −1 −1 −1 +1 +1 +1 −1 −1 +1 −1 −1 −j +j +j −j +j +j −1 +j −1 −1 +j −1 +j +1 +j +j +1 +j +j +1 +j −j −1 −j +1 −j +1 −1 +j −1 −1 +j −1 +1 −j +1 +j +1 +j −j −1 −j +j +1 +j +j +1 +j +1 −j +1 +1 −j +1 −1 +j −1 −1 +j −1 −j −1 −1 −j −1 −1 −j +j +1 +j −j −1 −j −1 +j −1 +1 −j +1 −1 +j −1 +1 −j +1 −j −1 −j +j +1 +j +j +1 +j +j +1 +j −1 +j −1 −1 +j −1 −j −−j −j −1 −j +1 −j +1 +1 −j +1 −1 +j −1 +1 −j +1 −j −1 −j +j +1 +j +j +1 +j −j −1 −j −1 +j −1 +1 −j +1 +1 −j +1 +1 −j +1 +j +1 +j +j +1 +j −j −1 −j −j −1 −j −1 +j −1 −1 +j −1 −1 +j −1 +1 −j +1 +j +1 +j −j −1 −j +j +1 +j −j −1 −j +1 −j +1 −1 +j −1 +1 −j +1 +1 −j +1 −j −1 −j −j −1 −j −j}.

15. The apparatus of claim 14, wherein the plurality of OFDM TRN sequences comprises a sixth OFDM TRN sequence TRN-BASIC$^6_{-386,386}$=[$Seq^6_{left,\ 385}$, 0, 0, 0, $Seq^6_{right,\ 385}$] corresponding to a sixth transmit chain, wherein $Seq^6_{left,\ 385}$={+j −1 +j −1 +j +1 +j −1 +j −1 +j +1 +j −j −1 −j −1 +j −1 −j −1 −j −1 +j −1 −1 +j −1 −j −1 −j −1 +j −1 −j −1 −j +j +1 +j −1 +j −1 +j +1 +j −1 +j −1 −j −1 −j −1 +j −1 +j +1 +j +1 −j +1 +1 −j +1 −j −1 −j −1 +j −1 +j +1 +j −j −1 −j +1 −j +1 +j +1 +j −1 +j −1 −1 +j −1 −j −1 −j +1 −j +1 +j +1 +j −j +j +j −1 +1 +1 −j +j +j −1 +1 +1 +1 −1 −1 −j +j +j +1 −1 −1 −j +j +j −j +j +j +1 −1 −1 −j +j +j +1 −1 −1 −1 +1 +1 −j +j +j −1 +1 +1 −j +j +j −1 +1 +1 +j −j −j +1 −1 −1 −j +j +j −j +j +j −1 +1 +1 +j −j −+1 −1 −1 −1 +1 +1 −j +j +j +1 −1 −1 +j −j −j +j −j −j −1 +1 +1 −j +j +j +1 −1 −1 +1 −j +1 +j +1 +j −1 +j −1 −j −1 −j +j +1 +j −1 +j −1 −j −1 −j +1 −j +1 +1 −j +1 −j −1 −j −1 +j −1 +j +1 +j −j −1 −j −1 +j −1 +j +1 +j +1 −j +1 +j +1 +j −1 +j −1 +j +1 +j −1 +j −1 −1 +j −1 −j −1 −j −1 +j −1 −j −1 −j +j +1 +j +1 −j +1 +j +1 +j +1 −j +1 +1 −j +1 −j −1 −j +1 −j +1 −j −1 −j +j −j −j −1 +1 +1 −j +j +j +1 −1 −1 −1 +1 +1 −j +j +j +1 −1 −1 +j −j −j +j −j −+1 −1 −1 −j +j +j −1 +1 +1 +1 −1 −1 −j +j +j −1 +1 +1 +j −j −+1 −1 −1 +j −j −j +1 −1 −1 +j −j −+j −j −j −1 +1 +1 +j −j −j −1 +1 +1 +1 −1 −1 −j +j +j +1 −1 −1 −j +j +j −j +j +j −1 +1 +1 −j +j +j −1 +1 +1}, and wherein $Seq^6_{right,\ 385}$={+1 −j +1 −j −1 −j +1 −j +1 −j −1 −j −j −1 −j −1 +j −1 −j −1 −j −1 +j −1 +1 −j +1 +j +1 +j +1 −j +1 +j +1 +j +j +1 +j −1 +j −1 +j +1 +j −1 +j −1 +j +1 +j +1 −j +1 −j −1 −j −1 +j −1 +1 −j +1 −j −1 −j −1 +j −1 +j +1 +j +j +1 +j −1 +j −1 −j −1 −j +1 −j +1 −1 +j −1 −j −1 −j +1 −j +1 +j +1 +j +j −j −+1 −1 −1 +j −j −+1 −1 −1 +1 −1 −1 −j +j +j +1 −1 −1 −j +j +j +j −j −j −1 +1 +1 +j −j −j −1 +1 +1 −1 +1 +1 −j +j +j −1 +1 +1 −j +j +j +1 −1 −1 −j +j +j −1 +1 +1 +j −j −j −+j +j −1 +1 +1 +j −j −+1 −1 −1 +1 −1 −1 +j −j −j −1 +1 +1 −j +j +j +j −j −j −1 +1 +1 −j +j +j +1 −1 −1 −1 +j −1 −j −1 −j +1 −j +1 +j +1 +j +j +1 +j −1 +j −1 −j −1 −j +1 −j +1 −1 +j −1 +j +1 +j +1 −j +1 −j −1 −j −j −1 −j −1 +j −1 +j +1 +j +1 −j +1 −j −1 −j +1 −j +1 −j −1 −j +1 −j +1 −1 +j −1 −j −1 −j −1 +j −1 −j −1 −j −j −1 −j −1 +j −1 −j −1 −j −1 +j −1 +1 −j +1 −j −1 −j +1 −j +1 −j −1 −j −j +j +j +1 −1 −1 +j −j −j −1 +1 +1 −1 +1 +1 −j +j +j +1 −1 −1 +j −j −j −j +j +j −1 +1 +1 +j −j −+1 −1 −1 +1 −1 −1 −j +j +j −1 +1 +1 +j −j −j −1 +1 +1 −j +j +j −1 +1 +1 −j +j +j +j −j −j −1 +1 +1 +j −j −j −1 +1 +1 −1 +1 +1 +j −j −j −1 +1 +1 +j −j −j −j +j +j −1 +1 +1 −j +j +j −1 +1 +1 −j}.

16. The apparatus of claim 15, wherein the plurality of OFDM TRN sequences comprises a seventh OFDM TRN sequence TRN-BASIC$^7_{-386,386}$=[$Seq^7_{left,\ 385}$, 0, 0, 0, $Seq^7_{right,\ 385}$] corresponding to a seventh transmit chain, wherein $Seq^7_{left,\ 385}$={−1 +1 −1 −1 +j −j −j +1 −1 −1 +j −j −j +1 −1 −1 −j +j +j +1 −1 −1 −j +j +j +j +1 +j −1 +j −1 +j +1 +j −1 +j −1 +j +1 +j +1 −j +1 +j +1 +j +1 −j +1 +j −j −j −1 +1 +1 −j +j +j +1 −1 −1 +j −j −+1 −1 −1 −j +j +j −1 +1 +1 +1 −j +1 +j +1 +j −1 +j −1 −j −1 −j +1 −j +1 −j −1 −j −1 +j −1 +j +1 +j −1 +1 +1 +j −j −j −1 +1 +1 +j −j −j −1 +1 +1 −j +j +j −1 +1 +1 −j +j +j −j −1 −j −1 +j −1 −j −1 −j −1 +j −1 −j −1 −j +1 −j +1 −j −1 −j +1 −j +1 −j +j +j −1 +1 +1 +j −j −+1 −1 −1 −j +j +j +1 −1 −1 +j −j −j −1 +1 +1 −1 +j −1 +j +1 +j +1 −j +1 −j −1 −j −1 +j −1 −j −1 −j +1 −j +1 +j +1 +j +j −j −j −1 +1 +1 −j +j +j +1 −1 −1 −j +j +j −1 +1 +1 +j −j −+1 −1 −1 −1 +j −1 −j −1 −j +1 −j +1 +j +1 +j +1 −j +1 −j −1 −j −1 +j −1 +j +1 +j −1 +1 +1 −j +j +j −1 +1 +1 −j +j +j +1 −1 −1 −j +j +j +1 −1 −1 −j +j +j +j +1 +j −1 +j −1 +j +1 +j −1 +j −1 −j −1 −j −1 +j −1 −j −1 −j −1 +j −1 −j +j +j −1 +1 +1 +j −j −+1 −1 −1 +j −j −j −1 +1 +1 −j +j +j +1 −1 −1 +1 −j +1 −j −1 −j −1 +j −1 +j +1 +j −1 +j −1 −j −1 −j +1 −j +1 +j +1 +j +1 −1 −1 −j +j +j +1 −1 −1 −j +j +j −1 +1 +1 −j +j +j −1 +1 +1 −j +j +j −j −1 −j −1 +j −1 −j −1 −j −1 +j −1 +j +1 +j −1 +j −1 +j +1 +j −1 +j −1}, and wherein $Seq^7_{right,\ 385}$={−1 +1 +1 −+j +j −1 +1 +1 −+j +j −1 +1 +1 +j −j −1 +1 +1 +j −j −j −j −1 −j +1 −j +1 −j −1 −j +1 −j +1 −j −1 −j −1 +j −1 −j −1 −j −1 +j −1 −j +j +j +1 −1 −1 +j −j −j −1 +1 +1 −j +j +j −1 +1 +1 +j −j −+1 −1 −1 −1 +j −1 −j −1 −j +1 −j +1 +j +1 +j −1 +j −1 +j +1 +j +1 −j +1 −j −1 −j −1 +1 +1 +j −j −j −1 +1 +1 +j −j −j −1 +1 +1 −j +j +j −1 +1 +1 −j +j +j −j −1 −j −1 +j −1 −j −1 −j −1 +j −1 −j −1 −j +1 −j +1 −j −1 −j +1 −j +1 −j +j +j −1 +1 +1 +j −j −j +1 −1 −1 −j +j +j +1 −1 −1 +j −j −j −1 +1 +1 −1 +j −1 +j +1 +j +1 −j +1 −j −1 −j −1 +j −1 −j −1 −j +1 −j +1 +j +1 +j −j +j +j +1 −1 −1 +j −j −j −1 +1 +1 +j −j −j +1 −1 −1 −j +j +j −1 +1 +1 +1 −j +1 +j +1 +j −1 +j −1 −j −1 −j −1 +j −1 +j +1 +j +1 −j +1 −j −1 −j +1 −1 −1 +j −j −j +1 −1 −1 +j −j −j −1 +1 +1 +j −j −j −1 +1 +1 +j −j −j −j −1 −j +1 −j +1 −j −1 −j +1 −j +1 +j +1 +j +1 −j +1 +j +1 +j +1 −j +1 −j +j +j −1 +1 +1 +j −j −+1 −1 −1 +j −j −j −1 +1 +1 −j +j +j +1 −1 −1 +1 −j +1 −j −1 −j −1 +j −1 +j +1 +j −1 +j −1 −j −1 −j +1 −j +1 +j +1 +j +1 −1 −1 −j +j +j +1 −1 −1 −j +j +j −1 +1 +1 −j +j +j −1 +1 +1 −j +j +j −j −1 −j −1 +j −1 −j −1 −j −1 +j −1 +j +1 +j −1 +j −1 +j +1 +j −1 +j −1 +1}.

17. The apparatus of claim 16, wherein the plurality of OFDM TRN sequences comprises an eighth OFDM TRN sequence TRN-BASIC$^{8}_{-386,386}$=[Seq$^{8}_{left,\ 385}$, 0, 0, 0, Seq$^{8}_{right,\ 385}$] corresponding to an eighth transmit chain, wherein Seq$^{8}_{left,\ 385}$=1 +1 +1 −j +1 −j −1 −j +1 −j +1 +j +1 +j −1 +1 +1 +j −j −j −1 +1 +1 −j +j +j −1 +j −1 −j −1 −j −1 +j −1 +j +1 +j +1 −1 −1 +j −j −+1 −1 −1 −j +j +j −1 +j −1 +j +1 +j −1 +j −1 −j −1 −j +1 −1 −1 −j +j +j +1 −1 −1 +j −j −+1 −j +1 +j +1 +j +1 −j +1 −j −1 −j −1 +1 +1 −j +j +j −1 +1 +1 +j −j −j −1 +j −1 +j +1 +j +1 −j +1 +j +1 +j −1 +1 +1 +j −j −+1 −1 −1 +j −j −+1 −j +1 +j +1 +j −1 +j −1 +j +1 +j +1 −1 −1 +j −j −j −1 +1 +1 +j −j −+1 −j +1 −j −1 −j −1 +j −1 −j −1 −j +1 −1 −1 −j +j +j −1 +1 +1 −j +j +j −1 +j −1 −j −1 −j +1 −j +1 −j −1 −j −1 +1 +1 −j +j +j +1 −1 −1 −j +j +j −j −1 −j −1 +j −1 −j −1 −j +1 −j +1 +j −j −+1 −1 −1 +j −j −j −1 +1 +1 −j −1 −j +1 −j +1 −j −1 −j −1 +j −1 +j −j −j −1 +1 +1 +j −j −+1 −1 −1 −j −1 −j −1 +j −1 −j −1 −j +1 −j +1 +j −j −+1 −1 −1 +j −j −j −1 +1 +1 −j −1 −j +1 −j +1 −j −1 −j −1 +j −1 +j −j −j −1 +1 +1 +j −j −+1 −1 −1 +j +1 +j +1 −j +1 −j −1 −j +1 −j +1 +j −j −+1 −1 −1 −j +j +j +1 −1 −1 +j +1 +j −1 +j −1 −j −1 −j −1 +j −1 +j −j −j −1 +1 +1 −j +j +j −1 +1 +1 +j +1 +j +1 −j +1 −j −1 −j +1 −j +1 +j −j −+1 −1 −1 −j +j +j +1 −1 −1 +j +1 +j −1 +j −1 −j −1 −j −1 +j −1 +j −j −j −1 +1 +1 −j +j +j −1 +1 +1}, and wherein Seq$^{8}_{right,\ 385}$={−1 +j −1 +j +1 +j −1 +j −1 −j −1 −j +1 −1 −1 −j +j +j +1 −1 −1 +j −j −+1 −j +1 +j +1 +j +1 −j +1 −j −1 −j −1 +1 +1 −j +j +j −1 +1 +1 −j +j +j −1 +1 +1 +j −j −j −1 +j −1 +j +1 +j −1 +j −1 −j −1 −j +1 −1 −1 −j +j +j +1 −1 −1 +j −j −+1 −j +1 +j +1 +j +1 −j +1 −j −1 −j −1 +1 +1 −j +j +j −1 +1 +1 +j −j −+1 −j +1 −j −1 −j −1 +j −1 −j −1 −j +1 −1 −1 −j +j +j −1 +1 +1 −j +j +j −1 +j −1 −j −1 −j −1 +1 +1 −j +j +j +1 −1 −1 −j +j +j +1 −j +1 −j −1 −j −1 +j −1 −j −1 −j +1 −1 −1 −j +j +j −1 +1 +1 −j +j +j −1 +j −1 −j −1 −j +1 −j +1 −j −1 −j −1 +1 +1 −j +j +j +1 −1 −1 −j +j +j +j +1 +j +1 −j +1 +j +1 +j −1 +j −1 −j +j +j −1 +1 +1 −j +j +j +1 −1 −1 +j +1 +j −1 +j −1 +j +1 +j +1 −j +1 −j +j +j +1 −1 −1 −j +j +j −1 +1 +1 −j −1 −j −1 +j −1 −j −1 −j +1 −j +1 +j −j −+1 −1 −1 +j −j −j −1 +1 +1 −j −1 −j +1 −j +1 −j −1 −j −1 +j −1 +j −j −j −1 +1 +1 +j −j −+1 −1 −1 −j −1 −j −1 +j −1 +j +1 +j −1 +j −1 −j +j +j −1 +1 +1 +j −j −−1 +1 +1 −j −1 −j +1 −j +1 +j +1 +j +1 −j +1 −j +j +j +1 −1 −1 +j −j −+1 −1 −1 +j +1 +j +1 −j +1 −j −1 −j +1 −j +1 +j −j −+1 −1 −1 −j +j +j +1 −1 −1 +j +1 +j −1 +j −1 −j −1 −j −1 +j −1 +j −j −j −1 +1 +1 −j +j +j −1 +1 +1 +1}.

18. The apparatus of claim 11, wherein the TRN field is after a data field of the EDMG OFDM PPDU.

19. The apparatus of claim 11 comprising the plurality of transmit chains to transmit the TRN field of the EDMG OFDM PPDU based on the plurality of TRN transmit waveforms.

20. The apparatus of claim 19 comprising a plurality of antennas connected to the plurality of transmit chains, and a processor to execute instructions of an Operating System (OS).

* * * * *